US012766405B2

(12) United States Patent
Phillips et al.

(10) Patent No.: US 12,766,405 B2
(45) Date of Patent: Oct. 20, 2026

(54) INVITING OR CONTROLLING REMOTE PLAYER CONNECTIONS VIA CONSOLE OR CLOUD SERVICE CLIENT OF GAME PUBLISHER OR REMOTE PLAY APPLICATION INCLUDING ESTABLISHMENT OF ULTRA-LOW LATENCY PEER-TO-PEER CONNECTION

(71) Applicant: Adeia Guides Inc., San Jose, CA (US)

(72) Inventors: Christopher Phillips, Hartwell, GA (US); Charles Dasher, Lawrenceville, GA (US); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 220 days.

(21) Appl. No.: 18/428,317

(22) Filed: Jan. 31, 2024

(65) Prior Publication Data

US 2025/0242235 A1 Jul. 31, 2025

(51) Int. Cl.
*A63F 13/35* (2014.01)

(52) U.S. Cl.
CPC .................................... *A63F 13/35* (2014.09)

(58) Field of Classification Search
CPC ...................................................... A63F 13/35
See application file for complete search history.

(56) References Cited

U.S. PATENT DOCUMENTS 8,613,673 B2 12/2013 Perry et al.
9,071,603 B1 * 6/2015 Frederick ............ H04L 67/1091
10,498,860 B2 12/2019 Howell et al.
10,643,492 B2 5/2020 Lee et al.
(Continued)

FOREIGN PATENT DOCUMENTS

WO 2024/124335 A1 6/2024

OTHER PUBLICATIONS

PlayStation. PS Remote Play: Download the PS remote play app and stream PS5 and PS4 games to your device. (2023). Retrieved Dec. 2, 2023, from http://www.playstation.com/en-us/remote-play/ (15 pages).

(Continued)

*Primary Examiner* — Malina D. Blaise
(74) *Attorney, Agent, or Firm* — HG LAW LLP

(57) ABSTRACT

Methods and systems are provided for improving remote computing experiences. The methods leverage modified PC or console architectures, which enable both local and remote console connections. The systems operate with multiple devices through a peer-to-peer connection. In the context of gaming, the systems are engineered to address obstacles such as low upstream rates and limited bandwidth or quality of service. An AI trained on play style is used as a substitute for a low bandwidth client. Also, methods are provided for inviting remote players, transferring control to a remote user, managing controller connections, and addressing low bandwidth situations using adaptive bitrate. The enhancement of connection, single encoding, and transmission processes contributes to a superior computing and/or gaming experience for all players, irrespective of their bandwidth or quality of service. Related networks, models, apparatuses, devices, techniques, articles, architectures, packets, manifests, tables, data storages, and graphical user interfaces are provided.

20 Claims, 77 Drawing Sheets

(56) References Cited

U.S. PATENT DOCUMENTS

2006/0287096 A1* 12/2006 O'Kelley, II ........... A63F 13/12
463/42
2007/0117617 A1* 5/2007 Spanton .................. A63F 13/12
463/40
2010/0166062 A1 7/2010 Perlman et al.
2010/0166068 A1 7/2010 Perlman et al.
2012/0309539 A1* 12/2012 Smith ................... A63F 13/795
463/42
2012/0310956 A1* 12/2012 Huhn .................... A63F 13/795
707/769
2012/0310959 A1* 12/2012 Huhn .................. G06F 16/2282
707/E17.014
2012/0311036 A1* 12/2012 Huhn .................... A63F 13/795
709/204
2013/0102392 A1* 4/2013 Nakata .................... A63F 13/35
709/204
2013/0210528 A1 8/2013 Pereira et al.
2013/0254278 A1* 9/2013 Buhr .................. G06Q 10/0639
709/204
2013/0324263 A1 12/2013 Ahiska et al.
2014/0018152 A1* 1/2014 Kislyi ..................... A63F 13/12
463/23
2014/0177813 A1* 6/2014 Leeds ............... H04M 3/42051
379/67.1
2015/0038233 A1* 2/2015 Rom ....................... A63F 13/42
463/42
2015/0088624 A1* 3/2015 Frederick ........... G06Q 30/0209
705/14.12
2015/0244760 A1 8/2015 Tun et al.
2016/0001184 A1* 1/2016 Sepulveda .............. A63F 13/60
463/31
2016/0001187 A1* 1/2016 Sepulveda .............. A63F 13/49
463/31
2016/0086137 A1* 3/2016 Ackerman ......... G06Q 10/1093
705/7.19
2016/0166935 A1* 6/2016 Condrey ................. A63F 13/48
463/31
2016/0206961 A1* 7/2016 Taylor ................... A63F 13/795
2016/0359939 A1 12/2016 Truax
2019/0282897 A1 9/2019 Posin
2019/0320494 A1* 10/2019 Jayawardene ........ H04W 48/18
2019/0392729 A1 12/2019 Lee et al.
2022/0249959 A1* 8/2022 Leppinen .............. A63F 13/352
2023/0201714 A1 6/2023 Perry et al.
2023/0214925 A1 7/2023 Cella et al.
2024/0207731 A1 6/2024 Chen
2024/0236432 A1 7/2024 Martin-Cocher et al.
2024/0307773 A1 9/2024 Panneer et al.
2025/0076080 A1 3/2025 Phillips
2025/0242235 A1* 7/2025 Phillips ................... A63F 13/35
2025/0242236 A1* 7/2025 Phillips ................. A63F 13/358

OTHER PUBLICATIONS

Johansson, I., & Sarker, Z. (Dec. 2017). RFC 8298—Self-Clocked Rate Adaptation for Multimedia. IETF. Retrieved Dec. 2, 2023, from https://datatracker.ietf.org/doc/html/rfc8298 (36 pages).

PlayStation. How to use Share Screen and Share Play on PS5 consoles. (2023). Retrieved Dec. 2, 2023, from https://www.playstation.com/en-us/support/games/ps5-share-play/#play (7 pages).

Steam. Steam Remote Play. (2023). Retrieved Dec. 2, 2023, from https://store.steampowered.com/remoteplay (7 pages).

Steam. Steam Support :: Steam Remote Play. (2023). Retrieved Dec. 2, 2023, from https://help.steampowered.com/en/faqs/view/0689-74B8-92AC-10F2#knownissues (6 pages).

Briscoe, B., Schepper, K. D., Bagnulo, M., & White, G. (Jul. 27, 2022). Low latency, low loss, scalable throughput (L4S) internet service: Architecture. Retrieved Dec. 2, 2023, from https://www.ietf.org/archive/id/draft-ietf-tsvwg-l4s-arch-19.html (29 pages).

Timberlake, R. (Mar. 6, 2022). Best Fighting Games For Four Players. TheGamer. Retrieved Dec. 2, 2023, from https://www.thegamer.com/best-fighting-games-four-players-list/#guardian-heroes-1996 (14 pages).

Wilde, T. (Oct. 22, 2019). Playing local multiplayer games over the internet with Steam works surprisingly well. PC Gamer. Retrieved Dec. 2, 2023, from https://www.pcgamer.com/playing-local-multiplayer-games-over-the-internet-with-steam-works-surprisingly-well/ (16 pages).

* cited by examiner

1910

1900

FIG. 20
2020
2010
2000
PASS CONTROL TO ANOTHER PLAYER
Hunter Arrows Pack [10]
2(10)
Ridge-Wood
1(40)
Metal Shards
Craft
210/210
2/10
5
47

INVITING OR CONTROLLING REMOTE PLAYER CONNECTIONS VIA CONSOLE OR CLOUD SERVICE CLIENT OF GAME PUBLISHER OR REMOTE PLAY APPLICATION INCLUDING ESTABLISHMENT OF ULTRA-LOW LATENCY PEER-TO-PEER CONNECTION

FIELD OF THE DISCLOSURE

The present disclosure relates to sending and receiving of content, coordination of content among local and/or remote users, peer-to-peer communications, gaming, peer-to-peer gaming, peer-to-peer game streaming, peer-to-peer remote play, and the like.

SUMMARY

Remote play over mobile or Wi-Fi has numerous problems and shortcomings. Remote play requires a minimum bandwidth of about 5 Mbps, but greater than or equal to about 15 Mbps is preferable for optimal performance, regardless of network type. This bandwidth requirement is true for mobile, including wide area networks (WANs) covering mobile, digital subscriber lines (DSL), data over cable service interface specification (DOCSIS), mobile fixed line, and the like. The existing remote play operates via a cell phone application (or "app"), which connects to a given console. The app first searches for a local area network (LAN), and if it does not find one, it looks for internet connections. Once a connection is made, the app checks the network.

However, there are several problems with this approach. For instance, if the bandwidth falls below the minimum required by a given console or game (e.g., less than about 5 Mbps), the remote play is cut off. This can lead to long latency (e.g., observed in existing PS5 systems) and undesirable data consumption, especially for those with limited data on their mobile plans. Even simplistic games such as golf are hampered by the long latency. Furthermore, if a battery of a remote player's controller or mobile phone connected via existing remote play runs out of power, the game simply ends on the other side. For disc-based games, the disc must be in the console for validation. Multiple players are not permitted to play the game remotely, leading to an unsatisfactory overall play experience.

Steam, a platform for remote play, has its share of problems. Originally, it was limited to LAN, and all encoding configuration was manual, i.e., the bitrate was hard-coded. The resolution was set for delivery to a connected monitor on a personal computer (PC), and the bitrate was not adaptable. Steam remote play allows a multiplayer experience but with significant issues including an inability to adjust to uplink bandwidth. Steam compels the user to establish the bitrate. Furthermore, Steam streams the game at the display resolution set by the host machine's game settings, which can cause issues at lower uplink bitrates. This necessitates that the host user play the game at the same resolution needed for the encoding resolution, leading to a subpar user experience for the host machine's user. Steam streams to a cloud server first, and then to remote players. The stream is transcoded at this point to match the downlink bitrate of the remote players, resulting in significant latency.

Also, Steam's port binding is uncertain, and there is no indication of whether Steam is able to bind the discovery port, i.e., port 27036. If that fails, no other computers will show up in the remote computer list in the remote play settings. Games may time out but still launch. If a game loses focus, Steam streams a desktop screen. There is limited support for non-Steam games, and surround sound is converted to stereo. Some features are completely unsupported, such as voice recording, and older DirectX controllers and games are not supported. Streaming may not perform well when streaming to older systems with a single or dual-core CPU and no hardware accelerated H264 decoding. There is no Windows XP streaming, and user account control (UAC) dialogs block streaming. In macOS, streaming is supported only from macOS 10.8+ (2012). On SteamOS and Linux builds, device files that allow a user-space process to create and send input events to a kernel input subsystem (e.g., /dev/uinput, an older interface, or /dev/input/uinput, a newer interface) need to be readable and writable by Steam. There is no Linux rumble support. Thus, the existing multiplayer streaming is unsatisfactory.

In another approach, self-clocked rate adaptation for multimedia (SCReAM) does not associate encoding properties based on bitrate change requests to the encoder.

Several improvements to remote play are provided that enhance the remote play experience. For example, systems (including modified architectures of PC or console) support local and/or remote console play with local and/or remote friends. Throughout the disclosure, where the term "friend" or "friends" is used, it should be assumed to refer more broadly to user(s) or participant(s), and the like, who are not necessarily friends in a strict sense, and more specifically, as appropriate to the context, to one or more devices operated by users and participants. That is, the term "friend" or "friends" is used colloquially and for convenience and is not to be construed as limiting.

In some embodiments, the systems comprise a relatively "heavy" PC or console that carries the processing, rendering, and/or gameplay load, variable and/or modulated resolution, frame rate, high efficiency video coding (HEVC, a.k.a., H.265) at a relatively low bitrate (low Mbs), and/or HEVC at a relatively high bitrate (high Mbs), and support for multiple relatively "light" devices (e.g., controllers) or smartphones connected via an app. Cloud services for console game providers and PC game publishers are improved. In some embodiments, device improvements may not be necessary, because the systems provide satisfying remote gameplay to multiple "light" clients.

For example, one method is provided for playing a game with friends, either locally or remotely, using a game console. The game console acts like a server and can connect directly with one or more remote devices (like friends' consoles or computers). The game console sends out a set of instructions (or QoE definition) for the game that is being played. The game console then processes this QoE definition into a map that links encoding bitrates (how fast data is sent) to encoding properties (how the data is formatted). The game console's controller, which manages the rate and properties of the video encoding, receives this map. The controller also receives information about the length of the queue of data packets waiting to be sent, the bitrate of the audio being encoded, and the bitrate from a multiplexer (which combines multiple signals into one) for determining the audio encoding and multiplexing overhead bitrates. The controller processes all this information to determine a target video encoding bitrate and target video encoding properties. The controller then sends these targets to the game console's video encoder, which is connected to a sender that uses, for example, the real-time transport protocol (RTP) to send data. Finally, this sender transmits the multiplexed audio and video encoded at the target video encoding bitrate and with the target video encoding properties to one or more receivers and decoders on the remote client devices. In simple terms, this is a way for a game console to manage how it sends game data to other devices, aiming to provide a good gaming experience whether playing on a console or remotely on another device. It considers various factors like the speed of data transmission and the format of the data to ensure the game runs smoothly.

Systems and methods are provided for overcoming a relatively low upstream rate as a limiter. Other types of implementations include security systems, extended reality environments, and servers where there is one encoder and one network sender sending multimedia streams with video to multiple remote clients in ultra-low latency. Overall remote play and remote operability are improved for users.

In some embodiments, an improved game console is provided as a robust device designed to accommodate not only, for example, four native controllers, whether they are remote or not, but also one, two, three, or multiple light remote devices. These light remote devices are controllers that send and receive human input. The game console delivers ultra-low latency, which ensures a smooth and responsive gaming experience. The encoding process is designed to accommodate all clients. The encoding process uses an encoder encoding at a single bitrate with a framerate and resolution optimized for the bitrate selected to send to the encoder, in contrast, for example, to adaptive bitrate (ABR) encoding. For example, in some embodiments, only one encoder and only one RTP streamer deliver to multiple RTP receivers and handle bitrate control. The system decides what to encode based on the requirements of all the clients.

In some embodiments, one client has a super low bandwidth or low quality of service (QoS). In such cases, the system decides what to do when bandwidth drops below a certain threshold, for example, about 5 Mbps. There are some games, like team hockey, which are completely ruined for all players by this kind of drop in bandwidth. To address this issue, the system offers alternatives. One option is for another player to pick up the controller. Another option is to substitute the low bandwidth client, who is reduced to "spectator mode," with an artificial intelligence (AI) that has been trained on the low bandwidth client's play style.

In some embodiments where the QoS is low, the system switches that player to an ABR server/encoder. Although this may result in a delay, putting the player behind real time, the player can still watch the game but not play the game. For example, the system switches to an ABR server/encoder for the one or more players whose bandwidth drops below a threshold. The system operates as per usual for the other players. In this example, this particular gaming session is also uploading video to a third-party delivery service (e.g., a content delivery network) so that this particular player (who is now in spectator mode) can still watch the game.

In some embodiments, the cloud is provided to establish a peer-to-peer connection from the light devices to the heavy game console. This peer-to-peer connection helps reduce latency versus streaming to and from an intermediate cloud service. This approach ensures that all players, regardless of their bandwidth or QoS, can participate in the gaming experience.

In some embodiments, a process for local and/or remote play via a game console is provided. The process includes accessing a game title quality of experience (QoE) remote play definition, determining a bitrate-to-encoding properties mapping, and determining a target video encoding bitrate and target video encoding properties.

In some embodiments, a process is provided for encoding and sending video and audio via RTP packets, processing received real-time control protocol (RTCP) packets and new or removed source internet protocol (SRC IP) connections and managing the congestion window (CWND) and round trip time (RTT) for each source RTP packet.

In some embodiments, a process is provided for connecting a single encoder and RTP sender to multiple client devices via a user datagram protocol (UDP) delivery port that involves running and rendering video at a video source, encoding video and audio at defined bitrates, receiving audio and video packetized elementary streams (PES) at a multiplexer, and adjusting a video encoding bitrate based on a size of a priority queue of packets changing as a result of a transmission scheduler sending out RTP packets. In some examples, the rate and quality are expected to rapidly increase provided all the clients have a decent QoS. If, for example, a client joins with a poor QoS or a client begins to experience a poor QoS, the video encoded bitrate will drop for all connected clients, in some embodiments.

In some embodiments, a process is provided for sending a new SRC IP address connection to a network congestion controller and adding a new packet response datastore for the SRC IP address.

In some embodiments, a process is provided for inviting remote players and controlling remote player connections via a console device or a cloud service client of a game publisher. The process includes logging a profile associated with a console or game owner in to a console device or PC game publisher cloud service (CD/CS) using credentials, sending a user-authenticated response with a user identification (shown in the drawings as "user_ID") to the CD/CS and a user authentication and/or user search and/or friend connection (UA/US/FC) response to a UA/US/FC controller of the CD/CS. In some embodiments, the cloud service is a PC game publisher cloud service (PCGPCS), which is shown in some of the drawings.

In some embodiments, a process is provided for local and/or remote play via a game console, where the console acts as a server and forms a peer-to-peer connection with remote client devices. The process includes at least one of the following: accessing a game title QoE remote play definition at the game engine; determining a bitrate-to-encoding properties mapping; accessing this mapping; determining a queue length based on a priority queue of RTP packets; determining an audio and/or video bitrate and a multiplexer bitrate; determining a target video encoding bitrate and target video encoding properties; accessing the target video encoding bitrate and the target video encoding properties; encoding video with the target video encoding properties according to the target video encoding bitrate; or sending the encoded video to one or more RTP receivers and/or decoders of the one or more remote client devices. The game title QoE remote play definition includes a frame rate and resolution for ranges of bandwidth conditions in some examples. The process also involves encoding and sending video and audio RTP packets, processing received RTCP packets, and managing the CWND and RTT for each source packet. In response to determining that the packet response datastore is waiting on an RTCP response packet, the SRC IP address is saved at the network congestion controller as a worst-case client device; and for the worst-case client device or a last client device to respond with an RTCP packet, the CWND and RTT are then sent to the transmission scheduler of the game console. This method further includes, in some examples, determining and sending RTP multiplexed encoded video and audio packets (e.g., from the transmission scheduler to the UDP socket), and then sending the same to the remote client devices. The process also includes, in some examples, receiving RTCP packets with the SRC IP address from the remote client devices at the UDP socket.

In some embodiments, a process is provided for local and/or remote play via a game console. The process includes at least one of the following: receiving and processing RTCP packets and existing, new or removed SRC IP connections at a network congestion controller; sending RTCP packets to a packet response datastore; processing the synchronization source (SSRC), timestamp of transmission (TS(TX)), sequence number of a real-time transport protocol (RTP (SN)), RTP packet (RTP(size)), and RTCP packets into a CWND and RTT for each SRC; or sending the CWND and RTT for each source packet to the transmission scheduler. The process also involves, in some examples, at least one of: sending a game title QoE remote play definition from the game engine; processing this definition into a bitrate-to-encoding properties mapping; receiving this mapping, queue length from a priority queue of RTP packets, audio bitrate, and multiplexer bitrate at a rate and video encoding properties controller; processing these into a target video encoding bitrate and target video encoding properties; sending the target video encoding bitrate and the target video encoding properties to a video encoder of the game console operatively connected to an RTP sender of the game console; encoding video with the target video encoding properties in accordance with the target video encoding bitrate; or sending, via the RTP sender, the encoded video to one or more RTP receivers and decoders of the one or more remote client devices. In some examples, the game title QoE remote play definition includes frame rate and resolution for ranges of bandwidth conditions. The process also involves, in some examples, encoding and sending video and audio, and sending RTP multiplexed encoded video and audio packets to the priority queue of the RTP packets and to the transmission scheduler. This method further involves, in some examples, sending RTP multiplexed encoded video and audio packets from the transmission scheduler to the UDP socket, and then to the remote client devices. The process also includes, in some examples, receiving RTCP packets with the SRC IP address from the remote client devices at the UDP socket.

In some embodiments, a process is provided for connecting a single encoder and RTP sender to multiple client devices via a UDP delivery port. The process includes at least one of: running and rendering video at a video source; encoding video and audio at defined bitrates; adjusting a video encoding bitrate based on a size of a priority queue of packets changing as a result of a transmission scheduler sending out RTP packets; sending a new SRC IP address connection to a network congestion controller; adding a new packet response datastore for the SRC IP address; sending RTP multiplexed encoded video and audio packets to the priority queue of packets and to the UDP delivery port for transmission; receiving an RTCP packet at a UDP socket; removing the RTCP packet from a packet response datastore for the SRC IP address of the RTCP packet; saving the SRC IP address as a worst-case client device if the packet response datastore has received the last client device's RTCP response; sending a CWND and RTT to the transmission scheduler; monitoring a queue length of the priority queue of packets; calculating a new video encoding rate based on an audio rate and a multiplexed bitrate; accessing encoding properties based on a multiplexer bitrate and an audio bitrate if a rate adjustment is requested; sending a new target video encoding bitrate and new target video encoding properties to the video encoder; or sending multiplexed audio and video PES streams to the RTP sender and sending the multiplexed bitrate to the rate and video encoding properties controller. In some embodiments, the process includes processing an RTCP response from an RTP receiver on one of the remote client devices at the network congestion control. In some embodiments, the process includes, in response to a last remote client device responding with an RTCP packet with an expected RTP sequence number, removing the RTCP packet from a packet response datastore for the SRC IP address of the RTCP packet. In some embodiments, the multiplexed bitrate is auto-adjusted based on the audio encoded bitrate and video encoded bitrate. The multiplexed audiovisual stream has, for example, additional overhead. In some examples, the additional overhead is accounted for when requesting a bitrate change to the encoder.

In some embodiments, a process is provided for inviting remote players and controlling remote player connections via a console device or a cloud service client of a game publisher. The process includes at least one of: logging a profile associated with a console or game owner in to a CD/CS using credentials; sending a user-authenticated response with a user identification to the CD/CS and a UA/US/FC response to a UA/US/FC controller of the CD/CS; sending a friends list request with the user identification to the user account and authentication system (UAAS) of the console game provider or cloud service (CGP/CS; the cloud service may be a PC game publisher cloud service) in response to user selection of an option to invite remote players; sending a user list with user names and user identifications response to the UA/US/FC controller; adding selected user identifications to an invite list for users to invite at the CD/CS in response to user selection of one or more friends to invite from the user list; sending a search request with a user name and user identification to the UAAS in response to user entry of a name and user selection of a search; adding the selected user identification to the invite list for users to invite at the CD/CS in response to user addition of a searched user to the invite list; sending a remote session request with the user identification and a remote session identifier ("remote_session_ID") to a remote player management controller of the CGP/CS in response to user selection of a send invite selection option; sending an invite with the user identification list, a requesting user name and user identification, RTP streaming connection endpoint (shown in the drawings as "address:port"), and controller connection UDP 1 connection endpoint, UDP 2 connection endpoint, UDP 3 connection endpoint, UDP 4 connection endpoint, and remote session identifier to the remote player management controller of the CGP/CS; sending a user invite request with the requesting user name and user identification, RTP streaming connection endpoint, and controller connection UDP 1 connection endpoint, UDP 2 connection endpoint, UDP 3 connection endpoint, UDP 4 connection endpoint, and remote session identifier to each invited user; or sending the user authentication, user search, and UA/US/FC management controller user login with credentials to the UAAS of the CGP/CS.

In some embodiments, a process is provided for inviting remote players and controlling remote player connections via a remote play application. The process includes at least one of: logging a user in to a remote client application and sending credentials to a UAAS; authenticating the user at the UAAS and sending a user identification to the remote play application; requesting user devices from a CGP/CS at a remote play controller; initiating remote services at the CGP/CS in response to user selection of remote player management and exchanging connection details with the remote play controller; prompting the user to invite friends by adding user identifications to an invite list; sending a request to the UAAS in response to user selection of searching for a name, which responds with a user list; adding the user identification to the invite list in response to user selection of adding a searched user to the invite list; sending an invite request to the CGP/CS from the remote play controller in response to user selection of sending an invite, which transmits an invite request to each invited user; connecting the remote play controller to the console device and starting interaction through a remote display; sending a remote session request to the CGP/CS from the remote play controller, which saves a remote connection IP address; or sending a user invite request to each invited user from the CGP/CS.

In some embodiments, a process is provided for remote players to accept a remote play invite. The process includes at least one of: logging a user in to a remote client application and sending user credentials to a UAAS of a CGP/CS; logging the remote user in to the CGP/CS in response to remote user selection of acceptance of a remote play invite; sending an invite acceptance response to a CD/CS from a remote play controller, which saves an IP address of the remote user; attempting to connect to a controller port at a remote play application; sending a message to a device of the remote user in response to unsuccessful connection to the controller port; in response to successful connection to the controller port; sending controller input to the console device from the remote application; receiving haptic feedback from the console device at the remote application; connecting a RTP streaming UDP connection endpoint of the console device at the remote play controller; or decoding and rendering content for display.

In some embodiments, a process is provided for initial controller connection for local and/or remote users. The process includes at least one of: powering on a console and a controller locally; assigning the locally powered controller as "controller 1" (i.e., the primary controller of the console); restricting primary control to controller 1 at the console; determining whether an additional controller is powered up and, if so, either setting a state that the console does not accept connection of the additional controller if all controller slots are taken, or assigning the additional controller to a next available controller spot if not all controller slots are taken; if the additional controller is not powered up, determining whether a remote user is joining a controller UDP port and, if so, determining whether all controller slots are taken; if all controller slots are taken, determining whether the remote user is joining a CD/CS as a service account owner and, if so, unlocking an option to force a connected local or remote user to disconnect from the controller slot and an option to force console control to controller 1 at a remote application; or if not all controller slots are taken, determining whether the remote user is joining the CD/CS as a service account owner and, if so, either unlocking an option to force console control to controller 1 at a remote application if other remote or local game controllers are connected, or sending force controller 1 mapping and a controller number input mapping request to a local or remote UDP port mapping controller input-output mapper if other remote or local game controllers are not connected.

In some embodiments, a process is provided for passing a controller for local and/or remote play via a game console. The process includes at least one of: determining if all controller slots are full and if any remote users are connected to a remote play game console session; verifying if the connected remote users are saved to a remote player management controller for a remote session identifier; determining if a local player has paused a game and selected a "pass the controller" option, and a type of game in progress; based on the type of game in progress: sending a user list in a remote session request and receiving a user list remote session response; displaying a list of remote users at the console for user selection and receiving user selection to "pass the controller" to; sending local controller pass requests and a "pass the controller" request; sending the "pass the controller" request to the remote play controller of the remote player application; connecting the remote player management controller of the remote play application to the controller UDP connection endpoint; or sending a controller connected response from the remote play controller of the remote play application to the remote player management controller.

In some embodiments, the processes and systems are configured for a particular type of the game in progress. For example, remote play is configured for multiplayer games where all players in the game are sharing the same video screen and controlling all characters that are always in the screen. Also, remote play is configured for multiplayer in the sense of a game (e.g., "Call of Duty") that allows a player to connect to a multiplayer session where there is a multiplayer server and all players are playing on their own devices or through a cloud subscription. Further, remote play is configured for multiplayer games, which could be played locally with no internet connection and all multiplayer aspects are handled locally in the game engine.

In some embodiments, a process is provided for a console owner to request main control or force disconnect for a user when controller ports are full. The process includes at least one of: determining if the console owner is logged into a remote application and if a slot for controller 1 on a CD/CS is occupied by a local or remote user; sending a force controller 1 mapping request from the remote application to a remote player management controller of the CD/CS; disconnecting a connected remote user from a mapped controller UDP socket at the controller input-output mapper and connecting the mapped controller UDP socket of the console owner; if all UDP sockets are occupied, displaying a message to the disconnected remote user and providing the console owner with a list of remote users connected to the controller; if not all UDP sockets are occupied, remapping the connected controller UDP socket of the remote user to an unused controller connection at the controller input-output mapper and mapping the connected controller UDP socket connection of the console owner to controller input 1; receiving console owner selection of a user to remove control from; sending a force controller mapping request for the remote user; disconnecting the connected remote user from the mapped controller UDP socket to the controller input for the remote user; or connecting the controller of the console owner to the mapped controller UDP socket.

In some embodiments, a process is provided for low bandwidth ABR for local and/or remote play via a game console. The process includes at least one of: sending a low bandwidth notification to an RTCP reporting system if the target video encoding bitrate is less than a minimum; sending a disconnect client device request to a remote play controller of the game console; forcing a disconnect from received addresses and ports by the remote play controller; sending a force disconnect request to a remote play client application if an ABR delivery controller session is not already running for a remote session identifier; sending a force disconnect request with the remote session identifier, IP address, and minimum bitrate requirement request to a remote player management controller if a reported bitrate is high enough to reconnect to a peer-to-peer RTP UDP streaming session; sending a session reconnect request to the remote play client application; sending an ABR session end request to an ABR delivery controller if no low bandwidth clients are determined; sending an ABR session start request to the ABR delivery controller if low bandwidth clients are determined; starting an ABR session instance with an RTP transmission receiver, a demultiplexer, an ABR transcoder, and an ABR segmenter; establishing an RTP connection via the RTP transmission receiver; receiving an RTP multiplexed audiovisual packet stream at the RTP transmission receiver and demultiplexing it into video and audio PES packet streams; sending the video and audio PES streams to the ABR transcoder and the ABR segmenter; generating a live manifest at the ABR segmenter and writing segments to an ABR audiovisual segment and manifest storage; sending an ABR live manifest uniform resource locator (URL) notification to the remote play client application; starting an instance of an ABR video player at the remote play client application and sending the ABR live manifest to the ABR video player; downloading and playing ABR segments at the ABR video player and receiving live manifest updates; or sending a calculated bitrate from the ABR video player to the remote play controller of the remote player management controller.

In some embodiments, a process is provided for providing local and remote play via a game console, prompting user selection to invite remote players to a gaming session, and forming a peer-to-peer connection between the game console and remote client devices. The prompting is provided, in some examples, after a pause command during the gaming session, with a main game screen, or with a main console interface. The process also includes, in some examples, prompting user selection to pass control to a remote user during a gaming session, determining if all controller slots are full, if remote users are connected to a remote play game console session, if a local player has paused a game and selected a "pass the controller" option, and/or if a type of game in progress. The process involves, based on the type of game in progress: sending a user list in a remote session request, receiving a user list remote session response, displaying a list of remote users at the console for user selection, receiving user selection to "pass the controller" to, sending local controller pass requests, sending a "pass the controller" request, connecting the remote player management controller to the controller UDP connection endpoint, and sending a controller connected response. The process also includes, in some examples, suspending a gameplay mode of the remote player and placing the remote player in a spectator mode in response to detection of a low bandwidth connection associated with the remote player, changing an appearance of a displayed game element associated with the remote player in the spectator mode, replacing gameplay by the remote player with an artificial intelligence trained on a play style of the remote player, and/or ending the spectator mode of the remote player and reverting the remote player to the gameplay mode in response to detection of a sufficient bandwidth connection associated with the remote player.

As detailed herein, related systems for performing one or more of the processes above are provided. Architectures of the related systems are provided. Related packets, manifests, tables, and data storages are provided. Related graphical user interfaces (GUIs) are provided. Related non-transitory, computer-readable media, having non-transitory, computer-readable instructions encoded thereon that, when executed by control circuitry, cause the control circuitry to perform one or more of the processes above are provided. Related devices for performing one or more of the processes above are provided. Means for performing one or more steps of one or more of the processes above are provided.

The present invention is not limited to the combination of the elements as listed herein and may be assembled in any combination of the elements described herein.

These and other capabilities of the disclosed subject matter will be more fully understood after a review of the following figures, detailed description, and claims.

BRIEF DESCRIPTIONS OF THE DRAWINGS

The present disclosure, in accordance with one or more various embodiments, is described in detail with reference to the following figures. The drawings are provided for purposes of illustration only and merely depict non-limiting examples and embodiments. These drawings are provided to facilitate an understanding of the concepts disclosed herein and should not be considered limiting of the breadth, scope, or applicability of these concepts. It should be noted that for clarity and ease of illustration these drawings are not necessarily made to scale.

The embodiments herein may be better understood by referring to the following description in conjunction with the accompanying drawings, in which like reference numerals indicate identical or similar elements, and in which.

Figure 1:
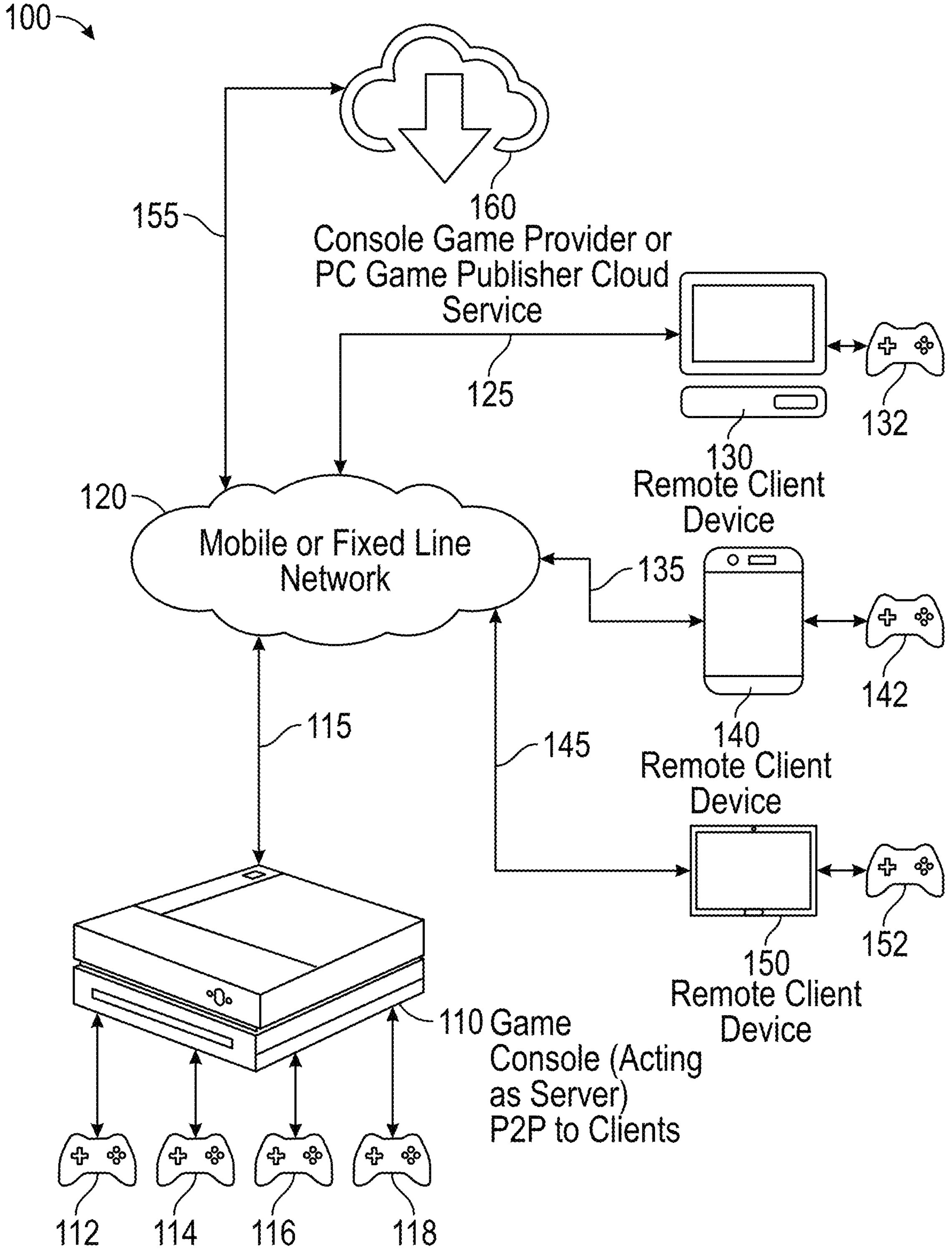
FIG. 1 depicts a system for local and/or remote play via a game console, where the console acts as a server and forms a peer-to-peer connection with remote client devices, in accordance with some embodiments of the disclosure.

Throughout the drawings, continuations of drawings are labeled with "(Continued)," and the continuations between sheets are labeled with circles labeled sequentially in alphabetic order, i.e., "A" (in a circle), "B" (in a circle), and so on. Where the continuations exceed 26 in number (such as at Sheet 7/77, FIG. 4 (Continued)), the labels continue with "AA" (in a circle), "AB" (in a circle), and so on.

The drawings are intended to depict only typical aspects of the subject matter disclosed herein, and therefore should not be considered as limiting the scope of the disclosure. Those skilled in the art will understand that the structures, systems, devices, and methods specifically described herein and illustrated in the accompanying drawings are non-limiting embodiments and that the scope of the present invention is defined solely by the claims.

DETAILED DESCRIPTION

A game console, a console game provider, and a game publisher cloud service offer a variety of features to enhance the gaming experience. These systems allow for both local and remote play, enabling users to engage with friends regardless of their geographical location. Some features include the ability to play together virtually, invite remote players, share games in single-player mode, and participate in multiplayer gaming. The systems also ensure efficient delivery of game data through a single stream and adapt to varying bandwidths and game-based bitrate requirements. These features collectively create an immersive, flexible, and accessible gaming experience, fostering social connections and shared gaming experiences.

A game console is provided for local and/or remote console play with local and/or remote friends. Also, a CGP/CS is provided for local and/or remote console play with local and/or remote friends. One or more of the following features may be provided with the game console and/or the CGP/CS.

Playing Together Virtually: This feature allows game console or PC game owners to play with friends or family who are far away, creating an experience as if they were playing in the same room.

Inviting Remote Players: A user at home can invite others to join their game. These invited players may use a device with a remote play application (like a phone, tablet, or streaming stick). They are not required to own the game console or PC game themselves.

In some embodiments, a console owner is provided with a capability to extend invitations to friends for participation in gaming activities via a remote play application. The invitation process can be initiated from within the application itself. The system is location-agnostic, which allows the console owner to extend these invitations irrespective of their physical location. This feature augments flexibility and accessibility of gaming experiences, enabling enjoyment of multiplayer games with friends regardless of each individual's geographical location. The system serves as an effective medium for maintaining social connections and facilitating shared gaming experiences.

Sharing the Game in Single Player Mode: In games that are usually for one player, this feature allows users to take turns playing the game with remote friends, just like passing a game controller around in the same room. Unlike conventional approaches, this feature is achieved, for example, with a console and peer-to-peer connections to one or more remote devices. In some embodiments, specific bandwidth management for the peer-to-peer connection is leveraged to provide improved QoE.

Multiplayer Gaming: For games that support multiple players, this feature allows all players to join the game as if they were in the same room, regardless of their location. They can even pass the game controller back and forth virtually.

Single Stream Delivery: All remote devices receive the game data from a single encoder and a single RTP stream, making the delivery process more efficient. In some embodiments, a direct peer-to-peer connection is provided to the client device. For example, a new adaptable bitrate and encoding quality controller is provided. The adaptable bitrate and encoding quality controller is provided, for example, with a single encoder and a single RTP sender. The single encoder and the single RTP sender are configured to connect to one or more clients over an unmanaged network. As such, remote play is provided in a peer-to-peer connection with multiple clients.

Bandwidth Adaptability: If a remote player's internet connection weakens, they can be switched to a cloud based ABR stream to continue watching the game. Once their connection improves, they can rejoin the game as a player.

Game-Based Bitrate Adjustment: The game can adjust its bitrate requirements based on the game's activity level and the player's network quality. For example, during high-action sequences, the game might require a higher framerate. If a player's network cannot meet the minimum requirements, they might be switched to a view-only mode until their network quality improves. As an example, bitrate requirements and encoding properties are controlled by a game engine through an application programming interface (API). The bitrate requirements and encoding properties are based, for example, on a level of action (e.g., higher action translates to a higher framerate), or a type of scene (e.g., a cutscene is delivered at a lower framerate and higher resolution). That is, game-controlled encoding parameters are based on the network QoS and/or bandwidth at any given point in time. In some examples, a minimum bandwidth required changes based on a lowest bitrate defined in encoding profiles. The changing minimum bitrate determines if a client device whose network QoS prevents the client device from meeting the minimum encoding properties based on its bandwidth will be either dropped or switched to a view-only ABR delivery mode until the device can meet the minimum network QoS and/or bandwidth requirements. For example, if a device's network quality is not sufficient to meet the minimum requirements for data transfer speed (bitrate), it might not be able to handle the encoding. In such cases, the device will either be disconnected or switched to a "view-only" mode that requires less data but increases latency. It may stay in this mode until the network quality improves and can meet the minimum requirements.

Other conditions may trigger a drop or switch to ABR. For example, a drop or switch to ABR may be triggered when a remote device decodes at a limited frame rate or limited resolution and displays a limited refresh rate (natively or battery constrained).

In some embodiments, a holistic QoS of all players is assessed. For example, if a remote player has a lower bandwidth that is still playable, the system evaluates how the lower bandwidth affects the QoS for the entire gaming session for all remote users. If this player's low bandwidth limits the session's QoS, then the system automatically switches this player to a "view-only" mode. This action is taken if removing this player can noticeably improve the gaming experience for others who have higher bandwidth.

These features make remote gaming more accessible, flexible, and enjoyable for everyone involved. They represent improvements in the gaming experience, especially for those who want to play with others remotely.

In some embodiments, the game controller provided for local and/or remote console play with local and/or remote friends is part of a system (e.g., FIG. 4) that ensures full QoS for multiple clients (e.g., three clients are illustrated), in some instances requiring a bandwidth greater than about 15 Mbps. System 400 of FIG. 4 comprises a game console that includes a game engine, video encoder, audio encoder, multiplexer, RTP sender, transmission scheduler, and a UDP socket that can connect to one or more remote client devices. The game console also includes a rate and video encoding properties controller for multiplayer, low-latency gaming, and a network congestion controller.

In some embodiments, the console game provider or PC game publisher cloud service provided for local and/or remote console play with local and/or remote friends is part of a system (e.g., FIG. 7) that is configured to send and receive data to and from the game console and one or more client devices. System 700 of FIG. 7 may be similar to the system 400 in some or all regards. Additionally, the game console of the system 700 includes a UA/US/FC controller, a transport bandwidth control system, and a remote play controller. The system 700 also includes a CGP/CS with a UAAS and a remote player management controller.

Figure 15:
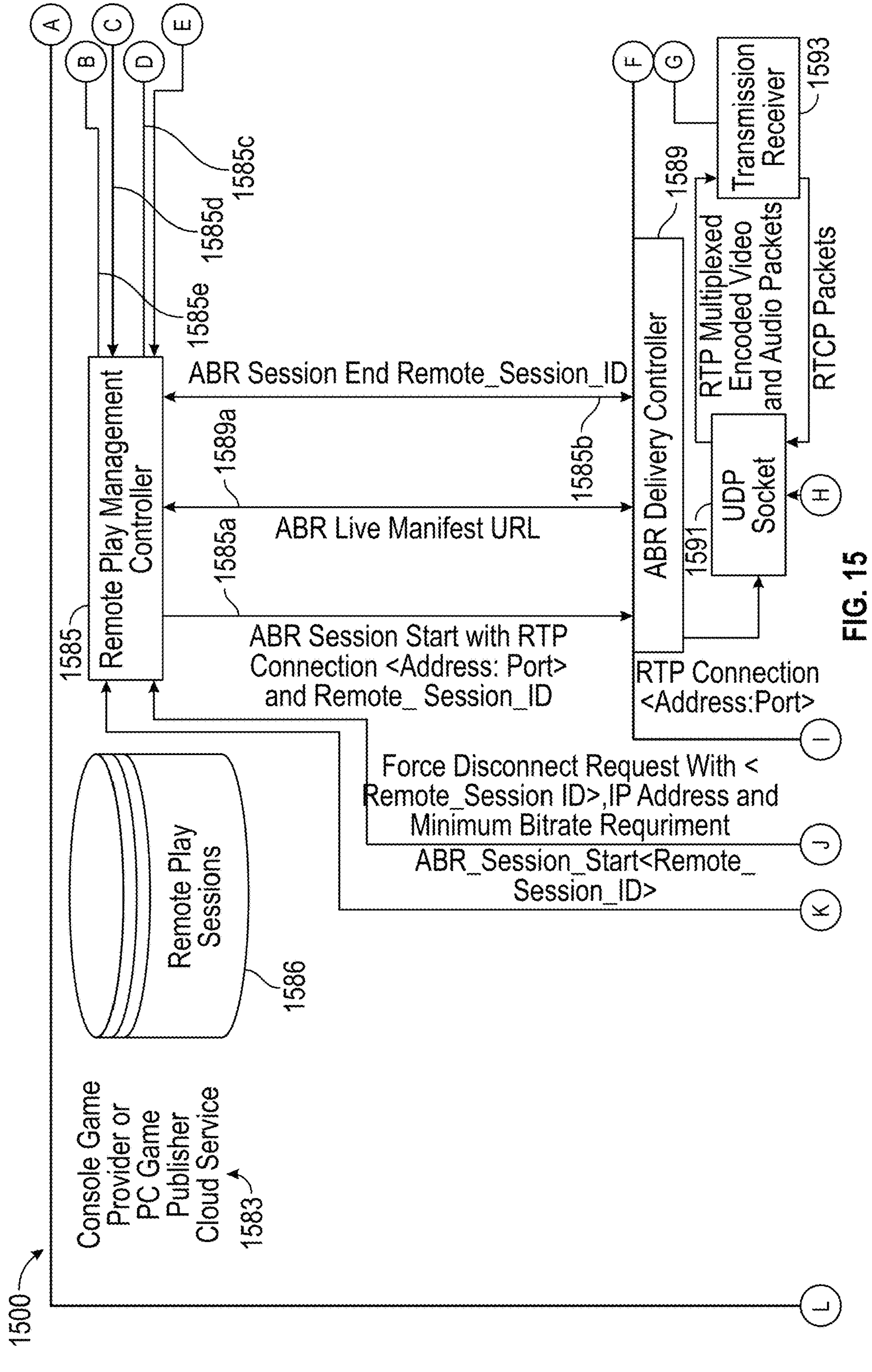
FIG. 15 depicts a system with focus on determining whether a user has sufficient bandwidth based on a standard (e.g., a determined minimum), which will cause the user to be disconnected, in accordance with some embodiments of the disclosure.
Figure 15:
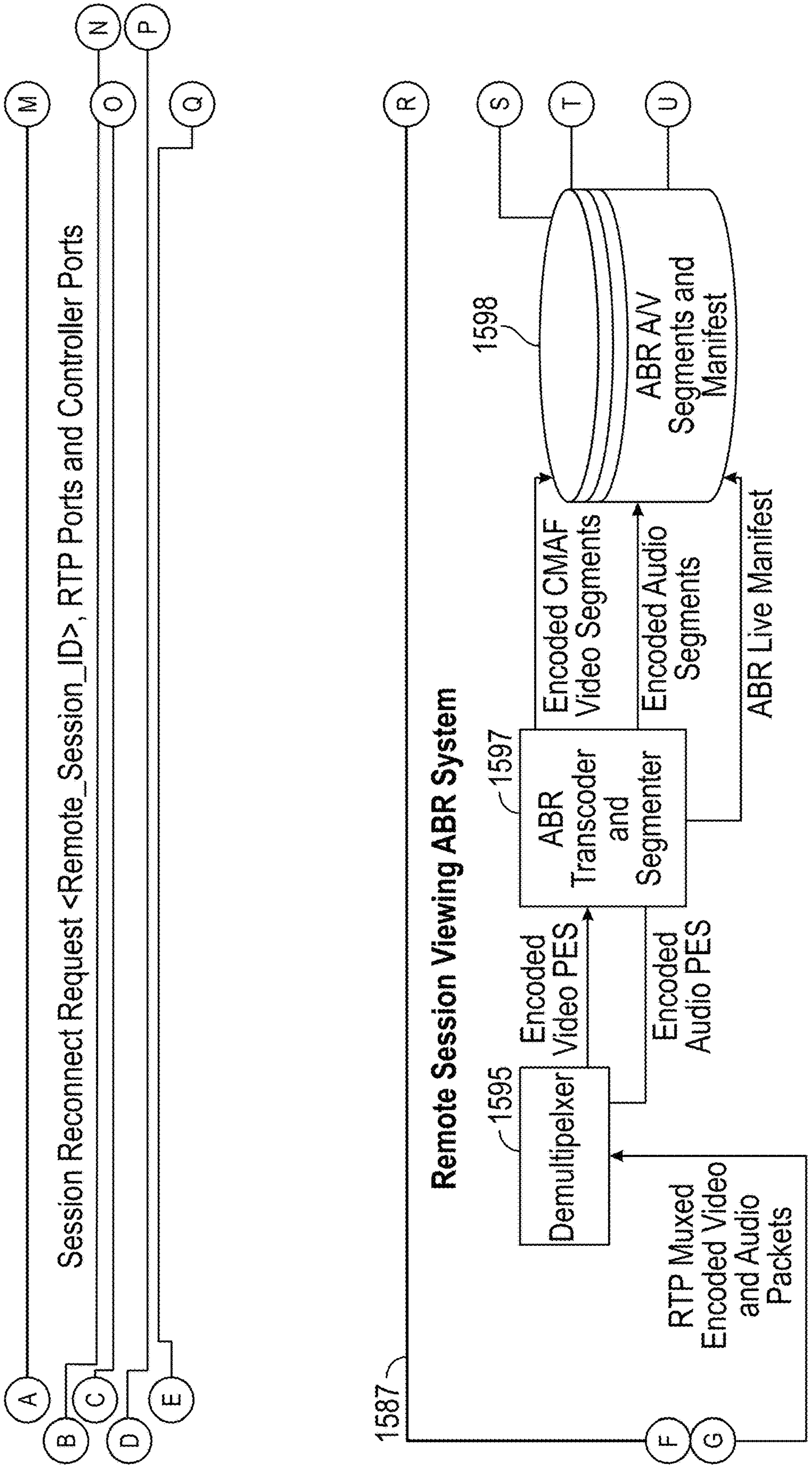
Figure 15:
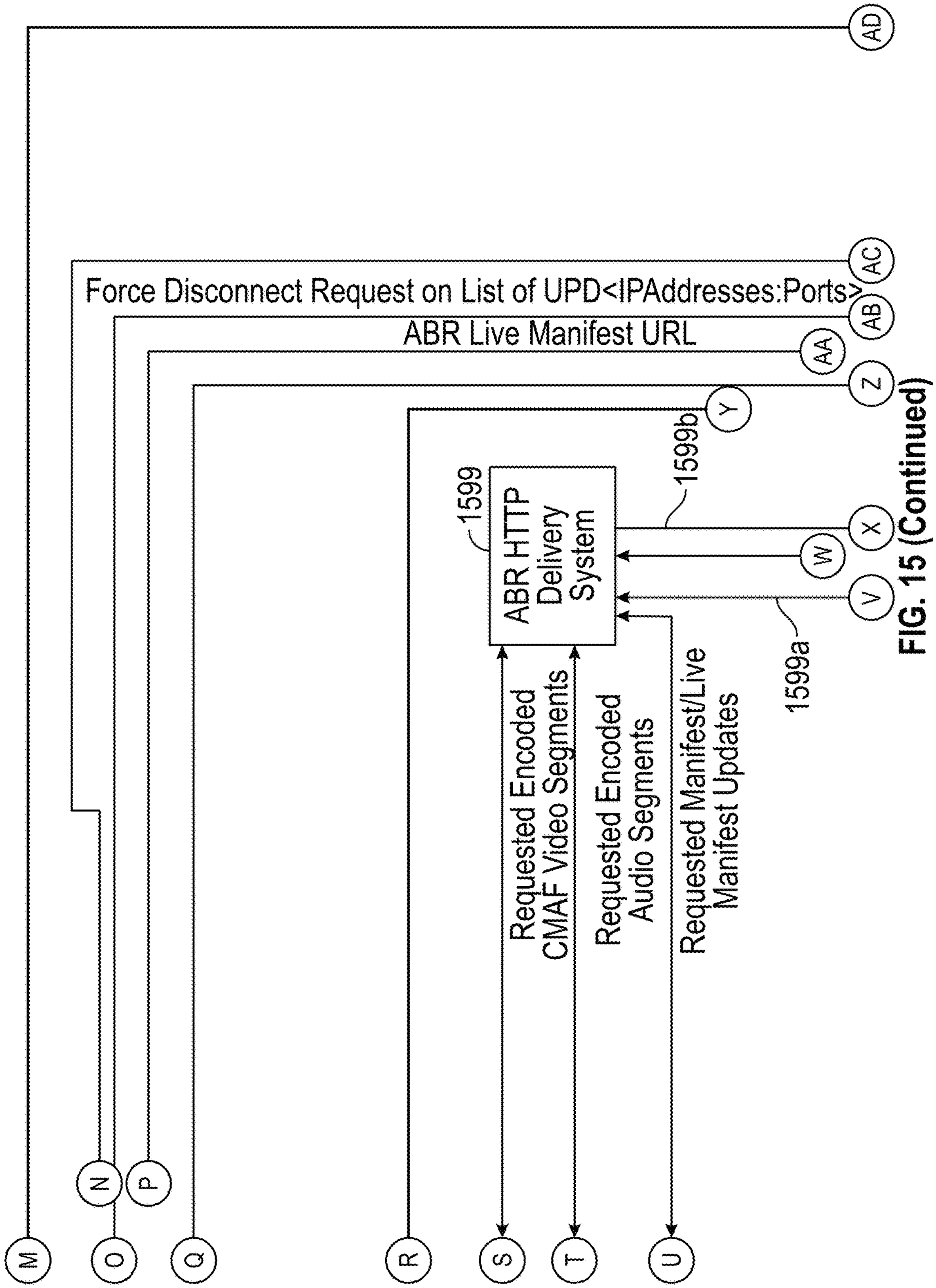
Figure 15:
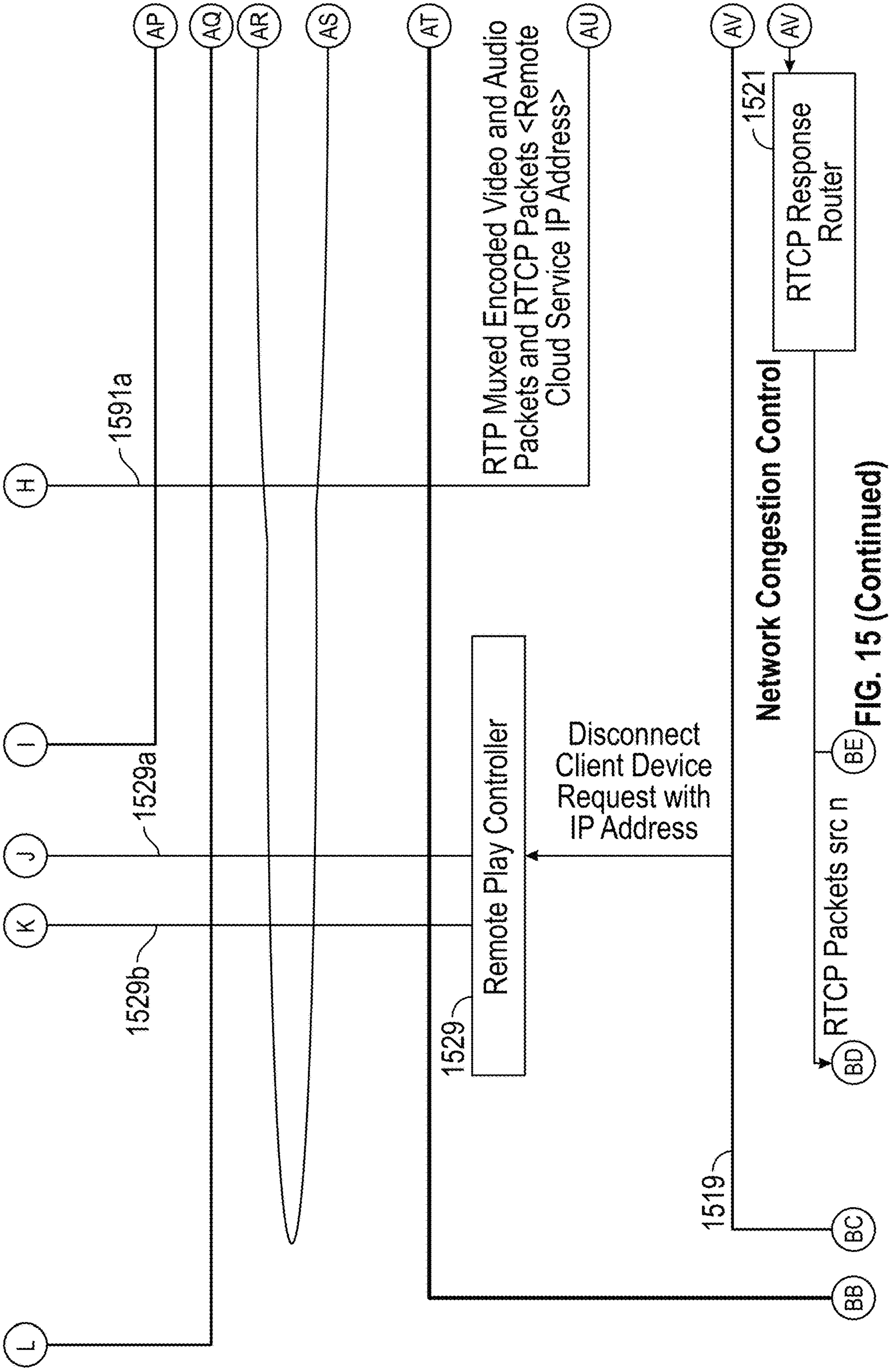
Figure 15:
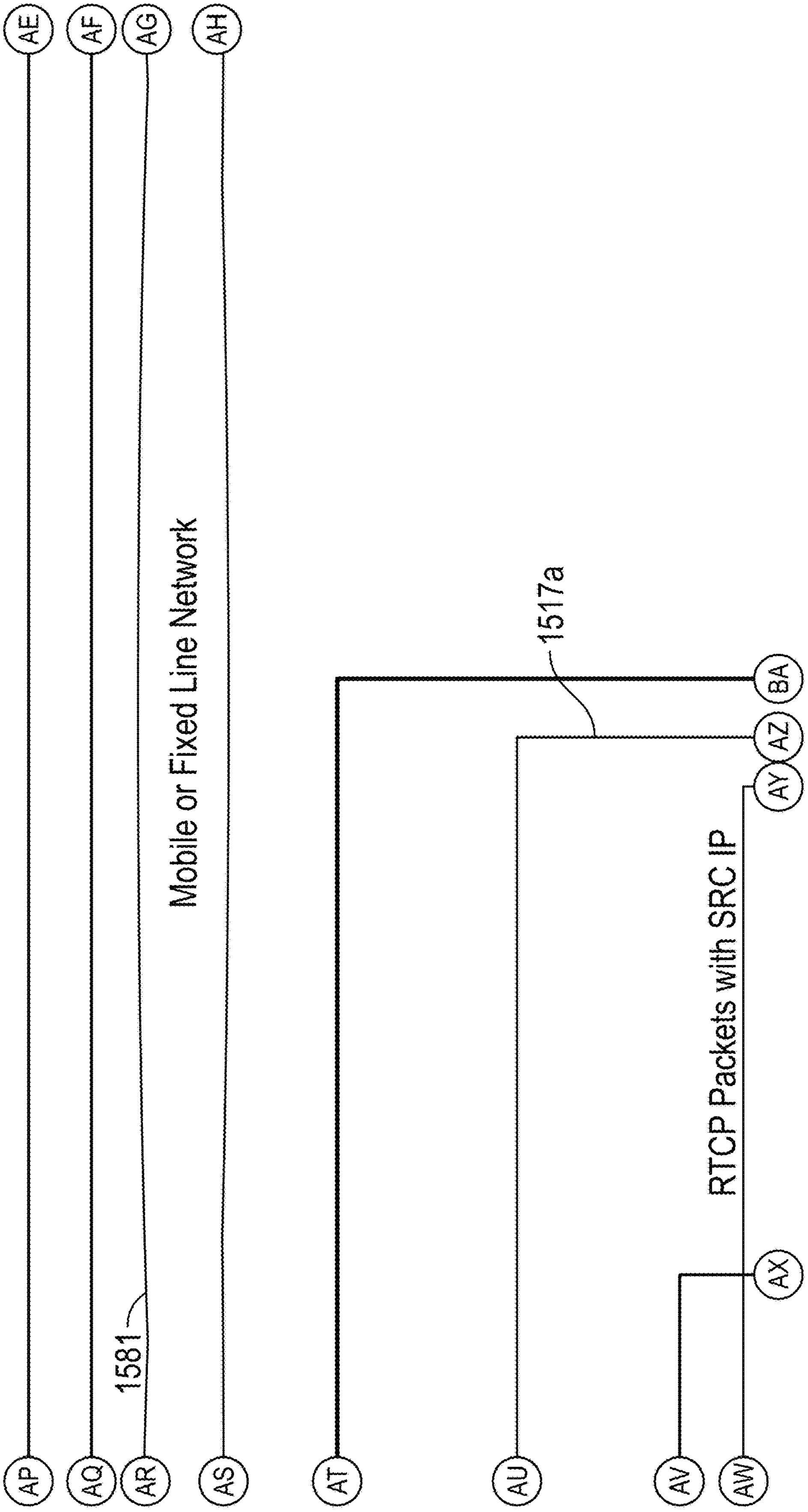
Figure 15:
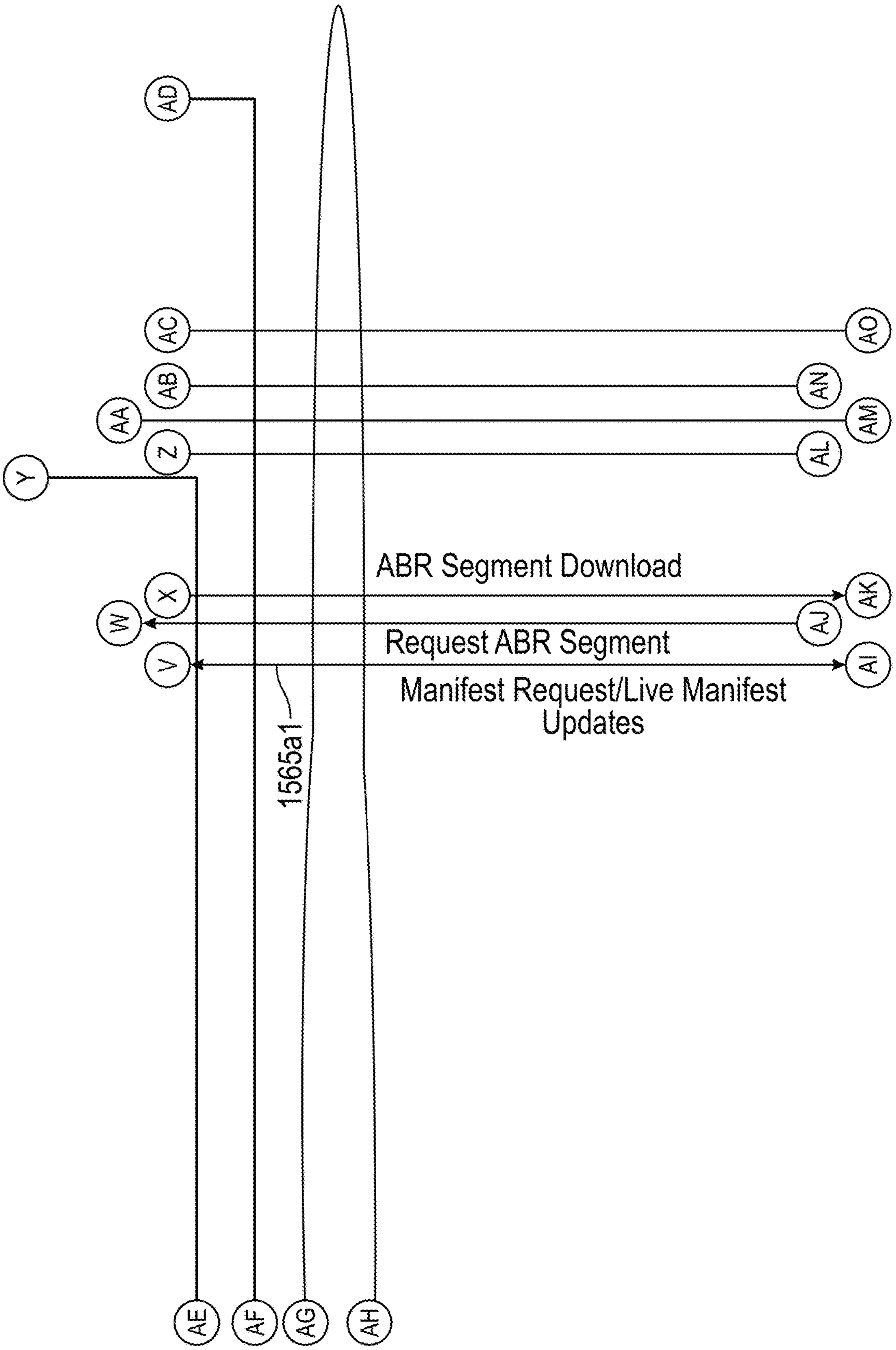
Figure 15:
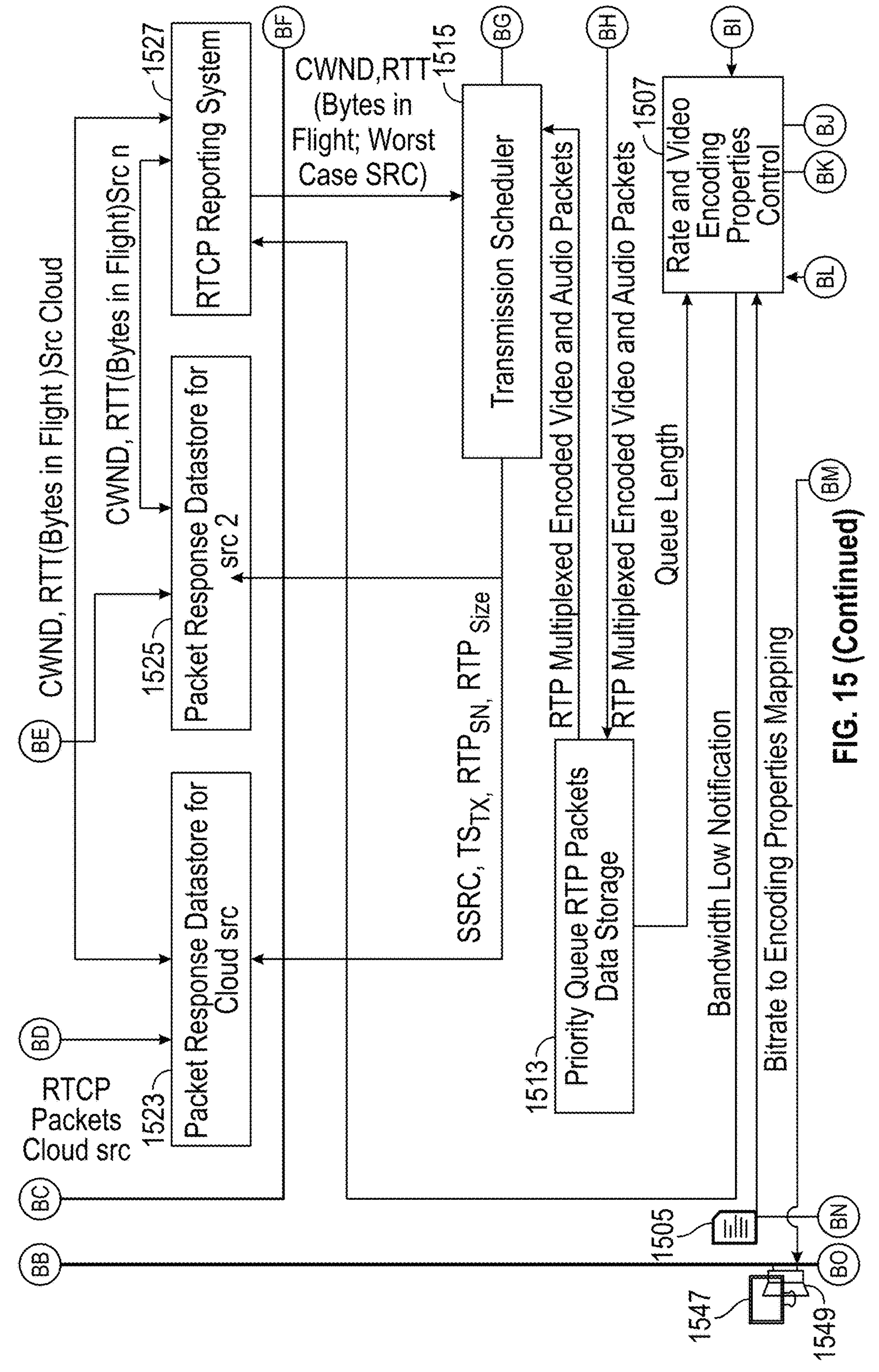
Figure 15:
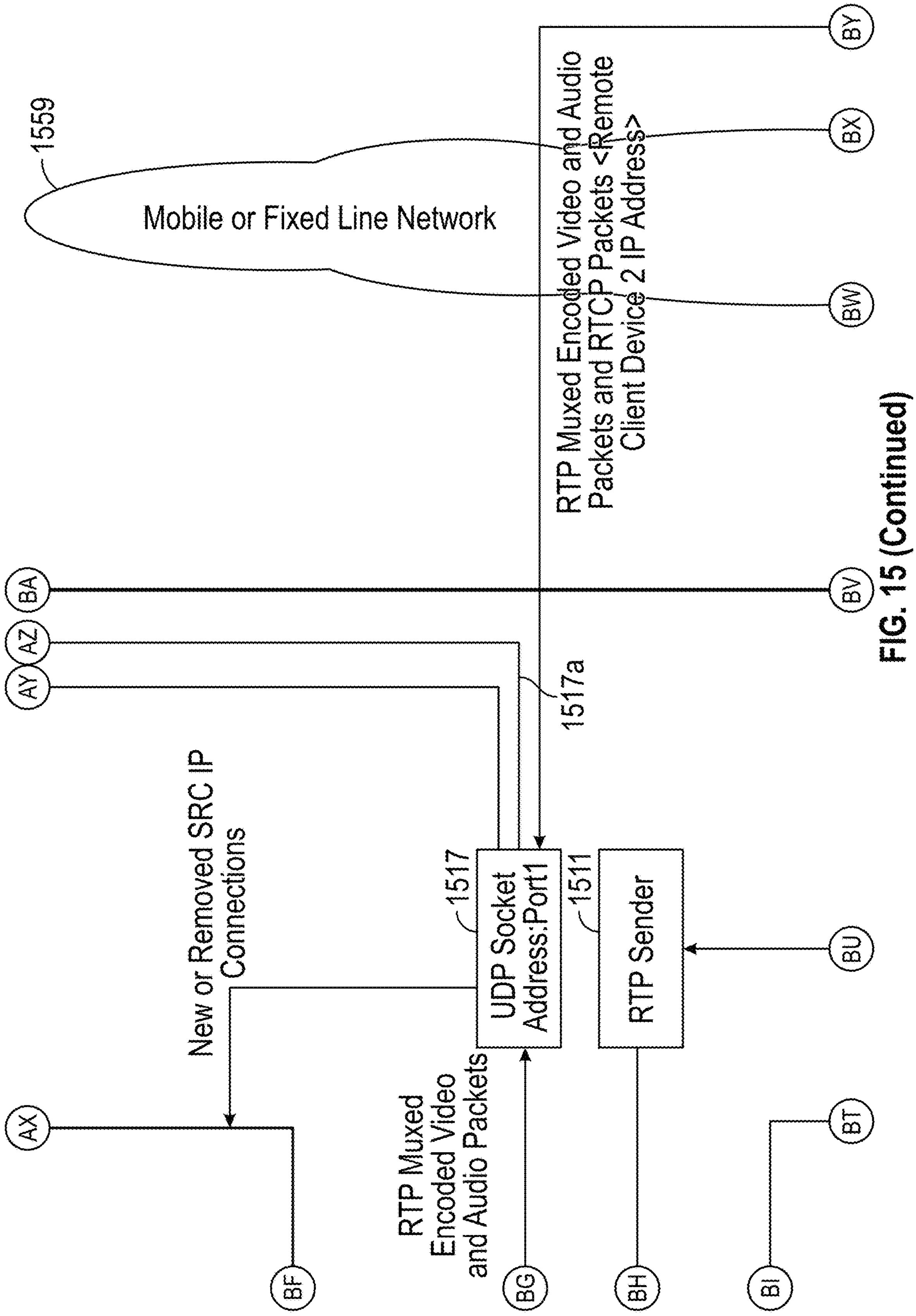
Figure 15:
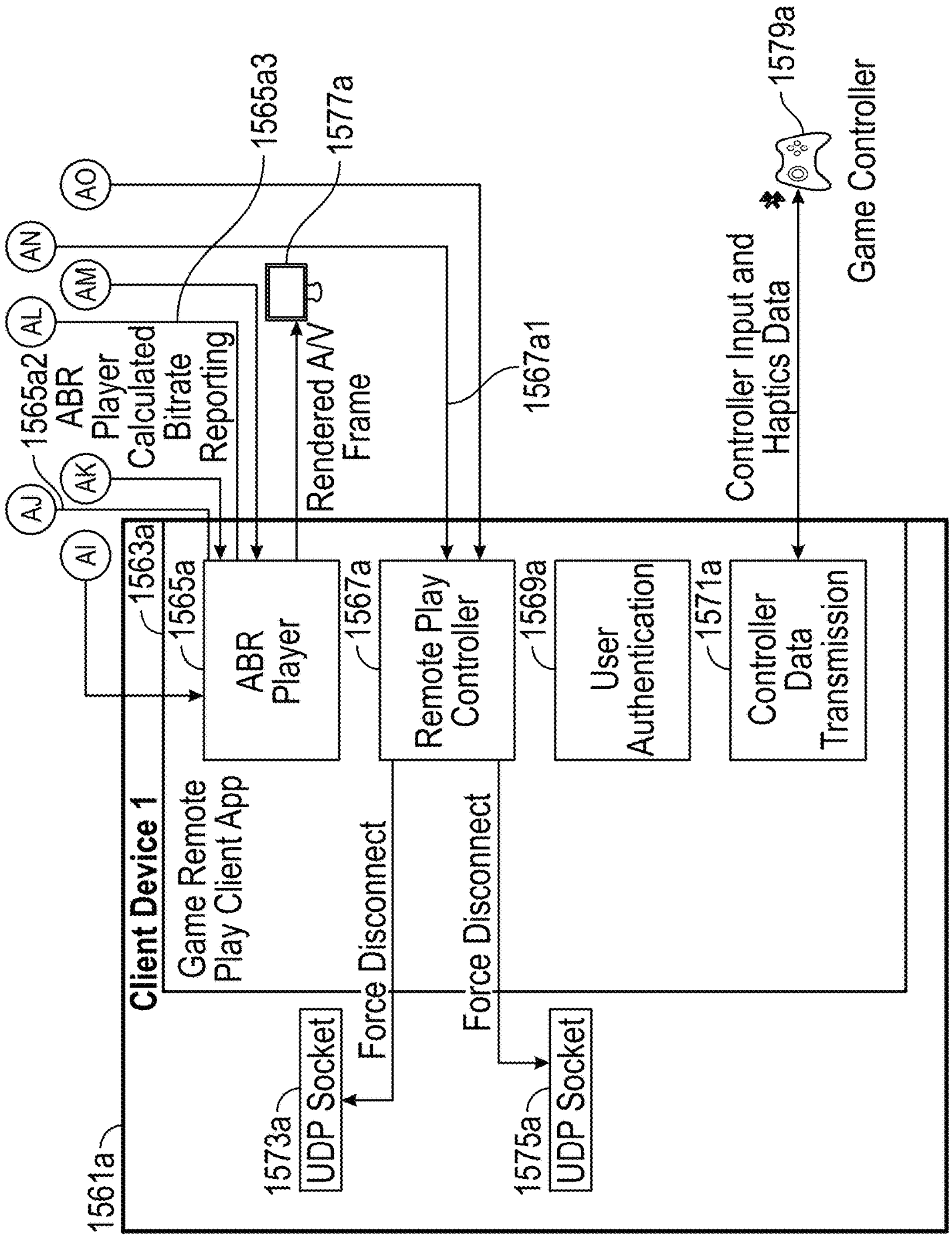
Figure 15:
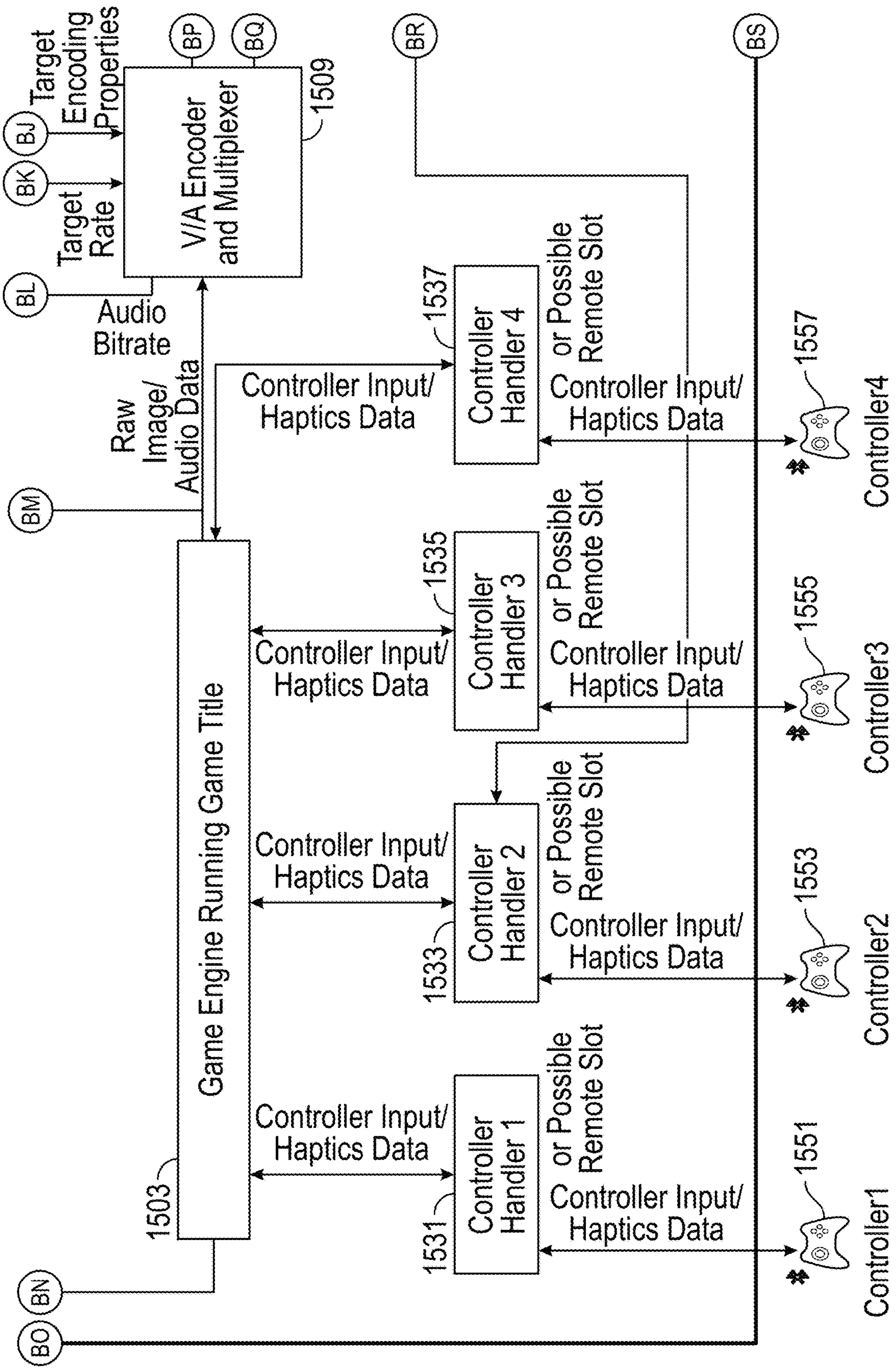
Figure 15:
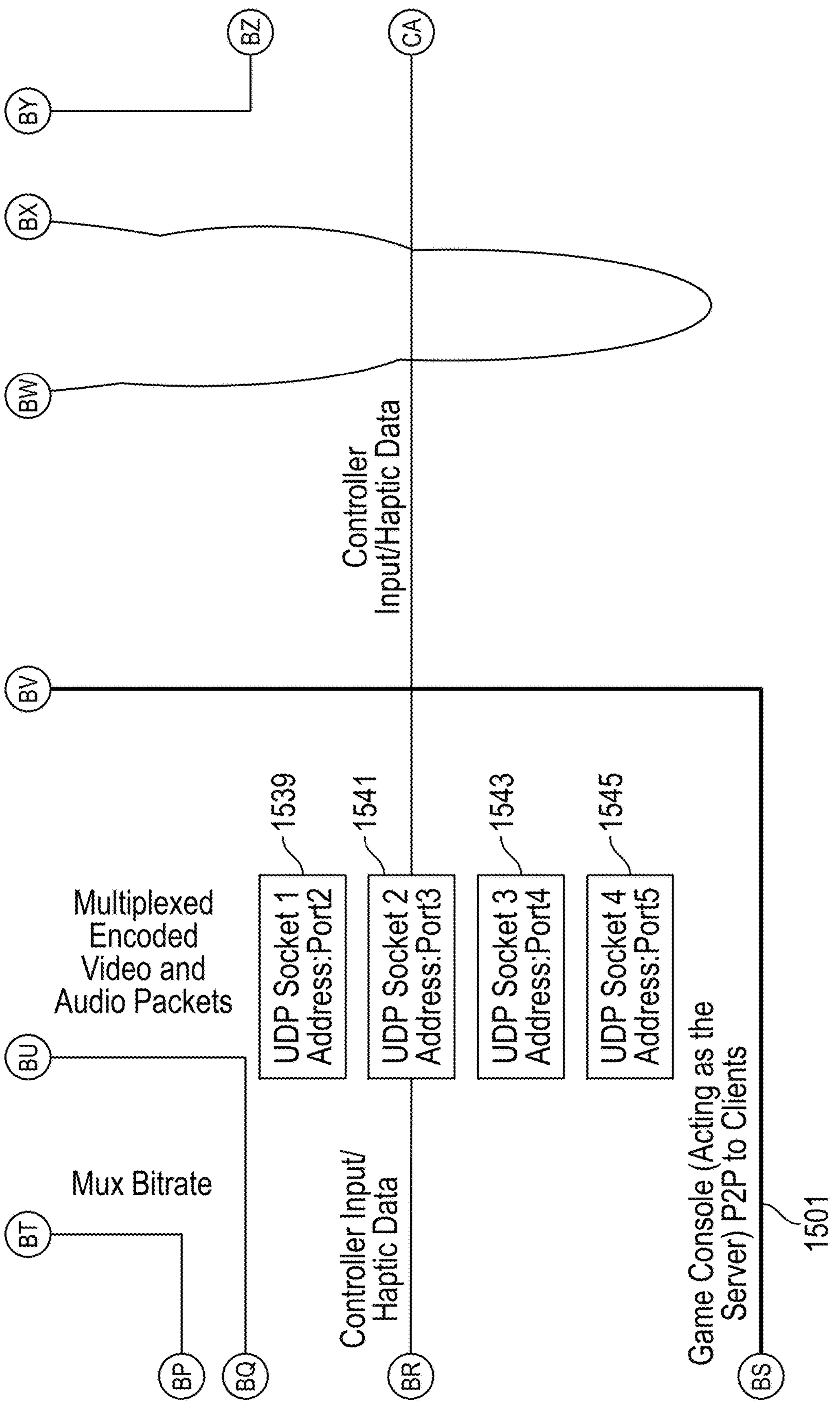
Figure 15:
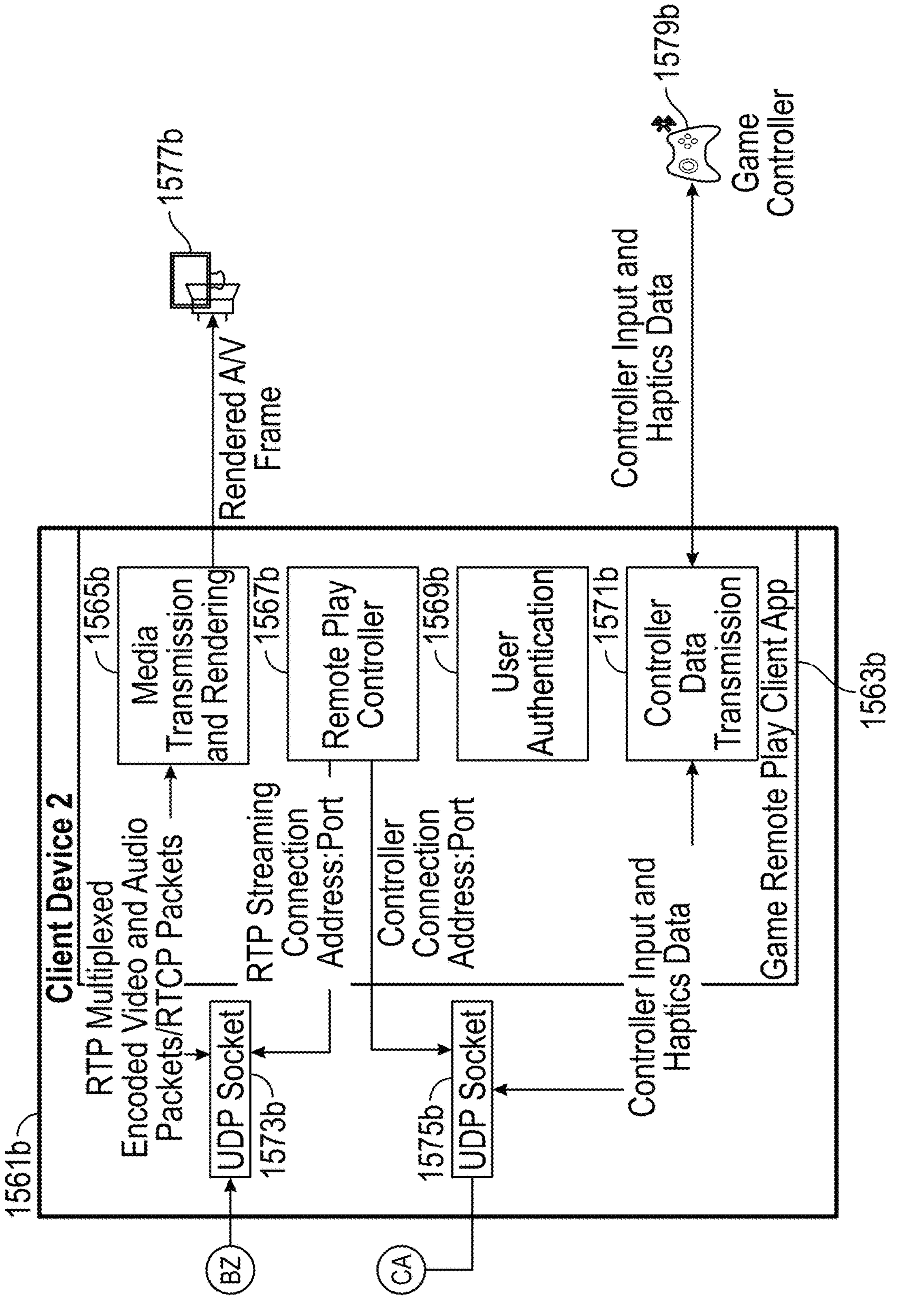

The system of FIG. 15, which is part of the console game provider or PC game publisher cloud service process (e.g., FIG. 16), is designed for low bandwidth/QoS connection states for at least one client. The system includes a remote session viewing adaptive bitrate (ABR) system with several novel details, such as an ABR delivery controller, UDP socket, transmission receiver, demultiplexer, ABR transcoder and segmenter, ABR A/V segments and manifest database, and an ABR hypertext transfer protocol (HTTP) delivery system.

Graphical user interfaces (GUIs) for local and/or remote console play with local and/or remote friends, are depicted in FIGS. 17 to 22.

Figure 4:
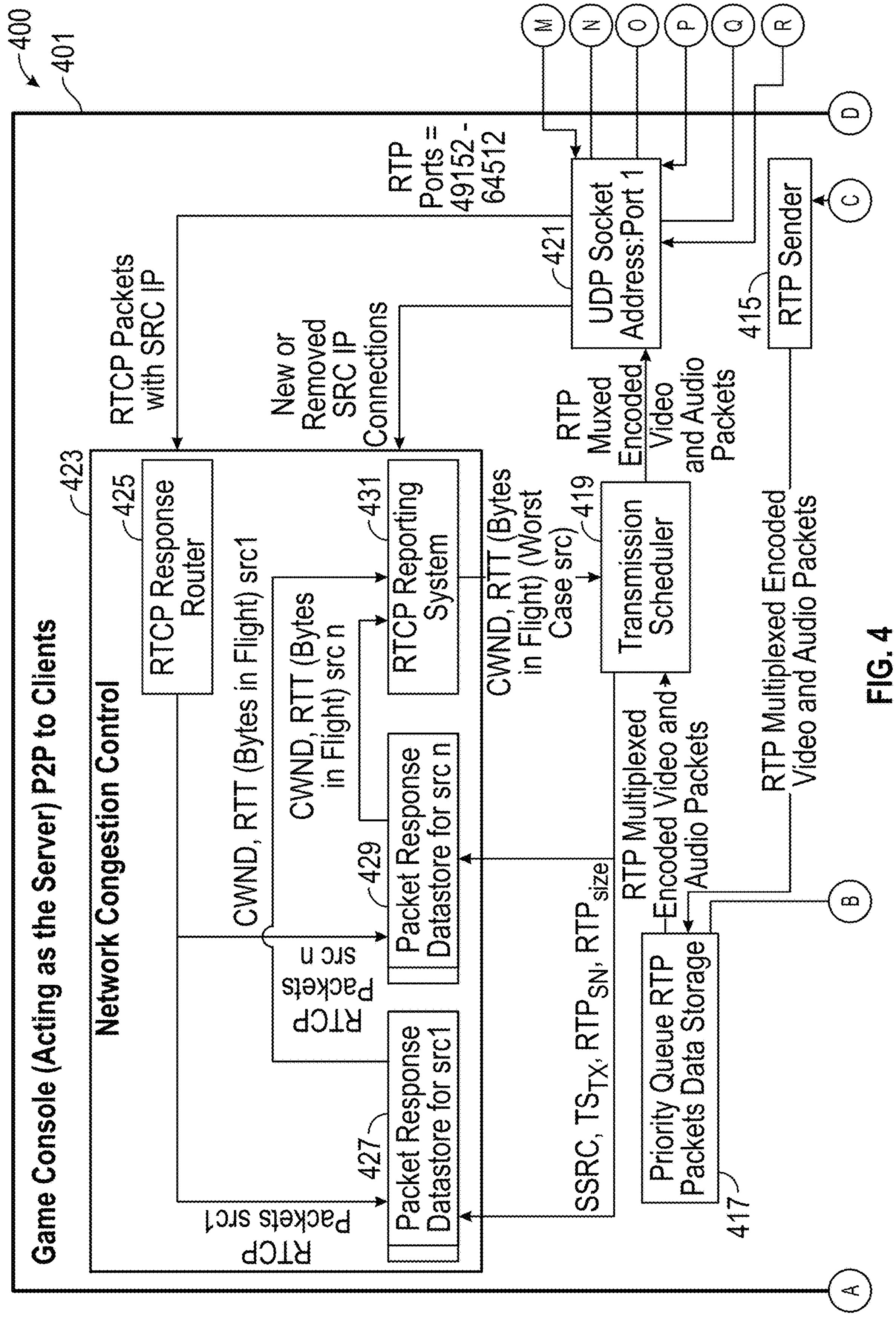
FIG. 4 depicts a system for local and/or remote play via a game console, where the console acts as a server and forms a peer-to-peer connection with remote client devices, in accordance with some embodiments of the disclosure.
Figure 4:
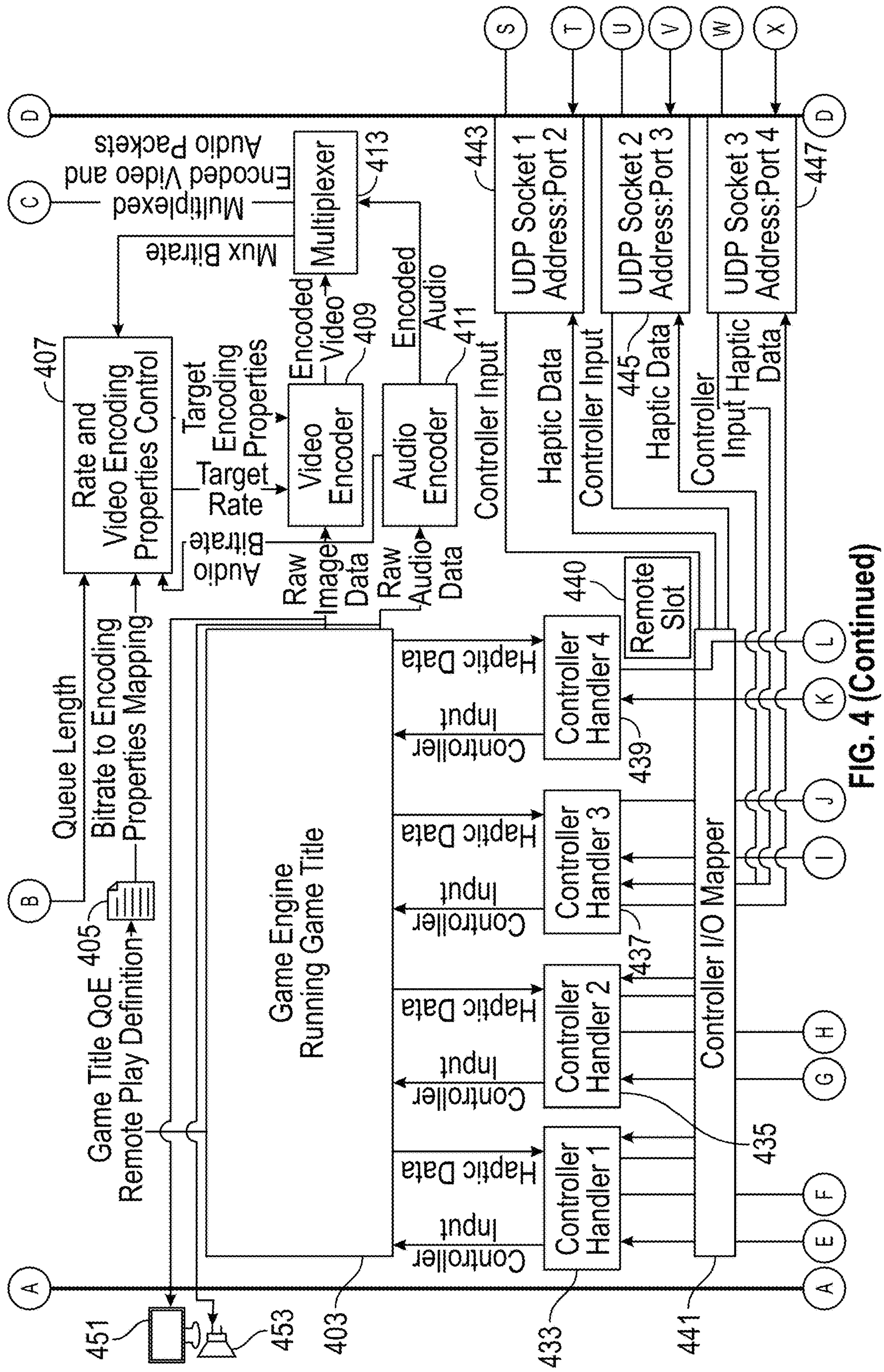
Figure 4:
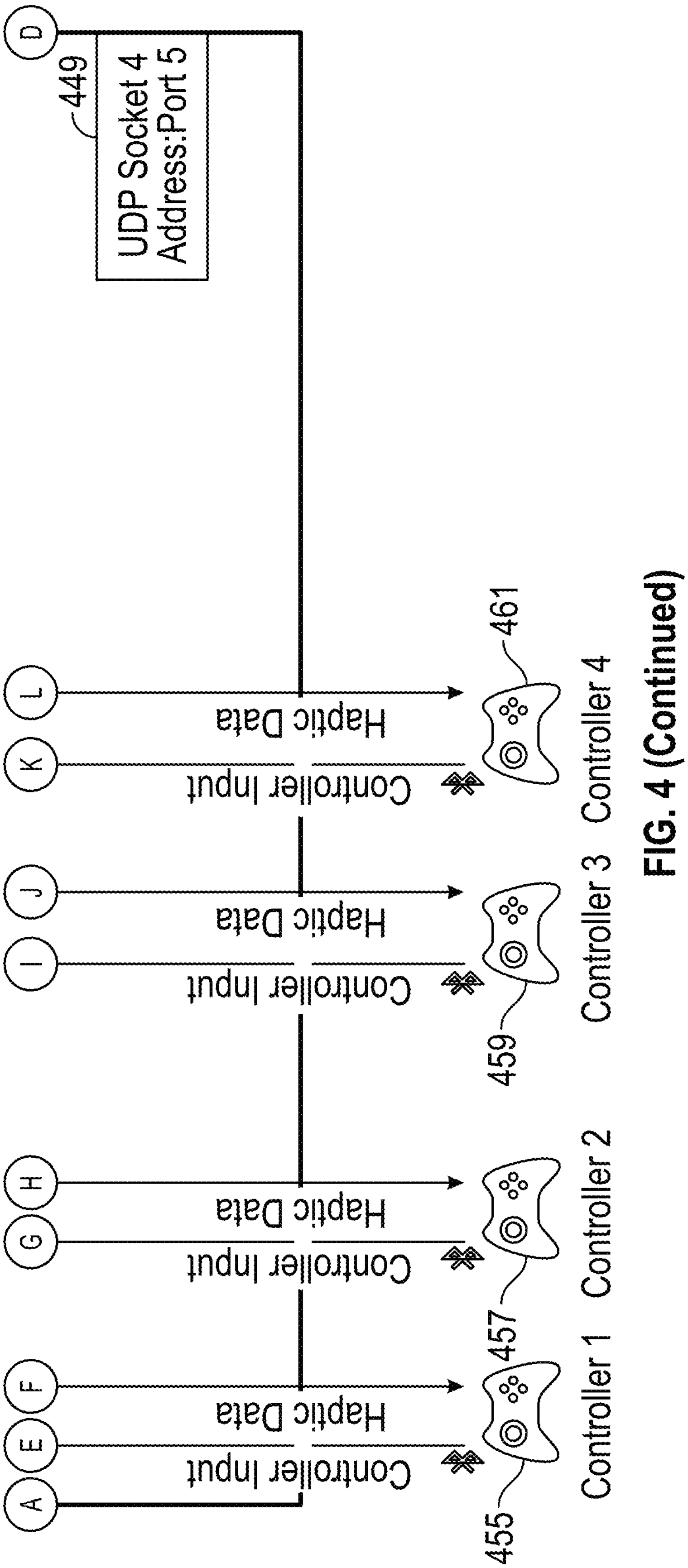
Figure 4:
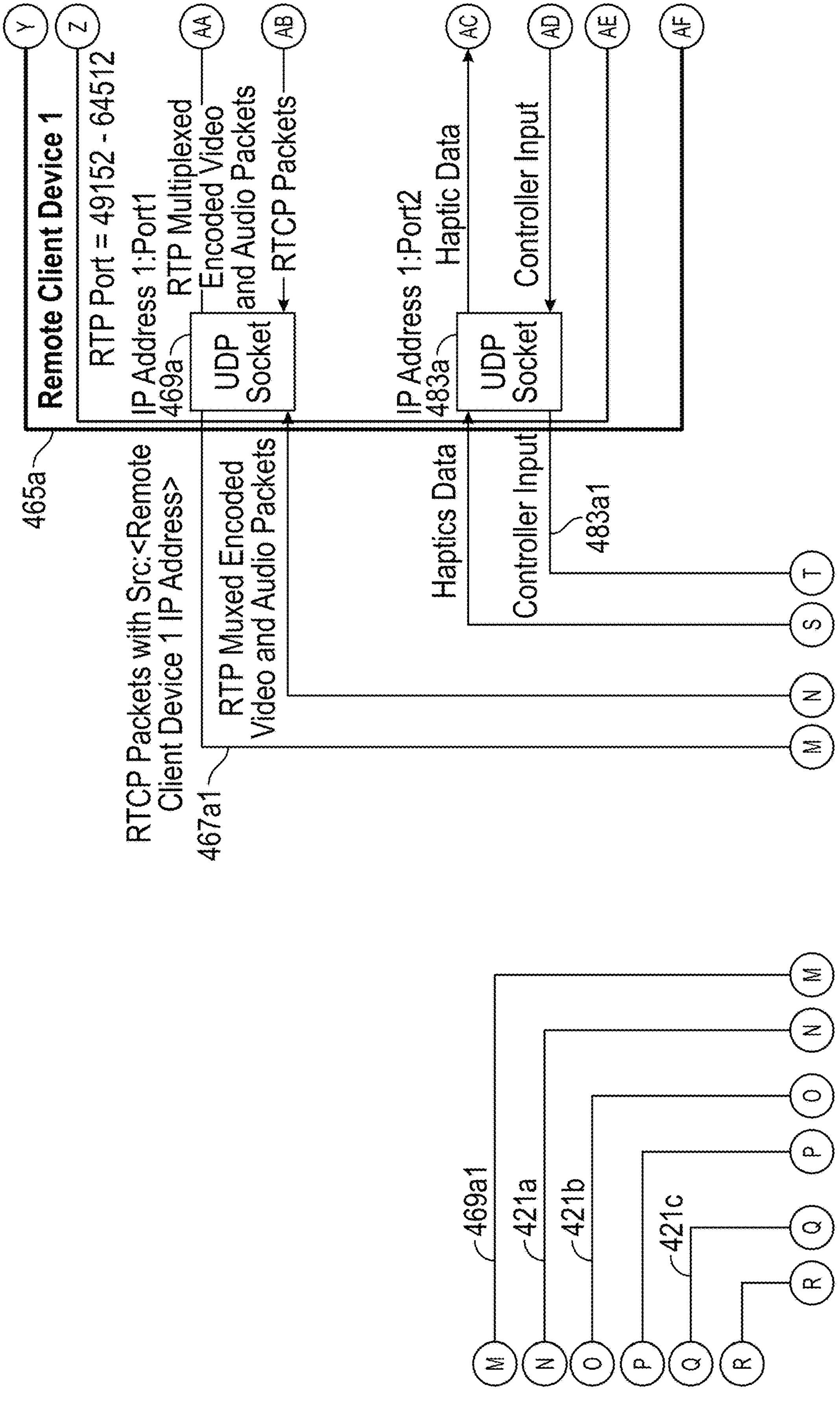
Figure 4:
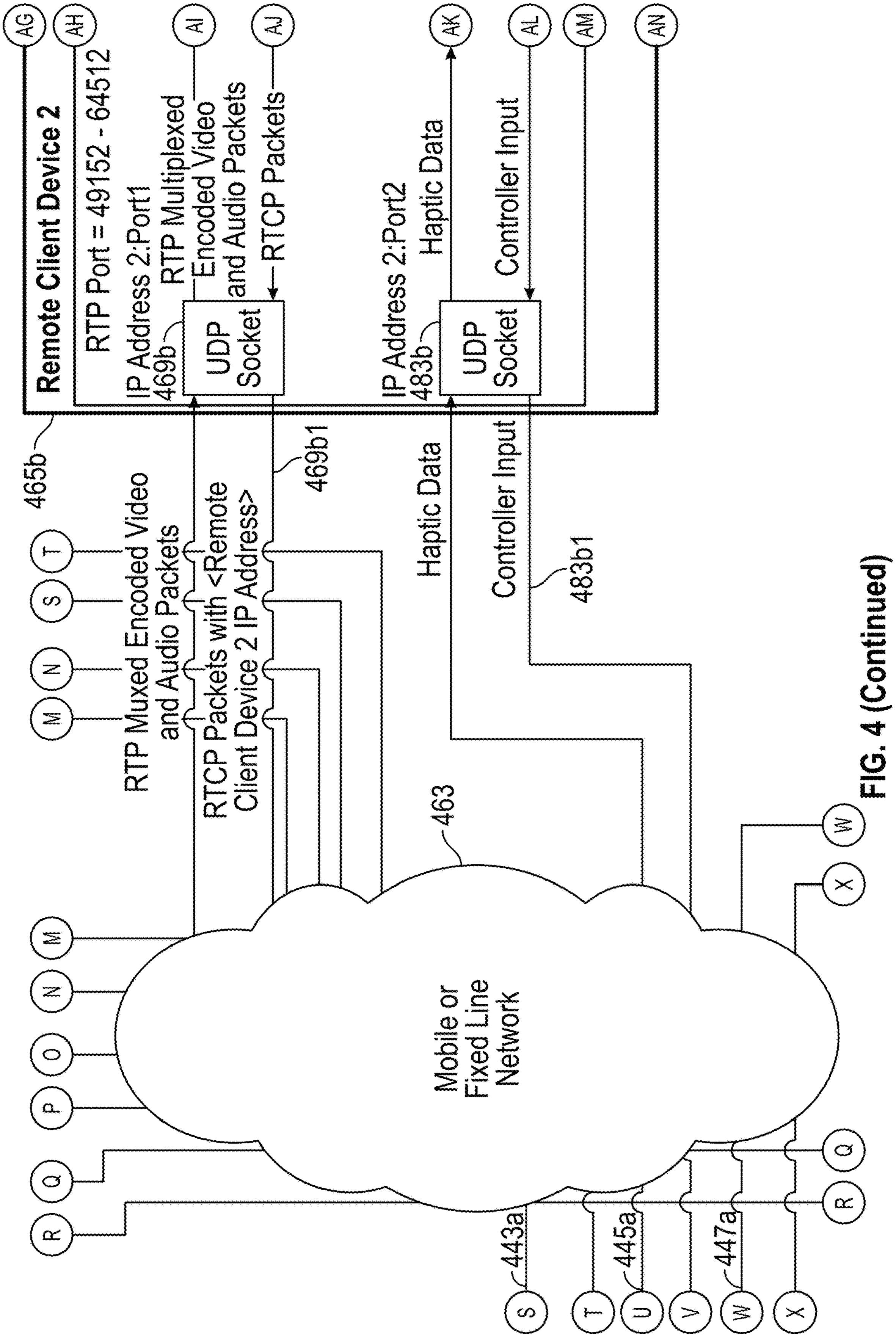
Figure 4:
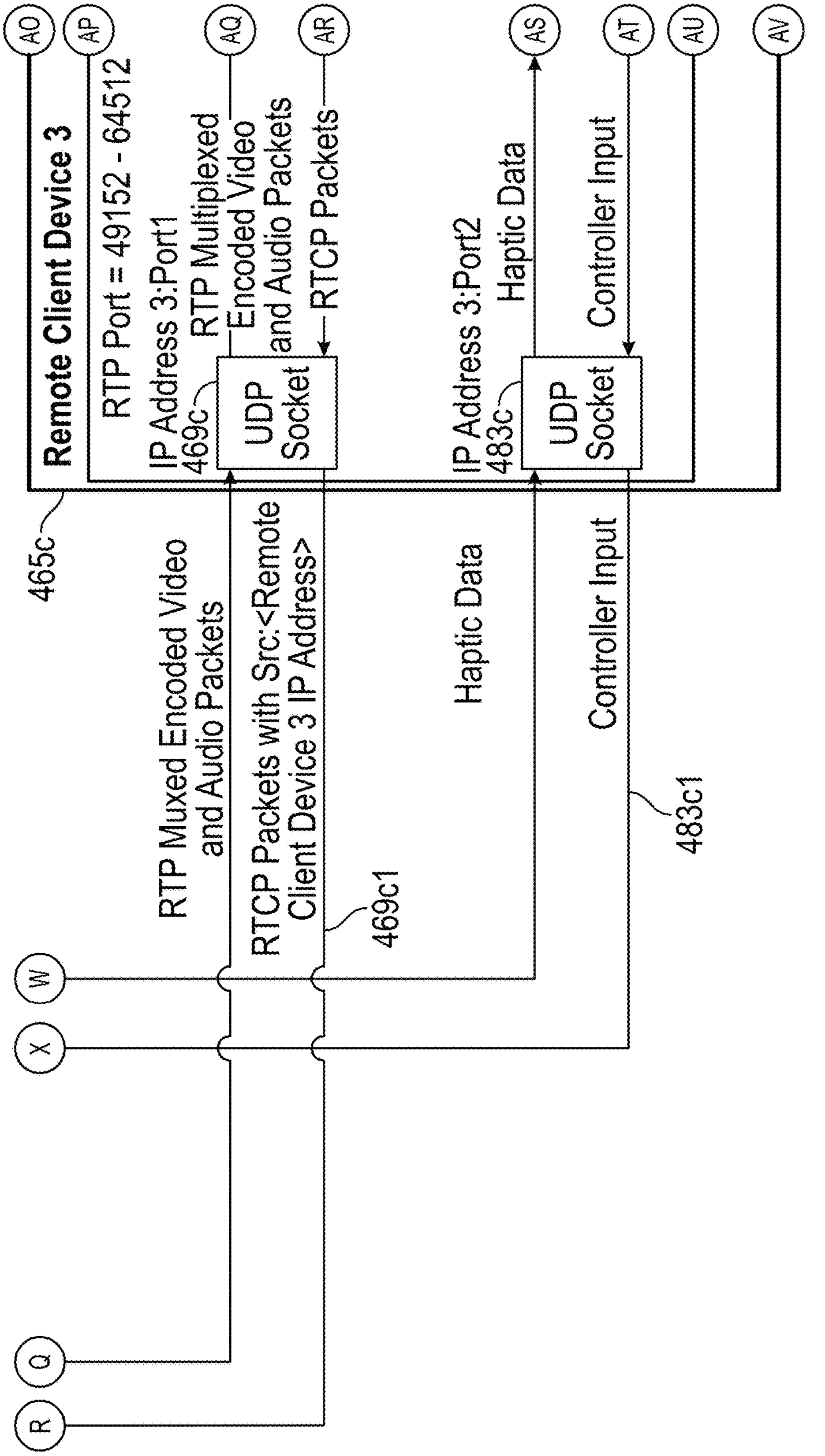
Figure 4:
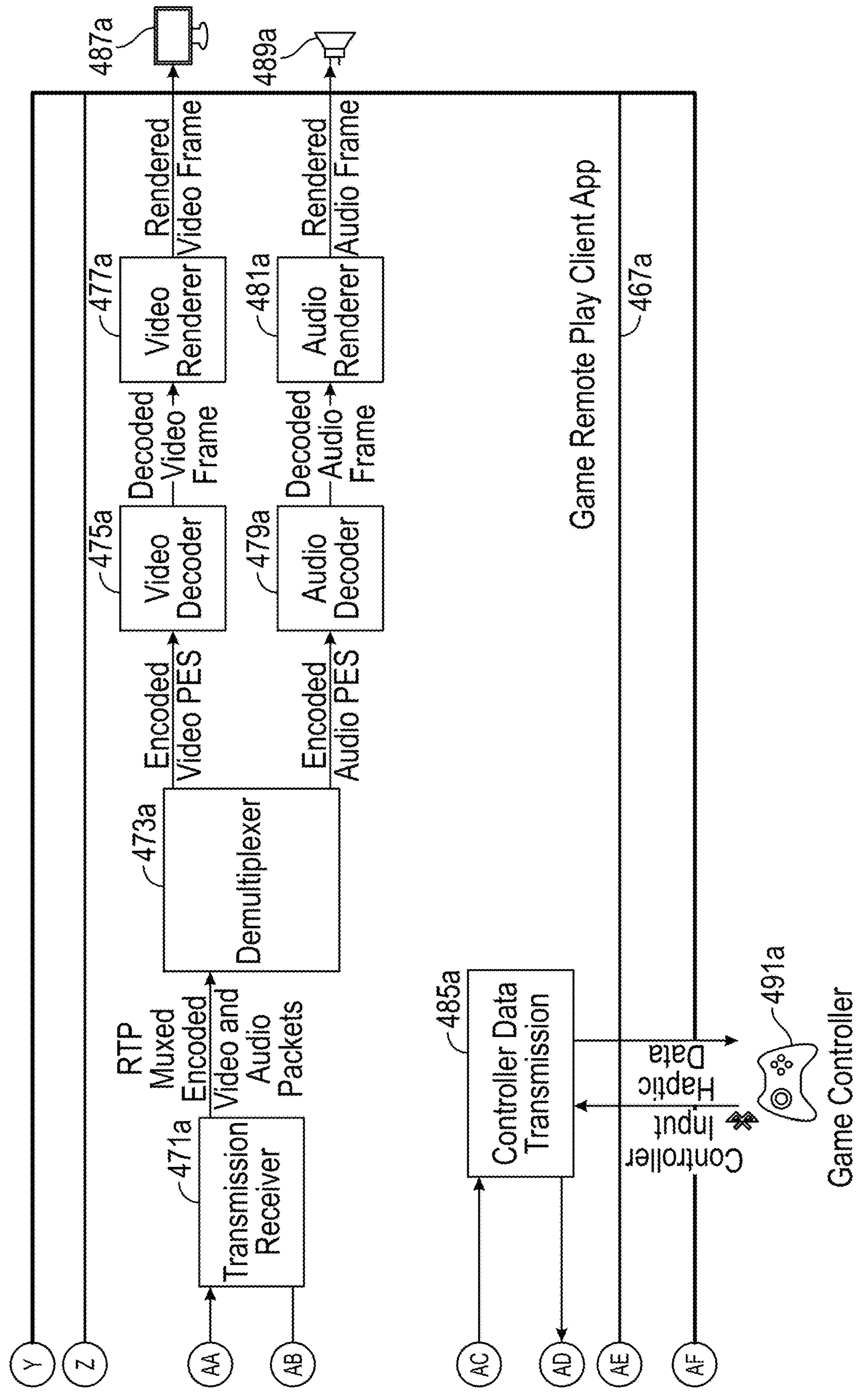
Figure 4:
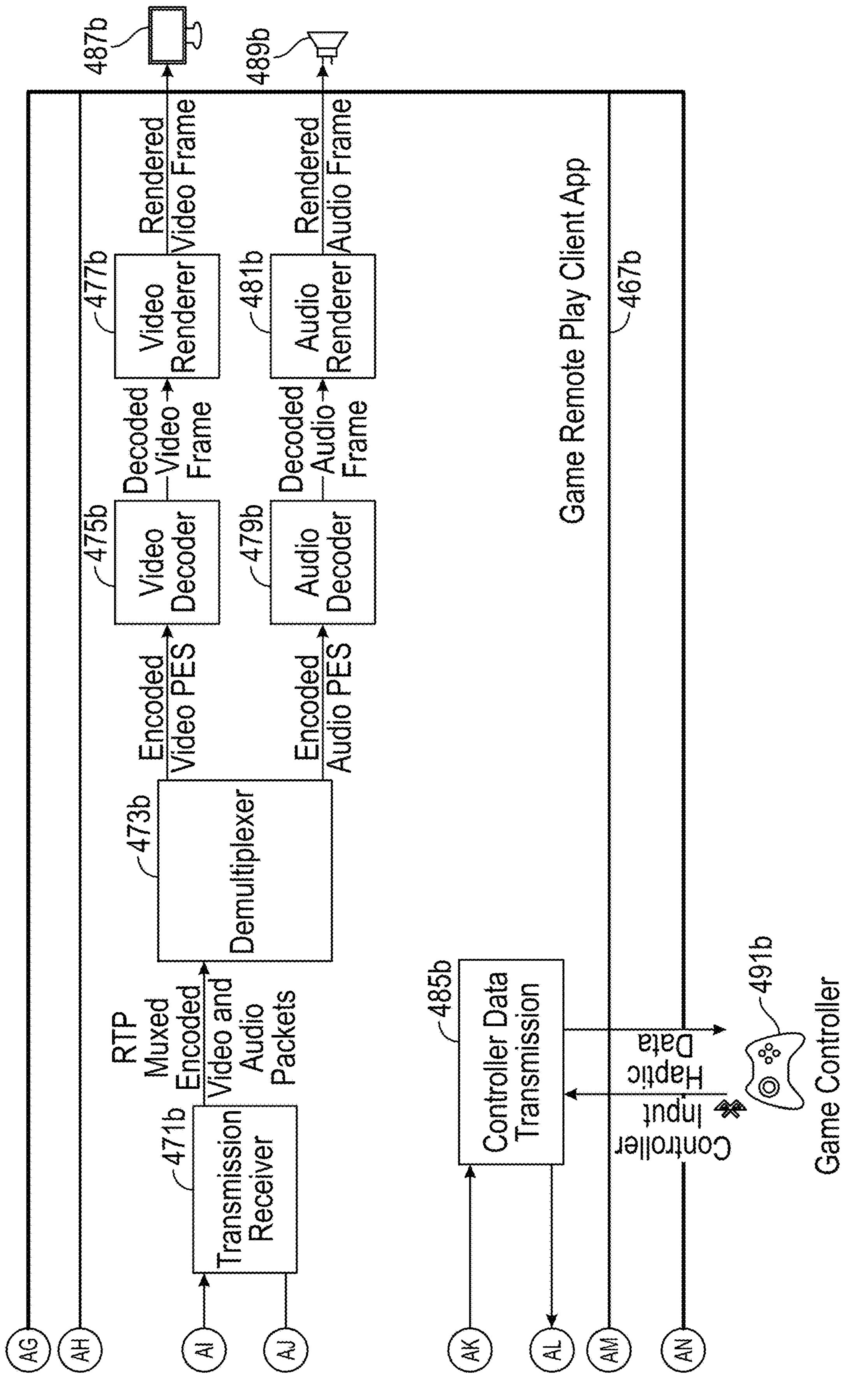
Figure 4:
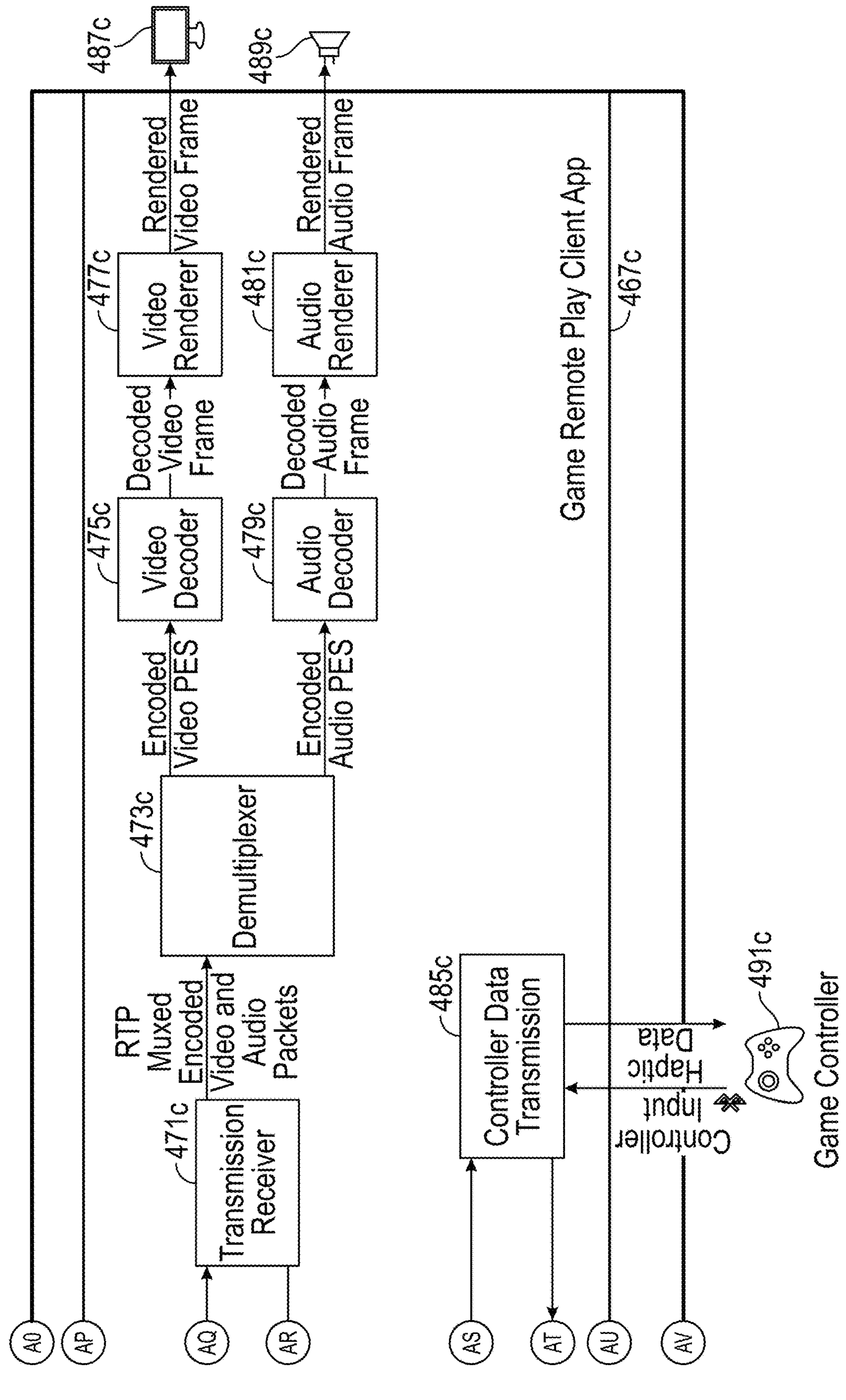
Figure 6:
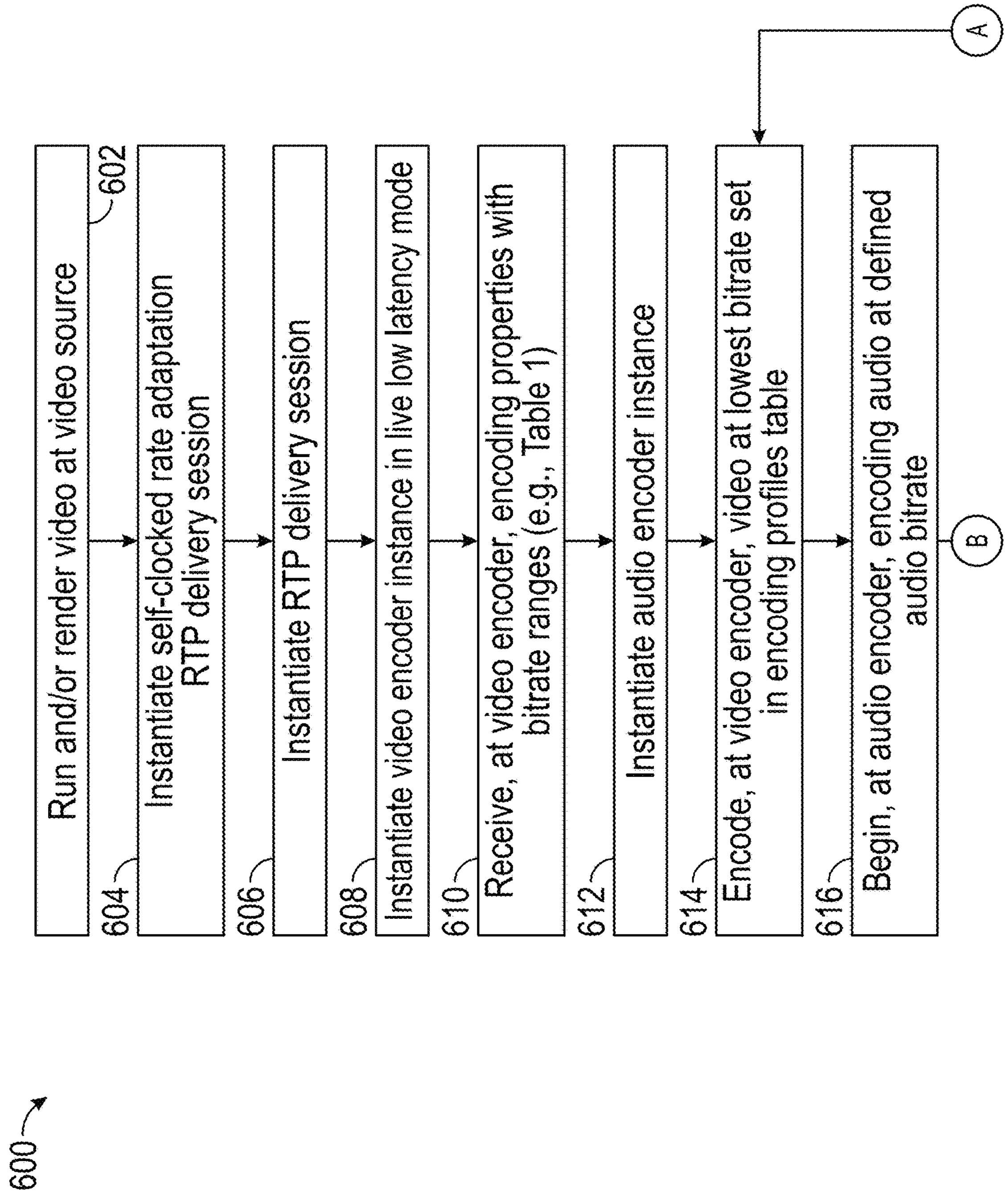
FIG. 6 depicts a process for bitrate and encoding quality control for delivering a single encoded stream from a single RTP sender to multiple client devices over an unmanaged network, in accordance with some embodiments of the disclosure.
Figure 6:
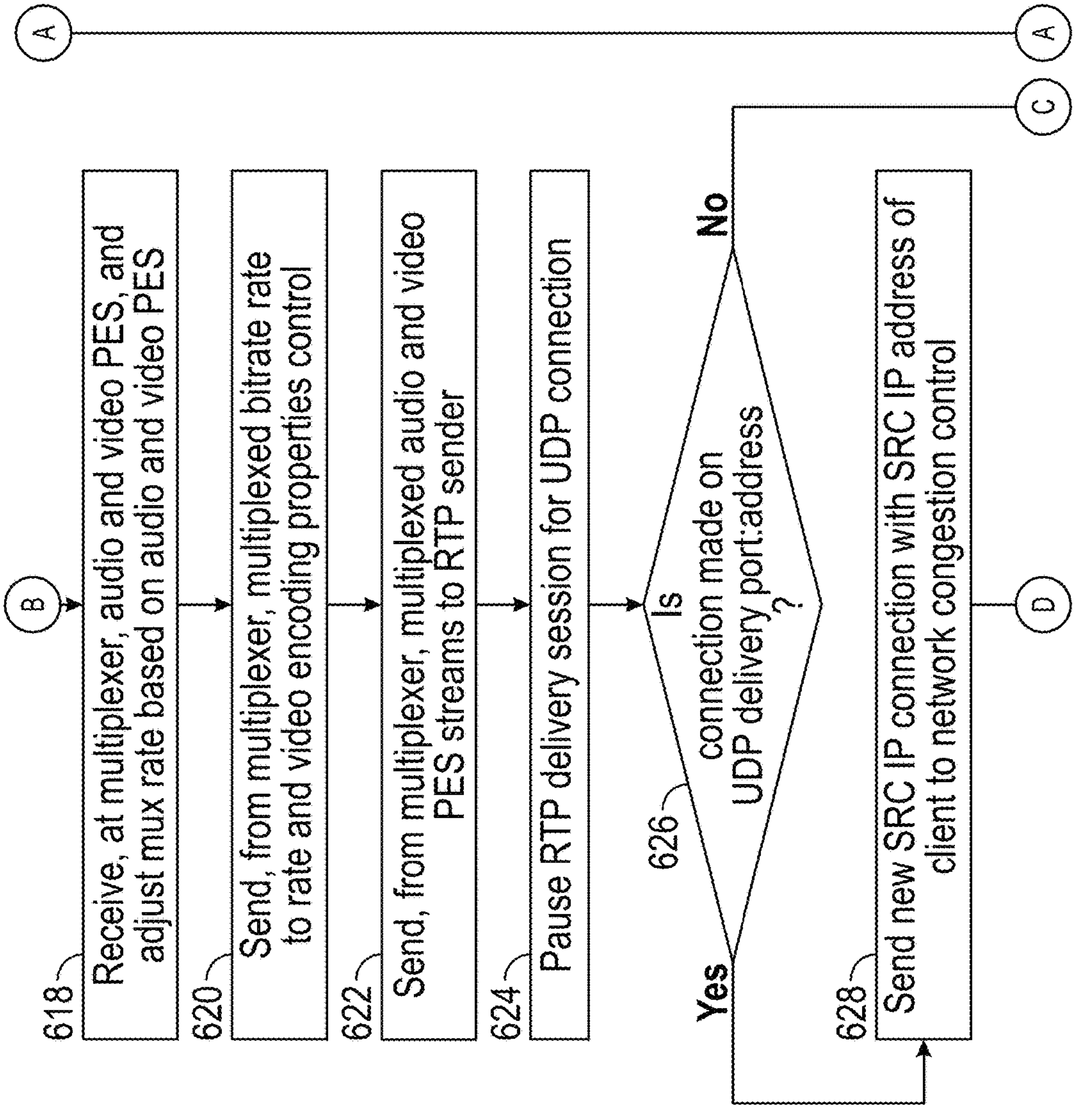
Figure 6:
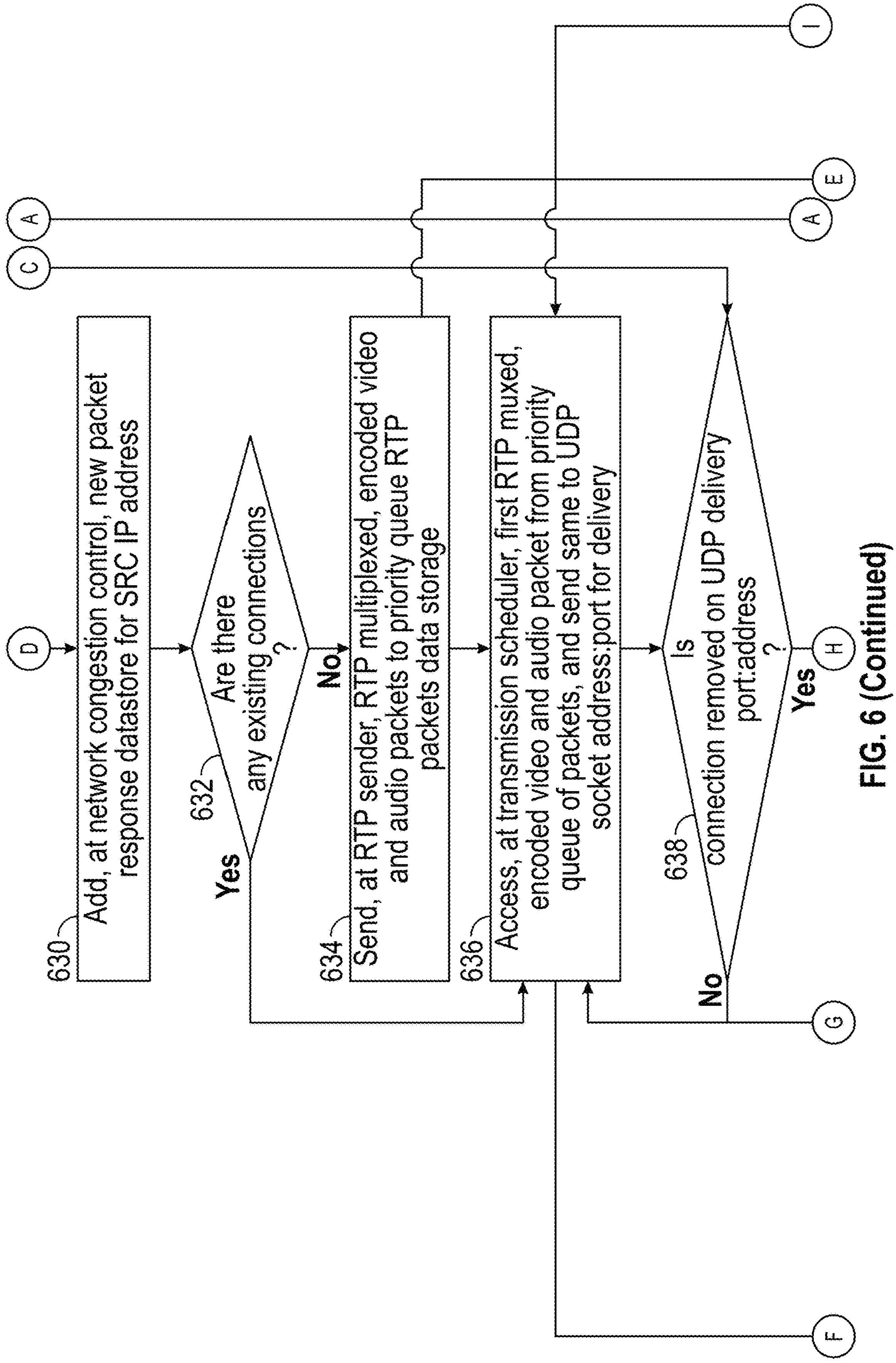
Figure 6:
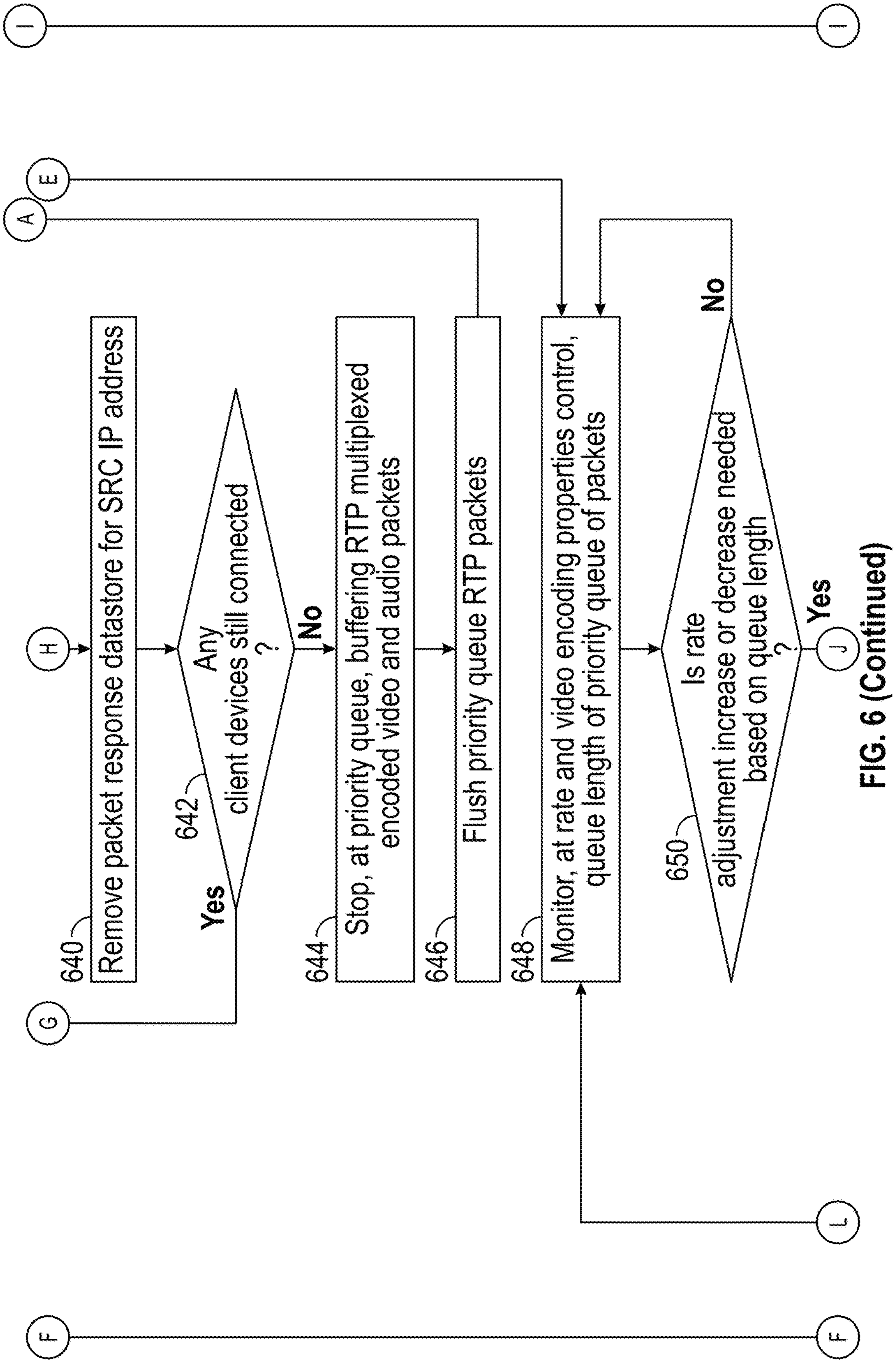
Figure 6:
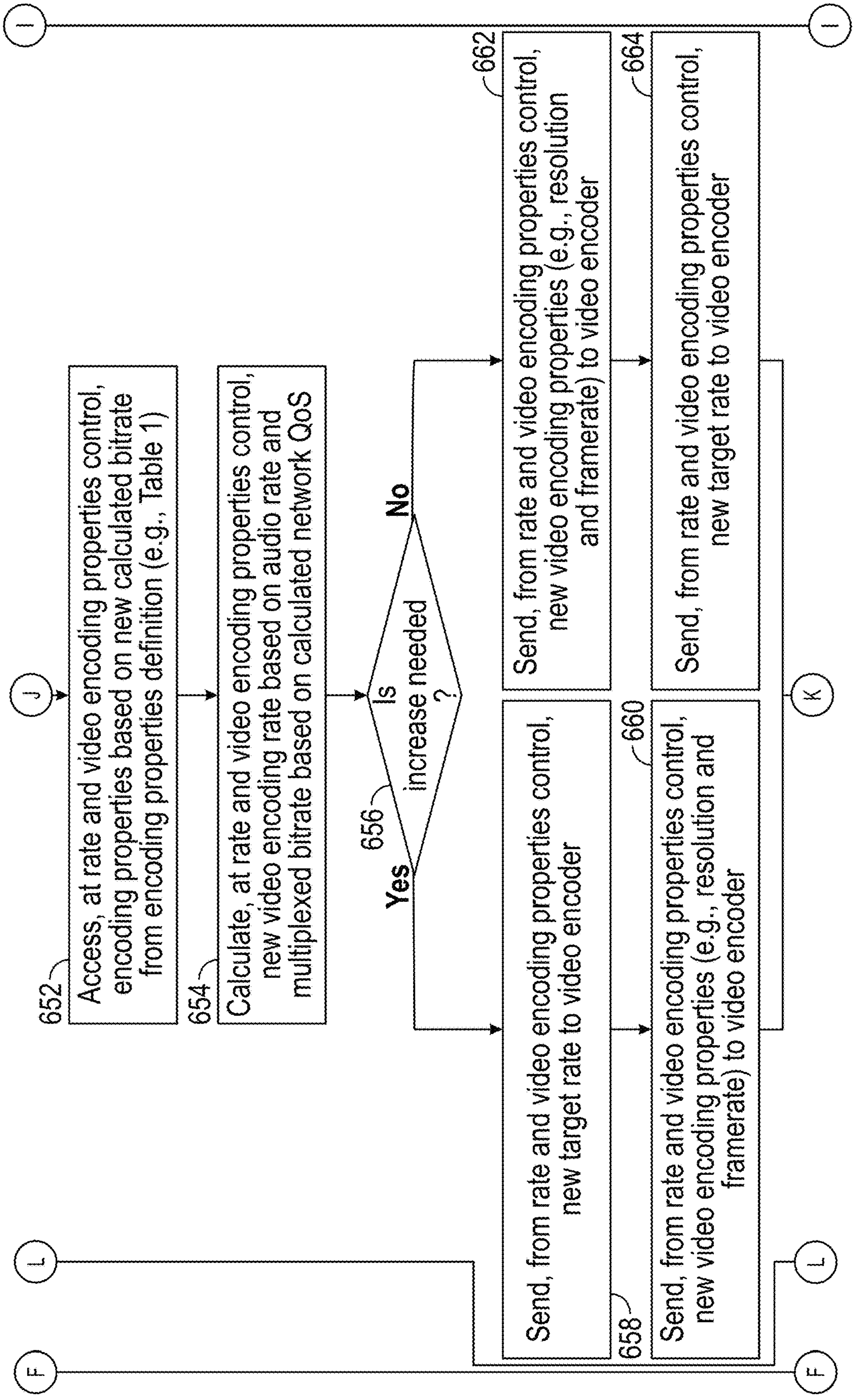
Figure 6:
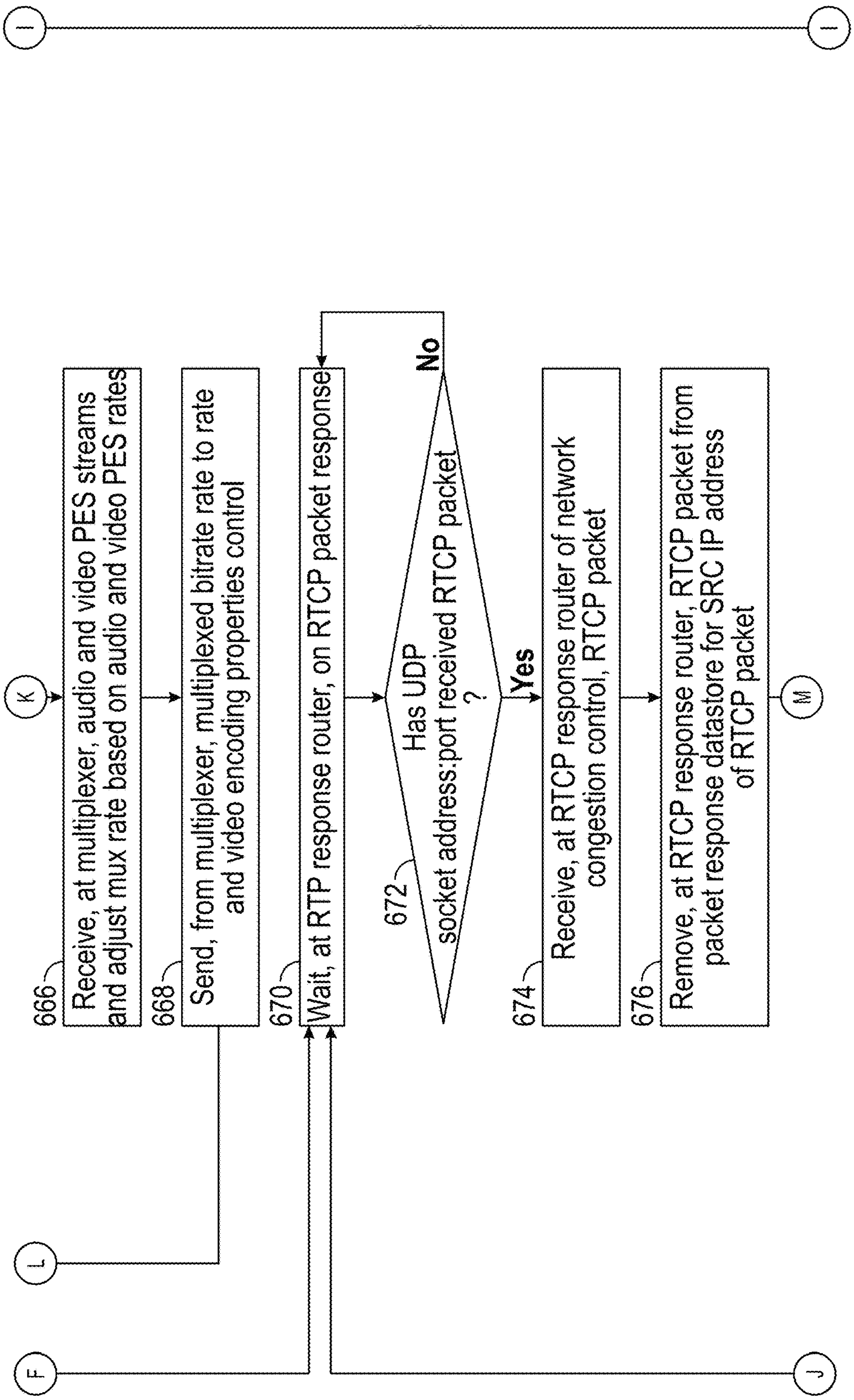
Figure 6:
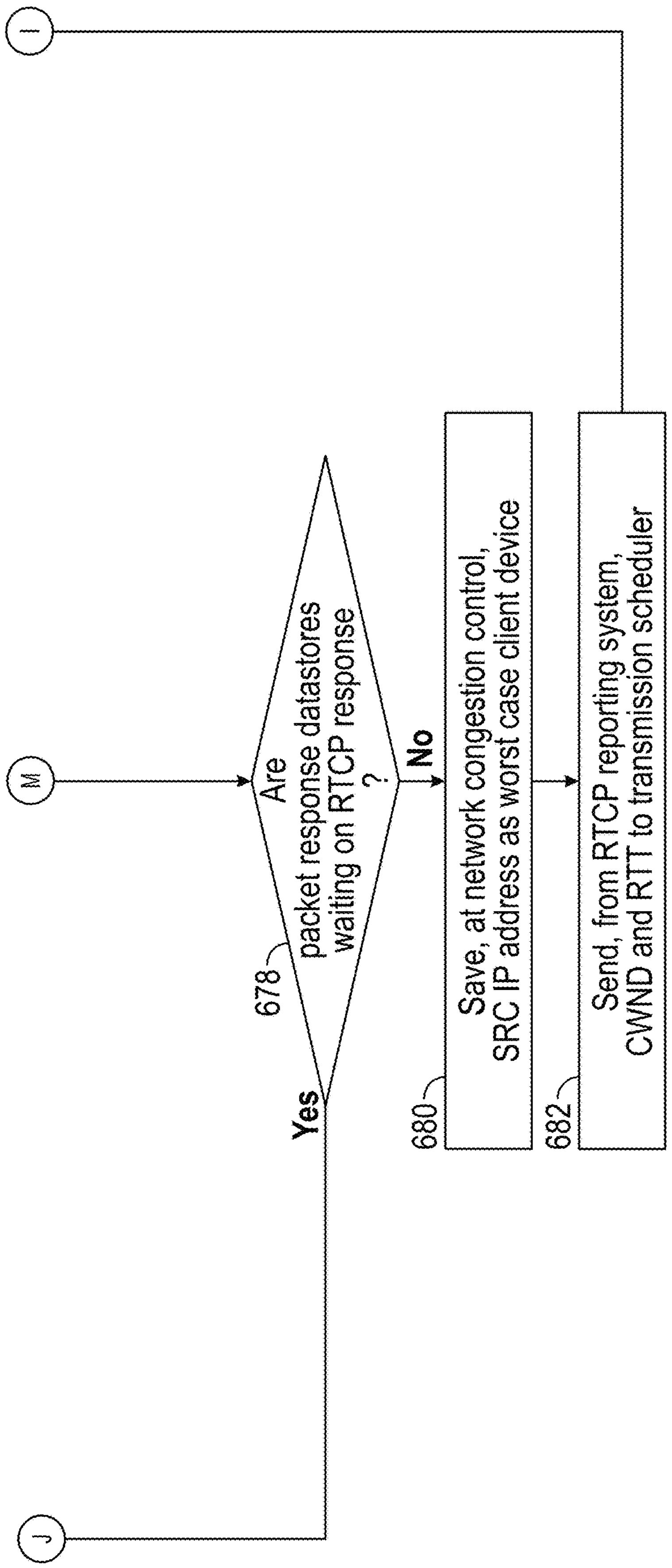
Figure 7:
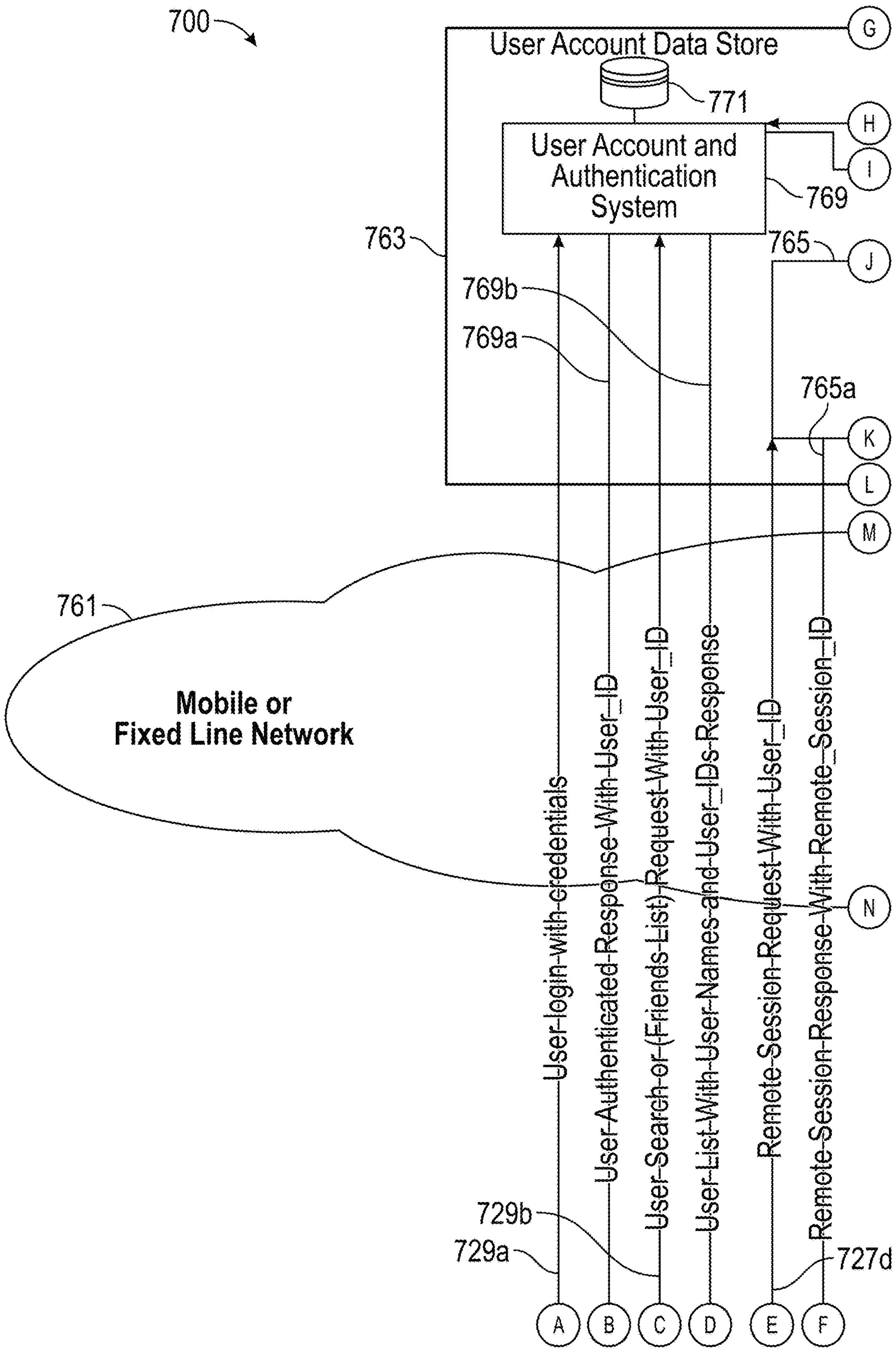
FIG. 7 depicts a system with focus on user invites by a console owner, managing peer-to-peer connections from remote controller input, and receiving a game rendered stream from a game console, in accordance with some embodiments of the disclosure.
Figure 7:
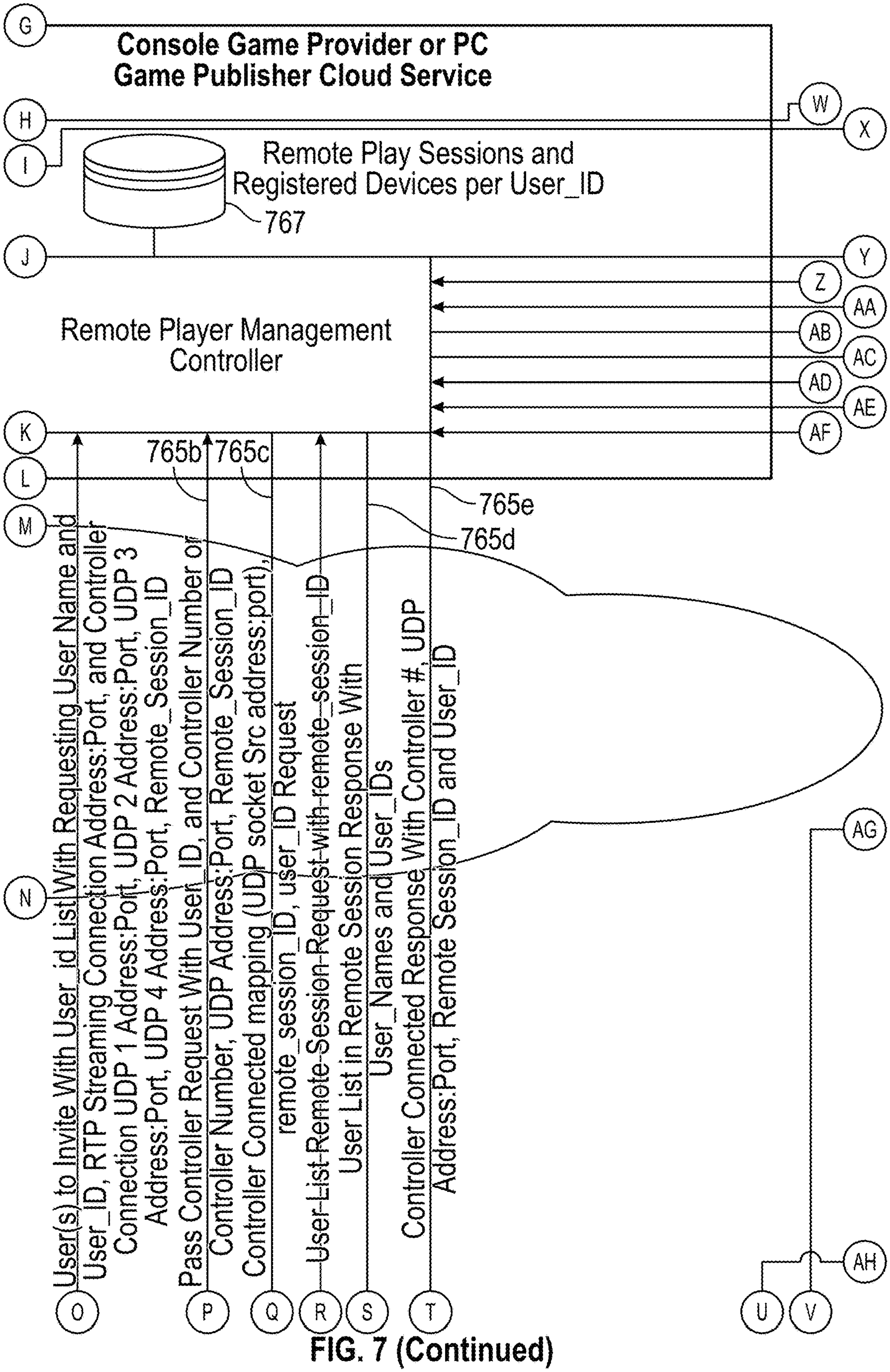
Figure 7:
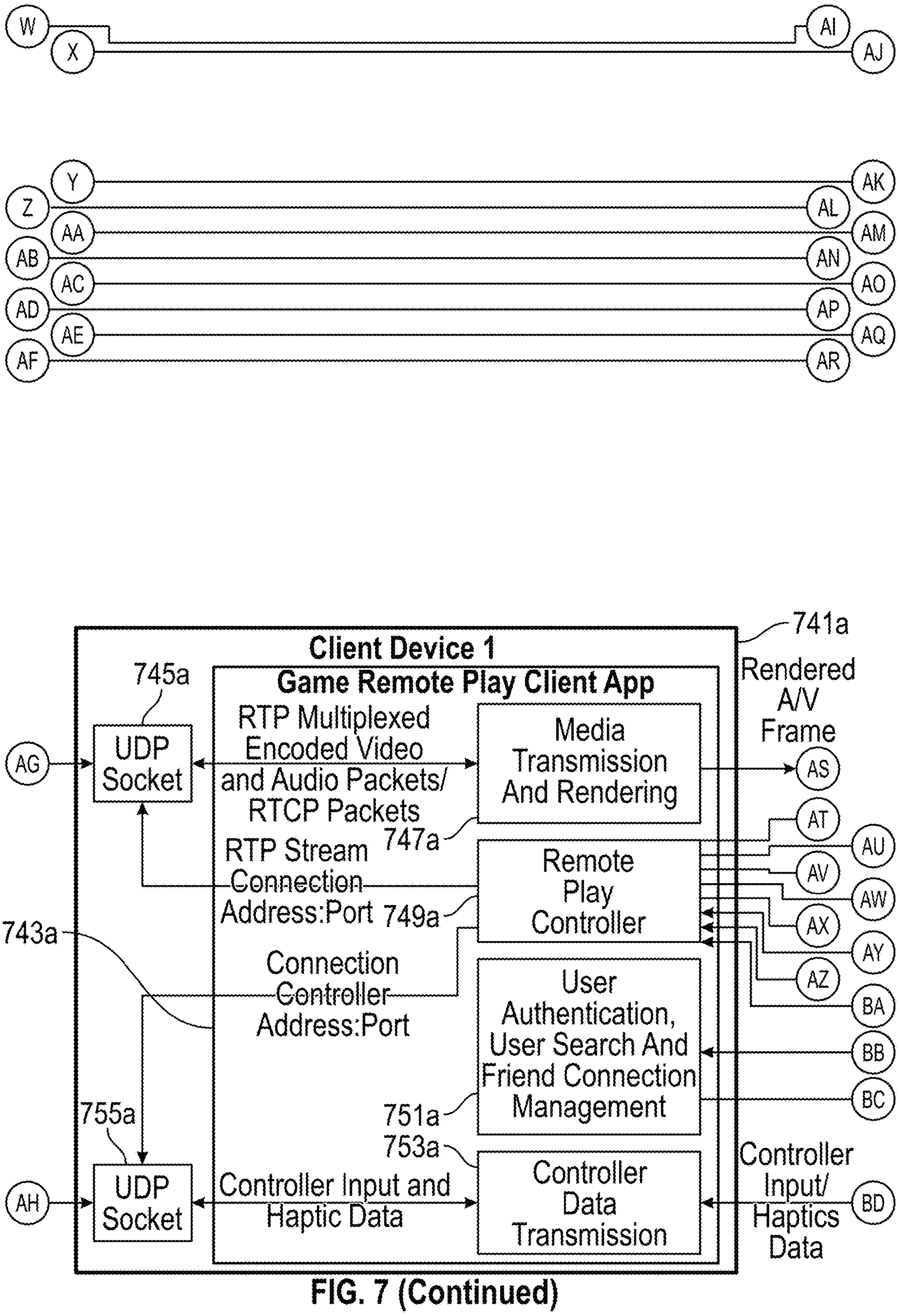
Figure 7:
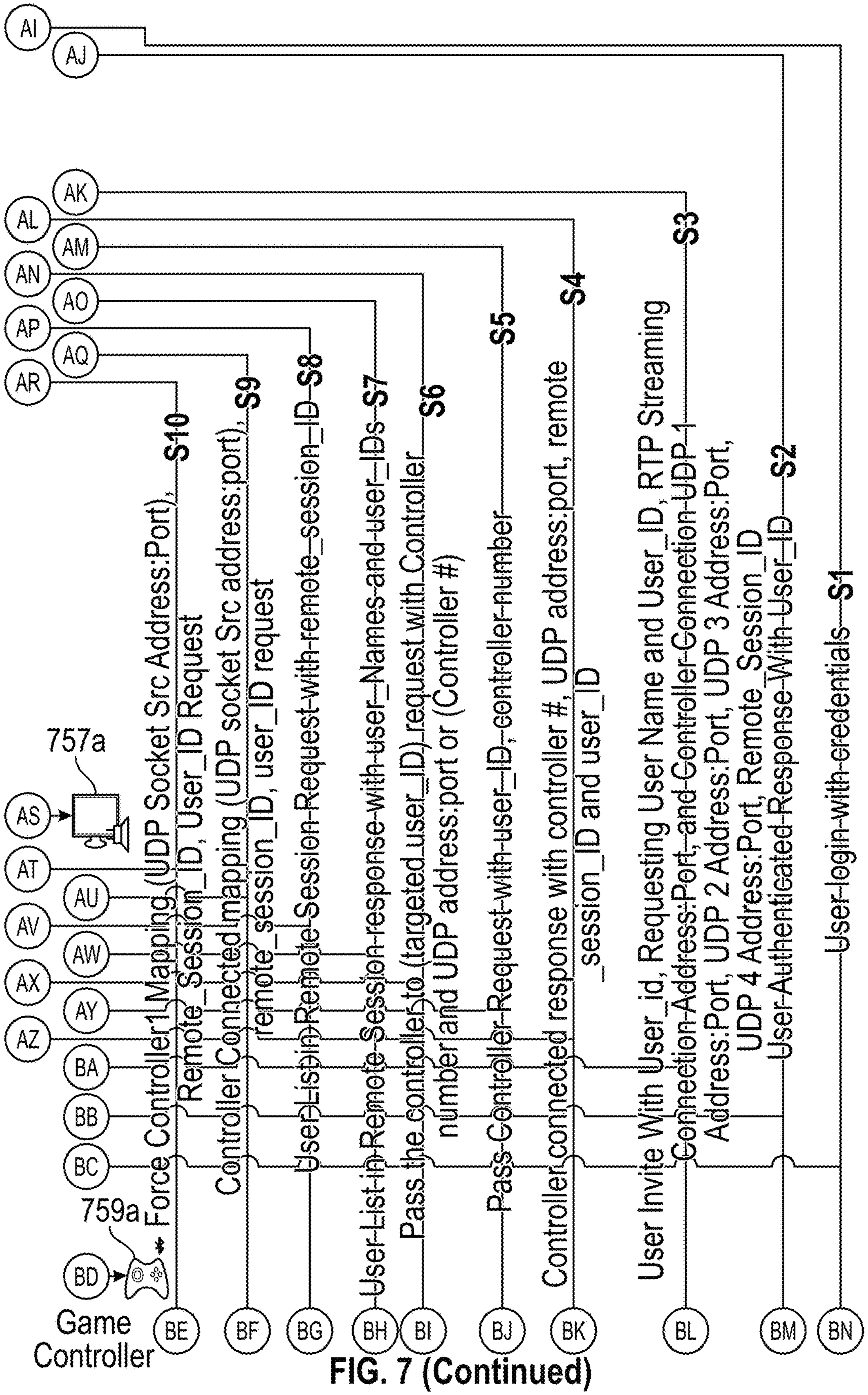
Figure 7:
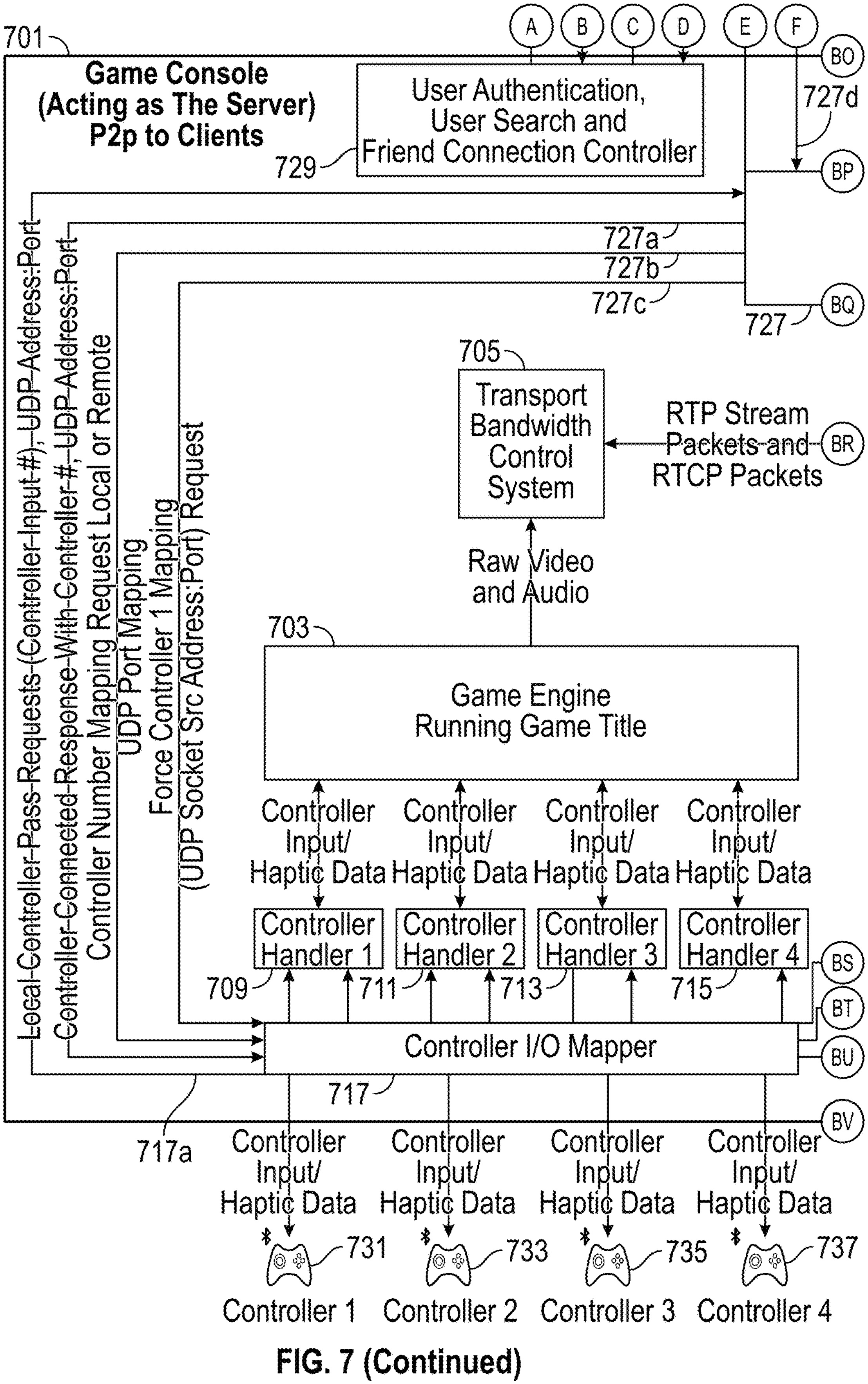
Figure 7:
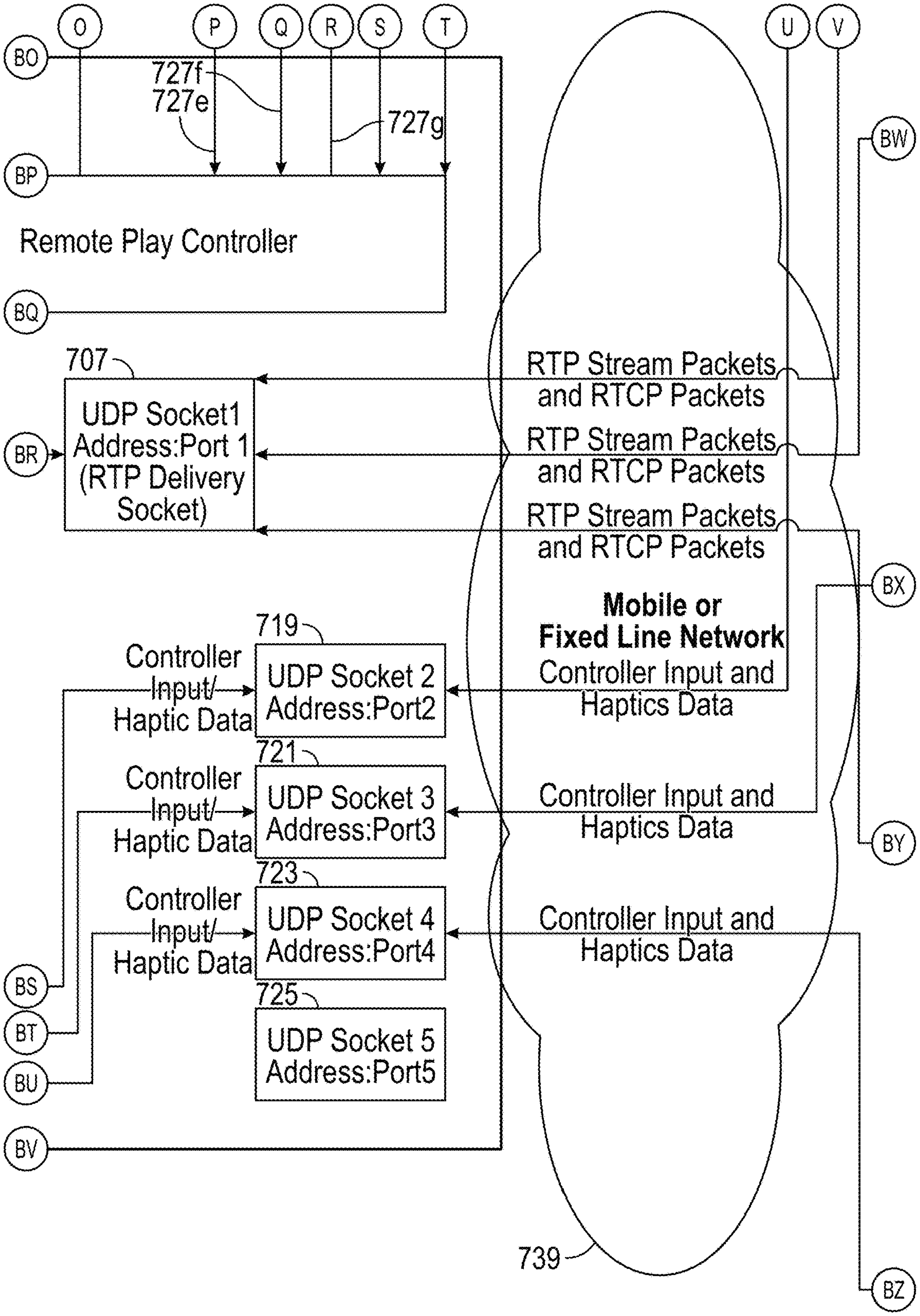
Figure 7:
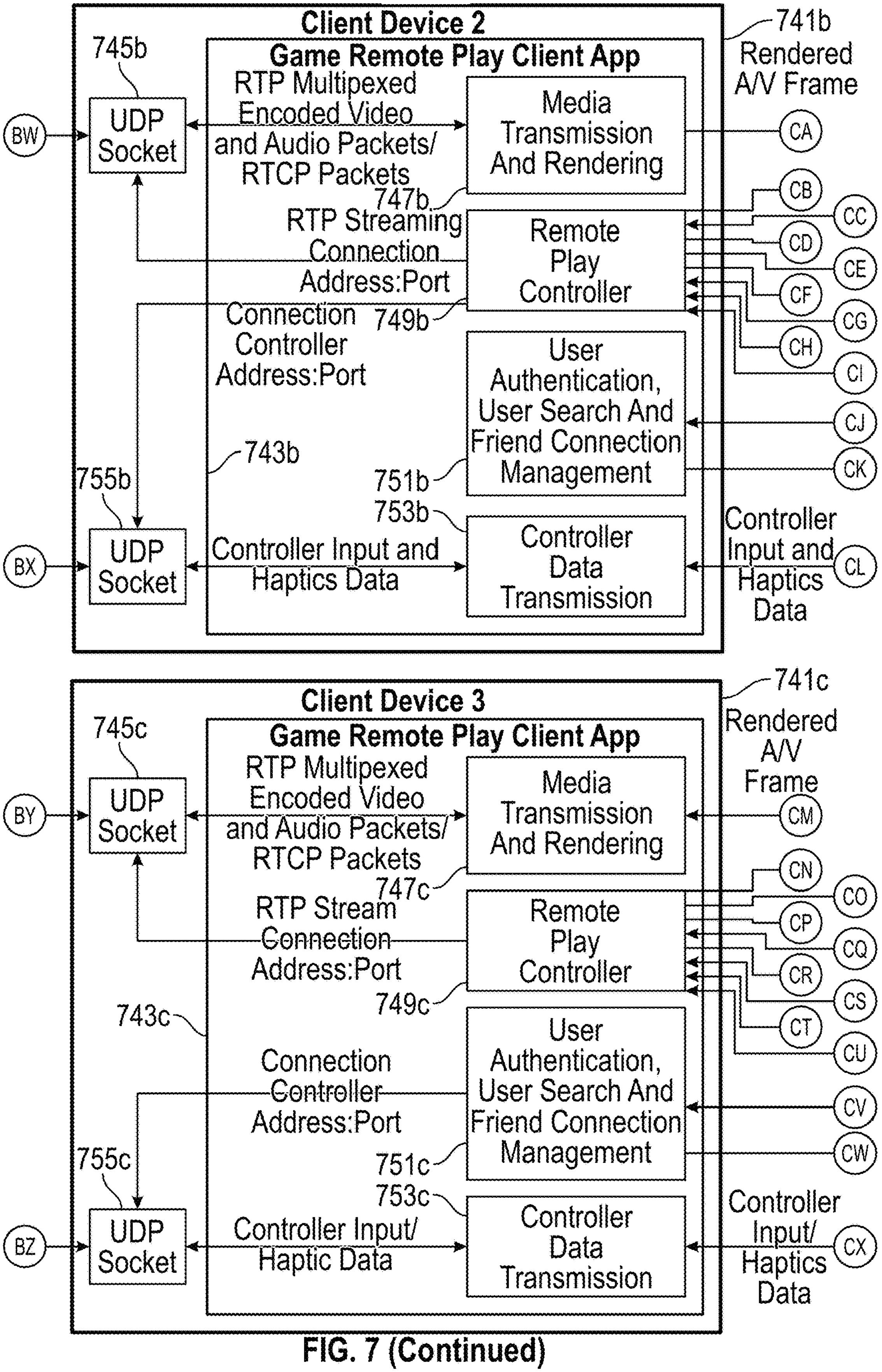
Figure 7:
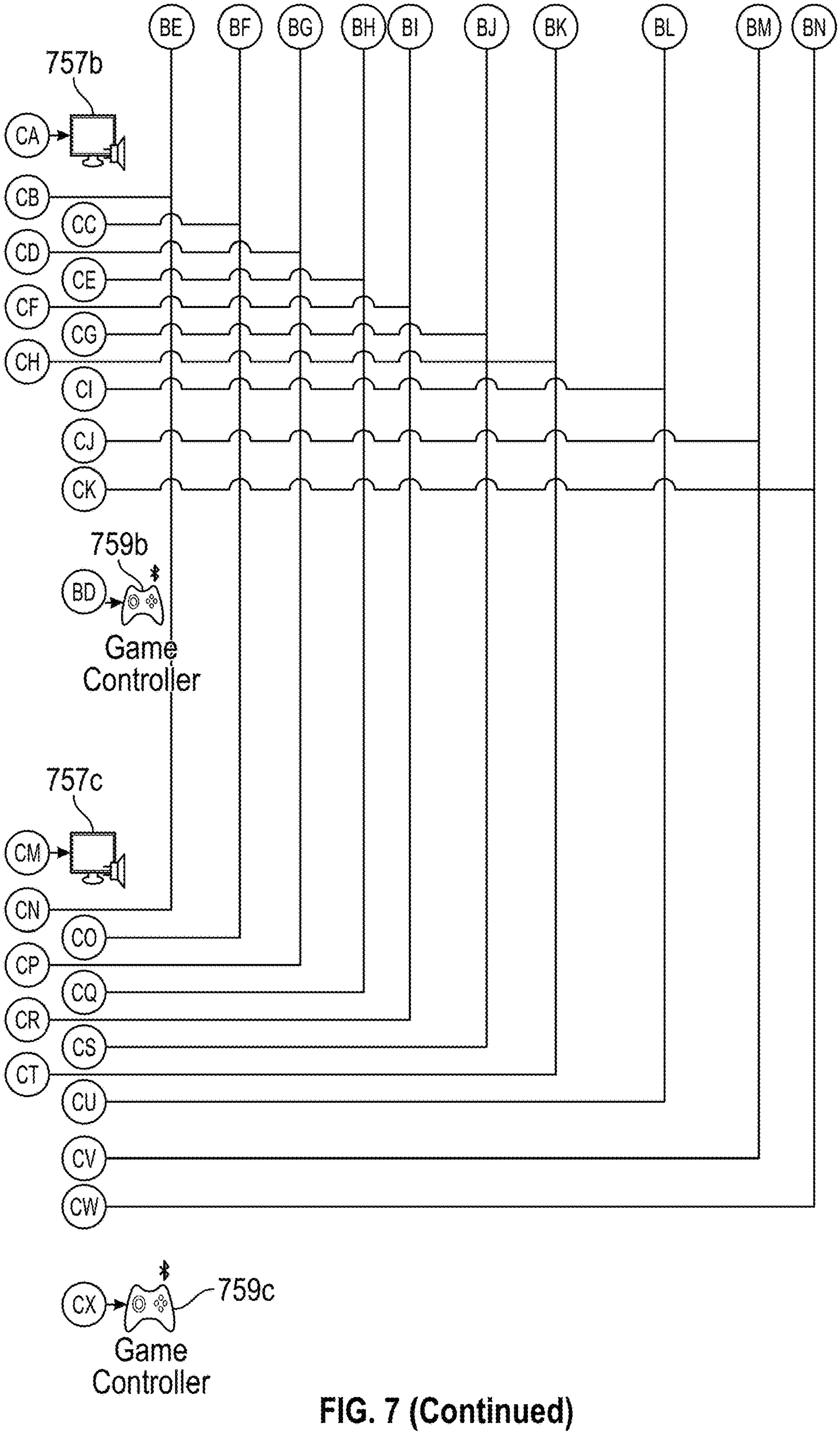
Figure 8:
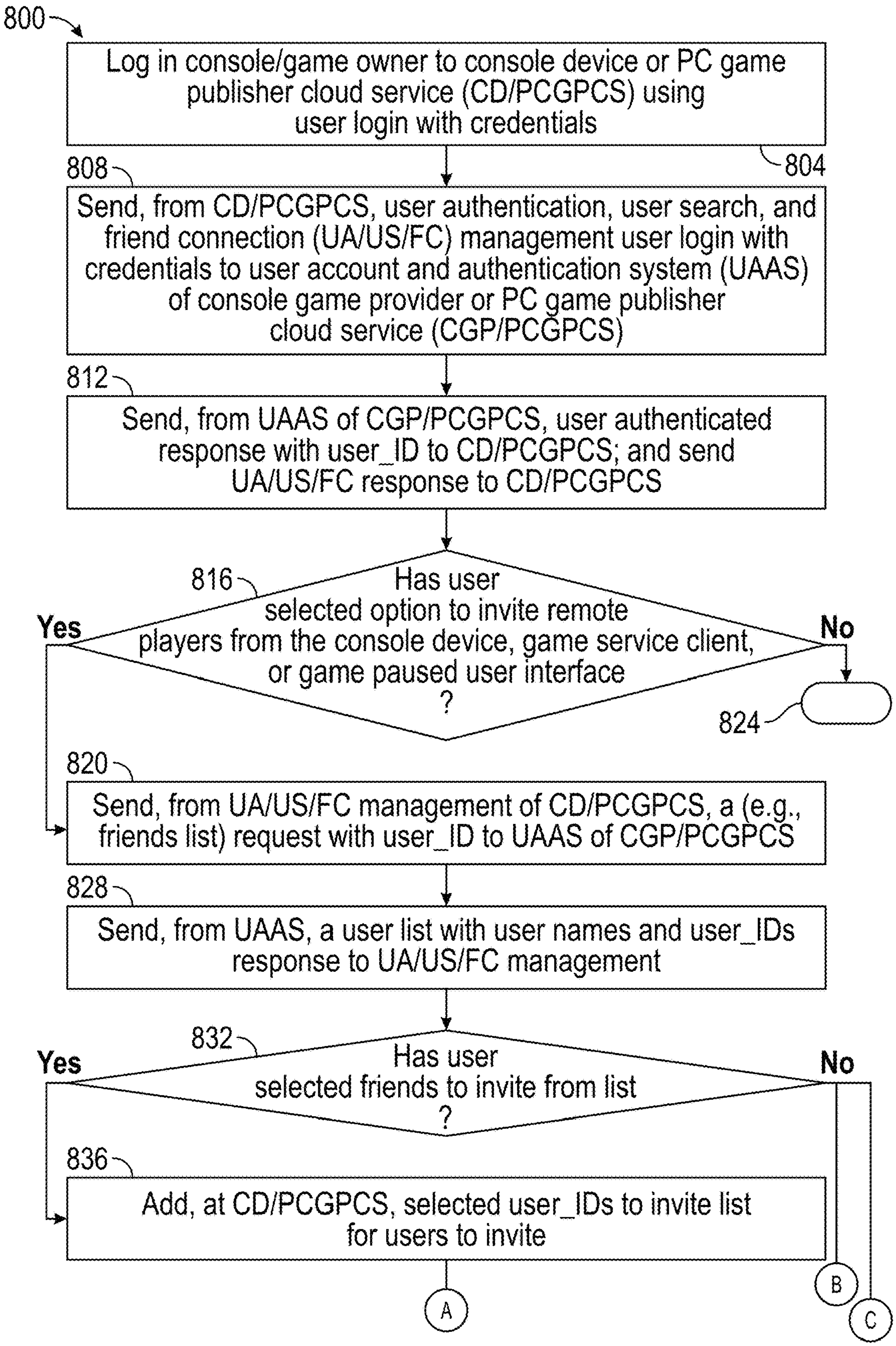
FIG. 8 depicts a process for starting a remote session, inviting friends, and sending connection information to remote devices with a user using the CD/CS application on the remote devices, in accordance with some embodiments of the disclosure.
Figure 8:
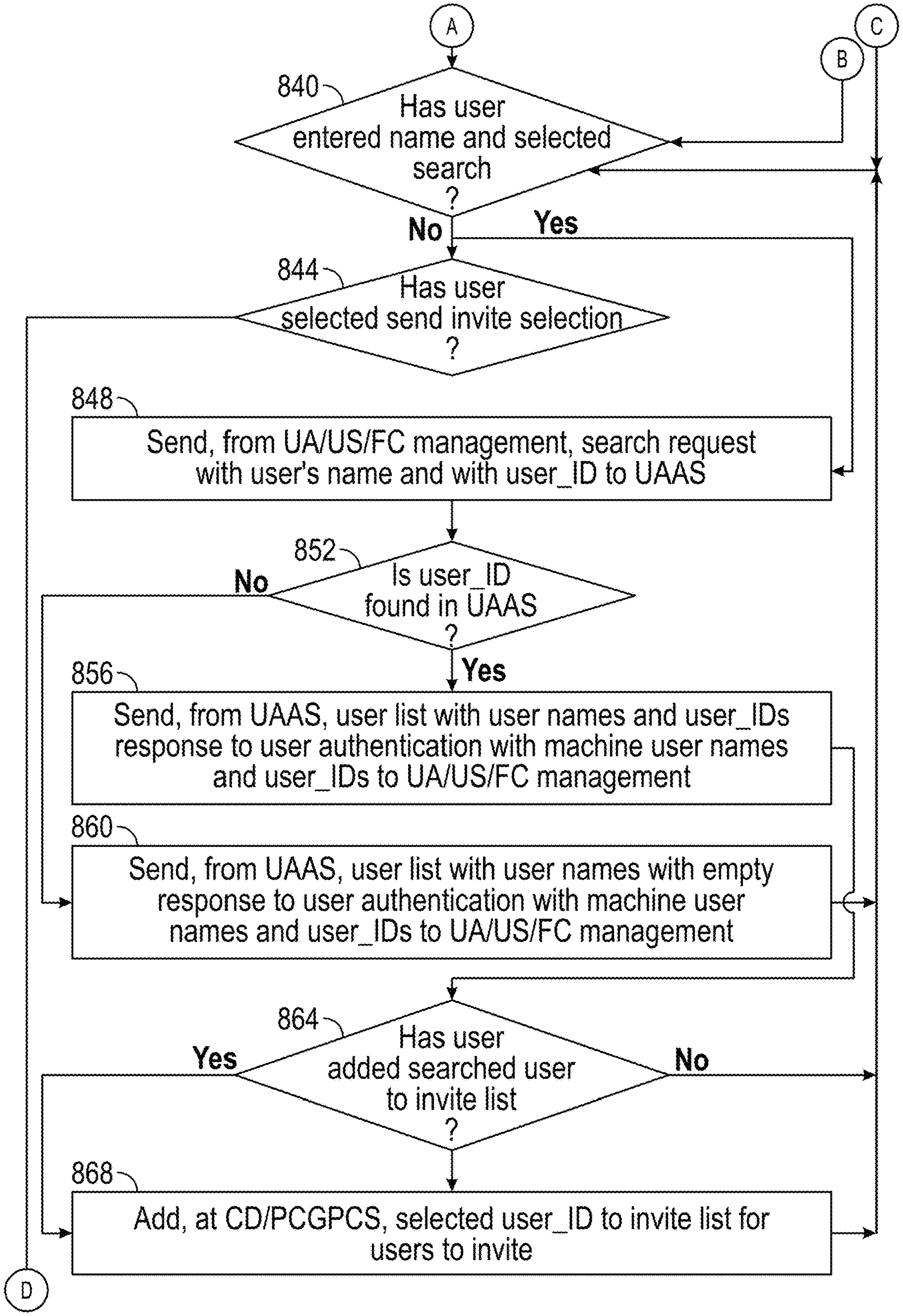
Figure 8:
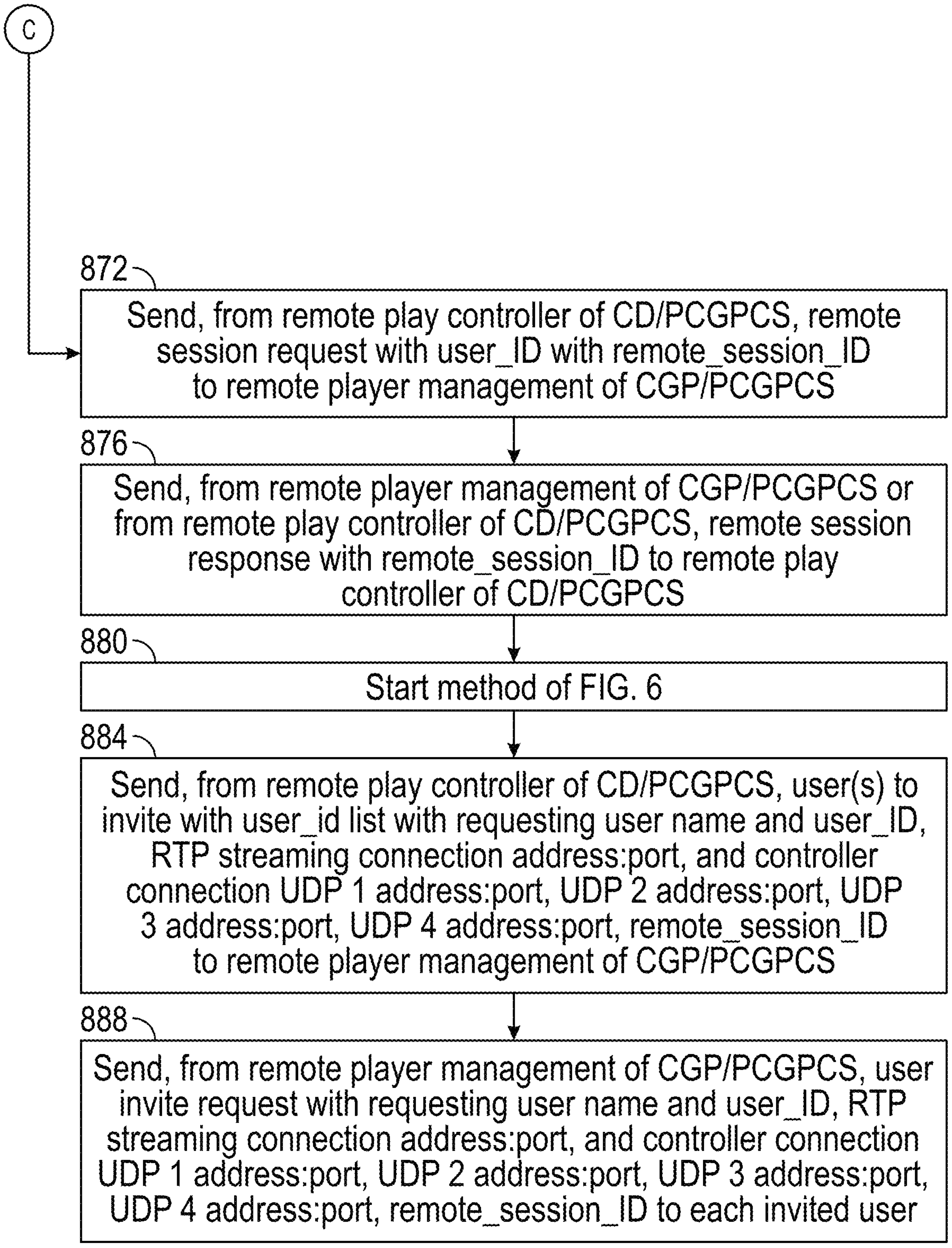

Also provided are various methods associated with the systems, such as the process of FIG. 6 for the system of FIG. 4, and the process of FIG. 8 for the system of FIG. 7. Additional systems and methods are provided. These methods detail processes like remote invite requests from account owners logged in as remote users, remote initial controller connections for local and remote users, passing the controller, and scenarios where the owner is remote and requests control.

As noted in detail herein, systems and methods for enhancing local and/or remote console play with local and/or remote friends are provided, whether through a game controller or a console game provider or PC game publisher cloud service. The features of these systems and methods deliver improved gaming experiences and improved remote computing.

FIG. 1 depicts a system 100 for local and/or remote play via a game console 110, where the console acts as a server and forms a peer-to-peer connection with remote client devices, in accordance with some embodiments of the disclosure. The game console 110 is locally connectable with one or more controllers, e.g., game controller 112, game controller 114, game controller 116, and game controller 118, via respective communication links (shown with two-headed arrows). The game console 110 is connectable with a mobile or fixed line network 120 via a communication link 115. The game console 110 is connectable with one or more remote client devices, e.g., desktop computer 130, mobile device 140, and tablet 150, via the mobile or fixed line network 120 and respective communication links 125, 135, and 145. In the illustrated embodiment, the desktop computer 130, the mobile device 140, and the tablet 150 are connected to game controller 132, game controller 142, and game controller 152 via respective communication links (shown with two-headed arrows). In some examples, controllers are not separate from remote client devices, and gameplay control is controlled by the remote client device itself (not shown). The game console 110 is connectable with one or more providers or cloud services, e.g., CGP/CS 160, via the mobile or fixed line network 120 and communication link 155. Although the mobile or fixed line network 120 is illustrated as a single network, plural networks may be utilized.

Figure 2:
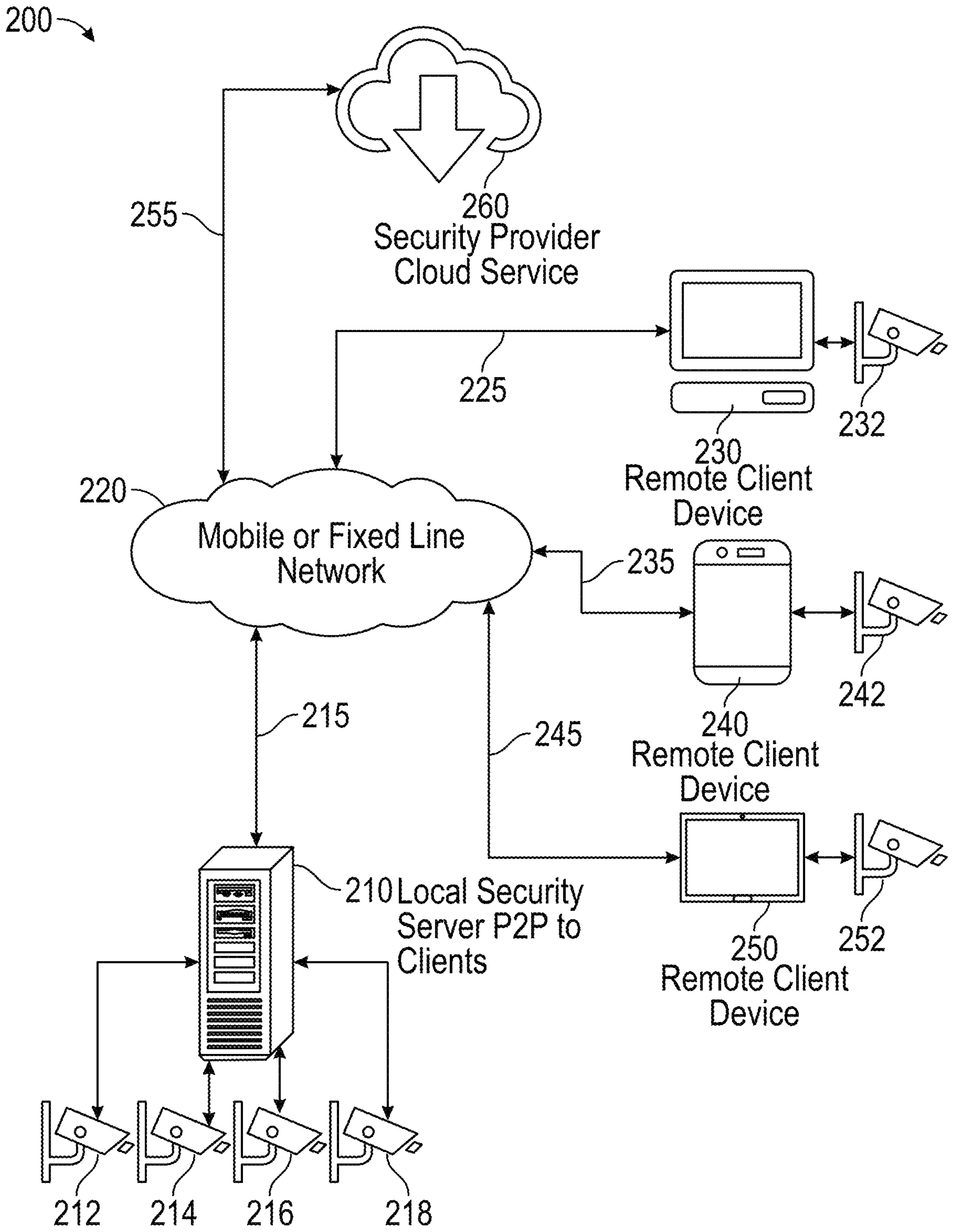
FIG. 2 depicts a security system for connecting local and/or remote devices via a server, which forms a peer-to-peer connection with remote client devices, in accordance with some embodiments of the disclosure.

FIG. 2 depicts a security system 200 for connecting local and/or remote devices via a server 210, which forms a peer-to-peer connection with remote client devices, in accordance with some embodiments of the disclosure. The local security server 210 is locally connectable with one or more devices, e.g., security camera 212, security camera 214, security camera 216, and security camera 218, via respective communication links (shown with two-headed arrows). The local security server 210 is connectable with a mobile or fixed line network 220 via a communication link 215. The local security server 210 is connectable with one or more remote client devices, e.g., desktop computer 230, mobile device 240, and tablet 250, via the mobile or fixed line network 220 and respective communication links 225, 235, and 245. In the illustrated embodiment, the desktop computer 230, the mobile device 240, and the tablet 250 are connected to security camera 232, security camera 242, and security camera 252 via respective communication links (shown with two-headed arrows). In some examples, cameras are not separate from remote client devices, and/or the camera itself is the remote client device (not shown). The local security server 210 is connectable with one or more providers or cloud services, e.g., security provider cloud service 260, via the mobile or fixed line network 220 and communication link 255. Although the mobile or fixed line network 220 is illustrated as a single network, plural networks may be utilized.

Figure 3:
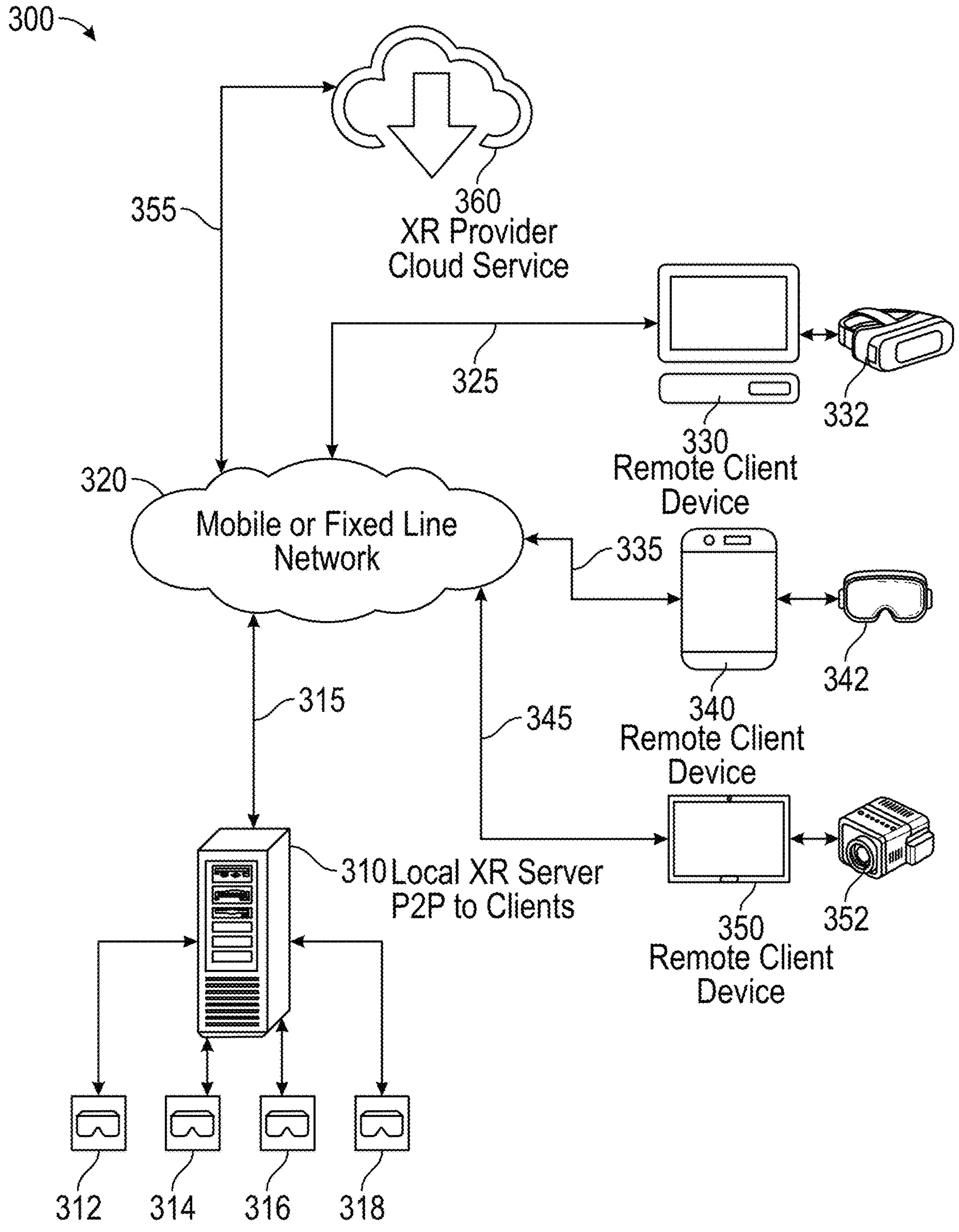
FIG. 3 depicts an extended reality (XR) system for connecting local and/or remote devices via a server, which forms a peer-to-peer connection with remote client devices, in accordance with some embodiments of the disclosure.

FIG. 3 depicts an extended reality (XR) system 300 for connecting local and/or remote devices via a server 310, which forms a peer-to-peer connection with remote client devices, in accordance with some embodiments of the disclosure. The local XR server 310 is locally connectable with one or more devices, e.g., XR device 312, XR device 314, XR device 316, and XR device 318, via respective communication links (shown with two-headed arrows). The local XR server 310 is connectable with a mobile or fixed line network 320 via a communication link 315. The local XR server 310 is connectable with one or more remote client devices, e.g., desktop computer 330, mobile device 340, and tablet 350, via the mobile or fixed line network 320 and respective communication links 325, 335, and 345. In the illustrated embodiment, the desktop computer 330, the mobile device 340, and the tablet 350 are connected to XR headset 332, XR glasses 342, and XR projector 352 via respective communication links (shown with two-headed arrows). In some examples, XR devices are not separate from remote client devices, and/or the XR device itself is the remote client device (not shown). The local XR server 310 is connectable with one or more providers or cloud services, e.g., XR provider cloud service 360, via the mobile or fixed line network 320 and communication link 355. Although the mobile or fixed line network 320 is illustrated as a single network, plural networks may be utilized.

FIG. 4 depicts a system 400 for local and/or remote play via a game console 401, where the console 401 acts as a server and forms a peer-to-peer connection with remote client devices, in accordance with some embodiments of the disclosure.

For example, the game console 401 may be located in a user's home. The remote client devices may be mobile phones, tablets, over-the-top (OTT) set-top boxes (STBs), high-definition multimedia interface (HDMI) sticks, personal computers, or other game consoles running a remote play application provided by a console company. The remote play application running on the remote devices is, for example, an extremely lightweight application requiring only an RTP receiver connected over a UDP socket, a video decoder, and the ability to remotely connect a game controller from the remote device sending the control data via UDP to the game console. In implementations for mobile phones or tablets with touch displays, remote buttons may be shown on a screen overlay. Another UDP socket is provided for connecting the controller back to the game console. The controller data is sent from the remote device to the game console, and the controller haptics data is sent from the game console to the remote device. To perform low latency delivery, in some embodiments, enhanced SCReAM is provided. Enhanced SCReAM leverages ultra-low latency RTP delivery. The enhanced SCReAM architecture leverages returned RTCP packets to determine when the next RTP packets should be sent. When a transmission scheduler determines it is time to send packets, the packets are taken from priority queue RTP packets by the transmission scheduler and sent over the UDP socket to the client. Changes in a size of the priority queue of RTP packets are sent to a rate and video encoding properties control. Based on the changes in the size of the priority queue, a video encoding bitrate is adjusted to fit within a current network QoS. In some embodiments, the enhanced SCReAM architecture includes provision of a datastore of RTCP packets from each connected client and adjustment of the encoding rate and encoding properties based on the worst-case client.

In some embodiments, the system 400 is configured with SCReAM and a low latency, low loss, scalable throughput (L4S) internet service. The L4S architecture is part of Internet Engineering Task Force (IETF) standards, allowing packets to be marked, e.g., with explicit congestion notification (ECN), by the sender and received at the receiver. SCReAM has been thoroughly tested with L4S, achieving a dramatic improvement in latency and packet loss. The insight on which L4S is based is that the root cause of queuing delay lies in the congestion controllers of senders, not in the queue itself.

In some embodiments, the system 400 is configured with L4S architecture. With the L4S architecture, all internet applications could transition away from congestion control algorithms that cause substantial queuing delay to a new class of congestion controls. These induce little queuing, aided by explicit congestion signaling from the network. This new class of congestion controls provides low latency for capacity-seeking flows, allowing applications to achieve both high bandwidth and low latency. This is provided as a flag that enables marking the packets with the appropriate ECN L4S markers.

In some embodiments, the system 400 is configured for real-time video, XR, and cloud gaming. For applications like real-time video, XR, and cloud gaming, the extra delay caused by retransmission or forward error correction (FEC) can become noticeable. ECN uses an active queue management (AQM) congestion detection method but with explicit signaling to indicate to the end hosts that packets normally dropped are instead marked as congested. ECN uses two bits in the IP header, and the information regarding ECN congestion experienced (CE)-marked packets is carried by the transmission control protocol (TCP) acknowledgments (ACKs). The end host then treats a CE-marked packet in the same way as a lost packet.

In some embodiments, the system 400 is configured with an ECN-capable AQM. The ECN-capable AQM marks a packet as CE instead of dropping it when congestion is detected, resulting in a considerable packet loss reduction but less latency reduction compared to a packet-dropping AQM. The interpretation for an L4S-capable AQM is that it should immediately mark packets with CE when queue delays are low if the packets are marked as being L4S capable. This gives a prompt reaction to small signs of congestion, allowing the end hosts to implement scalable congestion control. This means that instead of the multiplicative decrease approach used for ECN-capable flows, a scalable congestion control reduces the congestion window (or transmission rate) proportional to the fraction of CE-marked packets. Compared to classic ECN, the L4S approach gives denser congestion events, provides lower delay jitter, and makes it possible to have low queue delays while maintaining high link utilization.

In some embodiments, the system 400 is configured with an enhanced SCReAM architecture. The enhanced SCReAM architecture is modified in a way that multiple client devices can now connect to the same UDP socket and receive L4S marked for the multimedia packets. For each RTP packet sent to the client device, the client device responds with an RTCP packet, which contains the following: synchronization source identifier (SSRC), transmission timestamps (TSTX), RTP sequence number (RTP(SN)), RTP packet size (RTP(size)), round trip time (RTT), congestion window (CWND), source address (SRC:<IP address>), destination address (DEST:<IP address>), and client device IP address sending RTCP packets (SRC).

Figure 5:
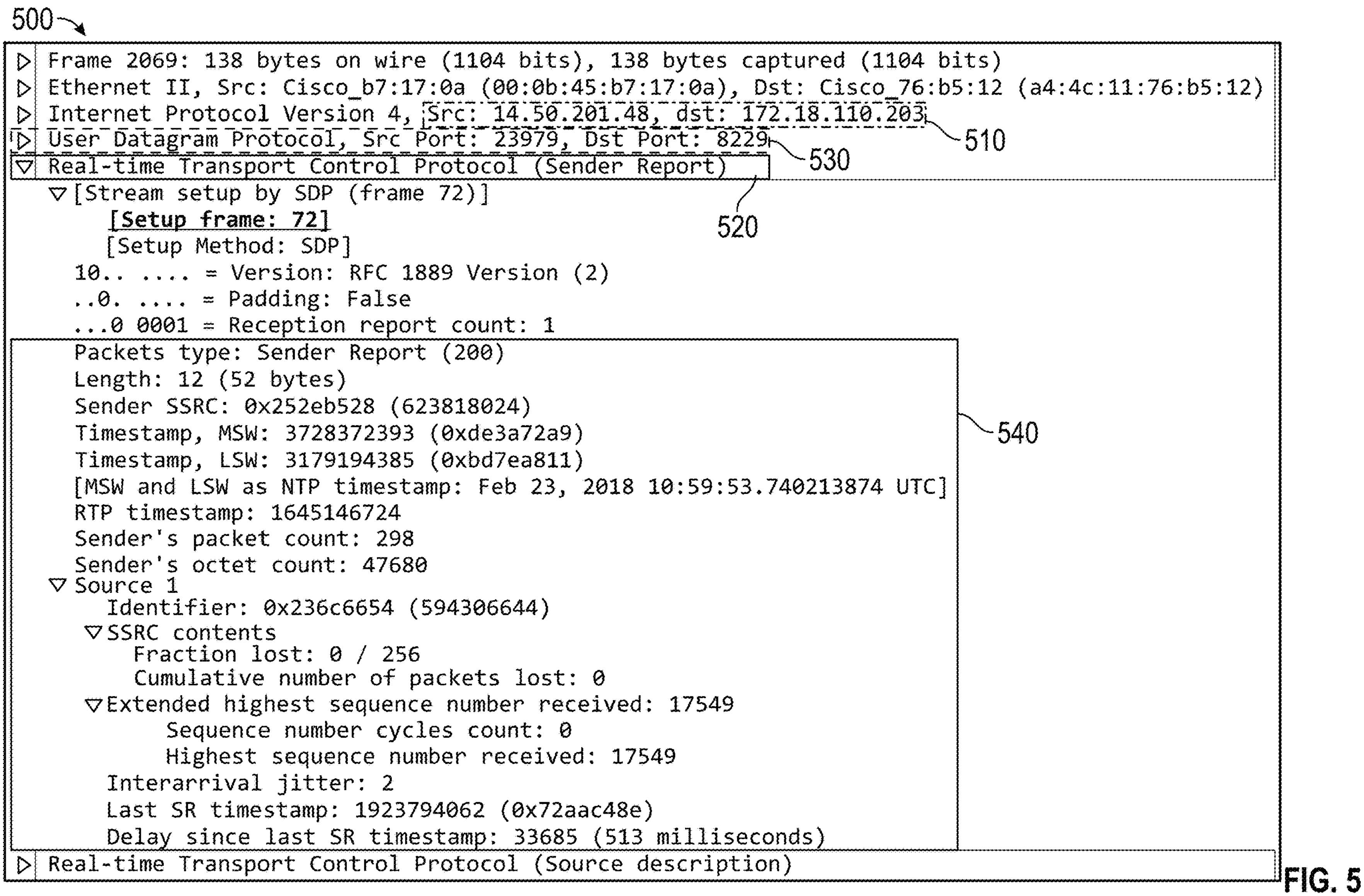
FIG. 5 depicts a packet for RTCP, in accordance with some embodiments of the disclosure.

FIG. 5 depicts a packet 500 for RTCP, in accordance with some embodiments of the disclosure. In some embodiments, the packet 500 includes the SRC and DEST IP address. The SRC, denoted at box 510, is the IP address of the RTP client/receiver sending the RTCP packets. The DEST is the IP address of the RTP sender (e.g., the game console 400). The packet 500 is designated as an RTCP packet at box 520.

In addition to the source and destination IP addresses, the packet 500 includes ports, timestamps, and other protocol-specific data. Frame 2069 refers to the specific packet being analyzed. The frame size is 138 bytes on wire and captured. Ethernet II is the most common Ethernet frame type, and it contains the source (Cisco b7:17:0a) and destination (Cisco_76:b5:12) MAC addresses. IPv4 is the fourth version of the internet protocol (IP). IPv4 is used to identify devices on a network. The source IP is 14.50.201.48, and the destination IP is 172.18.110.203. User datagram protocol (UDP), denoted at box 530, is used for establishing low-latency and loss-tolerating connections between applications on the internet. The source port is 23979, and the destination port is 8229. RTCP is used alongside RTP to provide out-of-band control information about the streaming media. It includes sender reports, receiver reports, source descriptions, and goodbye functions. As denoted at box 540, sender SSRC is a synchronization source identifier, which uniquely identifies the source of a stream. The sender SSRC value here is 623818024. The sender's report timestamp (most significant word (MSW)) is 3728732393. The sender's packet count is the number of packets the sender has sent for this profile. The value here is 298. The sender's octet count is the total number of payload octets (i.e., not including headers or padding) this sender has sent in RTP packets. The value here is 47680. Other information as shown is provided in the packet 500.

In some embodiments, a network congestion control is configured to send the CWND and RTT (bytes in flight) to the transmission scheduler to determine when to remove packets from the priority queue of RTP packets and send those packets via RTP to the device. Those packets are delivered to multiple devices over unmanaged networks with varying QoS. To do this, an RTCP response router, packet response datastores for each connected IP address (SRC IP), and an RTCP reporting system are provided in the architecture of the system 400. When an RTCP packet is received for a sent RTP packet, the RTCP packet from the SRC IP address is placed into the packet response datastore dedicated for that SRC IP address. The datastore also reports the CWND, RTT (bytes in flight) for that SRC IP address. The RTCP reporting system waits until there is a CWND, RTT (bytes in flight) for all connected clients. Once all connected clients have reported, the RTCP reporting system sends a CWND, RTT (bytes in flight) for the worst case SRC.<IP address> message to the transmission scheduler. Once this message has been received, the transmission scheduler moves a priority queue RTP packet into the transmission scheduler and sends that packet over the UDP socket to the connected clients. Using this method, all clients receive the same quality encoding based on the worst-case client. This method may be referred to as multicast multimedia with bitrate control, which delivers a single encoding over a single UDP link to multiple devices. The advantages of multicast multimedia with bitrate control include use of a single encoder to deliver a single stream with bitrate and quality control to multiple devices over an unmanaged limited internet uplink connection (which is considerably less on consumer unmanaged internet connections versus unmanaged downlink connections) with ultra-low latency suitable for remote rendered gaming.

In some embodiments, the system 400 is configured to connect players directly using a minimal number of servers controlled by different organizations. The priority queue is configured, for example, to help manage traffic and minimize the possibility of congestion-induced latency. To minimize inherent latency caused by physical distance, a number of nodes in a path and a number of connections between the nodes are minimized. Additionally, to ensure effectiveness of priority queues, in some embodiments, a server establishes an initial connection from the client device through the invites. After that, the server is not involved. A console-based system or a PC-based system is configured to allow connection URLs to be formed and given to devices through, for example, a game-streaming platform using a custom app, which connects directly to the console or PC system via a shared link.

In some embodiments, the system 400 is provided for local and/or remote play via a game console 401. The game console 401 acts as a server and forms a peer-to-peer connection with one or more remote client devices. The game console 401 includes and/or is connectable with a video device 451 and an audio device 453, which may be integrated into the game console 401 or separately provided and connected to the game console 401 via respective communication links. The game console 401 is locally connectable with one or more controllers, e.g., game controller 1 455, game controller 2 457, game controller 3 459, and game controller 4 461, via respective communication links. The game console 401 is connectable with a mobile or fixed line network 463 via communication links. The game console 401 is connectable with one or more remote client devices, e.g., remote client device 1 **465*a*, remote client device 2 465*b*, and remote client device 3 465*c* via the mobile or fixed line network 463 and respective communication links. In the illustrated embodiment, the remote client device 1 465*a*, the remote client device 2 465*b*, and the remote client device 3 465*c*** are connected to game controller

491*a*, game controller 491*b*, and game controller 491*c* via respective communication links. In some examples, controllers are not separate from remote client devices, and gameplay control is controlled by the remote client device itself (not shown). Although the mobile or fixed line network 463 is illustrated as a single network, plural networks may be utilized.

Figure 24:
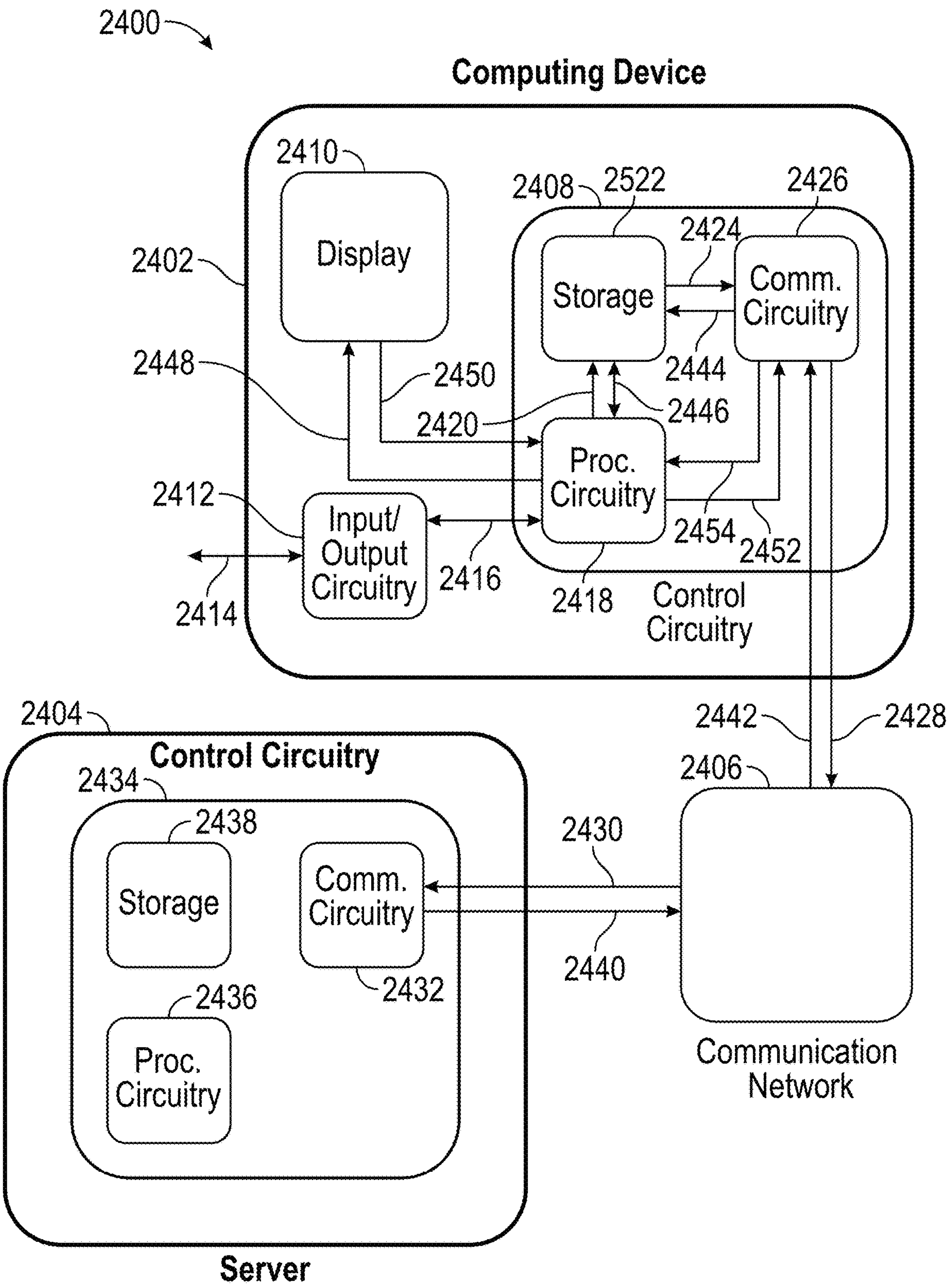
FIG. 24 depicts a system including a server, a communication network, and a computing device for performing the methods and processes noted herein, in accordance with some embodiments of the disclosure.

The game console 401 includes at least one of a central processing (CPU), a graphics processing unit (GPU), an audio chip, a memory (e.g. random access memory (RAM), a storage (e.g., a hard drive or a solid state drive), one or more input/output interfaces, an operating system, game media, or a network adapter (see, e.g., FIGS. 4 and 24). The CPU is the main processor of the console 401, responsible for executing the instructions of a computer program. The GPU is a specialized processor that accelerates the creation of images for output to a display. The audio chip is responsible for generating sound. The memory is the primary storage of the console 401 for temporary data that is being actively processed by the CPU. The storage is where data is stored long-term, including game data, user information, and more. The one or more input/output interfaces allow for the connection of controllers, external storage, and other peripherals. The operating system is the software that manages hardware resources and provides various services for the execution of games and applications. The game media could be cartridges, CDs, DVDs, or digital downloads. The game media contains the game data and is read by the console 401 to play the game. The network adapter allows the console to connect to the internet for online gaming, updates, and more.

In some embodiments, the game console 401 includes at least one of a game engine 403 for running a game title, a rate and video encoding properties control 407, a video encoder 409, an audio encoder 411, a multiplexer 413, an RTP sender 415, a priority queue RTP packets data storage (or file) 417, a transmission scheduler 419, a UDP socket (connection endpoint 1) 421, a network congestion control 423, a controller handler 1 433, a controller handler 2 435, a controller handler 3 437, a controller handler 4 439, a controller input/output mapper 441, a UDP socket 1 (connection endpoint 2) 443, a UDP socket 2 (connection endpoint 3) 445, a UDP socket 3 (connection endpoint 4) 447, or a UDP socket 4 (connection endpoint 5) 449.

In some embodiments, the game engine 403 is configured to perform at least one of send a game title QoE remote play definition to a data storage (or file) 405, send raw image data to the video encoder 409, send raw image data to the video device 451, send raw audio image data to the audio encoder 411, send raw audio image data to the audio device 453, send haptics data to at least one of the controller handlers (e.g., controller handler 1 433, the controller handler 2 435, the controller handler 3 437, the controller handler 4 439), or receive controller input from at least one of the controller handlers.

In some embodiments, the controller handlers are configured to exchange information with local and/or remote controllers or devices. For example, at least one of the controller handlers (e.g., controller handler 1 433, the controller handler 2 435, the controller handler 3 437, the controller handler 4 439) is configured to send haptics data to one or more controllers (e.g., the game controller 1 455, the game controller 2 457, the game controller 3 459, and the game controller 4 461), and receive controller input from one or more controllers. Also, in some embodiments, at least one of the controller handlers is configured to send haptics data to a respective UDP socket and to receive controller input from the respective UDP socket, e.g., the UDP socket 1 (connection endpoint 2) 443, the UDP socket 2 (connection endpoint 3) 445, the UDP socket 3 (connection endpoint 4) 447, or the UDP socket 4 (connection endpoint 5) 449. In some embodiments, either in addition to the controller handlers or in lieu of at least one of the controller handlers, a dedicated remote slot 440 is provided for communication with one or more of the remote clients and/or controllers. In some embodiments, four local controller handlers (each like the controller handlers 433-439, as shown) are provided for four controllers, and four remote slots (each like the dedicated remote slot 440) are provided for the respective UDP sockets. In some embodiments, the controller input/output mapper 441 is configured to control the various inputs and outputs to and/or from the local and/or remote controllers via the UDP sockets.

For example, in some embodiments, the UDP socket 1 (connection endpoint 2) 443 is configured to send haptics data 443*a* to a UDP socket 483*a* (at IP address 1:port 2) of the remote client device 1 465*a* and receive controller input 483*a*1 from the UDP socket 483*a* (at IP address 1:port 2) of the remote client device 1 465*a*. Also, the UDP socket 2 (connection endpoint 3) 445 is configured to send haptics data 445*a* to a UDP socket 483*b* (at IP address 2:port 2) of the remote client device 2 465*b* and receive controller input 483*b*1 from the UDP socket 483*b* (at IP address 2:port 2) of the remote client device 2 465*b*. Further, the UDP socket 3 (connection endpoint 4) 447 is configured to send haptics data 447*a* to a UDP socket 483*c* (at IP address 3:port 2) of the remote client device 3 465*c* and receive controller input 483*c*1 from the UDP socket 483*c* (at IP address 3:port 2) of the remote client device 3 465*c*. Further, the UDP socket 4 (connection endpoint 5) 449 may be configured for additional remote client devices (not shown).

In some embodiments, a bitrate-to-encoding properties mapping based on the game title QoE remote play definition stored in the data storage (or file) 405 is sent to the rate and video encoding properties control 407. In some embodiments, the rate and video encoding properties control 407 is configured to perform at least one of receive a queue length from the priority queue RTP packets data storage (or file) 417, receive the bitrate-to-encoding properties mapping from the data storage (or file) 405, receive an audio bitrate from the audio encoder 411, determine a target video encoding bitrate, send the target video encoding bitrate to the video encoder 409, determine target video encoding properties, send the target video encoding properties to the video encoder 409, or receive a multiplexer (mux) bitrate from the multiplexer 413. In some embodiments, the rate and video encoding properties control 407 is configured to calculate the target rate and the target video encoding properties based on the queue length, the bitrate-to-encoding properties mapping (itself based on the game title QoE remote play definition), the audio bitrate, and the mux bitrate.

In some embodiments, the video encoder 409 and the audio encoder 411 process information in accordance with instructions received from the game engine 403 and/or the rate and video encoding properties control 407. For example, the video encoder 409 receives the raw image data, the target rate, and the target video encoding properties and encodes the raw image data, the target rate, and the target video encoding properties into encoded video, which is sent to the multiplexer 413. Also, for example, the video encoder 411 receives the raw audio data, and encodes the raw image data into encoded audio, which is sent to the multiplexer 413. Also, the video encoder 411 transmits the audio bitrate to the rate and video encoding properties control 407.

In some embodiments, the multiplexer 413 receives the encoded video and the encoded audio, processes the encoded video and the encoded audio, transmits the mux bitrate to the rate and video encoding properties control 407, and transmits multiplexed encoded video and audio packets to the RTP sender 415.

In some embodiments, the RTP sender 415 receives the multiplexed encoded video and audio packets, processes the multiplexed encoded video and audio packets, and transmits RTP multiplexed encoded video and audio packets to the priority queue RTP packets data storage (or file) 417.

In some embodiments, the transmission scheduler 419 receives the RTP multiplexed encoded video and audio packets from the priority queue RTP packets data storage (or file) 417 and receives CWND and RTT (e.g., bytes in flight for a worse-case source) from the network congestion control 423; processes the RTP multiplexed encoded video and audio packets, the CWND, and the RTT; transmits a synchronization source (SSRC), a timestamp of transmission (TS(TX)), a sequence number of a real-time transport protocol (RTP(SN)), and an RTP packet (RTP(size)) to the network congestion control 423; and transmits RTP multiplexed ("multiplexed" and "muxed" are used interchangeably herein) encoded video and audio packets to the UDP socket (connection endpoint 1) 421.

In some embodiments, the UDP socket (connection endpoint 1) 421 is configured to receive the RTP muxed encoded video and audio packets from the transmission scheduler and process the RTP muxed encoded video and audio packets. The UDP socket (connection endpoint 1) 421 is configured to perform at least one of: receiving one or more RTCP packets from one or more remote client devices, sending RTP muxed encoded video and audio packets to one or more remote client devices, sending existing, new or removed SRC IP connections to the network congestion control 423, or sending RTCP packets with SRC IP to the network congestion control 423. For example, if a client disconnects, that client's IP address with a datastore will be removed from the network congestion control, and the network congestion control will no longer receive RTCP packets from the removed client. In other words, clients that are connected to the UDP socket connection endpoint are sending RTCP packets to the network congestion control.

In the embodiment of FIG. 4, the UDP socket (connection endpoint 1) 421 receives RTCP packets with SRC:<remote client device 1 IP address> **469*a*1 from a UDP socket (e.g., at IP address 1:port 1) 469*a* of the remote client device 1 465*a*, and transmits RTP muxed encoded video and audio packets (for the SRC:<remote client device 1 IP address>) 421*a* to the UDP socket 469*a* of the remote client device 1 465*a*. The UDP socket (connection endpoint 1) 421 and the UDP socket (e.g., at IP address 1:port 1) 469*a*** may communicate, for example, via one of RTP ports 49152-64512.

In some embodiments, the UDP socket (connection endpoint 1) 421 may be configured for multiple remote clients. For example, in the embodiment of FIG. 4, the UDP socket (connection endpoint 1) 421 receives RTCP packets with SRC:<remote client device 2 IP address> **469*b*1 from a UDP socket (e.g., at IP address 2:port 1) 469*b* of the remote client device 2 465*b*, and transmits RTP muxed encoded video and audio packets (for the SRC:<remote client device 2 IP address>) 421*b* to the UDP socket 469*b* of the remote client device 2 465*b*. Similarly, the UDP socket (connection endpoint 1) 421 receives RTCP packets with SRC:<remote client device 3 IP address> 469*c*1 from a UDP socket (e.g., at IP address 3:port 1) 469*c* of the remote client device 3 465*c*, and transmits RTP muxed encoded video and audio packets (for the SRC:<remote client device 3 IP address>) 421*c* to the UDP socket 469*c* of the remote client device 3 465*c*. The UDP socket (connection endpoint 1) 421 may communicate with one or both of the UDP socket 469*b* (e.g., at IP address 2:port 1) and the UDP socket 469*c*** (e.g., at IP address 3:port 1), for example, via one of the RTP ports 49152-64512.

The network congestion control 423 of the game console 401 manages data traffic between game console 401 and remote client devices (e.g., **465*a*, 465*b*, 465*c*). The network congestion control 423** receives and processes various types of data, keeps track of the data traffic for each client device, identifies any potential issues (like a worst-case client device), and adjusts its data transmission accordingly.

For example, the network congestion control 423 of the game console 401 is configured to receive RTCP packets and changes in SRC IP connections from a UDP socket (e.g., 421) connected to one or more remote client devices (e.g., **465*a*, 465*b*, 465*c*). The network congestion control 423 also receives various data from the transmission scheduler 419 of the game console 401. This data includes, for example, the SSRC, the TS(TX), the RTP(SN), and the RTP(size). The RTCP packets with the SRC IP are processed at an RTCP response router 425 of the network congestion control 423. The network congestion controller 423 processes the existing, new or removed SRC IP connections. The RTCP response router 425 sends RTCP packets to at least one packet response datastore, e.g., packet response datastore for SRC 1 427 and packet response datasource for SRC n 429. The network congestion controller 423 processes various data by accessing the one or more packet response datastores. The network congestion control 423 accesses the packet response datastore for each SRC (e.g., 427, 429). The network congestion control 423 determines a congestion window (CWND) and a round trip time (RTT) for each SRC, which is sent to an RTCP reporting system 431 of the network congestion control 423. The RTCP reporting system 431** is configured to process the CWND and the RTT for each source packet.

In some embodiments, the packet response datastore (e.g., 427, 429) stores one or more RTCP responses as they are received from their corresponding client IP addresses. Once a last datastore receives its RTCP response, the information is sent to the transmission scheduler 419. A worst-case client device will respond. (In operation, for example, datastores for other clients have already stored their RTCP packet in their datastore.) The last RTCP packet is used to send information to the transmission scheduler 419. All of the datastores that have stored that RTCP packet will remove that RTCP packet.

For the worst-case client device or the last client device to respond with an RTCP packet, the RTCP reporting system 431 sends the CWND and the RTT to the transmission scheduler 419 of the game console 401. In some embodiments, when the RTP packet is sent with a sequence number, the network congestion control 423 may wait for all (or some) client devices (identified by IP address) to respond with an RTCP packet. The last client to respond, e.g., results in the network congestion control 423 sending the CWND and RTT for that last client to respond.

Turning to the remote client device 1 **465*a*, the remote client device 2 465*b*, and the remote client device 3 465*c* of the system 400, a description of the remote client device 1 465*a* is provided herein. In some embodiments, such as the embodiment(s) depicted in FIG. 4, the remote client devices are depicted as identical (but need not necessarily be identical). As such, like reference numbers of the remote client device 1 465***a* have identical descriptions and functionality for like reference numbers for the remote client device 2 465*b* and the remote client device 3 465*c*. The duplicative descriptions are omitted for brevity.

In some embodiments, the remote client device 1 465*a* includes a game remote play client app 467*a*. The game remote play client app 467*a* includes at least one of the UDP socket 469*a*, a transmission receiver 471*a*, a demultiplexer 473*a*, a video decoder 475*a*, a video renderer 477*a*, an audio decoder 479*a*, an audio renderer 481*a*, a UDP socket 483*a*, or a controller for data transmission 485*a*. The remote client device 1 465*a* may include at least one of a built-in or separately connected video device 487*a*, a built-in or separately connected audio device 489*a*, or a built-in or separately connected controller, such as the game controller 491*a*.

In operation, in some embodiments, the remote client device 1 465*a* is configured to perform at least one of sending the RTCP packets with SRC:<remote client device 1 IP address> 469*a*1 to the game console 401, receiving the RTP muxed encoded video and audio packets (for the SRC:<remote client device 1 IP address>) 421*a* from the game console 401, sending a rendered video frame to the video device 487*a*, sending a rendered audio frame to the audio device 489*a*, receiving the haptics data 443*a* from the game console 401, sending controller input 483*a*1 to the game console 401, sending haptics data to the game controller 491*a*, or receiving controller input from the game controller 491*a*. As described in detail herein, the RTCP packets with SRC:<remote client device 1 IP address> 469*a*1 are sent to the game console 401 for processing (e.g., by the network congestion control 423).

In some embodiments, the game remote play client app 467*a* includes at least one of the following: the UDP socket 469*a* is configured to send RTP multiplexed (muxed) encoded video and audio packets to the transmission receiver 471*a*, the transmission receiver 471*a* is configured to generate and/or send RTCP packets to the UDP socket 469*a*, or the transmission receiver 471*a* is configured to generate and/or send the RTP muxed encoded video and audio packets to the demultiplexer 473*a*, video processing, or audio processing. On the video processing side, in some embodiments, the demultiplexer 473*a* is configured to demux the RTP muxed encoded video and audio packets, the demultiplexer 473*a* is configured to send encoded video PES to the video decoder 475*a*, the video decoder 475*a* is configured to decode the encoded video PES, the video decoder 475*a* is configured to send a decoded video frame to the video renderer 477*a*, the video renderer 477*a* is configured to render a rendered video frame, and the video renderer 477*a* is configured to send the rendered video frame to the video device 487*a*. On the audio processing side, in some embodiments, the demultiplexer 473*a* is configured to demux the RTP muxed encoded audio and audio packets, the demultiplexer 473*a* is configured to send encoded audio PES to the audio decoder 479*a*, the audio decoder 479*a* is configured to decode the encoded audio PES, the audio decoder 479*a* is configured to send a decoded audio frame to the audio renderer 481*a*, the audio renderer 481*a* is configured to render a rendered audio frame, and the audio renderer 481*a* is configured to send the rendered audio frame to the audio device 489*a*.

In some embodiments, the game remote play client app 467*a* is configured to process controller input data and haptics data (or other forms of input and output) between the remote client device 1 465*a*, the controller 491*a*, and the game console 401. For example, the UDP socket 483*a* is configured to receive the haptics data 443*a* from the game console 401, the UDP socket 483*a* is configured to send the haptics data to the controller for data transmission 485*a*, and the controller for data transmission 485*a* is configured to send the haptics data to the game controller 491*a*. A user operating the game controller 491*a* operates one or more input devices of the game controller 491*a* (e.g., buttons, triggers, sensor data, and the like), which are converted to controller input data. The controller for data transmission 485*a* is configured to receive the controller input from the game controller 491*a*. The controller for data transmission 485*a* is configured to send the controller input data to the UDP socket 483*a*. The UDP socket 483*a* is configured to send the controller input data 483*a*1 to the UDP socket 443 of the game console 401. The controller input data is, as described in detail herein, sent back to the game engine 403 via one of the controller handlers (e.g., 433).

Related to the concept defined herein of the game title quality of experience (QoE) remote play definition (e.g., between the game engine 403 and the data storage 405; see, also, FIG. 6), Table 1 below illustrates an example of bitrates for remote rendering codecs for a specific game title. These bitrates are adjusted to provide a controlled user experience based on bitrate changes. The game developer or publisher may define the qualities of the game title. This allows for adjustments in encoding quality based on the bitrate requested by the encoder. The enhanced SCReAM set forth herein is configured to associate bitrates with changes to the encoder. Also, the rate controller is configured to set encoding properties based on a policy definition. In some embodiments, this control is based on a codec type such as advanced video coding (AVC), high efficiency video coding (HEVC), or versatile video coding (VVC). In this context, the example provided is for HEVC. This example meets the minimum requirements defined by game consoles (e.g., Sony).

The game engine may also send updated requirements based on the dynamics of the game video and latency requirements. For instance, during a cutscene, the rates and framerates may change for its duration. After the cutscene, the encoding properties related to rates may change according to another encoding policy. These properties can be dynamic, changing based on the content being sent to the remote rendering client device at any given time.

Table 1 provides data on the bitrate (both low and high) for a specific combination of resolution and frame rate.

| Resolution | Frame Rate | HEVC Bitrate Low Mb/s | HEVC Bitrate High Mb/s |
|---|---|---|---|
| 8K | 120 Hz | 230 | 270 |
| 8K | 90 Hz | 180 | 230 |
| 8K | 60 Hz | 145 | 180 |
| 8K | 30 Hz | 115 | 145 |
| 4K | 120 Hz | 120 | 150 |
| 4K | 90 Hz | 90 | 120 |
| 4K | 60 Hz | 55 | 90 |
| 4K | 30 Hz | 35 | 55 |
| 1080p | 120 Hz | 60 | 75 |
| 1080p | 90 Hz | 35 | 60 |
| 1080p | 60 Hz | 16 | 35 |
| 1080p | 30 Hz | 8 | 16 |
| 720p | 120 Hz | 13 | 16 |
| 720p | 90 Hz | 10 | 13 |
| 720p | 60 Hz | 7 | 10 |
| 720p | 30 Hz | 5 | 7 |

FIG. 6 depicts a process 600 for bitrate and encoding quality control for delivering a single encoded stream from a single RTP sender to multiple client devices over an unmanaged network, in accordance with some embodiments of the disclosure. In some embodiments, the process is dynamic in that it gives control at real time to an encoder to adjust encoding properties based on a type of content. The encoding properties might change based on a current bandwidth at any given time based on the content. The producer of the content, in this case the game provider, for example, provides encoding properties to the encoder to drive the quality at any given time.

In some embodiments, the process 600 includes steps involving some components of the system 400 including, for example, at least one of the game console 401, the game engine 403, the rate and video encoding properties control 407, the video encoder 409, the audio encoder 411, the multiplexer 413, the RTP sender 415, the priority queue RTP packets data storage 417, the transmission scheduler 419, the UDP socket (connection endpoint 1) 421, the network congestion control 423, the RTCP response router 425, the packet response datastore for SRC 1 427, the packet response datastore for SRC n 429, or the RTCP reporting system 431.

The process 600 includes running and/or rendering 602 video at a video source. The process 600 includes instantiating 604 a self-clocked rate adaptation RTP delivery session. The process 600 includes instantiating 606 an RTP delivery session. The process 600 includes instantiating 608 a video encoder instance in a live low latency mode. The process 600 includes receiving 610, at a video encoder (e.g., 409), encoding properties with bitrate ranges (e.g., Table 1). The process 600 includes instantiating 612 an audio encoder instance. The process 600 includes encoding 614, at the video encoder, video at a lowest bitrate set in an encoding profiles table or controller. The process 600 includes beginning 616, at an audio encoder (e.g., 411), encoding audio at a defined audio bitrate. The process 600 includes receiving 618, at a multiplexer (e.g., 413), audio and video PES, and adjusting a mux rate based on the audio and video PES. The process 600 includes sending 620, from the multiplexer, multiplexed audio and video PES streams to an RTP sender (e.g., 415). The process 600 includes sending 622, from the multiplexer, a multiplexed bitrate rate to a rate and video encoding properties control (e.g., 407). The process 600 includes pausing 624 the RTP delivery session for a UDP connection.

The process 600 includes determining 626 whether a connection is made on a UDP delivery IP address and port number (shown in the drawings as "port:address"). If the connection is made on the UDP delivery IP address and port number (626="Yes"), then the process 600 proceeds to step 628. If the connection is not made on the UDP delivery IP address and port number (626="No"), then the process 600 proceeds to step 638.

The process 600 includes sending 628 a new SRC IP connection with an SRC IP address of a client to the network congestion control (e.g., 423). The process 600 includes adding 630, at the network congestion control (e.g., 423), a new packet response datastore for the SRC IP address (e.g., 427, 429). The process 600 includes determining 632 whether there are any existing connections. If there are not any existing connections (632="No"), then the process 600 proceeds to step 634. If there are any existing connections (632="Yes"), then the process 600 proceeds to step 636.

The process 600 includes sending (e.g., buffering) 634, at the RTP sender (e.g., 415), RTP multiplexed, encoded video and audio packets to the priority queue RTP packets data storage (e.g., 417). The process 600 includes accessing 636, at the transmission scheduler (e.g., 419), a first RTP muxed, encoded video and audio packet from the priority queue of packets, and sending the same to the UDP socket connection endpoint (e.g., 421) for delivery.

The process 600 includes determining 638 whether a connection is removed on the UDP delivery IP address and port number. If the connection is not removed on the UDP delivery IP address and port number (638="No"), then the process 600 proceeds to step 636. If the connection is removed on the UDP delivery IP address and port number (638="Yes"), then the process 600 proceeds to step 640.

The process 600 includes removing 640 the packet response datastore for the SRC IP address. The process 600 includes determining 642 whether any client devices are still connected. If any client devices are still connected (642="Yes"), then the process 600 proceeds to step 636. If any client devices are still connected (642="Yes"), then the process 600 proceeds to step 644.

The process 600 includes stopping 644, at the priority queue, sending (buffering) of the RTP multiplexed encoded video and audio packets. The process 600 includes flushing 646 the priority queue RTP packets (e.g., at 417). The process 600 reverts to the encoding step 614.

Following the sending step 634, the process 600 includes monitoring 648, at the rate and video encoding properties control (e.g., 407), a queue length of the priority queue of packets. The process 600 includes determining 650 whether a rate adjustment increase or decrease is needed based on the queue length. If the rate adjustment increase or decrease is needed based on the queue length (650="Yes"), then the method proceeds to step 652. If the rate adjustment increase or decrease is not needed based on the queue length (650="No"), then the method reverts to the monitoring step 648.

The process 600 includes accessing 652, at the rate and video encoding properties control (e.g., 407), encoding properties based on a new calculated bitrate from an encoding properties definition (e.g., Table 1). In some embodiments, in response to determining a bitrate adjustment increase or decrease is needed based on the queue length, the rate and video encoding properties controller accesses encoding properties based on a multiplexer bitrate and an audio bitrate. The process 600 includes calculating 654, at the rate and video encoding properties control (e.g., 407), a new video encoding rate based on an audio rate and a multiplexed bitrate based on a calculated network QoS. The process 600 includes determining 656 whether an increase is needed. If the increase is needed (656="Yes"), then the method proceeds to step 658. If the increase is not needed (656="No"), then the method proceeds to step 662.

If the increase is needed (656="Yes"), the process 600 includes sending 658, from the rate and video encoding properties control (e.g., 407), a new target rate to the video encoder (e.g., 409). The process 600 includes sending 660, from the rate and video encoding properties control (e.g., 407), new video encoding properties (e.g., resolution and framerate) to the video encoder (e.g., 409).

If the increase is not needed (656="No"), then steps 658 and 660 are reversed. That is, the process 600 includes sending 662, from the rate and video encoding properties control (e.g., 407), new video encoding properties (e.g., resolution and framerate) to the video encoder (e.g., 409). The process 600 includes sending 664, from the rate and video encoding properties control (e.g., 407), a new target rate to the video encoder (e.g., 409).

After the sending step 660 or the sending step 664, the process 600 includes receiving 666, at the multiplexer (e.g., 413), audio and video PES streams, and adjusting a mux rate based on the audio and video PES rates. The process 600 includes sending 668, from the multiplexer (e.g., 413), a multiplexed bitrate rate to the rate and video encoding properties control (e.g., 407). The process 600 reverts to the monitoring step 648.

If there are any existing connections (632="Yes"), and after the accessing step 636, the process 600 includes waiting 670, at the RTP response router (e.g., 425), on an RTCP packet response. The process 600 includes determining 672 whether the UDP socket connection endpoint (e.g., 421) received the RTCP packet. If the UDP socket connection endpoint (e.g., 421) received the RTCP packet (672="Yes"), then the process 600 proceeds to step 674. If the UDP socket connection endpoint (e.g., 421) has not received the RTCP packet (672="No"), then the process 600 reverts to the waiting step 670.

The process 600 includes receiving 674, at the RTCP response router (e.g., 425) of the network congestion control (e.g., 423), the RTCP packet. The process 600 includes removing 676, at the RTCP response router (e.g., 425), the RTCP packet from the packet response datastore for the SRC IP address (e.g., 472, 429) of the RTCP packet. The process 600 includes determining 678 whether one of the packet response datastores is waiting on an RTCP response. If one of the packet response datastores is waiting on an RTCP response (678="Yes"), then, the process 600 reverts to the waiting step 670. If one of the packet response datastores is not waiting on an RTCP response (678="No"), then, the process 600 includes saving 680, at the network congestion control (e.g., 423), the SRC IP address as a worst-case client device. The process 600 includes sending (682), from the RTCP reporting system (431), the CWND and the RTT to the transmission scheduler (e.g., 419). The process 600 reverts to the accessing step 636.

FIG. 7 depicts a system 700 with focus on user invites by a console owner, managing peer-to-peer connections from remote controller input, and receiving a game rendered stream from a game console, in accordance with some embodiments of the disclosure. The system 700 also includes "pass the controller" components and interfaces for passing the controller to both remote and local users.

The system 700 may be similar to and/or include some or all of the features described above with respect to the system 400. In some embodiments, the system 700 is provided for local and/or remote play via a game console 701. The game console 701 acts as a server and forms a peer-to-peer connection with one or more remote client devices. The game console 701 includes and/or is connectable with a video device (not shown) and an audio device (not shown), which may be integrated into the game console 701 or separately provided and connected to the game console 701 via respective communication links. The game console 701 is locally connectable with one or more controllers, e.g., game controller 1 731, game controller 2 733, game controller 3 735, and game controller 4 737, via respective communication links. The game console 701 is connectable with a mobile or fixed line network 739 and/or a mobile or fixed line network 761 via communication links. The game console 701 is connectable with one or more remote client devices, e.g., remote client device 1 741*a*, remote client device 2 741*b*, and remote client device 3 741*c* via the mobile or fixed line network 739 and respective communication links. In the illustrated embodiment, the remote client device 1 741*a*, the remote client device 2 741*b*, and the remote client device 3 741*c* are connected to game controller 759*a*, game controller 759*b*, and game controller 759*c* via respective communication links. In some examples, controllers are not separate from remote client devices, and gameplay control is controlled by the remote client device itself (not shown). Although each of the mobile or fixed line network 739 and the mobile or fixed line network 761 is illustrated as a single network, plural networks may be utilized. Although the mobile or fixed line network 739 and the mobile or fixed line network 761 are illustrated as separate networks, they may be the same network.

In some embodiments, in addition to the features illustrated and described with respect to the game console 401 of the system 400 of FIG. 4, the game console 701 of the system 700 includes a transport bandwidth control system 705, a UA/US/FC controller 729, and a remote play controller 727, described in detail herein. The system 700 also includes a CGP/CS 763 with a UAAS 769 and a remote player management controller 765. Further, each of the remote client device 1 741*a*, the remote client device 2 741*b*, and the remote client device 3 741*c* includes a game remote play client app 743*a*, a game remote play client app 743*b*, and a game remote play client app 743*c*, respectively, described in detail herein. Still further, each of the game remote play client app 743*a*, the game remote play client app 743*b*, and the game remote play client app 743*c* includes a remote play controller 749*a*, a remote play controller 749*b*, and a remote play controller 749*c*, respectively, described in detail herein. Even further, each of the game remote play client app 743*a*, the game remote play client app 743*b*, and the game remote play client app 743*c* includes a UA/US/FC management controller, respectively, described in detail herein.

In some embodiments, the game console 701 includes at least one of a game engine 703, the transport bandwidth control system 705, a UDP socket 1 (connection endpoint 1) or RTP delivery socket 707, a controller handler 1 709, a controller handler 2 711, a controller handler 3 713, a controller handler 4 715, a controller input/output mapper 717, a UDP socket 2 (connection endpoint 2) 719, a UDP socket 3 (connection endpoint 3) 721, a UDP socket 4 (connection endpoint 4) 723, a UDP socket 5 (connection endpoint 5) 725, the remote play controller 727, or the UA/US/FC controller 729.

In some embodiments, the game engine 703 is configured to send raw video and audio data to the transport bandwidth control system 705. The transport bandwidth control system 705 is configured to send RTP stream packets to and receive RTCP packets from the UDP socket 1 707. The UDP socket 1 707 is configured to send RTP stream packets and receive RTCP packets to and from one or more of the client device 1 741*a*, the client device 1 741*b*, and the client device 1 741*c*.

In some embodiments, the controller handler 1 709, the controller handler 2 711, the controller handler 3 713, the controller handler 4 715, the controller input/output mapper 717, the UDP socket 2 (connection endpoint 2) 719, the UDP socket 3 (connection endpoint 3) 721, the UDP socket 4 (connection endpoint 4) 723, and the UDP socket 5 (connection endpoint 5) 725 are configured to function in a manner similar to that described above with respect to similarly labeled structures of the system 400 (e.g., 433-449). That is, the controller handlers are configured to send and receive controller input and haptics data to and from one or more controllers (e.g., 731-737), and the UDP sockets are configured to send and receive controller input and haptics data to and from one or more remote client devices (e.g., 741*a*-741*c*).

In some embodiments, the UA/US/FC controller 729 is configured to exchange information with the UAAS 769 of the CGP/CS 763. For example, the UA/US/FC controller 729 is configured to send a user login with credentials 729*a* to the UAAS 769, which is configured to return a user-authenticated response with user identification 769*a*. Also, the UA/US/FC controller 729 is configured to send a user search (or friends list) request with user identification 729*b* to the UAAS 769, which is configured to return a user list with user names and user identifications response 769*b*.

In some embodiments, the UAAS 769 is configured to access, change, and/or store user account information in a data storage 771.

In some embodiments, such as the embodiment of FIG. 7, the remote client devices are functionally identical (but need not necessarily be functionally identical). As such, like reference numbers of the remote client device 1 741*a* have identical descriptions and functionality for like reference numbers for the remote client device 2 741*b* and the remote client device 3 741*c*. Duplicative descriptions are omitted for brevity.

In some embodiments, the remote client device 1 741*a* includes at least one of a game remote play client app 743*a*, a UDP socket 745*a*, or a UDP socket 755*a*. For example, the game remote play client app 743*a* includes at least one of a media transmission and rendering controller 747*a*, a remote play controller 749*a*, a UA/US/FC management controller 751*a*, or a controller for data transmission 753*a*. As illustrated in the embodiment of FIG. 7, the media transmission and rendering controller 747*a* is configured to receive RTP multiplexed encoded video and audio packets to and send RTCP packets from the UDP socket 745*a*. The media transmission and rendering controller 747*a* is configured to send a rendered audiovisual frame to an output device 757*a* (e.g., a video device and an audio device). The remote play controller 749*a* is configured to send an RTP streaming connection endpoint to the UDP socket 745*a*, and a connection controller connection endpoint to the UDP socket 755*a*. The controller for data transmission 753*a* is configured to send controller input and receive haptics data to and from the UDP socket 755*a* and to and from the game controller 759*a*.

In some embodiments, the remote player management controller 765 and the UAAS 769 of the CGP/CS 763 are configured to exchange information with one or more remote client devices (e.g., 741*a*-741*c*). Detailed herein are exchanges of information between the remote player management controller 765 and the UAAS 769 of the CGP/CS 763 and the remote client device 1 741*a*, which are understood to be similar if additional remote client devices are connected to the system 700.

In some embodiments, the UA/US/FC management controller 751*a* of the remote client device 1 741*a* is configured to exchange information with the UAAS 769. For example, the UA/US/FC management controller 751*a* is configured to send a user login with credentials (S1) to the UAAS 769, which is configured to return a user-authenticated response with user identification (S2).

In some embodiments, the remote play controller 749*a* of the remote client device 1 741*a* is configured to exchange information with the remote player management controller 765 of the CGP/CS 763. For example, the remote player management controller 765 is configured to send to the remote play controller 749*a* at least one of the following:

- user invite with user identification, requesting user name and user identification, RTP streaming connection endpoint, and controller connection UDP 1 connection endpoint, UDP 2 connection endpoint, UDP 3 connection endpoint, UDP 4 connection endpoint, and remote session identifier (shown in the drawings as "remote session identifier") (S3);
- pass the controller to (targeted user identification) request with controller number and UDP connection endpoint (or controller number) (S6); or
- user list in remote session response with user names (shown in the drawings as "user_names") and user identifications (S7).

For example, the remote play controller 749*a* is configured to send to the remote player management controller 765 at least one of the following:

- controller connected response with controller number, UDP connection endpoint, remote session identifier and user identification (S4);
- pass controller request with user identification, controller number (S5);
- user list in remote session request with remote session identifier (S8);
- controller connected mapping (UDP socket SRC connection endpoint), remote session identifier, and user identification request (S9); or
- force controller 1 mapping (UDP socket SRC connection endpoint), remote session identifier, user identification request (S10).

In some embodiments, the remote play controller 727 is configured to exchange information with the remote player management controller 765 of the CGP/CS 763. For example, the remote play controller 727 is configured to send a remote session request with user identification 727*d* to the remote player management controller 765, which is configured to return a remote session response with remote session identifier 765*a*. The remote play controller 727 is configured to send user(s) to invite with user identification list with requesting user name and user identification, RTP streaming connection endpoint, and controller connection UDP 1 connection endpoint, UDP 2 connection endpoint, UDP 3 connection endpoint, UDP 4 connection endpoint, and remote session identifier 727*e* to the remote player management controller 765. The remote play controller 727 is configured to send a pass the controller request with user identification and a controller number (or a controller number, UDP connection endpoint, and remote session identifier) 727*f* to the remote player management controller 765, which is configured to return a response 765*b* to the same. The remote player management controller 765 is configured to send a controller connected mapping (UDP socket SRC connection endpoint), remote session identifier, and user identification request 765*c* to the remote play controller 727. The remote play controller 727 is configured to send a user list remote session request with remote session identifier 727*g* to the remote player management controller 765, which is configured to return a user list in remote session response with user names and user identifications 765*d* to the remote play controller 727. The remote player management controller 765 is configured to send a controller connected response with controller number, UDP connection endpoint, remote session identifier and user identification 765*e* to the remote play controller 727.

In some embodiments, the remote player management controller 765 is configured to access, change, and/or store remote play sessions and registered devices per user identification in a data storage 767.

In some embodiments, the controller input/output mapper 717 is configured to exchange information with the remote play controller 727. For example, the controller input/output mapper 717 is configured to send local controller pass requests (with a controller input number) and a UDP connection endpoint to the remote play controller 727. The remote play controller 727 is configured to return to the controller input/output mapper 717 at least one of a controller connected response with the controller number and the UDP connection endpoint 727*a*, a controller number mapping request for local or remote UDP port mapping 727*b*, or a force controller 1 mapping (with UDP socket SRC connection endpoint) request 727*c*.

FIG. 8 depicts a process 800 for starting a remote session, inviting friends, and sending connection information to remote devices with a user using the CD/CS application on the remote devices, in accordance with some embodiments of the disclosure. The interfaces are defined, for example, in FIG. 7. The process 800 includes inviting remote players to a game via a console or cloud service. The user logs into a system (e.g., 700), selects friends to invite, and sends an invite. If the user searches for a name, the system checks the user identification and adds the searched user to an invite list. The system then manages the remote session, ensuring only authenticated users can join. This ensures a secure and efficient gaming experience.

In some embodiments, the process 800 includes logging 804 a console/game owner in to a console device (e.g., 701) or a CGP/CS (e.g., 763) (CD/CS) using user login with credentials. The method includes sending 808, from the CD/CS, a user authentication, user search, and friend connection (UA/US/FC) management user login with credentials to a UAAS (e.g., 769) of the CGP/CS. The process 800 includes sending 812, from the UAAS of the CGP/CS, a user-authenticated response with user identification to the CD/CS, and sending a UA/US/FC response to the console device or the CD/CS. The process 800 includes determining 816 whether the user has selected an option to invite remote players from the console device, a game service client, or a game paused user interface. If the user has selected the option to invite remote players from the console device, the game service client, or the game paused user interface (816="Yes"), then the process 800 proceeds to step 820. If the user has not selected the option to invite remote players from the console device, the game service client, or the game paused user interface (816="No"), then the process 800 ends 824 (as shown), pauses, or repeats the determining step 816 (not shown).

The process 800 includes sending 820, e.g., from the UA/US/FC controller 729, a request (e.g., a friends list) with user identifications to the UAAS of the CGP/CS. The process 800 includes sending 828, from the UAAS, a user list with user names and user identifications response to a UA/US/FC controller (e.g., 729). The process 800 includes determining 832 whether the user selected friends to invite from the list. If the user selected friends to invite from the list (832="Yes"), then the process 800 proceeds to step 836, and if the user has not selected friends to invite from the list (832="No"), then the process 800 proceeds to step 840.

The process 800 includes adding 836, at the CD/CS, selected user identifications to an invite list for users to invite. The method includes determining 840, whether the user entered a name and selected a search. If the user has not entered a name and selected a search (840="No"), then the process 800 proceeds to step 844, and if the user has entered a name and selected a search (840="Yes"), then the process 800 proceeds to step 848.

The process 800 includes determining 844 whether the user selected a send invite selection. If the user selected a send invite selection (844="Yes"), then the process 800 proceeds to step 872, and if the user has not selected a send invite selection (not shown), then the process 800 repeats the determining step 844.

The process 800 includes sending 848, from the UA/US/FC, a search request with a user's name and with user identification to the UAAS. The process 800 includes determining 852 whether the user identification is found in the UAAS. If the user identification is found in the UAAS (852="Yes"), the process 800 includes sending 856, from the UAAS, the user list with user names and user identifications response to user authentication with machine user names and user identifications to the UA/US/FC. If the user identification is not found in the UAAS (852="No"), the process 800 includes sending 860, from the UAAS, the user list with user names with any empty response to user authentication with machine user names and user identifications to the UA/US/FC.

The process 800 includes determining 864 whether the user added a searched user to an invite list. If the user added a searched user to an invite list (864="Yes"), the process 800 includes adding 868, at the CD/CS, a selected user identification to the invite list for users to invite and reverts to the determining step 840. If the user did not add a searched user to an invite list (864="No"), the process 800 reverts to the determining step 840.

The process 800 includes sending 872, from the remote play controller of the CD/CS, a remote session request with a user identification and with a remote session identifier to the remote player management of the CGP/CS. The process 800 includes sending 876, from the remote player management of the CGP/CS or from the remote play controller of the CD/CS, a remote session response with a remote session identifier to the remote play controller of the CD/CS. The process 800 includes starting the process 600 of FIG. 6. The process 800 includes sending 884, from the remote play controller of the CD/CS, one or more users to invite with a user identification list with a requesting user name and a user identification, an RTP streaming connection endpoint, and the controller connection UDP 1 connection endpoint, UDP 2 connection endpoint, UDP 3 connection endpoint, UDP 4 connection endpoint, and remote session identifier to the remote player management of the CGP/CS. The process 800 includes sending 888, from the remote player management of the CGP/CS, the user invite request with the requesting user name and the user identification, the RTP streaming connection endpoint, and the controller connection UDP 1 connection endpoint, UDP 2 connection endpoint, UDP 3 connection endpoint, UDP 4 connection endpoint, and remote session identifier to each invited user.

Figure 9:
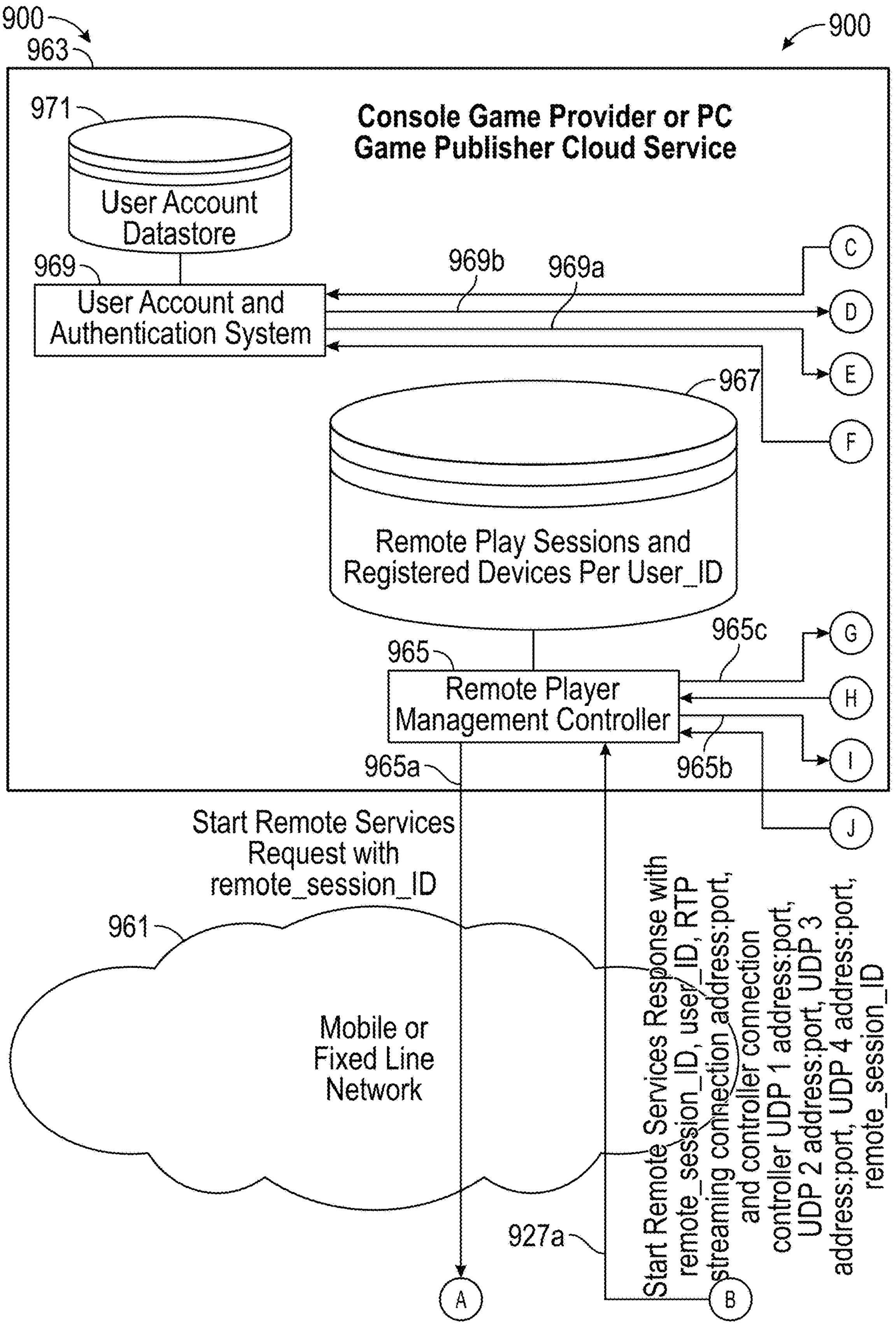
FIG. 9 depicts a system with focus on user invites by a console owner from a remote device when, for example, a user is not home, in accordance with some embodiments of the disclosure.
Figure 9:
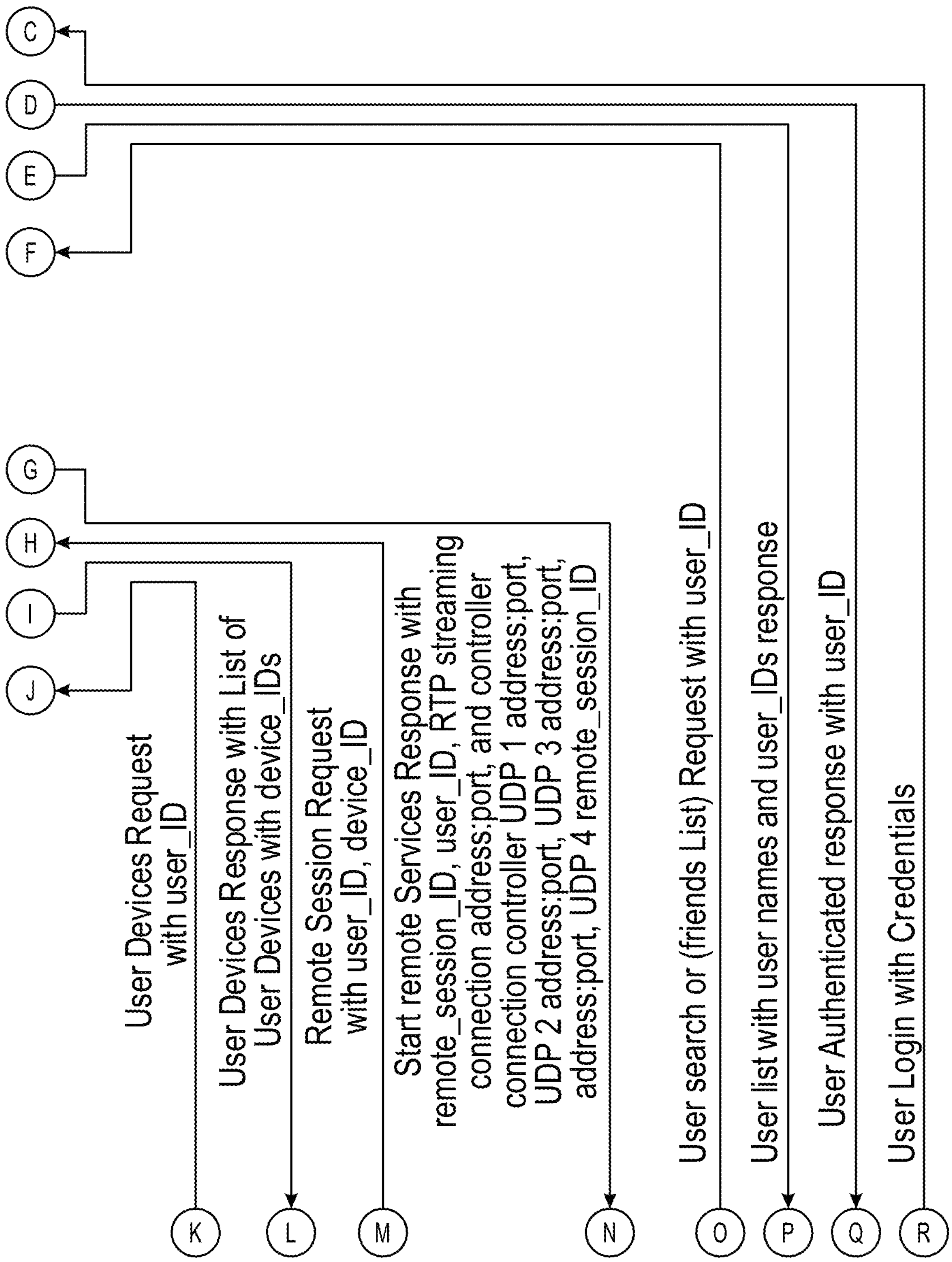
Figure 9:
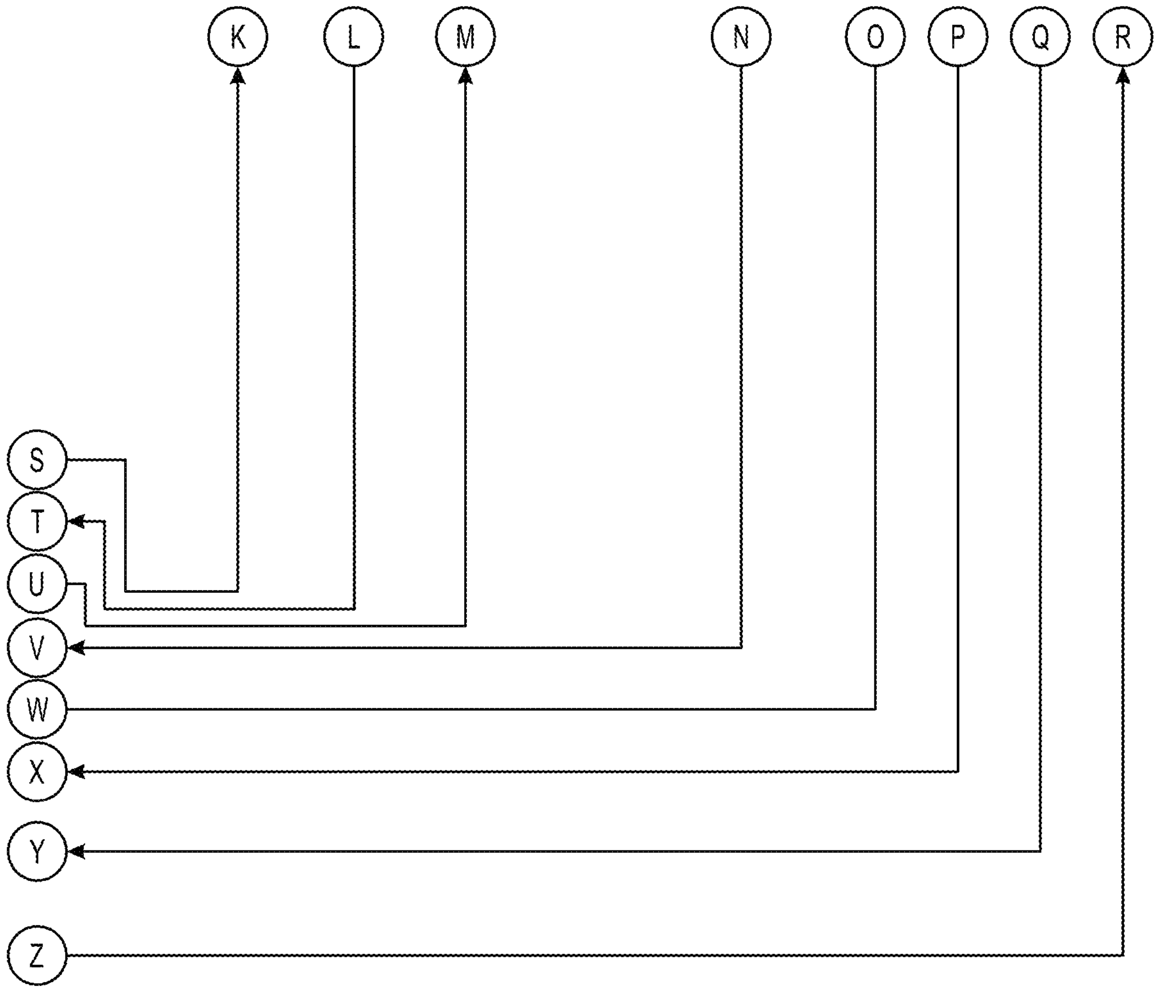
Figure 9:
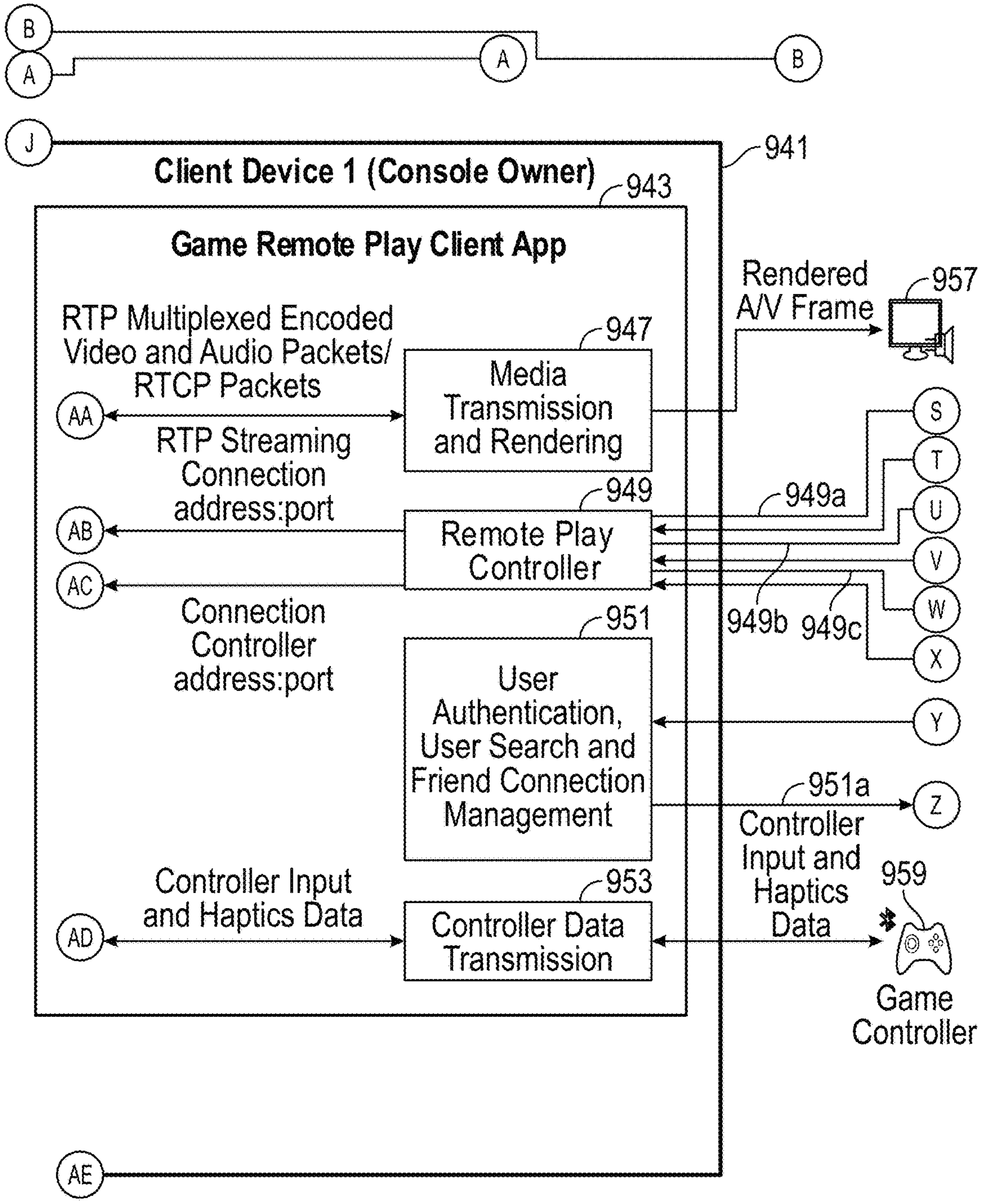
Figure 9:
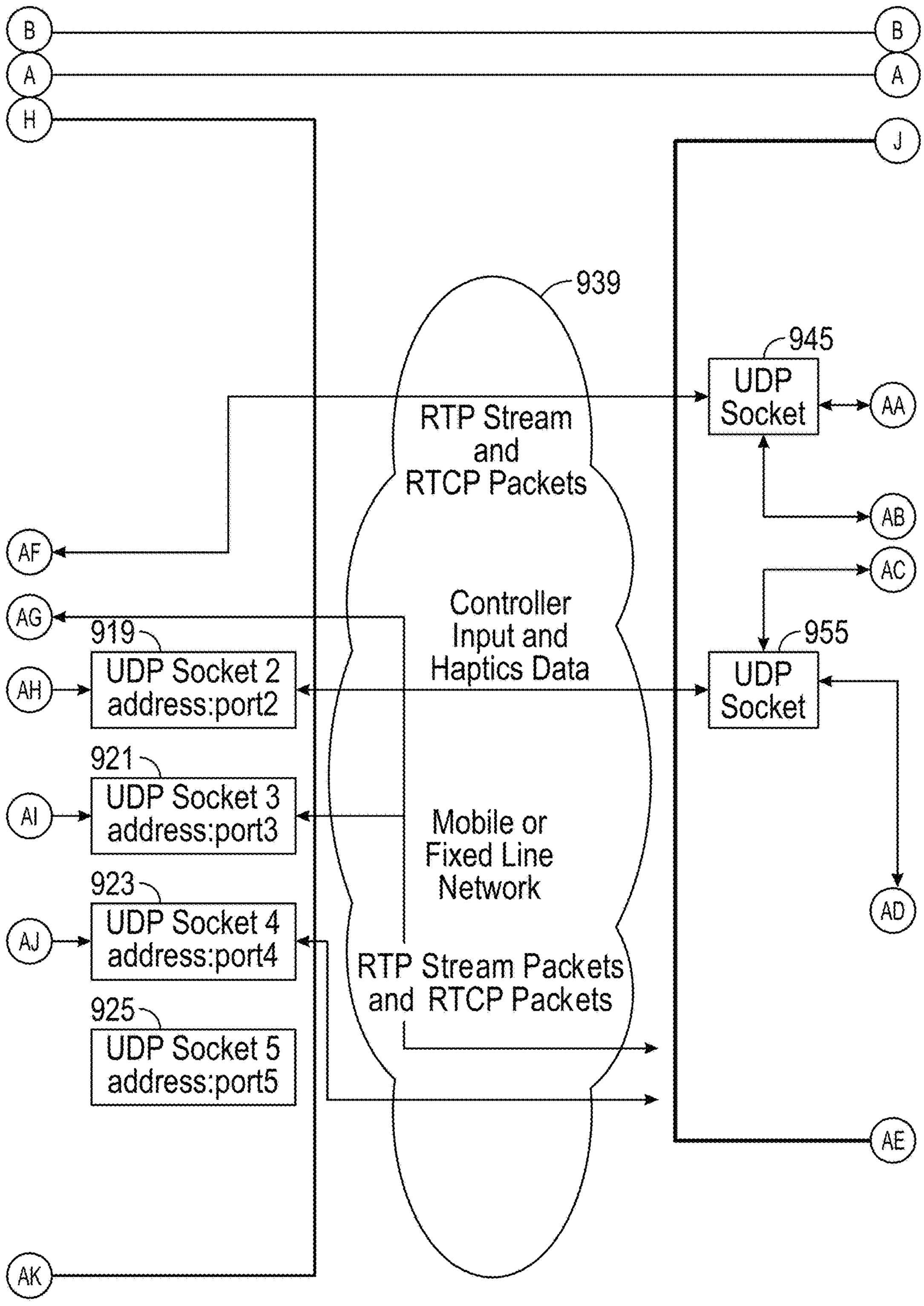
Figure 9:
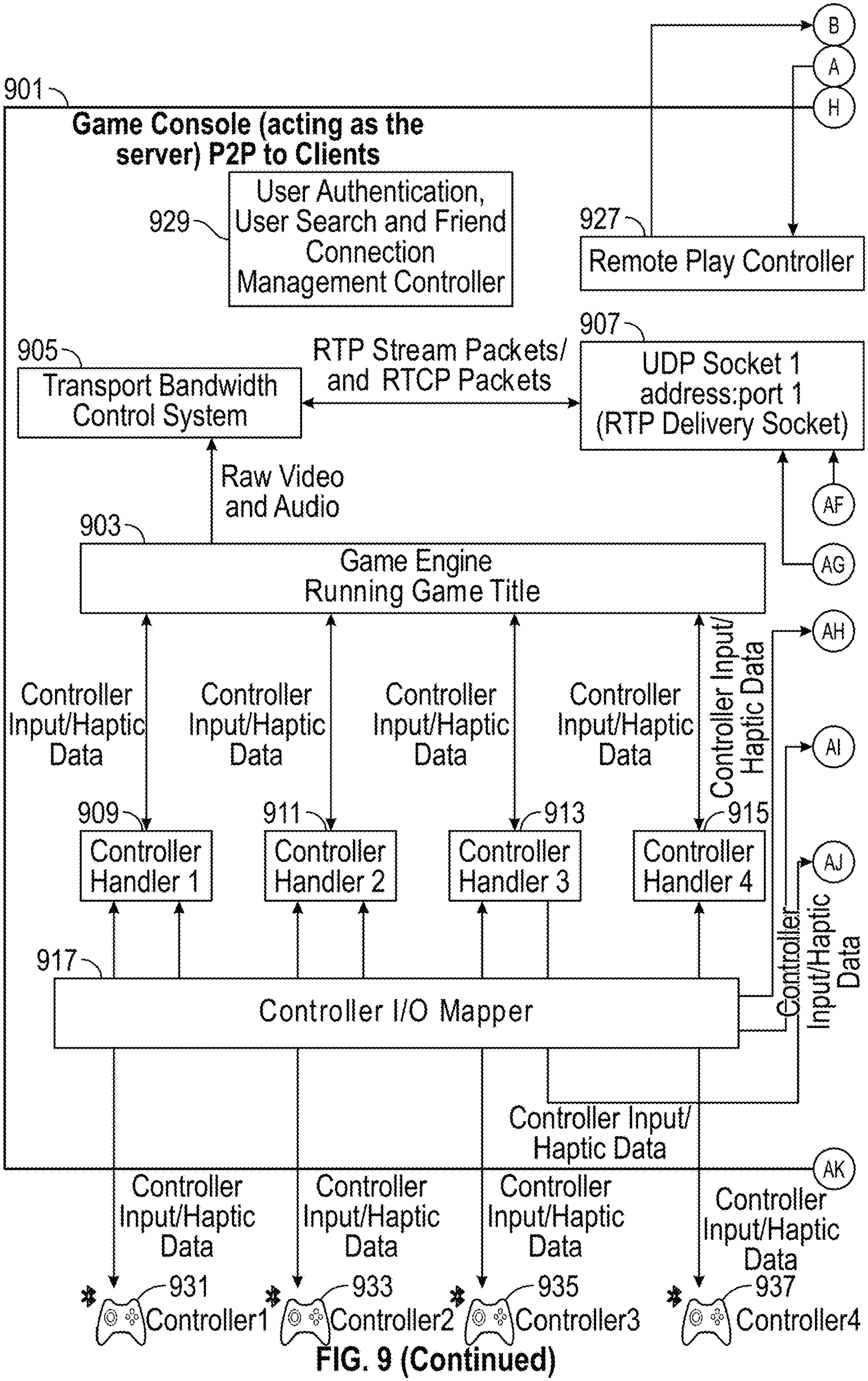

FIG. 9 depicts a system 900 with focus on user invites by a console owner from a remote device when, for example, a user is not home, in accordance with some embodiments of the disclosure. The overall structure of the system 900 is, in some embodiments, similar to that of the system 700. Descriptions of references 901-971 of FIG. 9 correspond with references 701-771 of FIG. 7, respectively, and are omitted for brevity.

In some embodiments, the UA/US/FC management controller 951 is configured to send a user login with credentials 951*a* to the UAAS 969 of the CGP/CS 963. The UAAS 969 is configured to send a user-authenticated response with user identification 969*b* to the UA/US/FC management controller 951.

In some embodiments, the remote player management controller 965 of the CGP/CS 963 is configured to start 965*a* a remote services request with a remote session identifier. In response, the remote player controller 927 is configured to start 927*a* a remote services response with remote session identifier, user identification, RTP streaming connection endpoint, and controller connection controller UDP 1 connection endpoint, UDP 2 connection endpoint, UDP 3 connection endpoint, UDP 4 connection endpoint, and remote session identifier.

In some embodiments, the remote player management controller 965 is configured to access, change, and/or store remote play sessions and registered devices per user identification in a data 967.

In some embodiments, the remote play controller 949 is configured to send a user devices request with user identification 949*a* to the remote player management controller 965. The remote player management controller 965 is configured to send a user devices response with list of user devices with device identifiers (shown in the drawings as "device_IDs") 965*b* to the remote play controller 949. The remote play controller 949 is configured to send a remote session request with user identification and device identifier 949*b* to the remote player management controller 965. The remote player management controller 965 is configured to send a start remote services response with remote session identifier, user identification, RTP streaming connection endpoint, and controller connection controller UDP 1 connection endpoint, UDP 2 connection endpoint, UDP 3 connection endpoint, UDP 4 connection endpoint, and remote session identifier 965*c* to the remote play controller 949. The remote play controller 949 is configured to send a user search (or friends list) request with user identification 949*c* to the UAAS 969. The UAAS 969 is configured to send a user list with user names and user identifications response 969*a* to the remote play controller 949.

Figure 10:
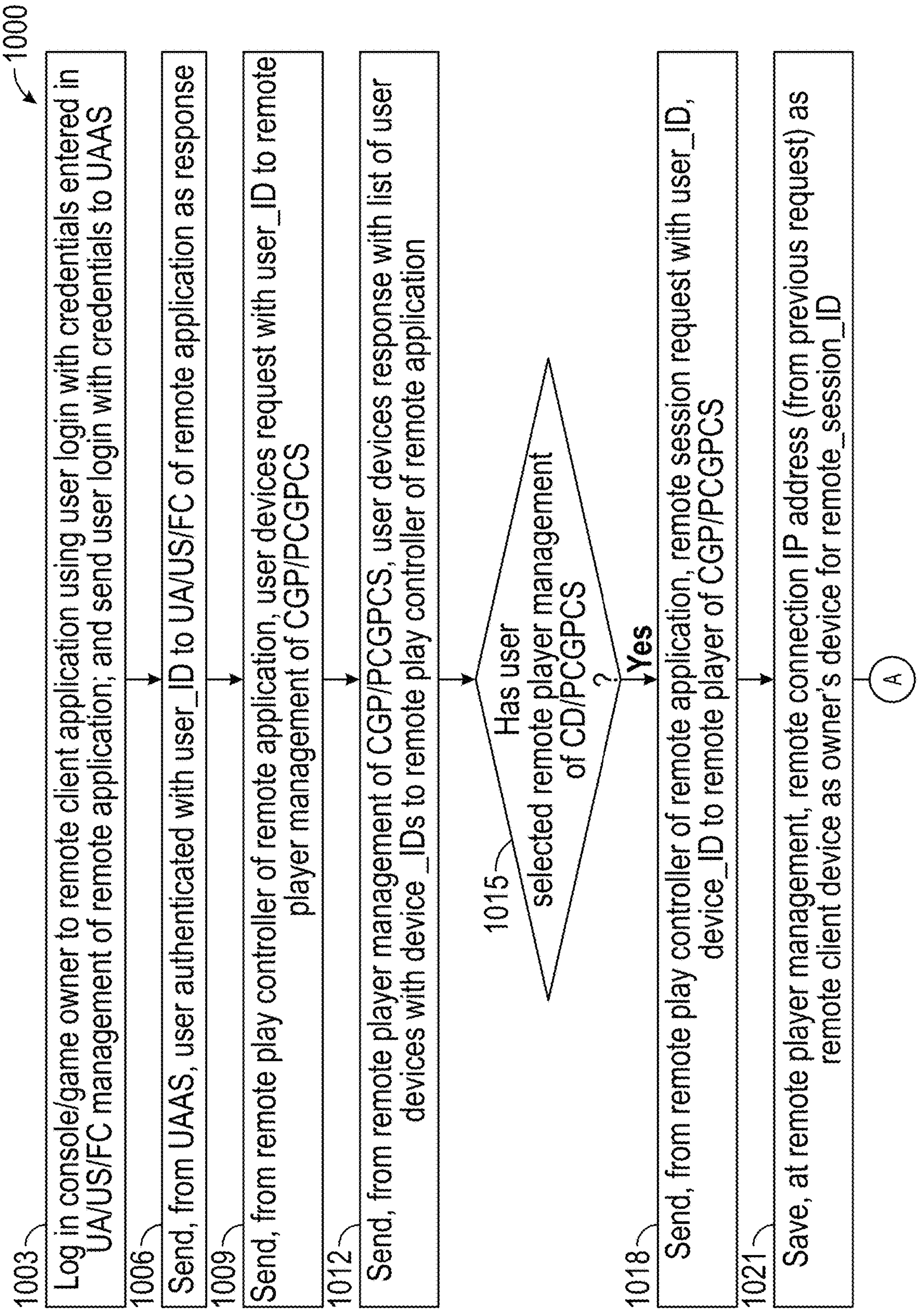
FIG. 10 depicts a process for starting a remote session, inviting friends, and sending connection information to remote devices with a user using a remote play application, in accordance with some embodiments of the disclosure.
Figure 10:
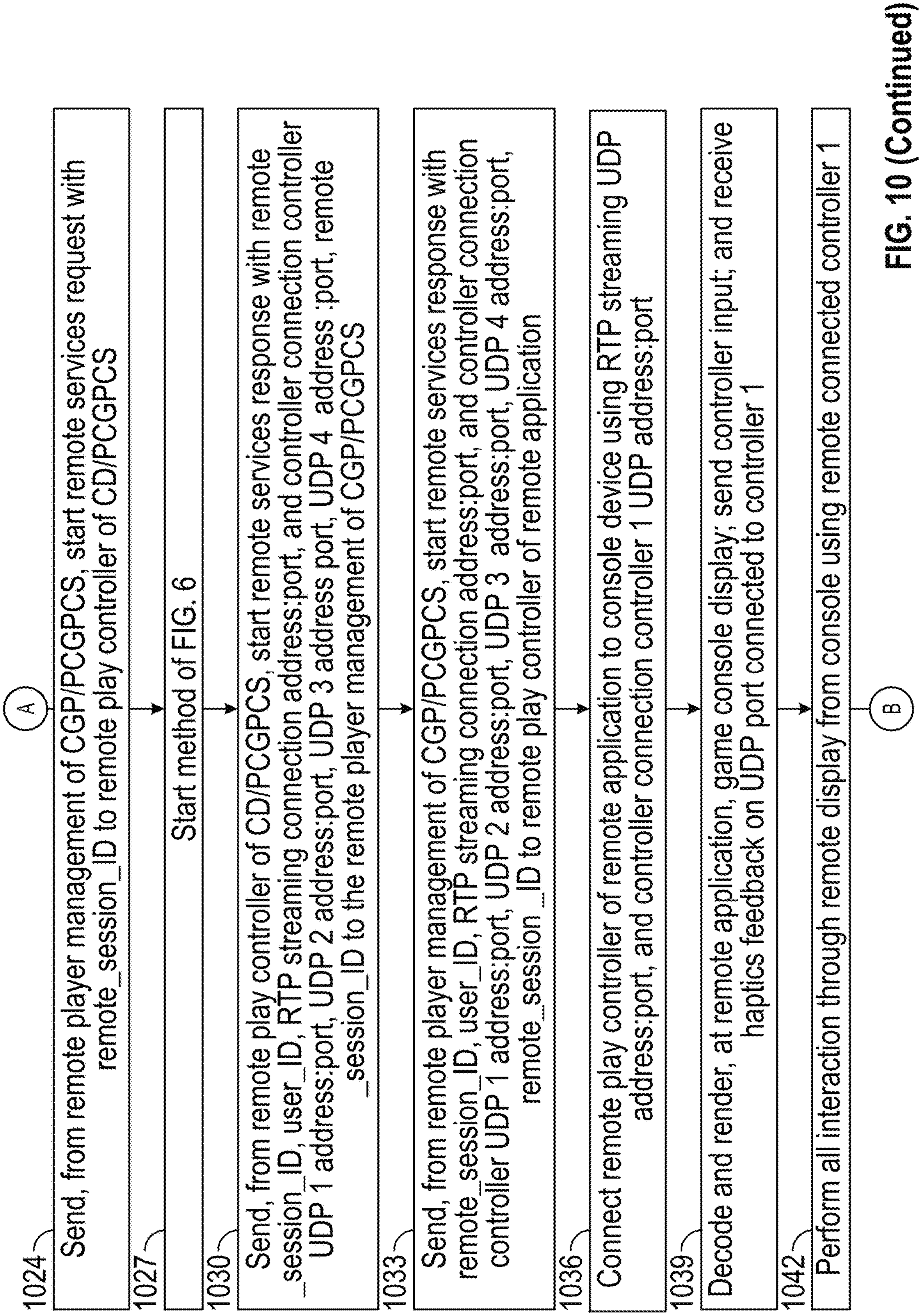
Figure 10:
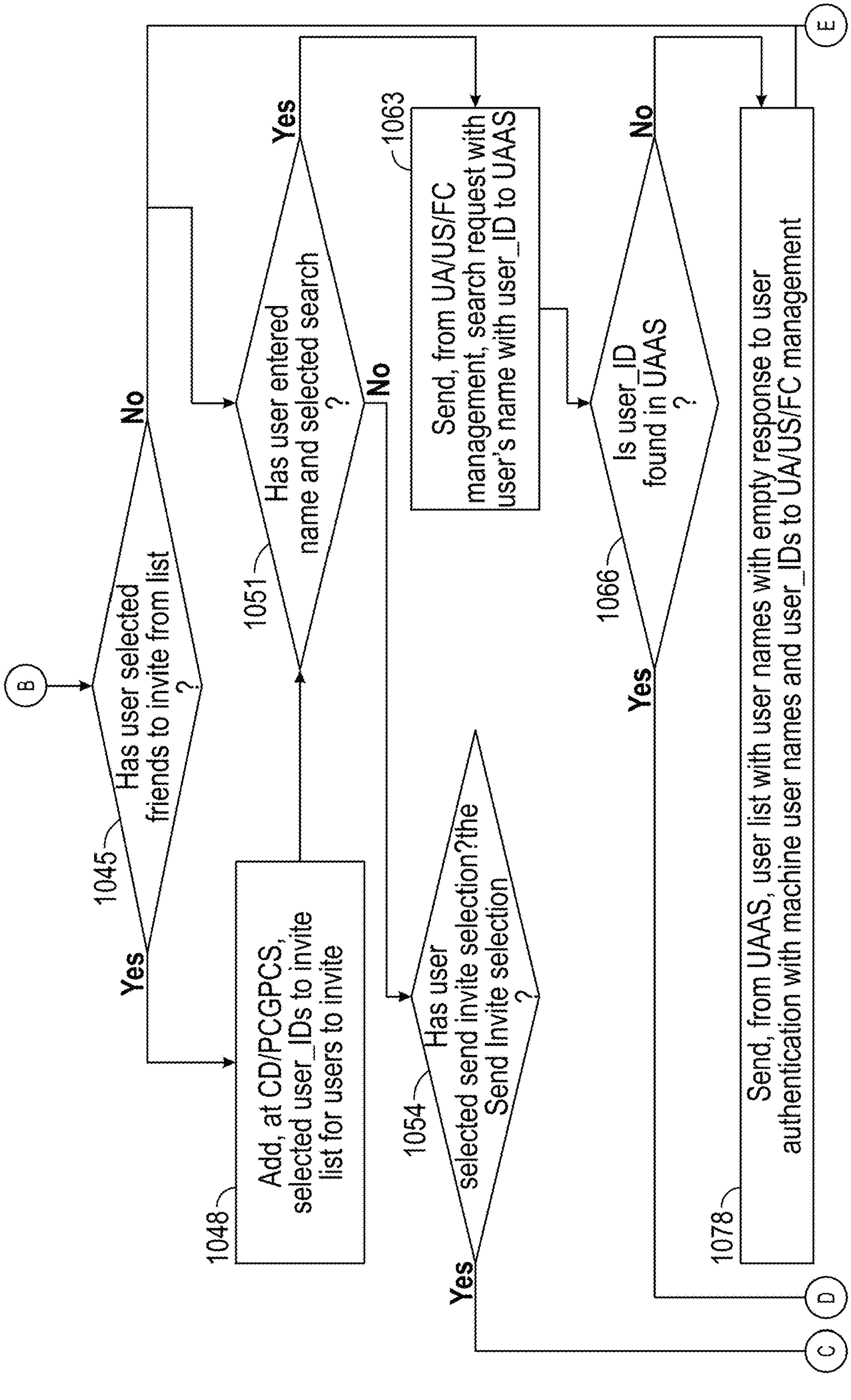
Figure 10:
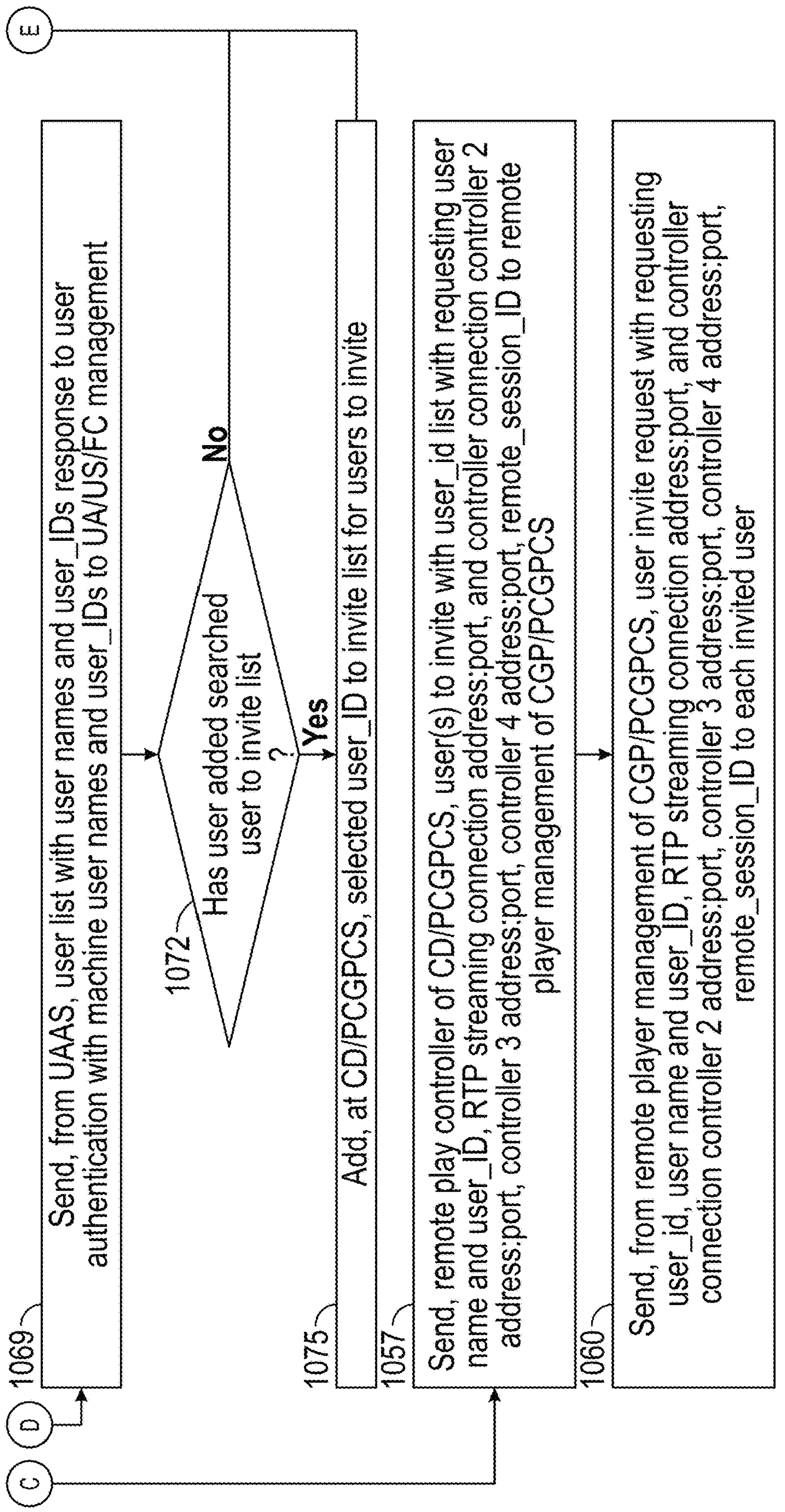

FIG. 10 depicts a process 1000 for starting a remote session, inviting friends, and sending connection information to remote devices with a user using a remote play application, in accordance with some embodiments of the disclosure. The interfaces are defined, for example, in FIG. 9.

In some embodiments, the process 1000 includes logging 1003 the console/game owner in to the remote client application using a user login with credentials entered in the UA/US/FC management of the remote application; and sending the user login with credentials to the UAAS. The process 1000 includes sending 1006, from the UAAS, a user authenticated with the user identification to the UA/US/FC of the remote application as response. The process 1000 includes sending 1009, from the remote play controller of the remote application, a user devices request with user identification to the remote player management of the CGP/CS. The process 1000 includes sending 1012, from the remote player management of the CGP/CS, a user devices response with a list of user devices with device identifiers to the remote play controller of the remote application. The process 1000 includes determining 1015 whether the user selected the remote player management of the CD/CS. If the user selected the remote player management of the CD/CS (1015="Yes"), the method proceeds to step 1018. If the user has not selected the remote player management of the CD/CS (not shown), the method reverts to the determining step 1015.

The process 1000 includes sending 1018, from the remote play controller of the remote application, a remote session request with user identification, and device identifier to the remote player of the CGP/CS. The process 1000 includes saving 1021, at the remote player management, the remote connection IP address (from a previous request) as a remote client device as the owner's device for the remote session identifier. The process 1000 includes sending 1024, from the remote player management of the CGP/CS, a start remote services request with remote session identifier to the remote play controller of the CD/CS. The process 1000 includes starting 1027 the process 600 of FIG. 6.

The process 1000 includes sending 1030, from the remote play controller of the CD/CS, a start remote services response with remote session identifier, user identification, RTP streaming connection endpoint, and controller connection controller UDP 1 connection endpoint, UDP 2 connection endpoint, UDP 3 connection endpoint, UDP 4 connection endpoint, and remote session identifier to the remote player management of the CGP/CS. The process 1000 includes sending 1033, from the remote player management of the CGP/CS, a start remote services response with remote session identifier, user identification, RTP streaming connection endpoint, and controller connection controller UDP 1 connection endpoint, UDP 2 connection endpoint, UDP 3 connection endpoint, UDP 4 connection endpoint, and remote session identifier to the remote play controller of the remote application. The process 1000 includes connecting 1036 the remote play controller of the remote application to the console device using the RTP streaming UDP connection endpoint, and the controller connection controller 1 UDP connection endpoint. The process 1000 includes decoding and rendering 1039, at the remote application, the game console display; sending controller input; and receiving haptics feedback on the UDP port connected to the controller 1. The process 1000 includes performing 1042 all interaction through the remote display from the console using the remote connected controller 1.

The process 1000 includes determining 1045 whether the user selected friends to invite from the list. In response to the user selecting friends to invite from the list (1045="Yes"), the process 1000 proceeds to step 1048. In response to the user not selecting friends to invite from the list (1045="No"), the process 1000 proceeds to step 1051. The process 1000 includes adding 1048, at the CD/CS, selected user identifications to the invite list for users to invite. The process 1000 includes determining 1051 whether the user not entering entered a name and selected a search. In response to the user not entering the name and not selecting the search (1051="No"), the method proceeds to step 1054. In response to the user entering the name and selecting the search (1051="Yes"), the method proceeds to step 1063.

The process 1000 includes sending 1057, from the remote play controller of the CD/CS, user(s) to invite with a user identification list with the requesting user name and user identification, RTP streaming connection endpoint, and controller connection controller 2 connection endpoint, controller 3 connection endpoint, controller 4 connection endpoint, and remote session identifier to the remote player management of the CGP/CS. The process 1000 includes sending 1060, from the remote player management of the CGP/CS, the user invite request with the requesting user identification, user name and user identification, RTP streaming connection endpoint, and controller connection controller 2 connection endpoint, controller 3 connection endpoint, controller 4 connection endpoint, and remote session identifier to each invited user.

The process 1000 includes sending 1063, from the UA/US/FC management, a search request with the user's name and user identification to the UAAS. The process 1000 includes determining 1066 whether the user identification is found in the UAAS. In response to the user identification being found in the UAAS (1066="Yes"), the process 1000 includes sending 1069, from the UAAS, the user list with user names and user identifications response to the user authentication with machine user names and user identifications to the UA/US/FC management. The process 1000 proceeds to step 1072. In response to the user identification not being found in the UAAS (1066="No"), the process 1000 includes sending 1078, from the UAAS, the user list with user names and with an empty response to the user authentication with machine user names and user identifications to the UA/US/FC management. The process 1000 proceeds to the determining step 1045.

The process 1000 includes determining 1072 whether the user added the searched user to the invite list. In response to the user adding the searched user to the invite list (1072="Yes"), the process 1000 includes adding, at the CD/CS, the selected user identification to the invite list for users to invite. In response to the user not adding the searched user to the invite list (1072="No"), the process 1000 proceeds to the determining step 1045.

Figure 11:
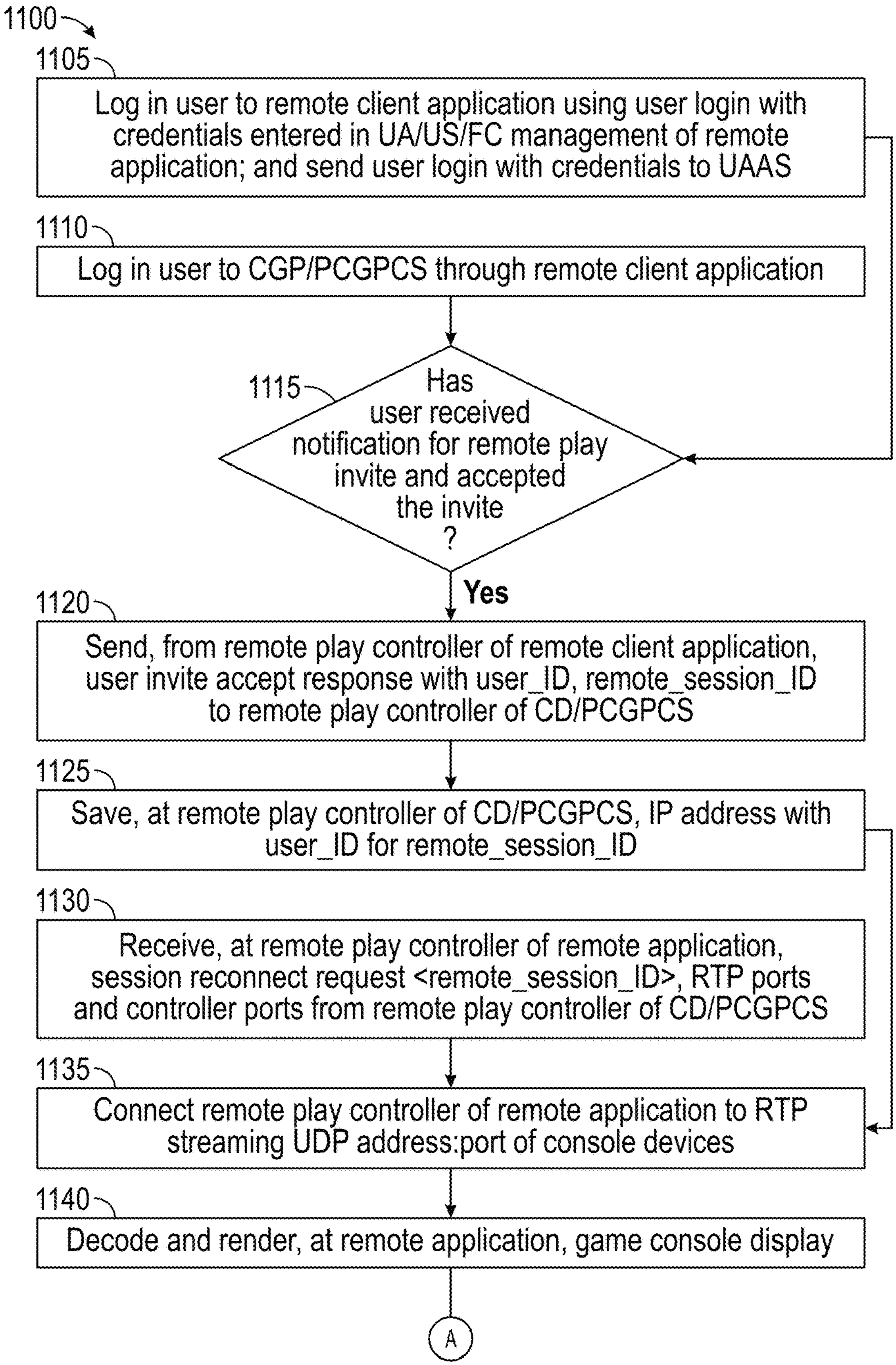
FIG. 11 depicts a process for a remote invite request from an account owner logged in as a remote user, in accordance with some embodiments of the disclosure.
Figure 11:
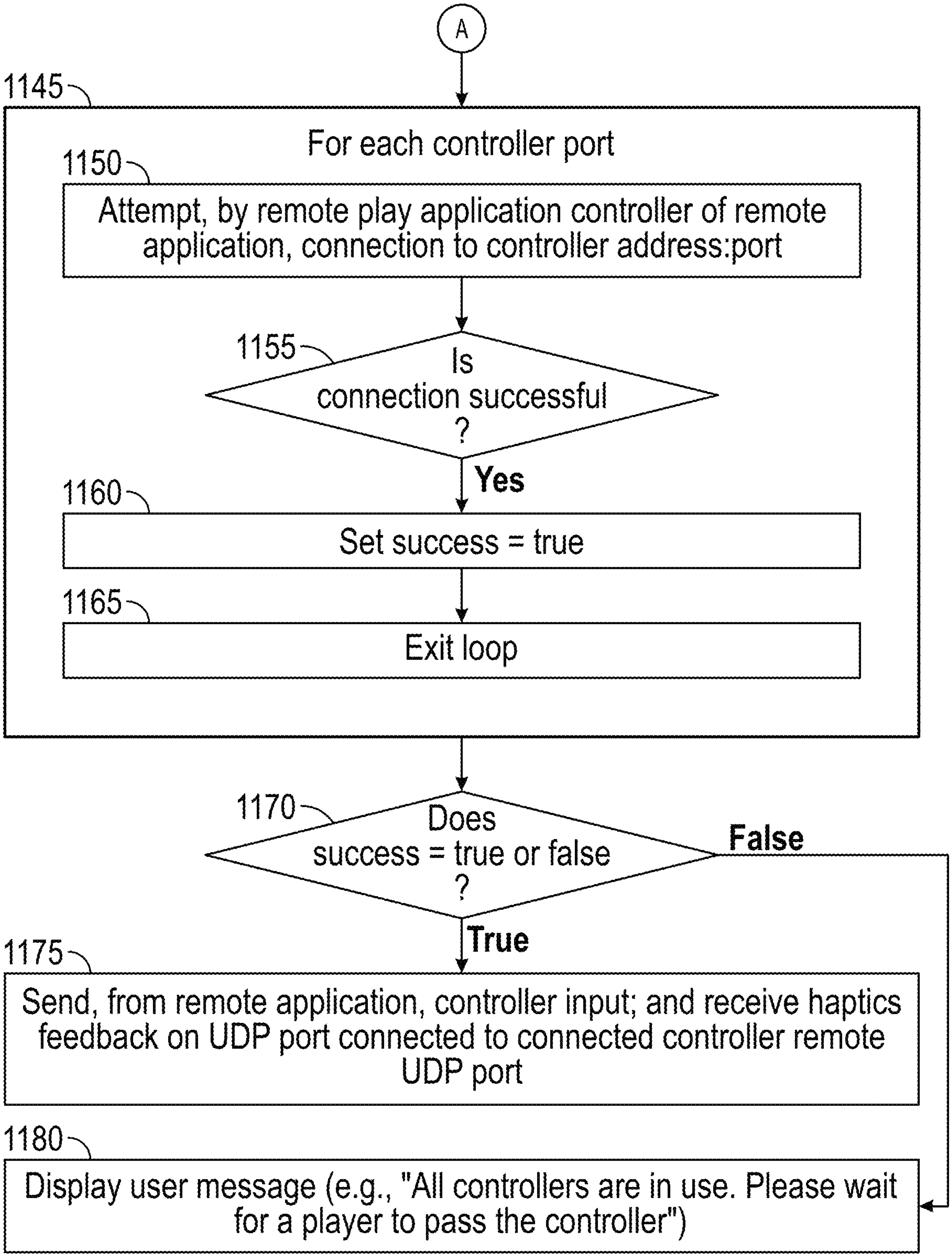

FIG. 11 depicts a process 1100 for a remote invite request from an account owner logged in as a remote user, in accordance with some embodiments of the disclosure.

In some embodiments, the process 1100 includes logging 1105 a user in to a remote client application using user login with credentials entered in a UA/US/FC management of a remote application; and sending the user login with credentials to a UAAS. The process 1100 includes logging 1110 the user in to a CGP/CS through the remote client application. The process 1100 includes determining 1115 whether the user received notification for a remote play invite and accepted the invite. In response to the user receiving the notification for the remote play invite and accepting the invite (1115="Yes"), the process 1100 proceeds to step 1120. In response to the user not receiving the notification for the remote play invite and accepting the invite (not shown), the determining step 1115 repeats.

The process 1100 includes sending 1120, from the remote play controller of the remote client application, a user invite accept response with user identification, and remote session identifier to the remote play controller of the CD/CS. The process 1100 includes saving 1125, at the remote play controller of the CD/CS, an IP address with the user identification for the remote session identifier. The process 1100 includes receiving 1130, at the remote play controller of the remote application, a session reconnect request <remote session identifier>, RTP ports and controller ports from the remote play controller of the CD/CS. The process 1100 includes connecting 1135 the remote play controller of the remote application to the RTP streaming UDP connection endpoint of the console devices. The process 1100 includes decoding and rendering 1140, at the remote application, the game console display.

The process 1100 includes a successful connection check for each controller port 1045. The process 1100 includes attempting 1150, by the remote play application of the remote application, connection to the controller connection endpoint. The process 1100 includes determining 1155 whether the connection is successful. If the connection is successful (1155="Yes"), the process 1100 includes setting 1160 a success flag to true. If the connection is not successful (not shown), the process 1100 includes setting the success flag to false. The process 1100 includes exiting 1165 the successful connection check.

The process 1100 includes determining 1170 whether the success flag is set to true or false. If the success flag is set to true (1170="True"), the process 1100 includes sending 1175, from the remote application, controller input; and receiving haptics feedback on the UDP port connected to the controller remote UDP port. If the success flag is set to false (1170="False"), the process 1100 includes displaying 1180 a user message (e.g., "All controllers are in use. Please wait for a player to pass the controller." or the like).

Figure 12:
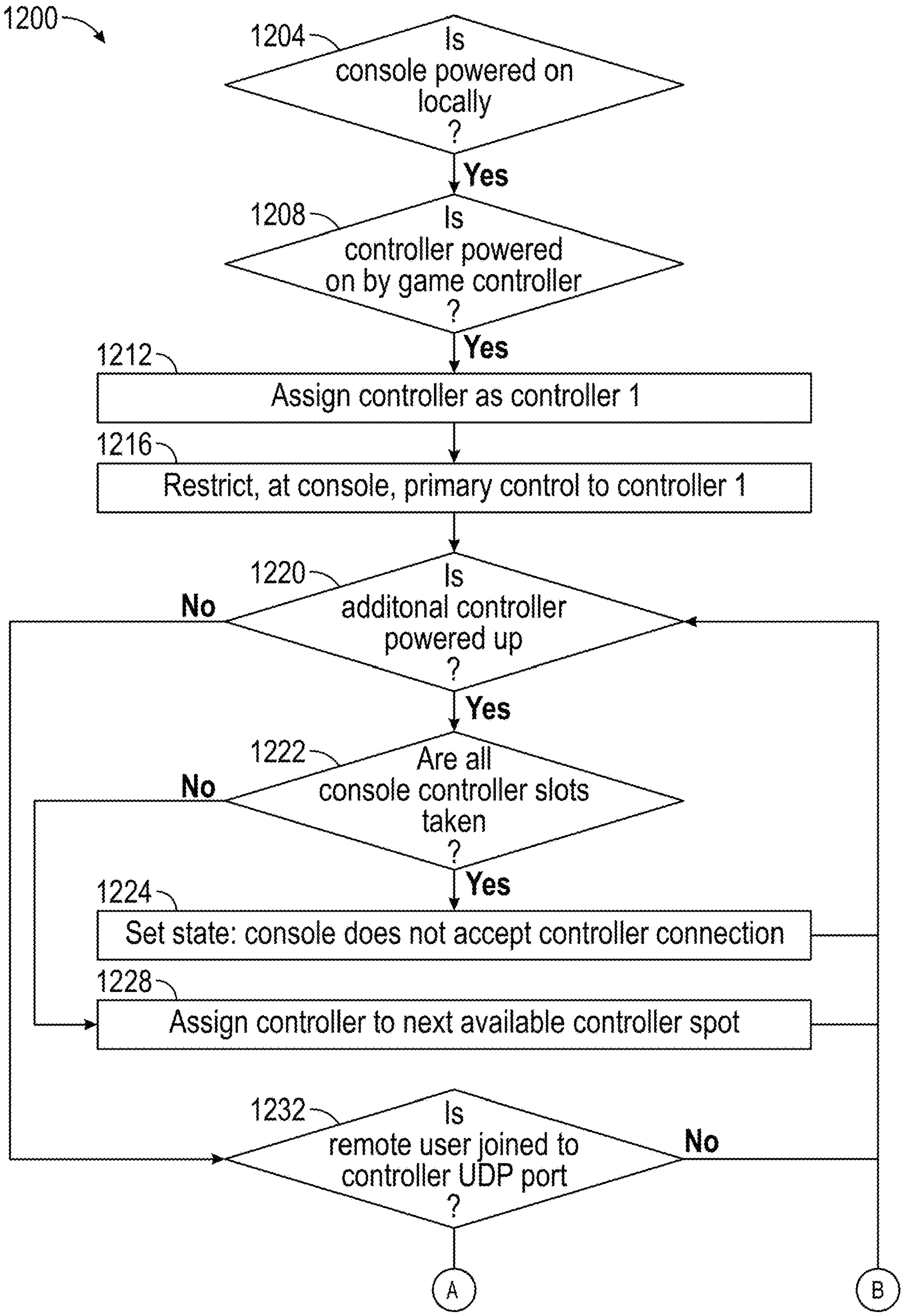
FIG. 12 depicts a process for initial controller connection for both local and remote users, in accordance with some embodiments of the disclosure.
Figure 12:
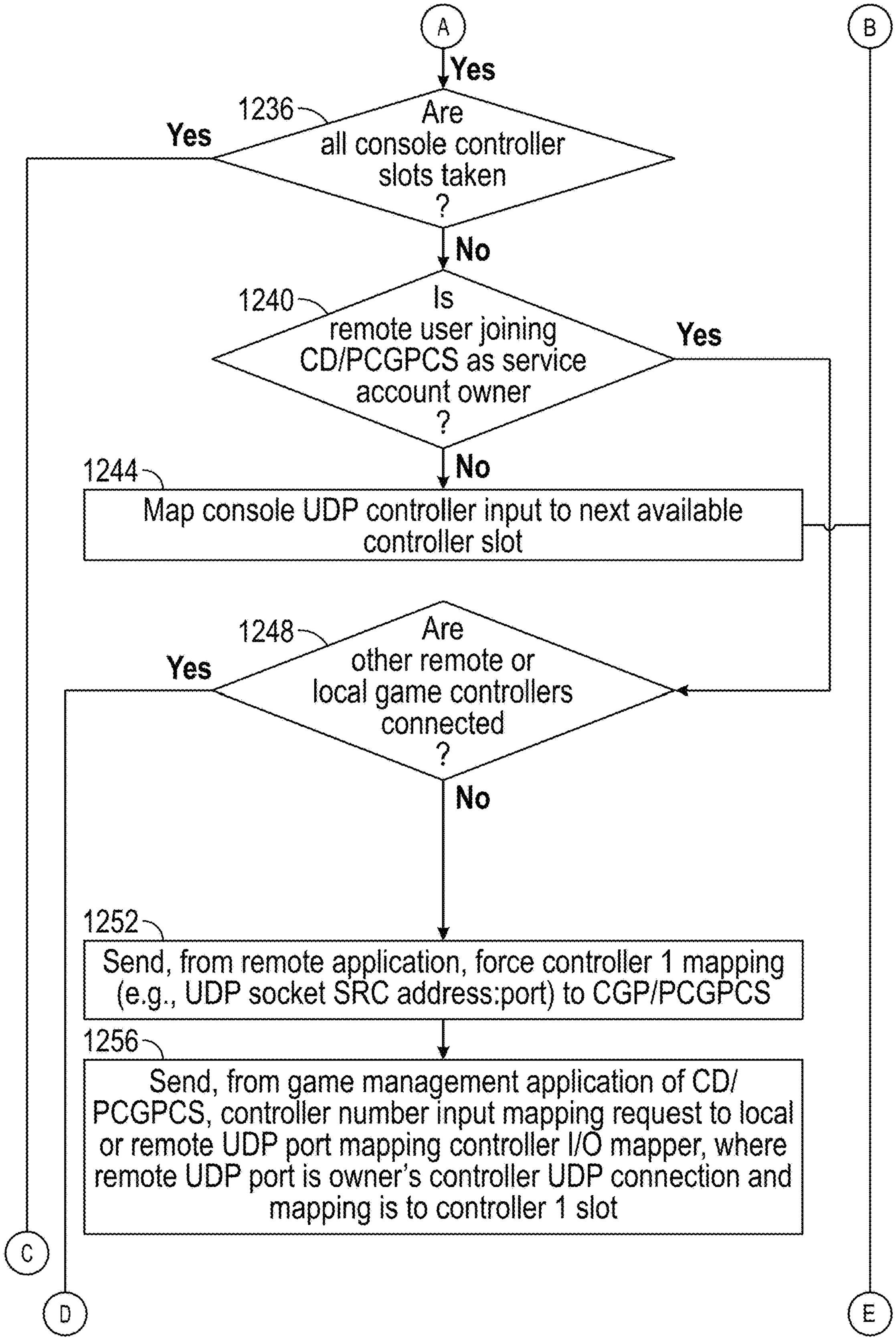
Figure 12:
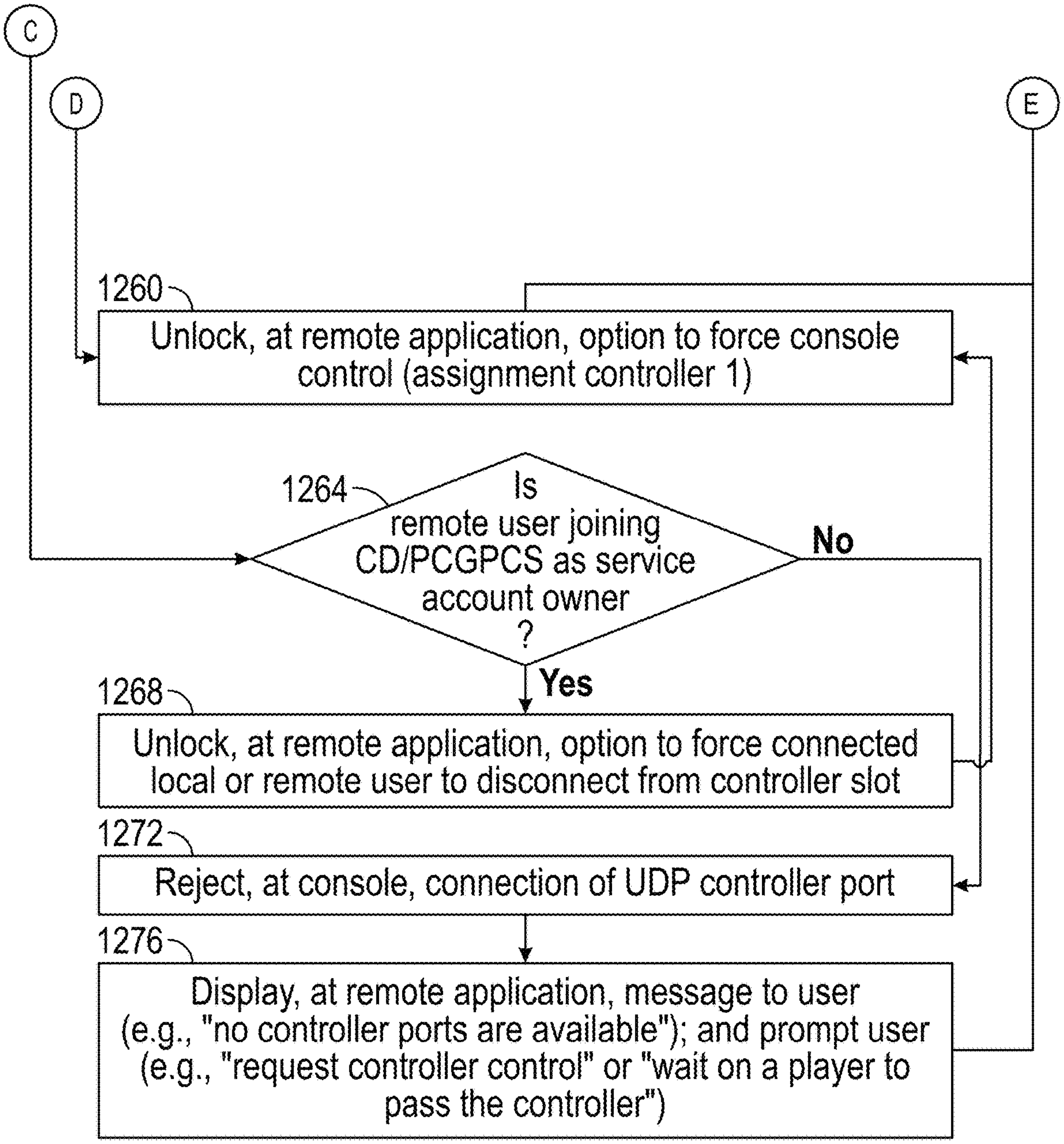

FIG. 12 depicts a process 1200 for initial controller connection for both local and remote users, in accordance with some embodiments of the disclosure.

In some embodiments, the process 1200 includes determining 1204 if the console is powered on locally. If the console is powered on locally (1204="Yes"), the process 1200 includes determining 1208 whether the controller is powered on by the game controller. If the console is not powered on locally (not shown), the determining step 1204 repeats. If the controller is powered on by the game controller (1208="Yes"), the process 1200 includes assigning 1212 the controller as controller 1. If the controller is not powered on by the game controller (not shown), the determining step 1208 repeats. The process 1200 includes restricting 1216, at the console, a primary control to the controller 1.

The process 1200 includes determining 1220 whether an additional controller is powered up. If the additional controller is not powered up (1220="No"), the process 1200 proceeds to step 1232. If the additional controller is powered up (1220="Yes"), the process 1200 includes determining 1222 whether all console controller slots are taken. If all console controller slots are not taken (1222="No"), the process 1200 includes assigning 1228 the controller to a next available controller slot. If all console controller slots are taken (1222="Yes"), the process 1200 includes setting 1224 a state (e.g., console does not accept a controller connection). The process 1200 reverts to the determining step 1220.

The process 1200 includes determining 1232 whether the remote user joined to the controller UDP port. If the remote user joined to the controller UDP port (1232="Yes"), the process 1200 includes determining 1236 whether all console controller slots are taken. If the remote user has not joined to the controller UDP port (not shown), the determining step 1232 repeats. If all console controller slots are taken (1236="Yes"), the process 1200 proceeds to step 1264.

If all console controller slots are not taken (1236="No"), the process 1200 includes determining 1240 whether the remote user joined the CD/CS as a service account owner. If the remote user joined the CD/CS as the service account owner (1240="Yes"), the process 1200 proceeds to step 1248. If the remote user has not joined the CD/CS as the service account owner (1240="No"), the process 1200 includes mapping 1244 the console UDP controller input to a next available controller slot. The process 1200 reverts to the determining step 1220.

The process 1200 includes determining 1248 whether other remote or local game controllers are connected. If other remote or local game controllers are connected (1248="Yes"), the process 1200 includes unlocking 1260, at the remote application, an option to force console controller (including, e.g., an assignment of controller 1), and the process 1200 reverts to the determining step 1220.

If other remote or local game controllers are not connected (1248="No"), the process 1200 includes sending 1252, from the remote application, force controller 1 mapping (e.g., UDP socket SRC connection endpoint) to the CGP/CS. The process 1200 includes sending 1256, from the game management application of the CD/CS, a controller number input mapping request to a local or remote UDP port mapping controller I/O mapper, where a remote UDP port is an owner's controller UDP connection and mapping is to the controller 1 slot.

The process 1200 includes determining 1264 whether the remote user is joining the CD/CS as a service account owner. If the remote user is joining the CD/CS as the service account owner (1264="Yes"), the process 1200 includes unlocking 1268, at the remote application, an option to force a connected local or remote user to disconnect from the controller slot. The process 1200 proceeds to the unlocking step 1260.

If the remote user is not joining the CD/CS as the service account owner (1264="No"), the process 1200 includes rejecting 1272, at the console, the connection of the UDP controller port. The process 1200 includes displaying 1276, at the remote application a message to the user (e.g., no controller ports are available"); and prompting the user (e.g., "request controller control" or "wait on a player to pass the controller" or the like). The process 1200 reverts to the determining step 1220.

Figure 13:
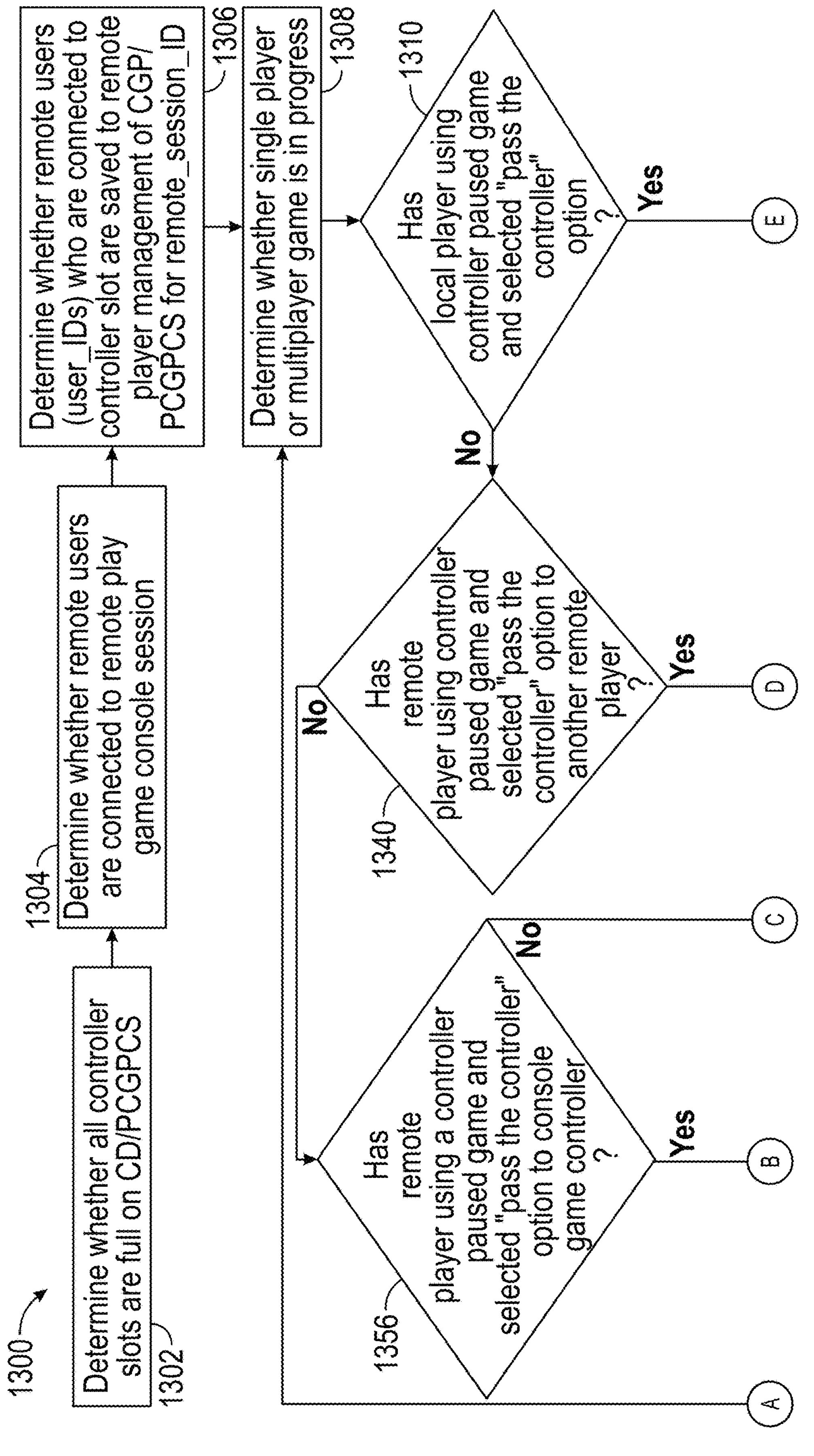
FIG. 13 depicts a process for passing a controller between local and remote users, in accordance with some embodiments of the disclosure.
Figure 13:
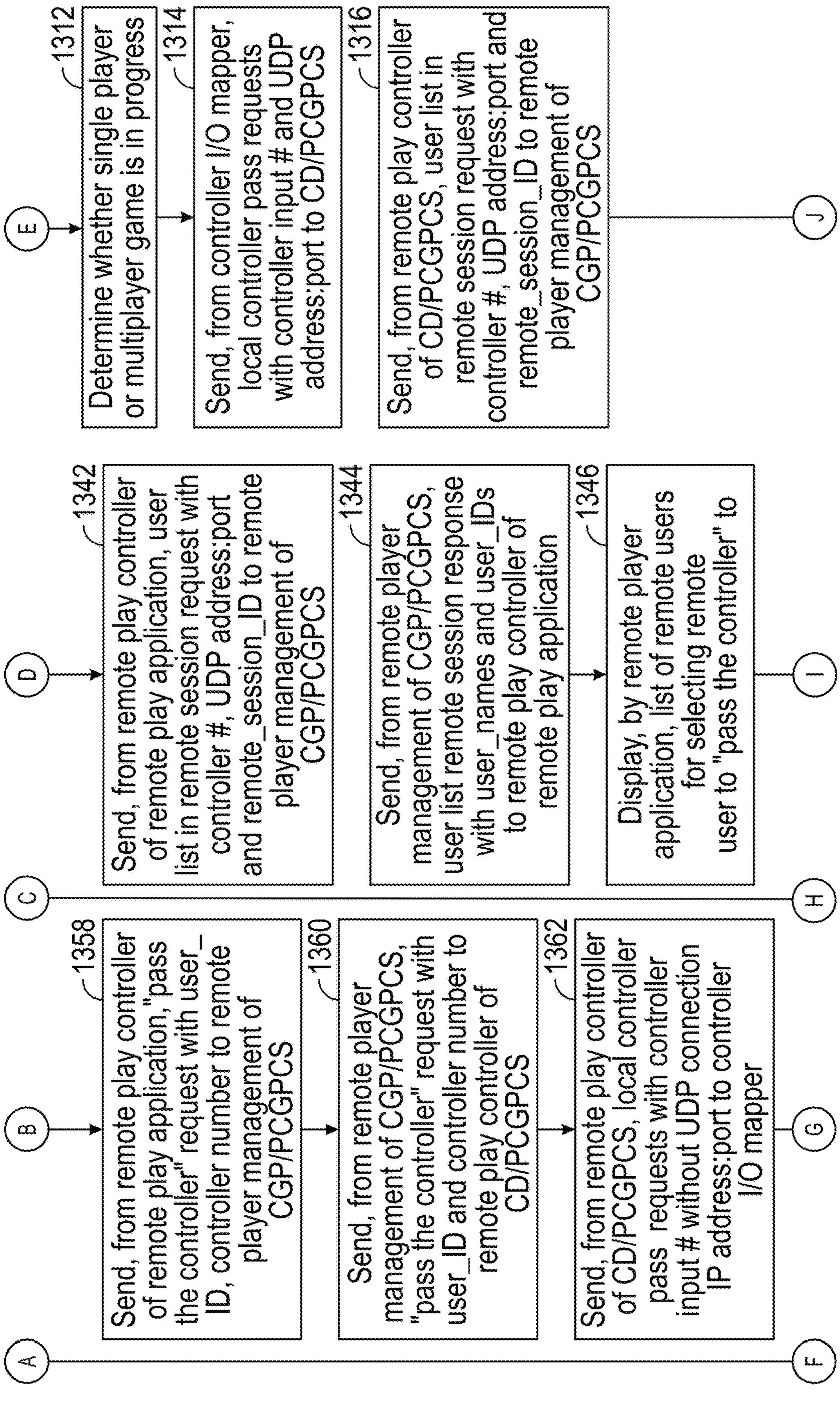
Figure 13:
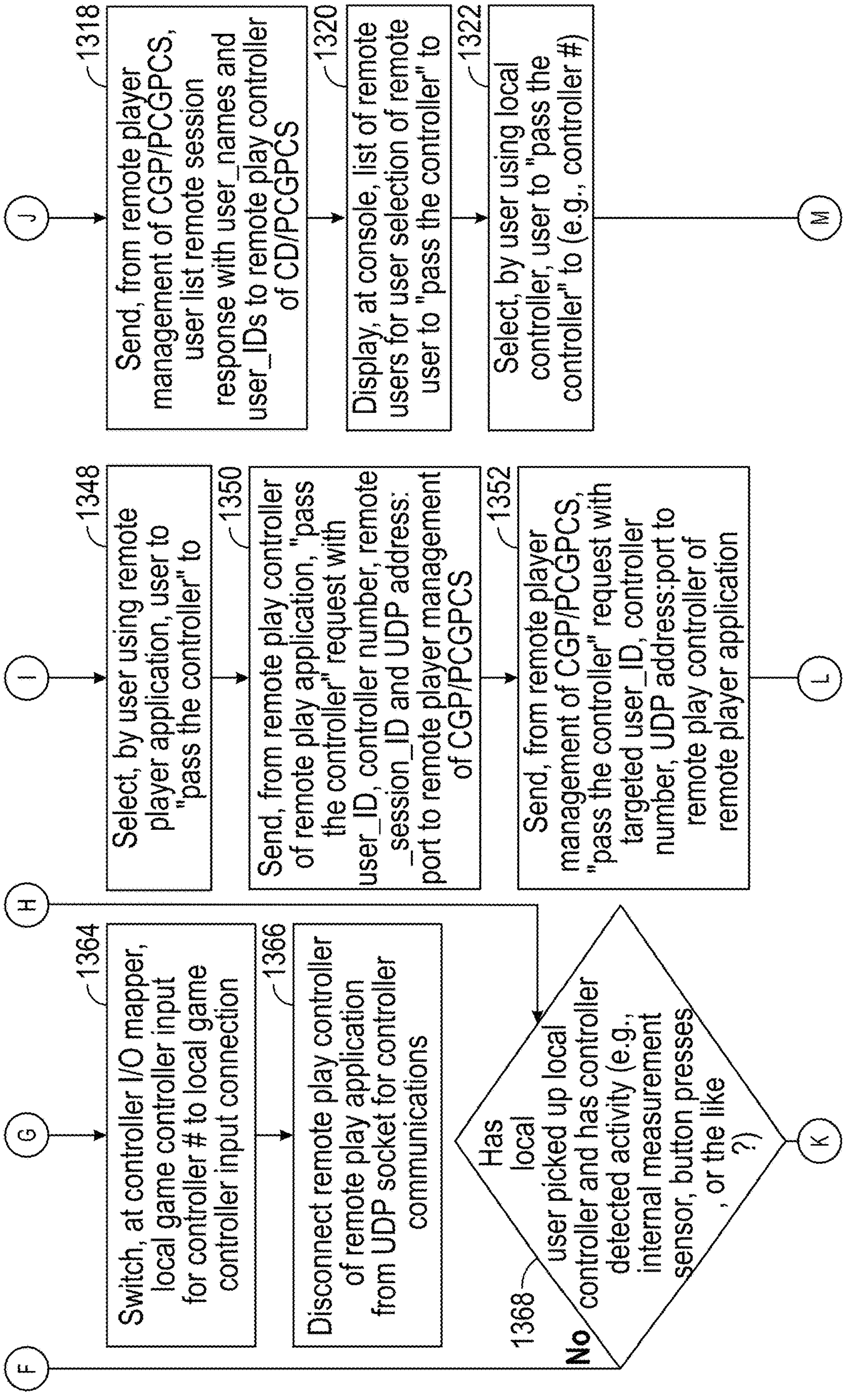
Figure 13:
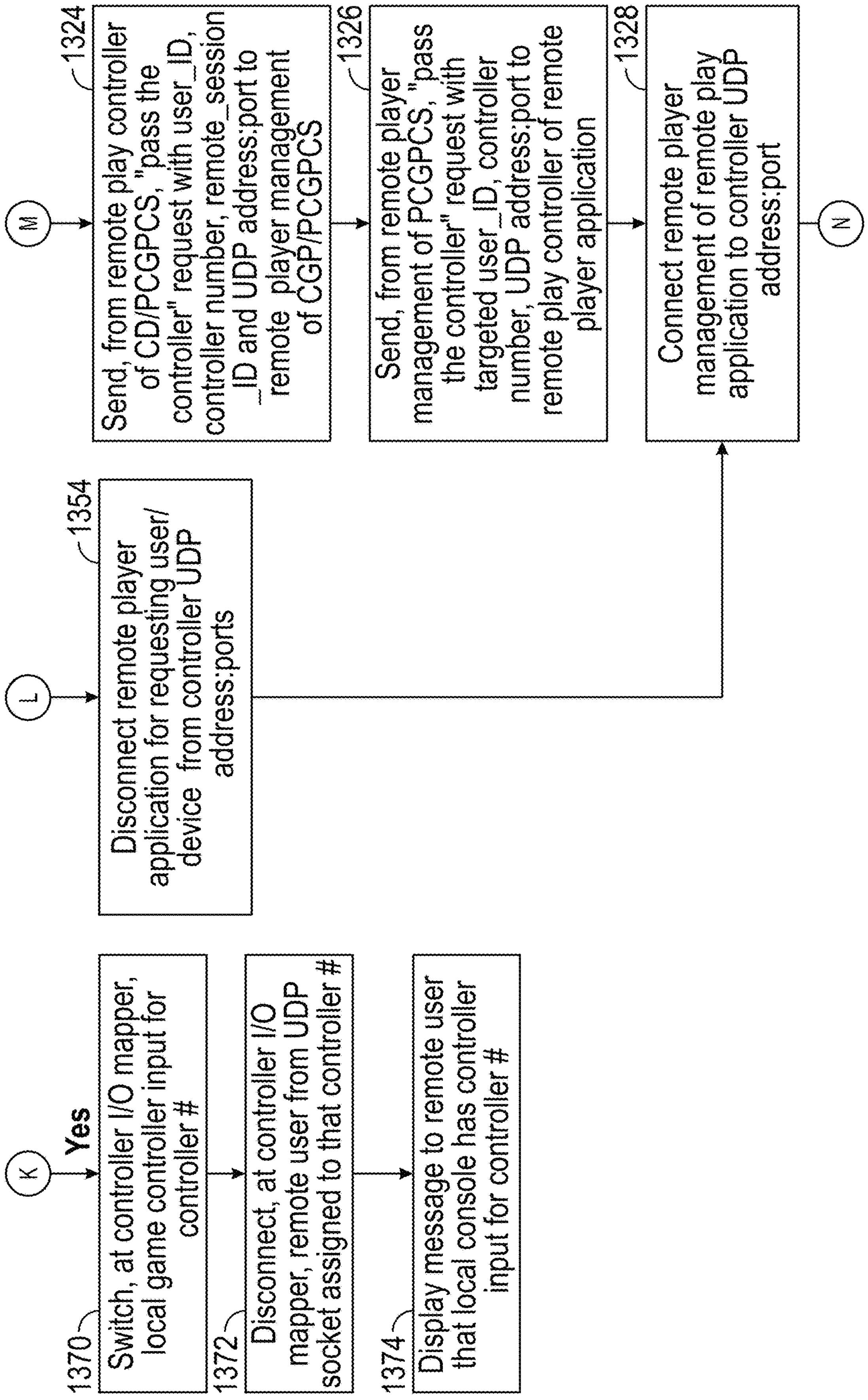
Figure 13:
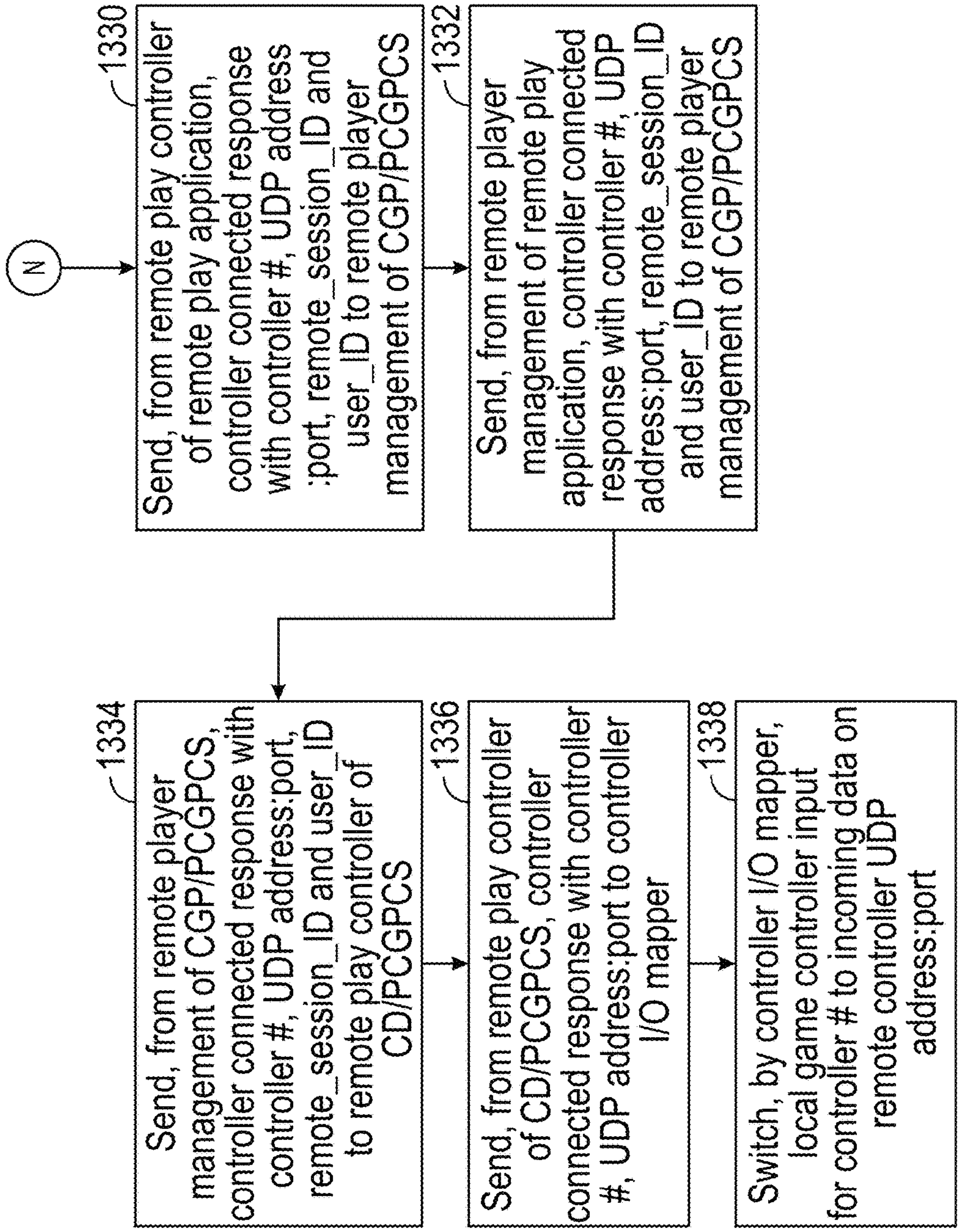

FIG. 13 depicts a process 1300 for passing a controller between local and remote users, in accordance with some embodiments of the disclosure.

In some embodiments, the process 1300 includes determining 1302 whether all controller slots are full on the CD/CS. The process 1300 includes determining 1304 whether remote users are connected to a remote play game console session. The process 1300 includes determining 1306 whether remote users (user identifications) who are connected to the controller slot are saved to the remote player management of the CGP/CS for a remote session identifier. The process 1300 includes determining 1308 whether a single player or multiplayer game is in progress. The process 1300 includes determining 1310 whether a local player using a controller paused the game and selected a "pass the controller" option. If the local player using the controller has not paused the game and selected a "pass the controller" option (1310="No"), the process 1300 proceeds to step 1340.

If the local player using the controller has paused the game and selected a "pass the controller" option (1310="Yes"), the process 1300 includes determining 1312 whether a single player or multiplayer game is in progress. The process 1300 includes sending 1314, from the controller I/O mapper, local controller pass requests with controller input # and UDP connection endpoint to the CD/CS. The process 1300 includes sending 1316, from the remote play controller of the CD/CS, the user list the in remote session request with a controller number (shown in the drawings as "controller #"), UDP connection endpoint and remote session identifier to the remote player management of the CGP/CS. The process 1300 includes sending 1318, from the remote player management of the CGP/CS, a user list remote session response with user names and user identifications to the remote play controller of the CD/CS. The process 1300 includes displaying 1320, at the console, a list of remote users for user selection of remote user to "pass the controller" to. The process 1300 includes selecting 1322, by the user using the local controller, the user to "pass the controller" to (e.g., controller number). The process 1300 includes sending 1324, from the remote play controller of the CD/CS, a "pass the controller" request with user identification, controller number, remote session identifier and UDP connection endpoint to the remote player management of the CGP/CS. The process 1300 includes sending 1326, from the remote player management of the PCGPCS, the "pass the controller" request with targeted user identification, controller number, and UDP connection endpoint to the remote play controller of the remote player application. The process 1300 includes connecting 1328 the remote player management of the remote play application to the controller UDP connection endpoint. The process 1300 includes sending 1330, from the remote play controller of the remote play application, a controller connected response with controller number, UDP connection endpoint, remote session identifier and user identification to the remote player management of the CGP/CS. The process 1300 includes sending 1332, from the remote player management of the remote play application, a controller connected response with controller number, UDP connection endpoint, remote session identifier and user identification to the remote player management of the CGP/CS. The process 1300 includes sending 1334, from the remote player management of the CGP/CS, a controller connected response with controller number, UDP connection endpoint, remote session identifier and user identification to the remote play controller of the CD/CS. The process 1300 includes sending 1336, from the remote play controller of the CD/CS, a controller connected response with controller number, and UDP connection endpoint to the controller I/O mapper. The process 1300 includes switching 1338, by the controller I/O mapper, a local game controller input for the controller number to incoming data on the remote controller UDP connection endpoint.

The process 1300 includes determining 1340 whether a remote player using a controller paused the game and selected the "pass the controller" option to another remote player. If the remote player using the controller has not paused the game and selected the "pass the controller" option (1340="No"), the process 1300 proceeds to step 1356.

If the remote player using the controller has paused the game and selected the "pass the controller" option (1340="Yes"), the process 1300 includes sending 1342, from the remote play controller of the remote play application, a user list in remote session request with controller number, UDP connection endpoint and remote session identifier to the remote player management of the CGP/CS. The process 1300 includes sending 1344, from the remote player management of the CGP/CS, a user list remote session response with user names and user identifications to the remote play controller of the remote play application. The process 1300 includes displaying 1346, by the remote player application, a list of remote users for selecting a remote user to "pass the controller" to. The process 1300 includes selecting, by the user using the remote player application, the user to "pass the controller" to. The process 1300 includes sending 1350, from the remote play controller of the remote play application, the "pass the controller" request with user identification, controller number, remote session identifier and UDP connection endpoint to the remote player management of the CGP/CS. The process 1300 includes sending 1352, from the remote player management of the CGP/CS, the "pass the controller" request with targeted user identification, controller number, and UDP connection endpoint to the remote play controller of the remote player application. The process 1300 includes disconnecting 1354 the remote player application for requesting the user/device from the controller UDP connection endpoint. The process 1300 proceeds to the connecting step 1328.

The process 1300 includes determining 1356 whether the remote player using a controller paused the game and selected the "pass the controller" option to the console game controller. If the remote player using the controller did not pause the game and select the "pass the controller" option to the console game controller (1356="No"), the process 1300 proceeds to step 1368.

If the remote player using the controller paused the game and selected the "pass the controller" option to the console game controller (1356="Yes"), the process 1300 includes sending 1358, from the remote play controller of the remote play application, a "pass the controller" request with user identification, and controller number to the remote player management of the CGP/CS. The process 1300 includes sending 1360, from the remote player management of the CGP/CS, the "pass the controller" request with user identification and controller number to the remote play controller of the CD/CS. The process 1300 includes sending 1362, from the remote play controller of the CD/CS, local controller pass requests with controller input # without UDP connection IP connection endpoint to the controller I/O mapper. The process 1300 includes switching 1364, at the controller I/O mapper, a local game controller input for controller number to a local game controller input connection. The process 1300 includes disconnecting 1366 the remote play controller of the remote play application from the UDP socket for controller communications.

The process 1300 includes determining 1368 whether a local user picked up a local controller and whether the controller detected activity (e.g., internal measurement sensor, button presses, or the like). If the local user has not picked up the local controller and the controller has not detected activity (1368="No"), the process 1300 reverts to the determining step 1308. If the local user has picked up the local controller and the controller has detected activity (1368="Yes"), the process 1300 includes switching 1370, at the controller I/O mapper, a local game controller input for controller number. The process 1300 includes disconnecting 1372, at the controller I/O mapper, a remote user from the UDP socket assigned to that controller number. The process 1300 includes displaying 1374 a message to the remote user that the local console has controller input for controller number.

Figure 14:
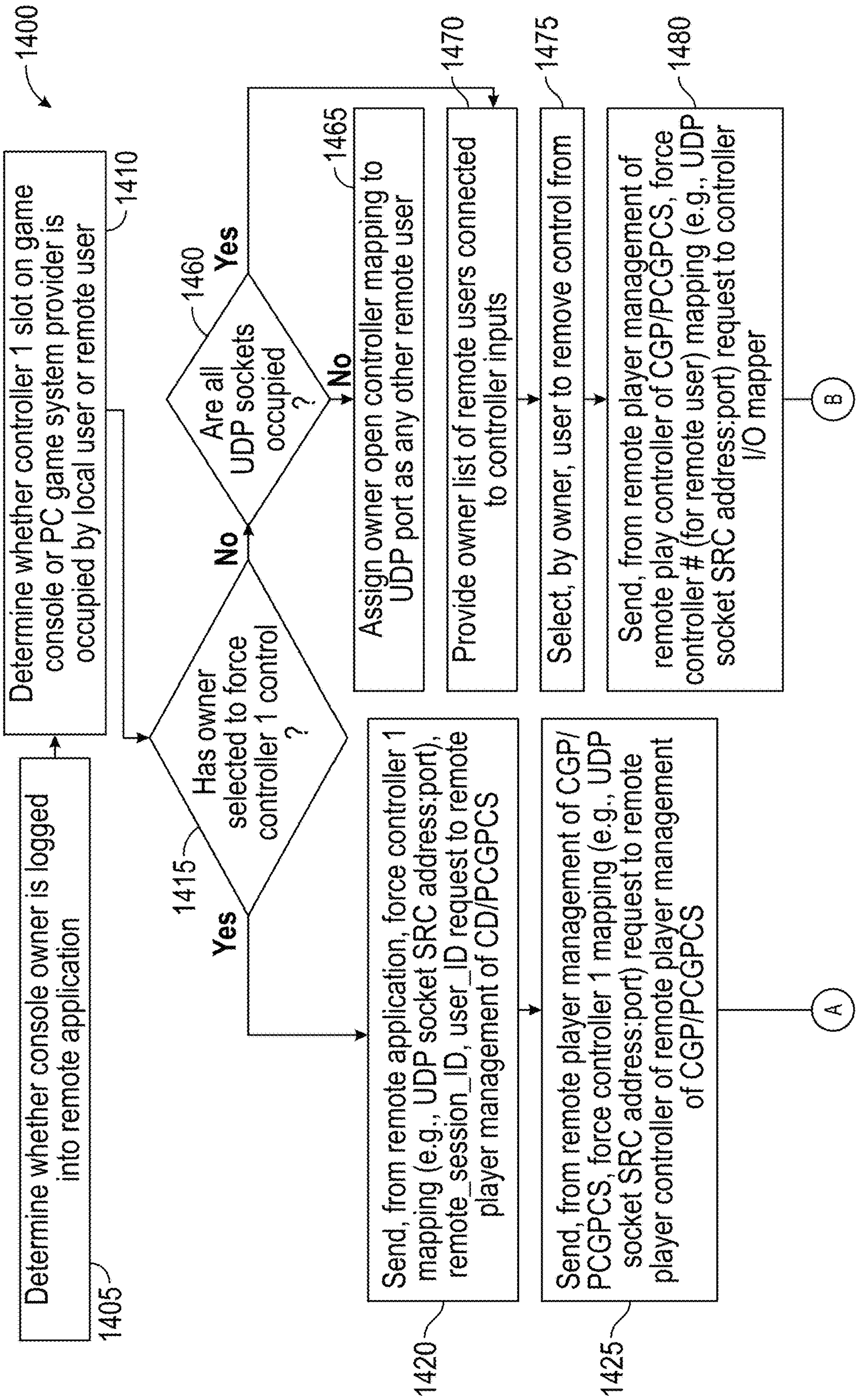
FIG. 14 depicts a process for a remote owner to request control on a primary controller input (e.g., controller input 1) or force disconnect when all controller slots are taken, in accordance with some embodiments of the disclosure.
Figure 14:
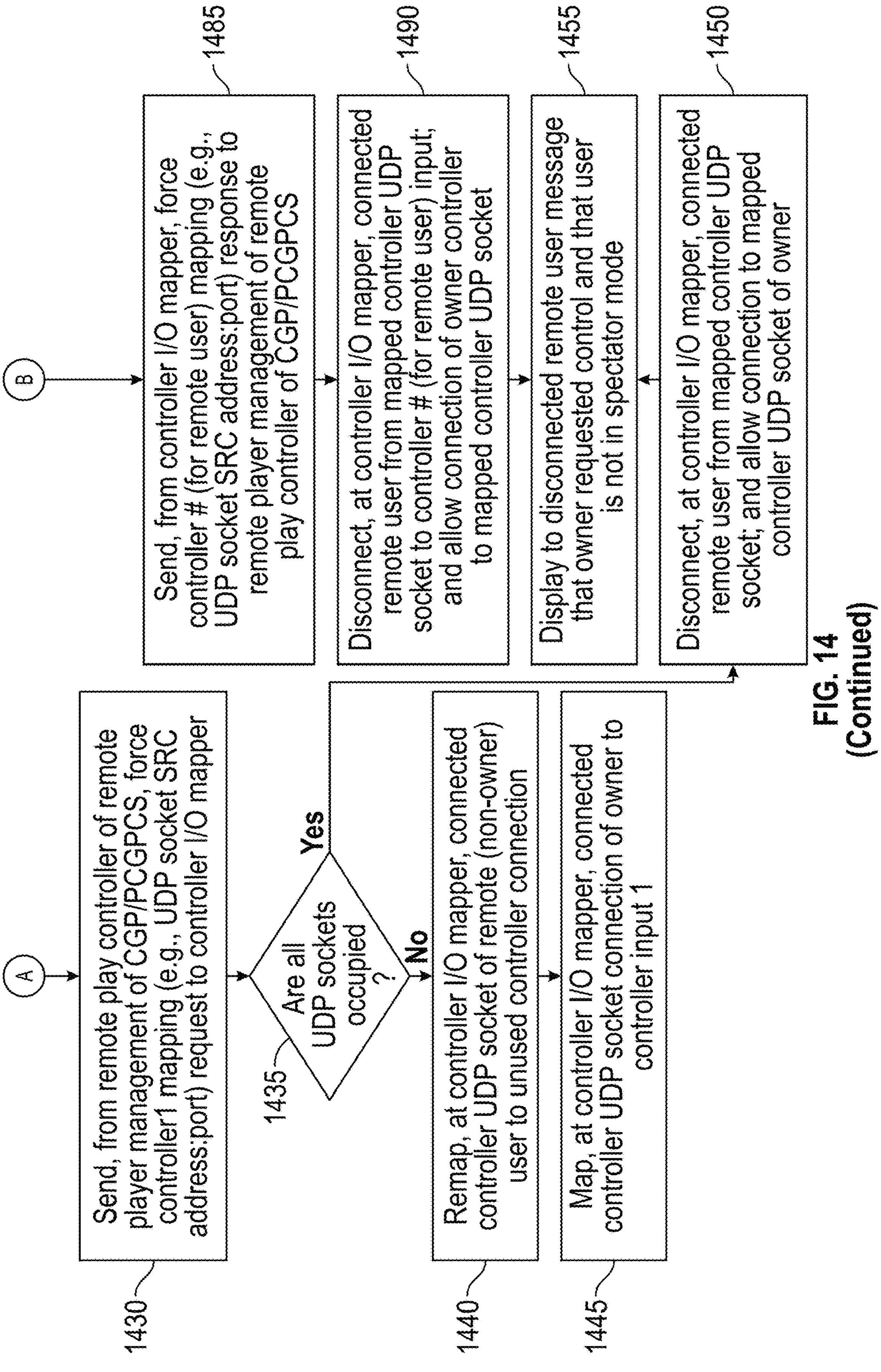

FIG. 14 depicts a process 1400 for a remote owner to request control on a primary controller input (e.g., controller input 1) or force disconnect when all controller slots are taken, in accordance with some embodiments of the disclosure.

In some embodiments, process 1400 includes determining 1405 whether the console owner is logged into the remote application. The process 1400 includes determining 1410 whether the controller 1 slot on the game console or the PC game system provider is occupied by a local user or a remote user. The process 1400 includes determining 1415 whether the owner selected to force controller 1 control. If the owner did not select to force controller 1 control (1415="No"), the process 1400 continues to step 1460.

If the owner selected to force controller 1 control (1415="Yes"), the process 1400 includes sending 1420, from the remote application, force controller 1 mapping (e.g., UDP socket SRC connection endpoint), remote session identifier, and user identification request to the remote player management of the CD/CS. The process 1400 includes sending 1425, from the remote player management of the CGP/CS, force controller 1 mapping (e.g., UDP socket SRC connection endpoint) request to the remote player controller of the remote player management of the CGP/CS. The process 1400 includes sending 1430, from the remote play controller of the remote player management of the CGP/CS, force controller 1 mapping (e.g., UDP socket SRC connection endpoint) request to the controller I/O mapper.

The process 1400 includes determining 1435 whether all UDP sockets are occupied. If all UDP sockets are not occupied (1435="No"), the process 1400 includes remapping 1440, at the controller I/O mapper, a connected controller UDP socket of a remote (non-owner) user to an unused controller connection. The process 1400 includes mapping 1445, at the controller I/O mapper, the connected controller UDP socket connection of the owner to controller input 1. If all UDP sockets are occupied (1435="Yes"), the process 1400 includes disconnecting 1450, at the controller I/O mapper, the connected remote user from the mapped controller UDP socket; and allowing the connection to a mapped controller UDP socket of the owner. The process 1400 includes displaying 1455 to the disconnected remote a user message that the owner requested control and that the user is not in spectator mode.

The process 1400 includes determining 1460 whether all UDP sockets are occupied. If all UDP sockets are not occupied (1460="No"), the process 1400 includes assigning 1465 the owner an open controller mapping to the UDP port as any other remote user. If all UDP sockets are occupied (1460="Yes"), the process 1400 includes provide 1470 the owner a list of remote users connected to the controller inputs. The process 1400 includes selecting 1475, by the owner, a user from which to remove control. The process 1400 includes sending 1480, from the remote player management of the remote play controller of the CGP/CS, a force controller number (for remote user) mapping (e.g., UDP socket SRC connection endpoint) request to the controller I/O mapper. The process 1400 includes sending 1485, from the controller I/O mapper, a force controller number (for remote user) mapping (e.g., UDP socket SRC connection endpoint) response to the remote player management of the remote play controller of CGP/CS. The process 1400 includes disconnecting 1490, at the controller I/O mapper, the connected remote user from the mapped controller UDP socket to the controller number (for remote user) input; and allowing connection of the owner controller to the mapped controller UDP socket. The process 1400 proceeds to the displaying step 1455.

FIG. 15 depicts a system 1500 with focus on determining whether a user has sufficient bandwidth based on a standard (e.g., a determined minimum), which will cause the user to be disconnected, in accordance with some embodiments of the disclosure. For example, Sony's PS Remote Play requires a minimum of 5 Mbps but recommends 15 Mbps. If a player's connection has poor network QoS, exemplified by a 5 Mbps connection, it will be removed from the peer-to-peer ultra-low latency RTP stream. Whereas, in some embodiments, the system 1500 includes a feature that switches to a hypertext transfer protocol (HTTP) ABR stream (e.g., HTTP live streaming (HLS), dynamic adaptive streaming over HTTP (a.k.a., MPEG DASH), Microsoft smooth streaming (SS), or Adobe HTTP dynamic streaming (HDS)) delivered from the cloud for those users. If the system 1500 determines that the QoS has improved, the user's connection to the console or PC will be restored to the peer-to-peer ultra-low latency connection. However, when in ABR delivery mode, it is in spectator-only mode.

The overall structure of the system 1500 is, in some embodiments, similar to one or more portions of the system 400, the system 700, and the system 900. For instance, descriptions of references 1501-1527 of FIG. 15 correspond, in some embodiments, for example, with references 401-431 of FIG. 4 and are omitted for brevity. Please note, in the embodiment of FIG. 4, the video encoder 409, the audio encoder 411, and the multiplexer 413 are illustrated and described; whereas, in the embodiment of FIG. 15, it is to be understood that the functions of the video encoder, the audio encoder, and the multiplexer are performed by video and/or audio (V/A) encoder and multiplexer 1509. The other references 1511-1527 of FIG. 15 correspond, in some embodiments, for example, with references 415-431, respectively, of FIG. 4.

In some embodiments, remote play controller 1529 of FIG. 15 includes one or more features of the remote play controller 727 of the embodiment of FIG. 7 or the remote play controller 927 of the embodiment of FIG. 9, which are omitted for brevity.

In some embodiments, references 1531-1559 of FIG. 15 correspond, for example, with references 433-463 of FIG. 4 and are omitted for brevity. The remote slots in FIG. 15 are not numbered but are similar to the remote slot 440, in some embodiments. In FIG. 15, a controller I/O mapper is omitted but is similar to, e.g., the controller I/O mapper 441, in some embodiments.

In some embodiments, the system 1500 includes a client device 1 1561*a* and a client device 2 1561*b*. In some embodiments, such as the embodiment of FIG. 15, the remote client devices are identical (but need not necessarily be identical), i.e., the client device 1 1561*a* is identical in structure to the client device 2 1561*b*. Thus, details of the client device 2 1561*b* are omitted for brevity.

In some embodiments, the client device 1 1561*a* includes at least one of: an ABR player 1565*a*, a remote play controller 1567*a*, a UA/US/FC management controller 1569*a*, a controller for data transmission 1571*a*, a UDP socket 1573*a*, or a UDP socket 1575*a*. For example, the remote play controller 1567*a* is configured to send a force disconnect message to one of the UDP sockets 1573*a*, 1575*a*. In some embodiments, the ABR player 1565*a* is configured to send a rendered A/V frame to an output device 1577*a* (e.g., a video device and an audio device).

In some embodiments, the system 1500 includes a console game provider or cloud service (CGP/CS; the cloud service may be a PC game publisher cloud service) 1583. The CGP/CS 1583 includes, for example, a remote player management controller 1585 and a remote viewing session viewing ABR system 1587. In some embodiments, the remote player management controller 1585 is configured to access, change, and/or store remote play sessions in a data storage 1586.

In some embodiments, the remote viewing session viewing ABR system 1587 includes at least one of: an ABR delivery controller 1589, a UDP socket 1591, a transmission receiver 1593, a demultiplexer 1595, an ABR transcoder and segmenter 1597, an ABR A/V segments and manifest storage 1598, or an ABR HTTP delivery system 1599.

In some embodiments, the ABR delivery controller 1589 is configured to send an RTP connection (with a connection endpoint) to the UDP socket 1591. The UDP socket 1591 is configured to send RTP muxed encoded video and audio packets to the transmission receiver 1593, which is configured to return RTCP packets. The transmission receiver 1593 is configured to send RTP muxed encoded video and audio packets to the demultiplexer 1595. The demultiplexer 1595 is configured to send encoded video PES and encoded audio PES to the ABR transcoder and segmenter 1597. The ABR transcoder and segmenter 1597 is configured to send encoded common media application format (CMAF) video segments, encoded audio segments, and an ABR live manifest to the ABR A/V segments and manifest storage 1598. The ABR A/V segments and manifest storage 1598 is configured to permit access by the ABR HTTP delivery system 1599. The ABR HTTP delivery system 1599 is configured to access requested encoded CMAF video segments, requested encoded audio segments, and requested manifest/live manifest updates.

In some embodiments, the UDP socket 1517 is configured to exchange, e.g., send 1517*a* 1591*a*, RTP muxed encoded video and audio packets and receive RTCP packets (e.g., with a remote cloud service IP address) with the UDP socket 1591. In some embodiments, the UDP socket 1517 is configured to send RTP muxed encoded video and audio packets and receive RTCP packets (e.g., with a remote client device IP address) to/from the UDP socket of the client device. In some embodiments, the remote play controller 1592 is configured to send 1529*a* a force disconnect request with remote session identifier, an IP address, and a minimum bitrate requirement to the remote player management controller 1585. In some embodiments, the remote play controller 1592 is configured to send 1529*b* an ABR session start with remote session identifier to the remote player management controller 1585.

In some embodiments, the remote player management controller 1585 is configured to send 1585*a* an ABR session start with RTP connection (connection endpoint) and remote session identifier to the ABR delivery controller 1589. The ABR delivery controller 1589 is configured to send 1589*a* an ABR live manifest URL to the remote player management controller 1585. The remote player management controller 1585 is configured to send 1585*b* an ABR session end with remote session identifier to the ABR delivery controller 1589.

In some embodiments, the ABR HTTP delivery system 1599 is configured to send 1599*b* an ABR segment download to the ABR player 1565*a*. The ABR player 1565*a* is configured to download and play ABR segments and receive live manifest updates (e.g., at 1565*a*1 and 1565*a*2). The ABR player 1565*a* is configured to send, at 1565*a*3, a calculated bitrate to the remote play controller of the remote player management of the CS.

In some embodiments, the remote player management controller 1585 is configured to send 1585*c* an ABR live manifest URL to the ABR player 1565*a*. The remote play controller 1567*a* and the remote player management controller 1585 are configured to exchange, e.g., send 1567*a*1 and receive 1585*d*, a force disconnect request on a list of UDP connection endpoints. The remote player management controller 1585 is configured to send 1585*e* a session reconnect request (including a remote session identifier), RTP UDP ports and controller UDP ports to the remote play controller 1567*a*.

Figure 16:
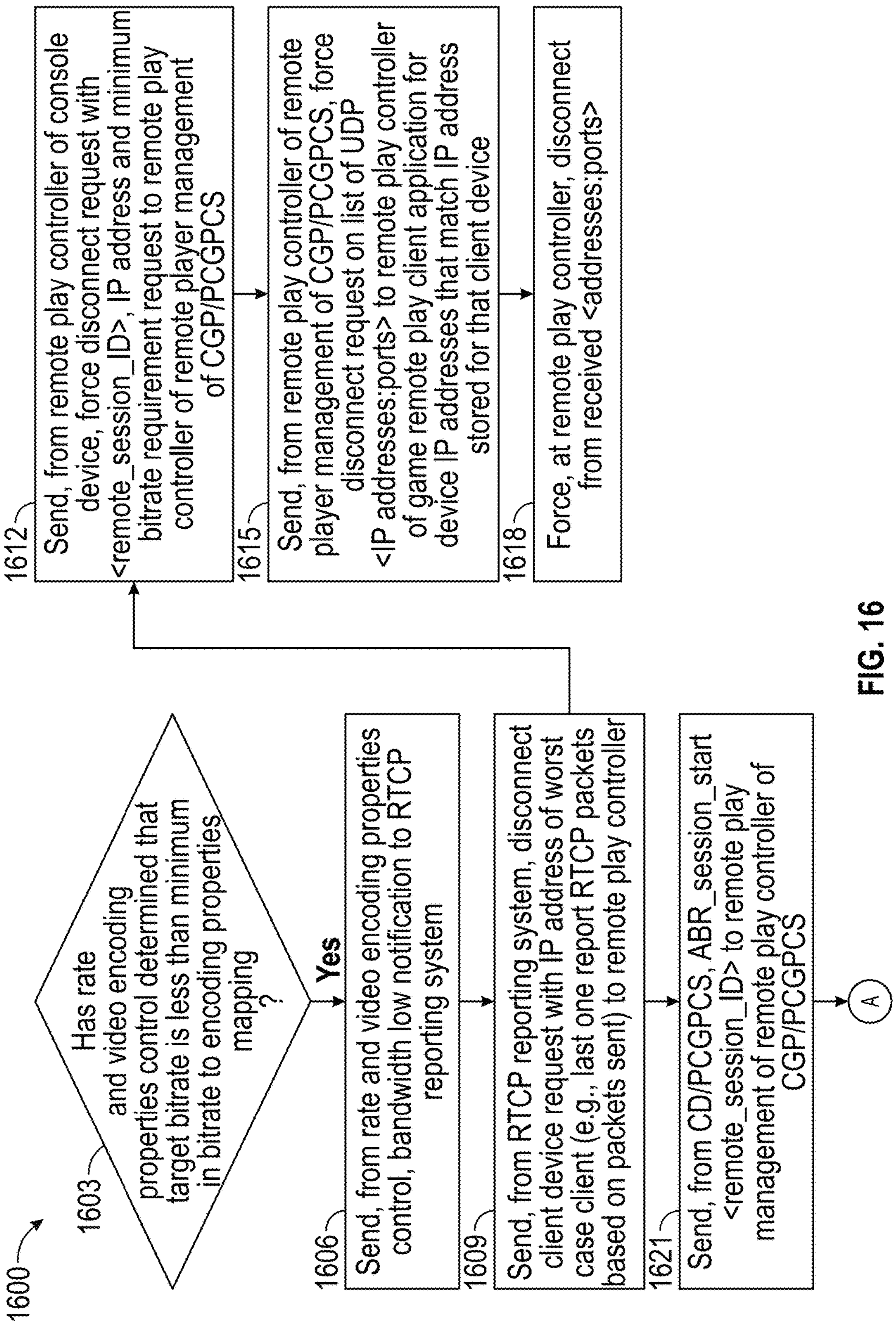
FIG. 16 depicts a process for determining whether there is sufficient bandwidth to support a remote client session, in accordance with some embodiments of the disclosure.
Figure 16:
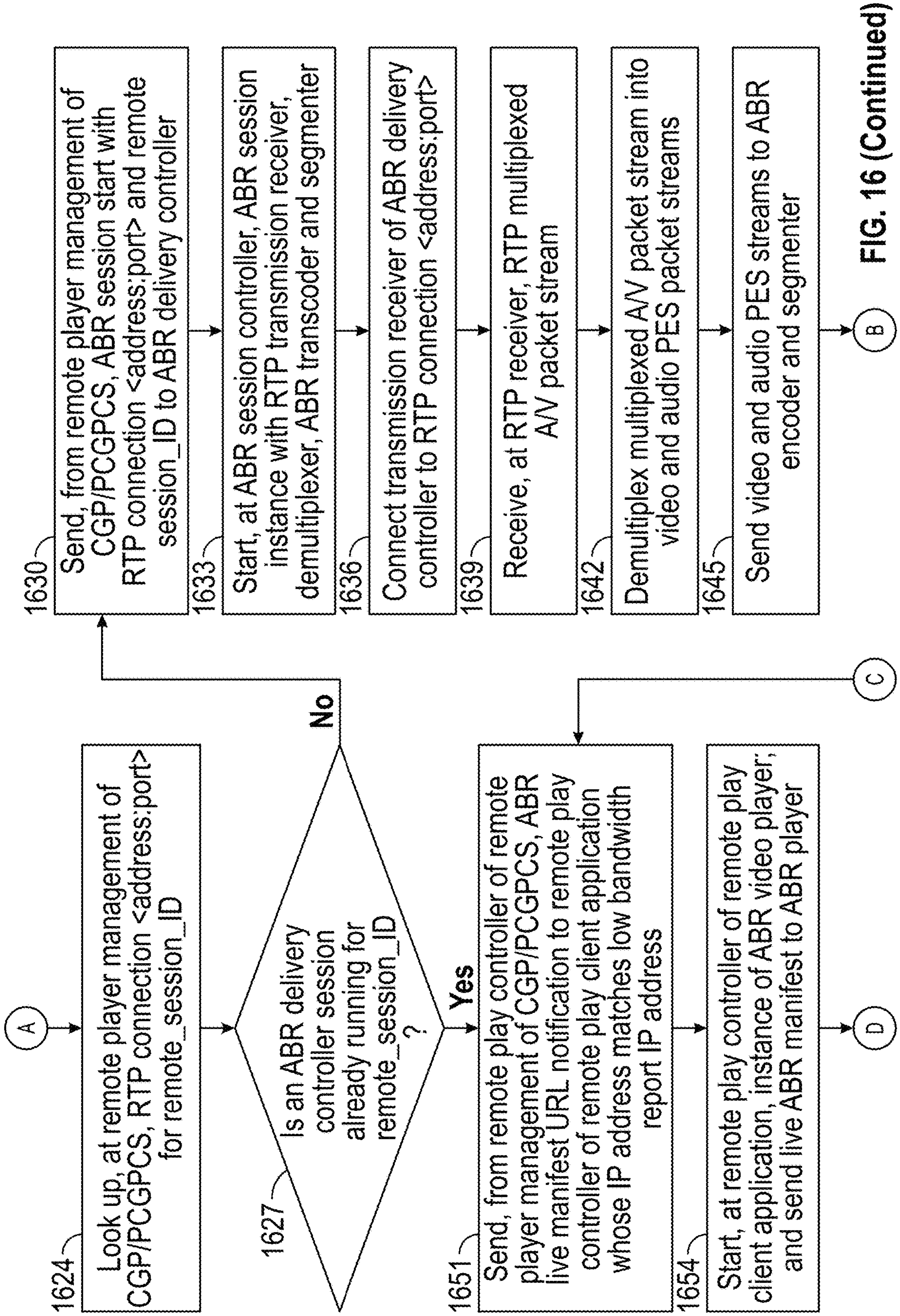
Figure 16:
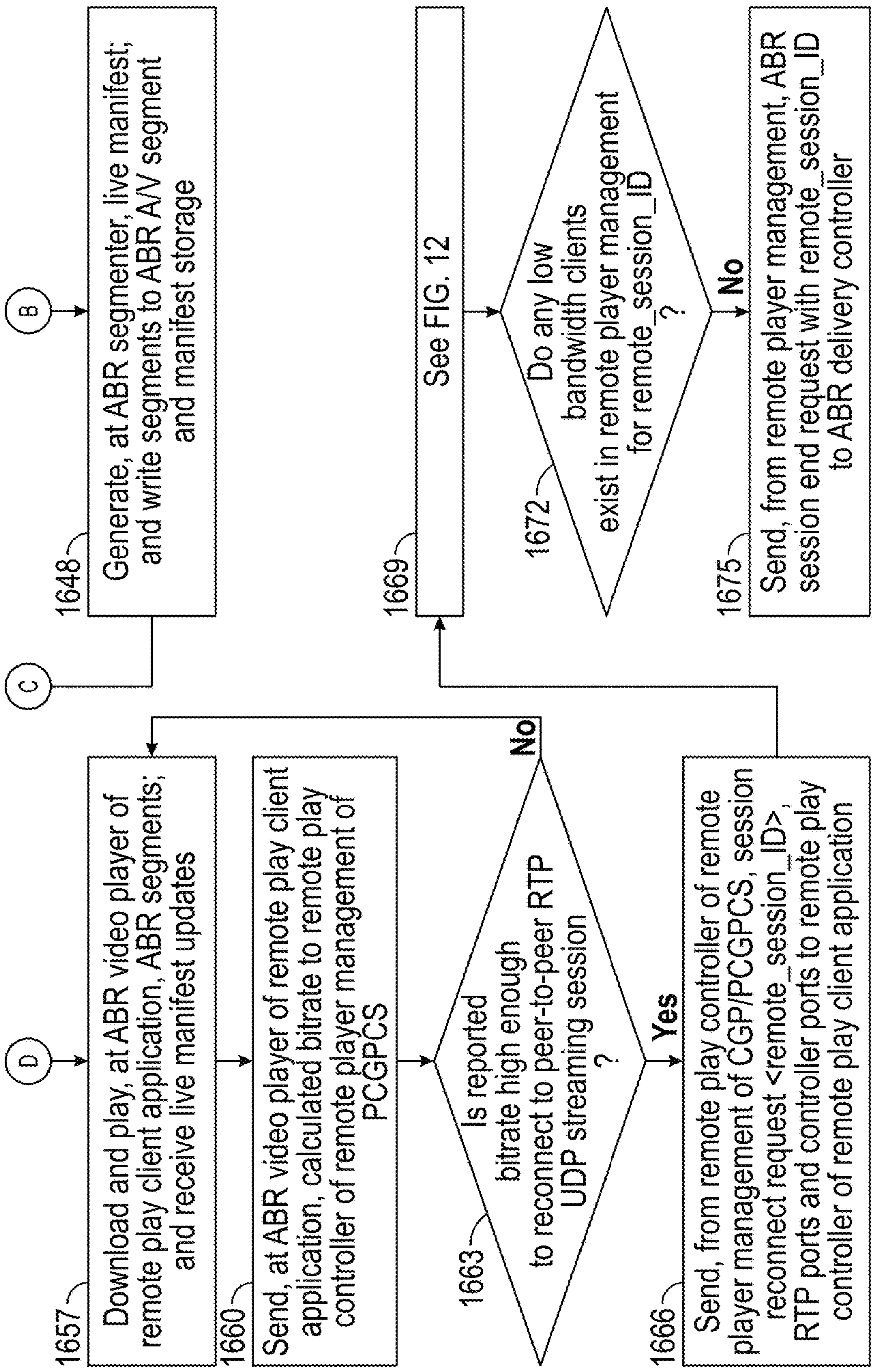

FIG. 16 depicts a process 1600 for determining whether there is sufficient bandwidth to support a remote client session, in accordance with some embodiments of the disclosure. In some embodiments, the process 1600 starts the ABR Session and ends the ABR Session based on the low bandwidth clients which are part of the remote gaming session. The process 1600 also covers disconnecting the low bandwidth clients from the RTP sender service, monitoring the network QoS during the ABR Session, and re-establishing the RTP sender service connection if the QoS improves above the bottom threshold.

In some embodiments, the process 1600 includes determining 1603 whether a rate and video encoding properties control has determined that a target bitrate is less than a minimum in bitrate to encoding properties mapping. If the rate and video encoding properties control has determined that the target bitrate is less than the minimum in the bitrate to encoding properties mapping (1603="Yes"), the process 1600 includes sending 1606, from the rate and video encoding properties control, a bandwidth low notification to the RTCP reporting system. The process 1600 includes sending 1609, from the RTCP reporting system, a disconnect client device request with an IP address of a worst case client (e.g., last one to report RTCP packets based on packets sent) to the remote play controller.

The process 1600 includes sending 1612, from the remote play controller of the console device, a force disconnect request with a remote session identifier, an IP address and a minimum bitrate requirement request to the remote play controller of the remote player management of the CGP/CS. The process 1600 includes sending 1615, from the remote play controller of the remote player management of the CGP/CS, a force disconnect request on a list of UDP IP connection endpoints to the remote play controller of the game remote play client application for the device IP addresses that match the IP address stored for that client device. The process 1600 includes forcing 1618, at the remote play controller, a disconnect from received connection endpoints.

In some embodiments, after the sending step 1609, in a process parallel to the steps 1612-1618, the process 1600 includes sending 1621, from the CD/CS, an ABR session start (with a remote session identifier) to the remote play management of the remote play controller of the CGP/CS. The process 1600 includes looking up 1624, at the remote player management of the CGP/CS, an RTP connection (including a connection endpoint) for the remote session identifier.

The process 1600 includes determining 1627 whether an ABR delivery controller session is already running for the remote session identifier. In response to determining the ABR delivery controller session is already running for the remote session identifier (1627="Yes"), the process 1600 proceeds to step 1651. In response to determining the ABR delivery controller session is not already running for the remote session identifier (1627="No"), the process 1600 proceeds to step 1630.

The process 1600 includes sending 1630, from the remote player management of the CGP/CS, an ABR session start with RTP connection endpoint and remote session identifier to the ABR delivery controller. The process 1600 includes starting 1633, at the ABR session controller, an ABR session instance with the RTP transmission receiver, the demultiplexer, the ABR transcoder and the segmenter. The process 1600 includes connecting 1636 the transmission receiver of the ABR delivery controller to the RTP connection endpoint. The process 1600 includes receiving 1639, at the RTP receiver, an RTP multiplexed A/V packet stream. The process 1600 includes demultiplexing 1642 the multiplexed A/V packet stream into video and audio PES packet streams. The process 1600 includes sending 1645 the video and audio PES streams to the ABR encoder and the segmenter. The process 1600 includes generating 1648, at the ABR segmenter, a live manifest; and writing segments to the ABR A/V segment and manifest storage. The process 1600 includes sending 1651, from the remote play controller of the remote player management of the CGP/CS, an ABR live manifest URL notification to the remote play controller of the remote play client application whose IP address matches a low bandwidth report IP address. The process 1600 includes starting 1654, at the remote play controller of the remote play client application, an instance of the ABR video player; and sending a live ABR manifest to the ABR player. The process 1600 includes downloading and playing 1657, at the ABR video player of the remote play client application, ABR segments; and receiving live manifest updates. The process 1600 includes sending 1660, at the ABR video player of the remote play client application, a calculated bitrate to the remote play controller of the remote player management of the CS.

The process 1600 includes determining 1663 whether the reported bitrate is high enough to reconnect a peer-to-peer RTP UDP streaming session. If the reported bitrate is not high enough to reconnect a peer-to-peer RTP UDP streaming session (1663="No"), the process 1600 returns to the downloading, playing, and receiving step 1657. If the reported bitrate is high enough to reconnect a peer-to-peer RTP UDP streaming session (1663="Yes"), the process 1600 includes sending 1666, from the remote play controller of the remote player management of the CGP/CS, a session reconnect request (including a remote session identifier), RTP UDP ports and controller UDP ports to the remote play controller of the remote play client application. The process 1600 includes starting 1669 one or more steps of the process 1200 of FIG. 12.

The process 1600 includes determining 1672 whether any low bandwidth clients exist in the remote player management for the remote session ID. If any low bandwidth clients exist in the remote player management for the remote session ID (1672="Yes"), the process 1600 includes sending 1675, from the remote player management, an ABR session end request with the remote session identifier to the ABR delivery controller.

Additional features, systems, and methods are provided. Techniques for establishing local and remote sessions are fully disclosed herein and are understood to be included. In some embodiments, the system can detect nearby devices that advertise themselves as game controllers. This advertisement is initiated in response to an action taken by a user within a specific app, such as the Sony PlayStation App, or at an operating system level, for example, via a quick menu setting. The advertisement is provided over a communication protocol such as Bluetooth low energy (BLE) or when the device is connected to the same local area network as the game console.

Upon detecting a nearby device and its associated user profile, the game console takes specific actions. These could include asking the console user if they wish to allow the detected device (and its associated user profile) to join the current gameplay, listing the device as a controller within the console system while it is connected, or sorting a list of remote players. For instance, when a user is using this invention for peer-to-peer connections or "pass the controller" activities, nearby users are moved to the top of the list of remote users.

"Share Play" is a PlayStation feature where one player can share their screen with a second, remote player and "hand over" the controller to that player so that the other player can play instead. For example, the second player can help the first player who shared their screen to win a level or defeat an enemy. This feature allows the second user to be invited and the screen to be shared in real-time when a session is already active.

Improving on Share Play, "Pick Up The Controller" is provided. This feature allows a second remote player to pick up the controller at a later time that is convenient for them to help the first player. The first player assigns such a task to a group (e.g., a WhatsApp group) or a specific player or players through a direct invite or message to their social network, via SMS, or messaging apps. The invite is a secure link to the gaming console and specifically to the gaming session that was shared. Additionally, the first player has options to pick up multiple players and assign them a priority order. This is beneficial if the first player "passes" or rejects to assist the first player, in which case, the second player on the list is notified or invited to pick up the controller after a predetermined time. Such time can be defined by the first player. In one embodiment, the gaming console enters a "sharing mode" when the "pick up the controller" feature is invoked to prevent the recipient of the invite from controlling gaming console functionalities (e.g., browse apps, pictures, and the like) on the gaming console. In this mode, only the shared game is accessible.

"Pick up the controller" shares an existing session ID of a game or persists in the database of the gaming console until the other player(s) can participate. The game state of the existing session is saved or persisted, and the sharing player defines the task for the other player(s). This can include, for example, eliminating a specific target in a war game or killing a boss. In some examples, the second user can resume the game for the first user but with level and/or task restrictions. The session can be accessible for a period defined by the player (e.g., via the console) or can expire when that first player attempts to resume their game.

In one embodiment, when the second player picks up the controller, the first player is notified so that they can watch the second player on a device such as their mobile device. Other functions such as voice chat are activated, for example. The notification to the first player establishes a streaming session with the gaming console locally (if the user is on the same LAN as the gaming console) or over the Internet.

Other methods are contemplated. For example, a seamless gaming experience is provided in which a user transitions between devices or games without interruption. This feature enhances the user experience by providing flexibility and convenience. In some examples, the user starts a game on one device, such as an iPhone, and then continues on a different device, like a PS5 console, without losing their progress. Similarly, the ability to accept an invite while in the middle of another game and have the new session load automatically after exiting the current game is provided.

Figure 17:
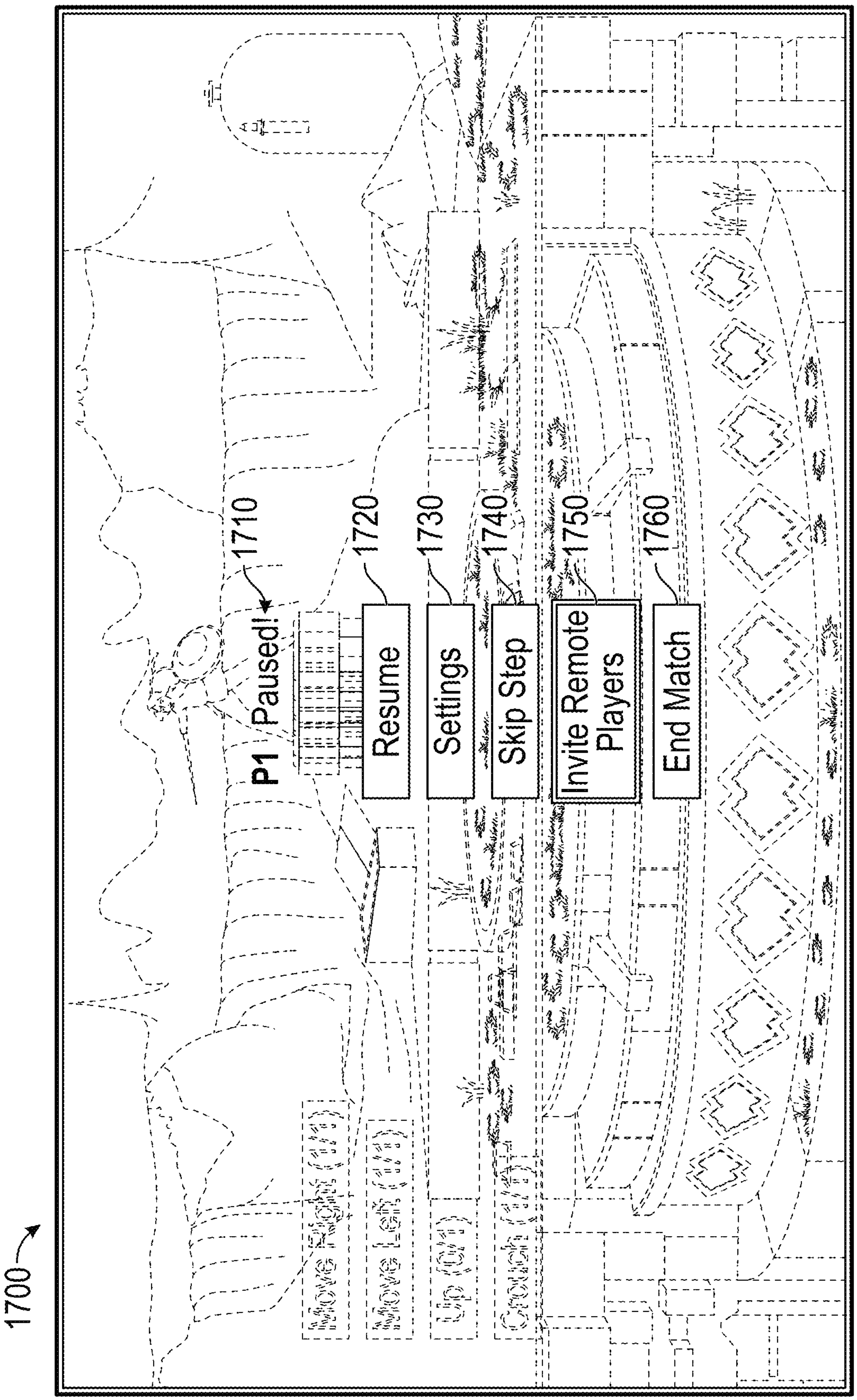
FIG. 17 depicts a user experience (UX) after a user pauses a game with an option to invite remote players to join the game, in accordance with some embodiments of the disclosure.

FIG. 17 depicts a user experience (UX) 1700 after a user pauses a game with an option to invite remote players to join the game, in accordance with some embodiments of the disclosure. The UX 1700 includes indicators and user selectable buttons. For example, the UX 1700 includes at least one of a player 1 paused indicator 1710, a resume button 1720, a settings button 1730, a skip step button 1740, an invite remote players button 1750 (highlighted in FIG. 17 indicating selection), or an end match button 1760. In response to selection of the invite remote players button 1750, at least one of the methods, processes, and steps detailed herein for inviting remote players is performed.

Figure 18:
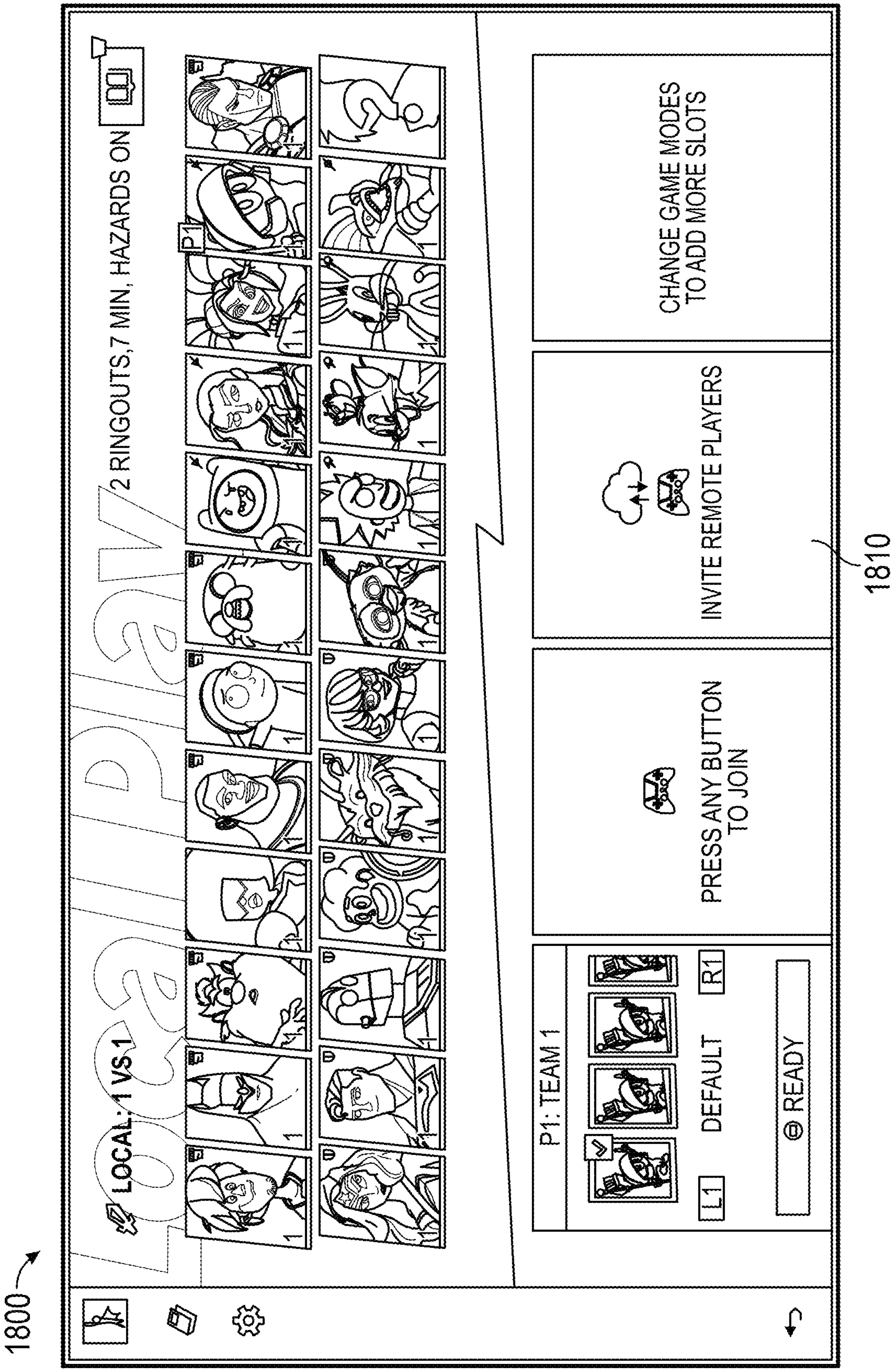
FIG. 18 depicts a UX including an option for a user to invite a remote player to take a spot in a game, in accordance with some embodiments of the disclosure.

FIG. 18 depicts a UX 1800 including an option for a user to invite a remote player to take a spot in a game, in accordance with some embodiments of the disclosure. In some embodiments, the UX 1800 includes a user selectable option to invite remote players 1810. In some embodiments, the option 1810 includes the text "INVITE REMOTE PLAYERS" and a graphic of a controller and a cloud with arrows indicating connection between the controller and the cloud.

Figure 19:
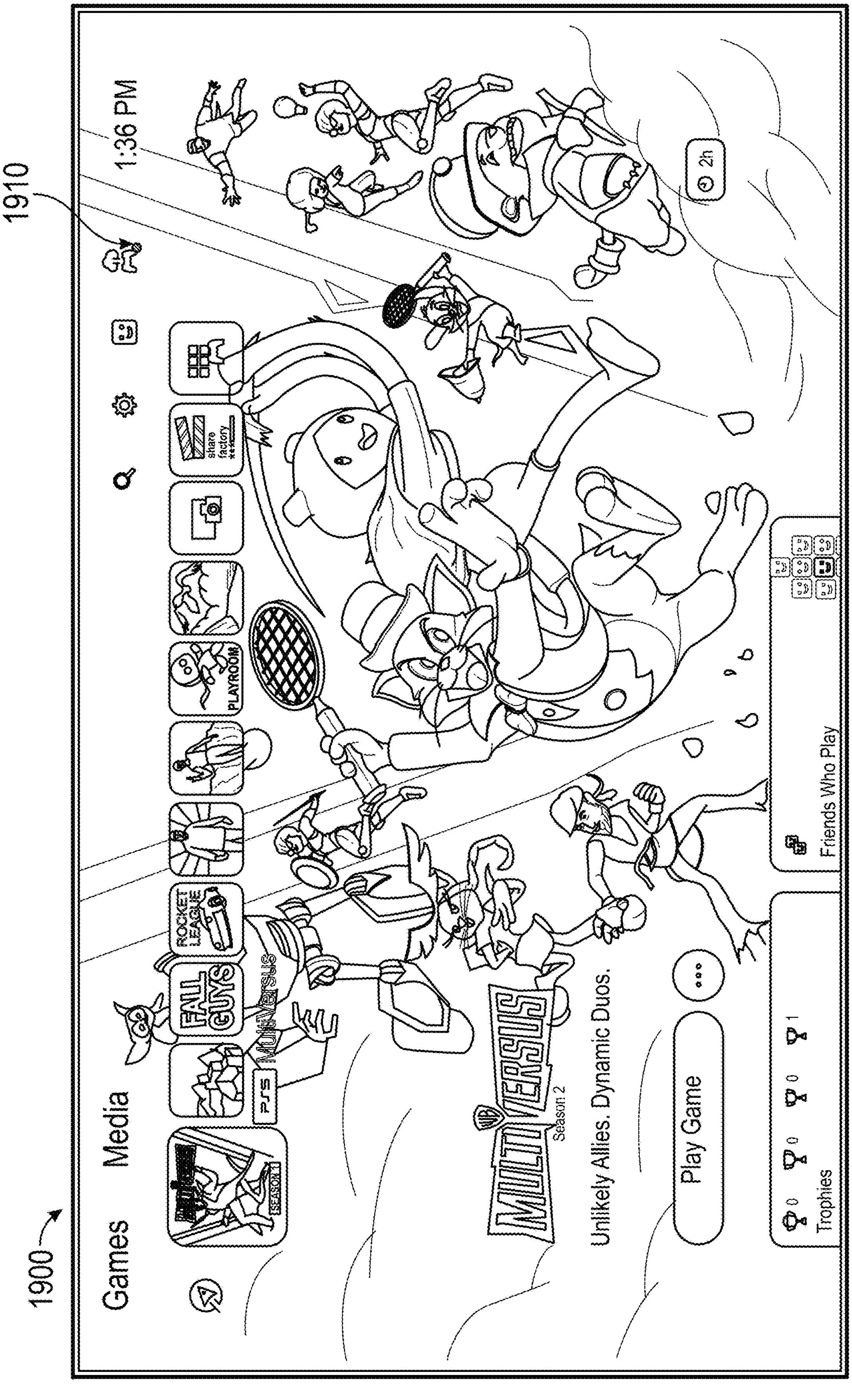
FIG. 19 depicts a UX including an option for a console owner to select remote players to view a main console as if the remote player were playing in person with the console owner, in accordance with some embodiments of the disclosure.

FIG. 19 depicts a UX 1900 including an option for a console owner to select remote players to view a main console as if the remote player were playing in person with the console owner, in accordance with some embodiments of the disclosure. In some embodiments, the console owner maintains control of game controller 1 and all other remote or local players have the option to join a game the console owner starts. The console owner retains control over the navigation and selecting of the games to play. Once a game is started, local or remote users can join the game as in FIG. 16. In some embodiments, the UX 1900 includes an icon 1910 indicating that a remote user has successfully formed a peer-to-peer connection between the game console and at least one or more remote client devices. In some embodiments, the icon 1910 includes a graphic of a controller and a cloud with arrows indicating connection between the controller and the cloud. Also, for example, the icon 1910 can include a status indicator, such as a green circle in a lower right-hand corner of the graphic of the controller indicating an active peer-to-peer connection.

Figure 20:
FIG. 20 depicts a UX including an option for a user to pass a controller to a remote user or allow a local user to take control of a game controller locally, in accordance with some embodiments of the disclosure.

FIG. 20 depicts a UX 2000 including an option for a user to pass a controller to a remote user or allow a local user to take control of a game controller locally, in accordance with some embodiments of the disclosure. In some embodiments, the UX 2000 includes a user selectable option to invite remote players 2010 with a graphic of a controller and a cloud with arrows indicating connection between the controller and the cloud. In some embodiments, the option 2010 includes a text field (e.g., "PASS CONTROL TO ANOTHER PLAYER") 2020. See, related descriptions of "pass the controller" options provided herein.

Figure 21:
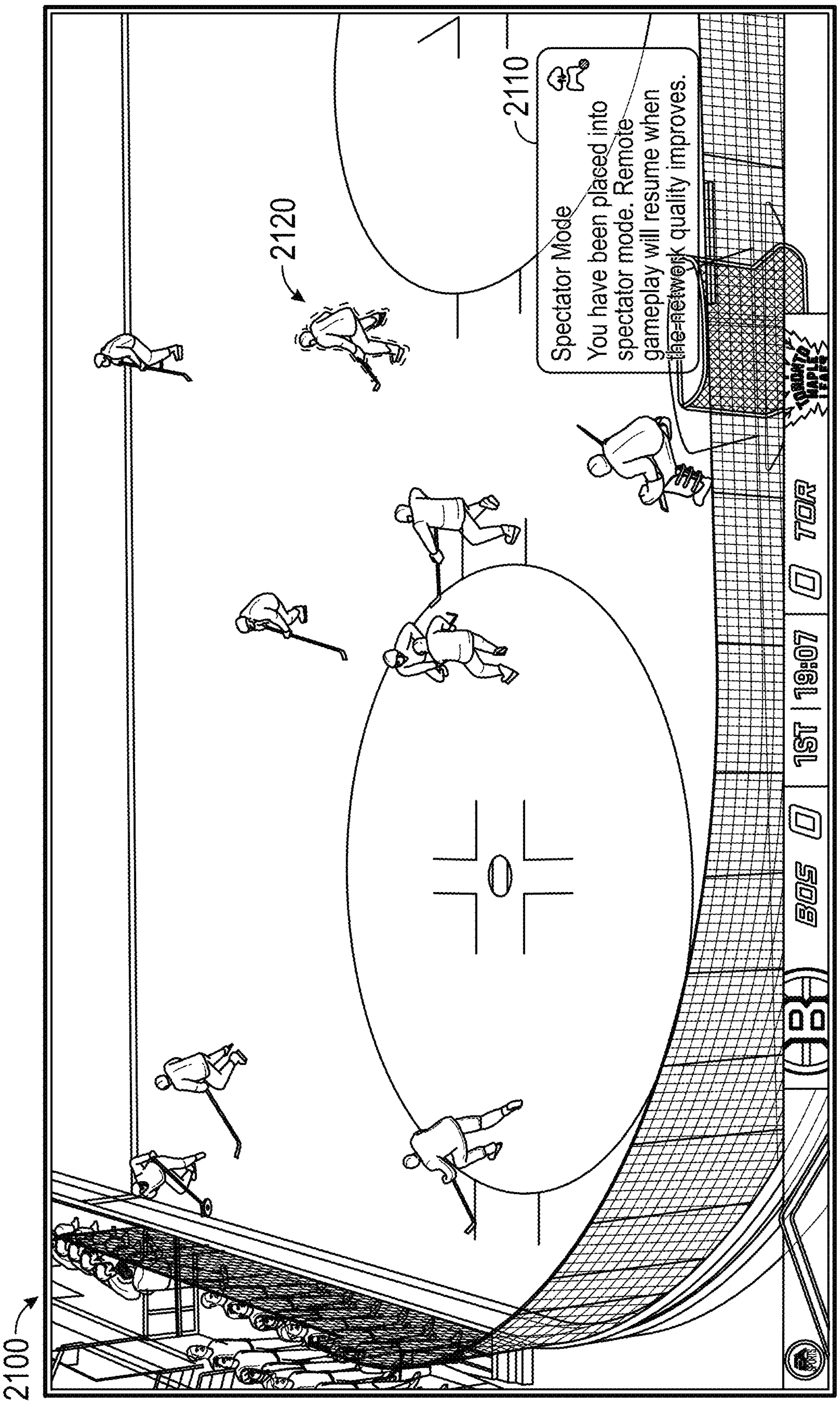
FIG. 21 depicts a UX in a spectator mode, in accordance with some embodiments of the disclosure.
Figure 22:
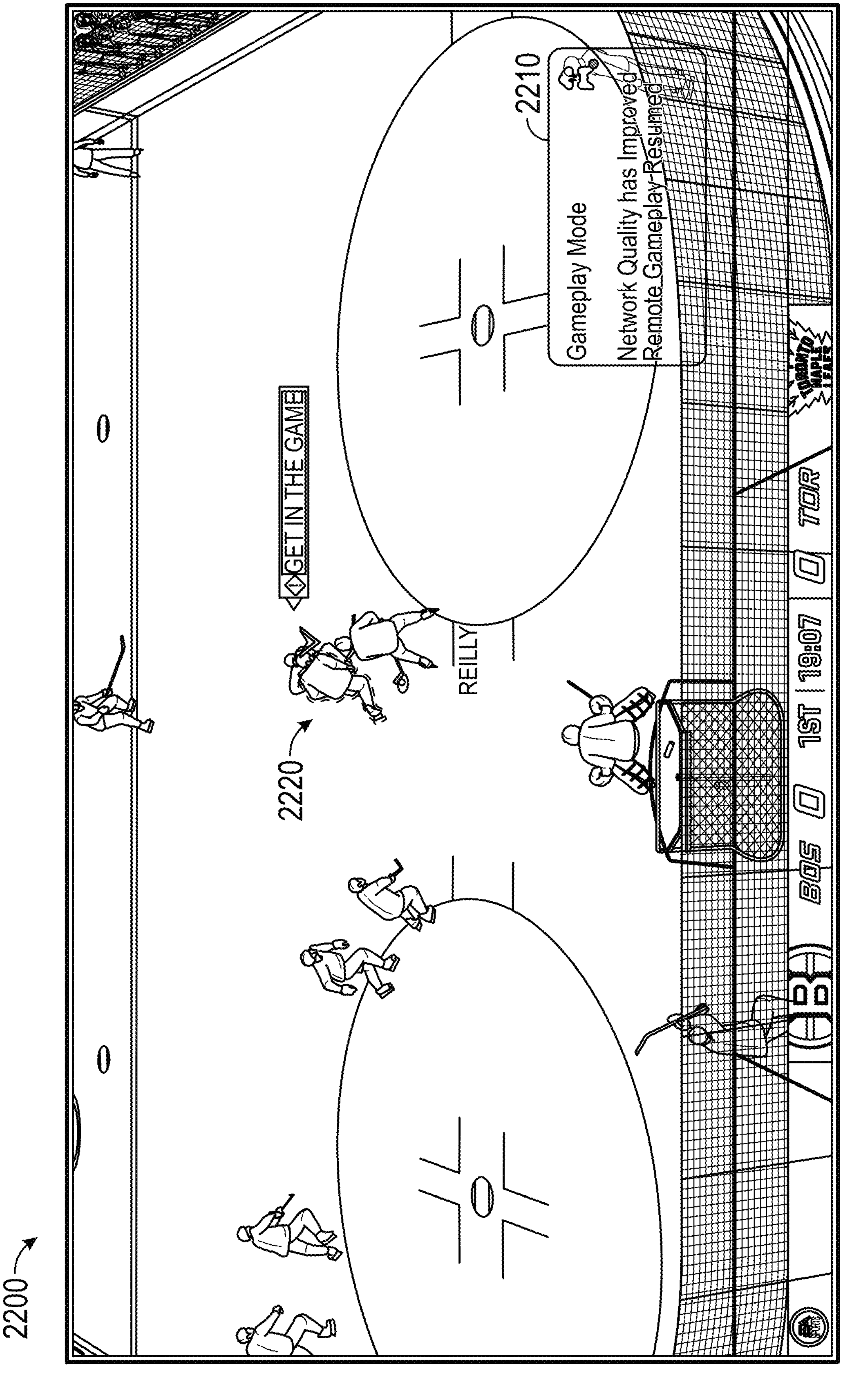
FIG. 22 depicts a UX in a gameplay mode, in accordance with some embodiments of the disclosure.

FIG. 21 depicts a UX 2100 in a spectator mode, in accordance with some embodiments of the disclosure. FIG. 22 depicts a UX 2200 in a gameplay mode, in accordance with some embodiments of the disclosure.

In some embodiments, a process for remote play for a game running on a game console is provided. For example, the process includes: forming a peer-to-peer connection between the game console and one or more remote client devices; in response to a loss of the peer-to-peer connection between the game console and the one or more remote client devices: causing the game to play in a spectator mode (e.g., FIG. 21); highlighting an icon (e.g., 2120) corresponding to a player controlled at the one or more remote client devices with the lost peer-to-peer connection; and controlling action of the player with the lost peer-to-peer connection by an artificial intelligence trained on gameplay of the player (see, FIGS. 23 and 25 and related descriptions). In response to a restoration of the peer-to-peer connection between the game console and the one or more remote client devices: the process includes causing the game to play in a gameplay mode (e.g., FIG. 22).

For example, when the game is in the spectator mode (e.g., FIG. 21), a game may display a message overlay 2110 including the label "Spectator Mode," a graphic of a controller and a cloud with arrows indicating a potential connection between the controller and the cloud, an indicator of a loss of connection (e.g., such as a red circle over a portion of the controller graphic, not shown), and a message (e.g., "You have been placed into spectator mode. Remote gameplay will resume when the network quality improves.").

Also, for example, when the game is in the gameplay mode (e.g., FIG. 22), a game may display a message overlay 2210 including the label "Spectator Mode," a graphic of a controller and a cloud with arrows indicating connection between the controller and the cloud, and a message (e.g., "Network quality has improved. Remote gameplay resumed."). Also, for example, the graphic of the controller can include a status indicator, such as a green circle in a lower right-hand corner of the graphic of the controller (not shown) indicating an active peer-to-peer connection.

In some embodiments, associated with at least one of the UXs 1700-2200, a process is provided for prompting addition of one or more remote client devices to a game console controlled by a local operator of the game console. The process includes, for example, providing, for display on a local display connected to the game console, a selectable option to invite and connect at least one of the one or more remote client devices to the game console. The process includes in response to selection of the selectable option by the at least one of the one or more remote client devices, forming a peer-to-peer connection between the game console and the at least one of the one or more remote client devices.

In some embodiments, the process includes at least one of: in response to the local operator pausing a game, providing for display the selectable option; in response to running a multiplayer game on the game console, providing for display the selectable option to take a spot in the multiplayer game; providing an option for the local operator of the game console to allow the one or more remote client devices to view a main console of the game console as if the one or more remote client devices are playing in person with the local operator; or in response to the one or more remote client devices pausing a game, providing for display to the one or more remote client devices a selectable option for the remote client device to pass a controller to the local operator or another of the one or more remote client devices.

In some embodiments, reinforcement learning (RL) is used to train a model of a player for use as a proxy user, for example, after the player is moved to the spectator mode. Examples of RL used to train a model of a player for use as a proxy user and related topics are described, for example, in Dasher et al., U.S. patent application Ser. Nos. 18/241,106 and 18/241,109, both filed Aug. 31, 2023, each of which is hereby incorporated by reference herein in its entirety.

For example, the proxy user is an emulated player character that can be controlled by the gaming system or another user, and that mimics the behavior and preferences of the original player character. RL is a machine learning technique that enables an agent to learn from its own actions and rewards in an environment, without requiring explicit supervision or labeled data. An RL architecture for training a proxy user may be provided. In some embodiments, the RL architecture comprises an agent, an environment, a policy, and a reward function. The agent is the proxy user, the environment is the video game, the policy is a function that maps the agent's state to an action, and the reward function is a function that evaluates the agent's performance and provides feedback. In some embodiments, an RL training process involves the agent interacting with the environment, observing the state and reward, and updating the policy based on a learning algorithm.

The RL approach differs from traditional methods where AI models govern non-player character (NPC) behaviors based on predefined rules or simpler learning algorithms. The RL-based proxy user is generated using historic gaming data and can emulate real users' play styles, biases, and tendencies.

The proxy user can be used in gaming sessions initiated through a social media platform, allowing for repetitive training of the NPC model as more players interact with it. This results in a more personalized and immersive experience for other players. The system uses reward and return functions to fine-tune the proxy user profile over thousands or millions of plays, resulting in a model that better represents a real player.

In some embodiments, features are recorded and extracted from the user's voice data to train a custom voice model.

Figure 25:
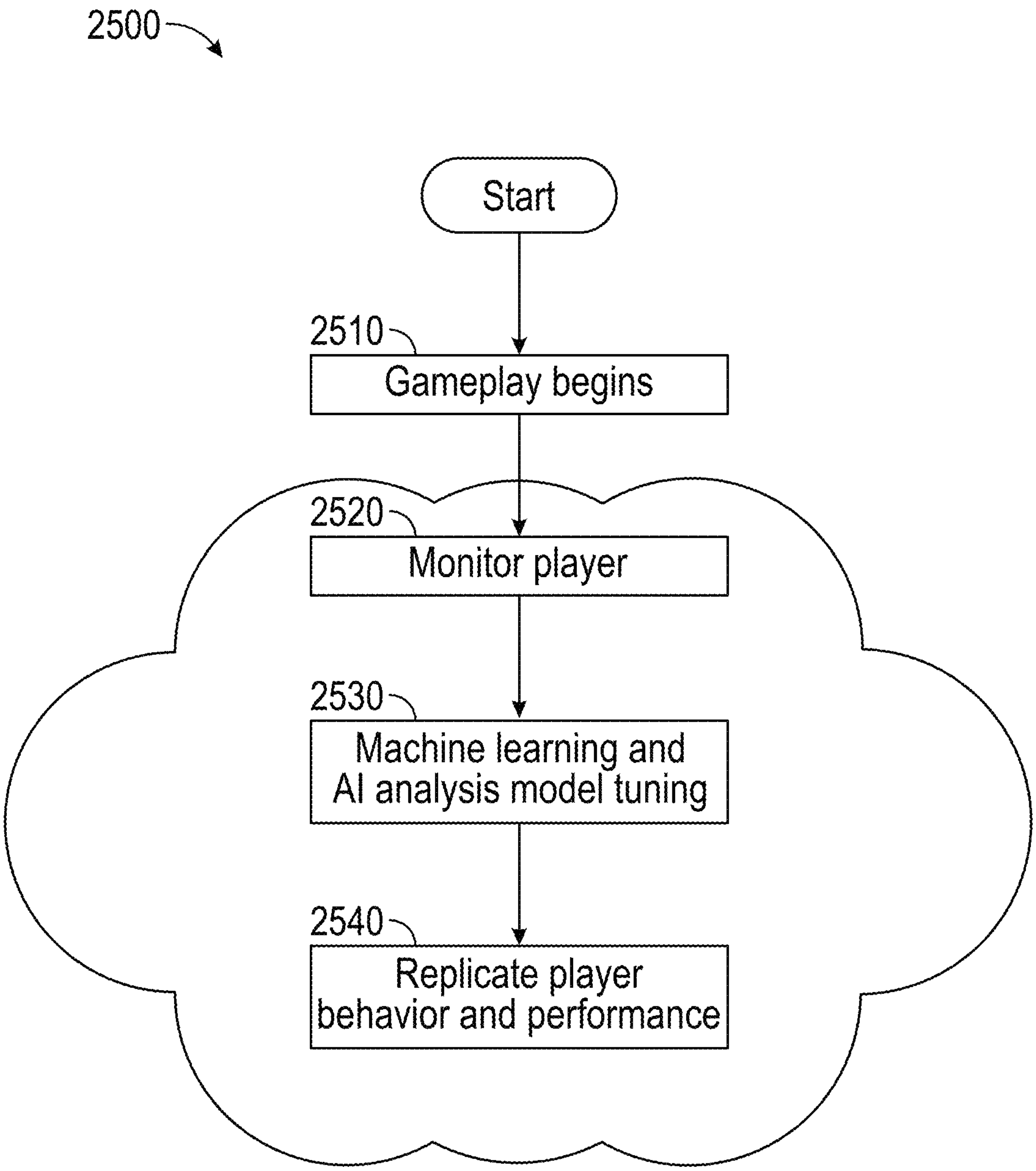
FIG. 25 depicts an illustrative flowchart of a process 2500 for monitoring players with an AI model, in accordance with some examples of the disclosure.

FIG. 25 depicts an illustrative flowchart of a process 2500 for monitoring players with an AI model, in accordance with some examples of the disclosure. The process 2500 may be included, in whole or in part, in the process 2300 shown in FIG. 23. The process 2500 may be implemented, in whole or in part, by cloud server with AI, such as the cloud server 763 of the system 700 shown in FIG. 7. One or more actions of the process 2500 may be incorporated into or combined with one or more actions of any other process or embodiments described herein. The process 2500 may be saved to a memory or storage as one or more instructions or routines that may be executed by a corresponding device or system to implement process 2500.

In some examples, during gameplay, a cloud server actively monitors the players, with a particular focus on the player who shared the game on the social media platform. The server learns about this player's ability and style of play using Machine Learning algorithms and AI. This data is used to replicate the player's performance and behavior emulation in "ghost mode." In addition to learning the first user's skill and style, the system will also learn about the player's in-game preferences. This will include their favorite characters, weapons, tactics, and the like, providing a more realistic representation of the first user in ghost mode. Different algorithms can be used such as reinforcement learning where the AI is rewarded or penalized based on the moves it makes within the game. Supervised learning where the AI algorithm learns from labeled training data, and this knowledge is applied to new data.

For instance, different aspects of player behavior can be labeled and categorized (aggressive, defensive, prefers magic, favors stealth, etc.), and a supervised learning algorithm like a Decision Tree or Neural Network could be trained on this data, Deep Learning, which is a form of machine learning that uses artificial neural networks with multiple layers (hence 'deep'), deep learning can handle complex, high dimensional data. Convolutional Neural Networks (CNNs) can be used for image-based data (such as recognizing preferred in-game locations or actions from screen images), while Recurrent Neural Networks (RNNs) or Long Short-Term Memory networks (LSTMs) can handle sequential data, like a series of actions taken by a player and Transfer Learning where a pre-trained model, often trained on a large, general dataset, is fine-tuned it for a specific task. For example, an AI model that has been generally trained on gameplay data from many players can be fine-tuned to mimic a specific player's style and preferences.

Accordingly, at step 2510 of process 2500, the gameplay session is initiated. At step 2520, the system monitors the player in the gameplay session. At step 2530, machine learning and AI analysis tune the models discussed above. At step 2540, the tuned models are now able to replicate player behavior and their performance to provide a representative experience to the other users joining their gaming session.

Predictive Model

Figure 23:
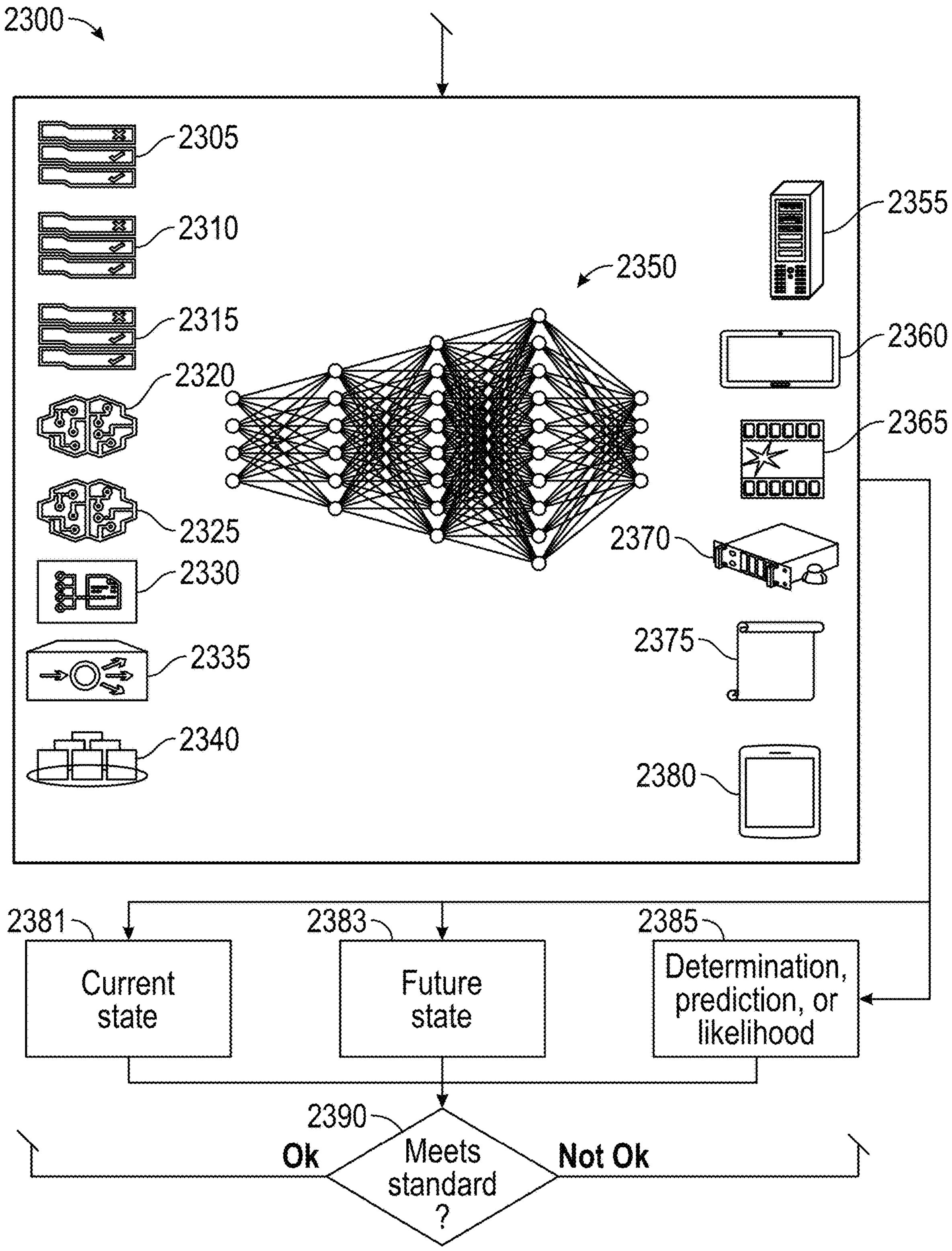
FIG. 23 depicts an artificial intelligence system, in accordance with some embodiments of the disclosure.

Throughout the present disclosure, in some embodiments, determinations, predictions, likelihoods, and the like are determined with one or more predictive models. For example, FIG. 23 depicts a predictive model. A prediction process 2300 includes a predictive model 2350 in some embodiments. The predictive model 2350 receives as input various forms of data about one, more or all the users, media content items, devices, and data described in the present disclosure. The predictive model 2350 performs analysis based on at least one of hard rules, learning rules, hard models, learning models, usage data, load data, analytics of the same, metadata, profile information, combinations of the same, or the like. The predictive model 2350 outputs one or more predictions of a future state of any of the devices described in the present disclosure. A load-increasing event is determined by load-balancing processes, e.g., least connection, least bandwidth, round robin, server response time, weighted versions of the same, resource-based processes, and address hashing. The predictive model 2350 is based on input including at least one of a hard rule 2305, a user-defined rule 2310, a rule defined by a content provider 2315, a hard model 2320, a learning model 2325, combinations of the same, or the like.

The predictive model 2350 receives as input usage data 2330. The predictive model 2350 is based, in some embodiments, on at least one of a usage pattern of the user or media device, a usage pattern of the requesting media device, a usage pattern of the media content item, a usage pattern of the communication system or network, a usage pattern of the profile, a usage pattern of the media device, combinations of the same, or the like.

The predictive model 2350 receives as input load-balancing data 2335. The predictive model 2350 is based on at least one of load data of the display device, load data of the requesting media device, load data of the media content item, load data of the communication system or network, load data of the profile, load data of the media device, combinations of the same, or the like.

The predictive model 2350 receives as input metadata 2340. The predictive model 2350 is based on at least one of metadata of the streaming service, metadata of the requesting media device, metadata of the media content item, metadata of the communication system or network, metadata of the profile, metadata of the media device, combinations of the same, or the like. The metadata includes information of the type represented in the media device manifest.

The predictive model 2350 is trained with data. The training data is developed in some embodiments using one or more data processes including but not limited to data selection, data sourcing, and data synthesis. The predictive model 2350 is trained in some embodiments with one or more analytical processes including but not limited to classification and regression trees (CART), discrete choice models, linear regression models, logistic regression, logit versus probit, multinomial logistic regression, multivariate adaptive regression splines, probit regression, regression processes, survival or duration analysis, and time series models. The predictive model 2350 is trained in some embodiments with one or more machine learning approaches including but not limited to supervised learning, unsupervised learning, semi-supervised learning, reinforcement learning, and dimensionality reduction. The predictive model 2350 in some embodiments includes regression analysis including analysis of variance (ANOVA), linear regression, logistic regression, ridge regression, and/or time series. The predictive model 2350 in some embodiments includes classification analysis including decision trees and/or neural networks. In FIG. 23, a depiction of a multi-layer neural network is provided as a non-limiting example of a predictive model 2350, the neural network including an input layer (left side), three hidden layers (middle), and an output layer (right side) with 32 neurons and 192 edges, which is intended to be illustrative, not limiting. The predictive model 2350 is based on data engineering and/or modeling processes. The data engineering processes include exploration, cleaning, normalizing, feature engineering, and scaling. The modeling processes include model selection, training, evaluation, and tuning. The predictive model 2350 is operationalized using registration, deployment, monitoring, and/or retraining processes.

The predictive model 2340 is configured to output results to a device, or multiple devices. The device includes means for performing one, more, or all the features referenced herein of the systems, methods, processes, inputs, and outputs of one or more of FIGS. 1-22, 24, and 25, in any suitable combination. The device is at least one of a server 2355, a tablet 2360, a media display device 2365, a network-connected computer 2370, a media device 2375, a computing device 2380, combinations of the same, or the like.

The predictive model 2350 is configured to output a current state 2381, and/or a future state 2383, and/or a determination, a prediction, or a likelihood 2385, and the like. The current state 2381, and/or the future state 2383, and/or the determination, the prediction, or the likelihood 2385, and the like may be compared 2390 to a predetermined or determined standard. In some embodiments, the standard is satisfied (2390=OK) or rejected (2390=NOT OK). If the standard is satisfied or rejected, the predictive process 2300 outputs at least one of the current state, the future state, the determination, the prediction, the likelihood to any device or module disclosed herein, combinations of the same, or the like.

Communication System

FIG. 24 depicts a block diagram of system 2400, in accordance with some embodiments. The system is shown to include computing device 2402, server 2404, and a communication network 2406. It is understood that while a single instance of a component may be shown and described relative to FIG. 24, additional embodiments of the component may be employed. For example, server 2404 may include, or may be incorporated in, more than one server. Similarly, communication network 2406 may include, or may be incorporated in, more than one communication network. Server 2404 is shown communicatively coupled to computing device 2402 through communication network 2406. While not shown in FIG. 24, server 2404 may be directly communicatively coupled to computing device 2402, for example, in a system absent or bypassing communication network 2406.

Communication network 2406 may include one or more network systems, such as, without limitation, the Internet, LAN, Wi-Fi, wireless, or other network systems suitable for audio processing applications. The system 2400 of FIG. 24 excludes server 2404, and functionality that would otherwise be implemented by server 2404 is instead implemented by other components of the system depicted by FIG. 24, such as one or more components of communication network 2406. In still other embodiments, server 2404 works in conjunction with one or more components of communication network 2406 to implement certain functionality described herein in a distributed or cooperative manner. Similarly, the system depicted by FIG. 24 excludes computing device 2402, and functionality that would otherwise be implemented by computing device 2402 is instead implemented by other components of the system depicted by FIG. 24, such as one or more components of communication network 2406 or server 2404 or a combination of the same. In other embodiments, computing device 2402 works in conjunction with one or more components of communication network 2406 or server 2404 to implement certain functionality described herein in a distributed or cooperative manner.

Computing device 2402 includes control circuitry 2408, display 2410 and input/output (I/O) circuitry 2412. Control circuitry 2408 may be based on any suitable processing circuitry and includes control circuits and memory circuits, which may be disposed on a single integrated circuit or may be discrete components. As referred to herein, processing circuitry should be understood to mean circuitry based on at least one microprocessors, microcontrollers, digital signal processors, programmable logic devices, field-programmable gate arrays (FPGAs), application-specific integrated circuits (ASICs), system-on-chip (SoC), application-specific standard parts (ASSPs), indium phosphide (InP)-based monolithic integration and silicon photonics, non-classical devices, organic semiconductors, compound semiconductors, "More Moore" devices, "More than Moore" devices, cloud-computing devices, combinations of the same, or the like, and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i7 processor and an Intel Core i9 processor). Some control circuits may be implemented in hardware, firmware, or software. Control circuitry 2408 in turn includes communication circuitry 2426, storage 2422 and processing circuitry 2418. Either of control circuitry 2408 and 2434 may be utilized to execute or perform any or all the systems, methods, processes, inputs, and outputs of one or more of FIGS. 1-23, and 25, or any combination of steps thereof (e.g., as enabled by processing circuitries 2418 and 2436, respectively).

In addition to control circuitry 2408 and 2434, computing device 2402 and server 2404 may each include storage (storage 2422, and storage 2438, respectively). Each of storages 2418 and 2438 may be an electronic storage device. As referred to herein, the phrase "electronic storage device" or "storage device" should be understood to mean any device for storing electronic data, computer software, or firmware, such as random-access memory, read-only memory, cloud-based storage, hard drives, optical drives, digital video disc (DVD) recorders, compact disc (CD) recorders, BLU-RAY disc (BD) recorders, BLU-RAY 8D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 2422 and 2438 may be used to store several types of content, metadata, and/or other types of data. Non-volatile memory may also be used (e.g., to launch a boot-up routine and other instructions). Cloud-based storage may be used to supplement storages 2418 and 2438 or instead of storages 2418 and 2438. In some embodiments, a user profile and messages corresponding to a chain of communication may be stored in one or more of storages 2418 and 2438. Each of storages 2418 and 2438 may be utilized to store commands, for example, such that when each of processing circuitries 2418 and 2436, respectively, are prompted through control circuitries 2408 and 2434, respectively. Either of processing circuitries 2418 or 2436 may execute any of the systems, methods, processes, inputs, and outputs of one or more of FIGS. 1-23, and 25, or any combination of steps thereof.

In some embodiments, control circuitry 2408 and/or 2434 executes instructions for an application stored in memory (e.g., storage 2422 and/or storage 2438). Specifically, control circuitry 2408 and/or 2434 may be instructed by the application to perform the functions discussed herein. In some embodiments, any action performed by control circuitry 2408 and/or 2434 may be based on instructions received from the application. For example, the application may be implemented as software or a set of and/or one or more executable instructions that may be stored in storage 2422 and/or 2438 and executed by control circuitry 2408 and/or 2434. The application may be a client/server application where only a client application resides on computing device 2402, and a server application resides on server 2404.

The application may be implemented using any suitable architecture. For example, it may be a stand-alone application wholly implemented on computing device 2402. In such an approach, instructions for the application are stored locally (e.g., in storage 2422), and data for use by the application is downloaded on a periodic basis (e.g., from an out-of-band feed, from an Internet resource, or using another suitable approach). Control circuitry 2408 may retrieve instructions for the application from storage 2422 and process the instructions to perform the functionality described herein. Based on the processed instructions, control circuitry 2408 may determine a type of action to perform in response to input received from I/O circuitry 2412 or from communication network 2406.

The computing device 2402 is configured to communicate with an I/O device via the I/O circuitry 2412. The I/O device includes any suitable device. In some embodiments, the user input 2414 is received from the I/O device. A wired and/or wireless connection between the I/O circuitry 2412 and the I/O device is provided in some embodiments.

In client/server-based embodiments, control circuitry 2408 may include communication circuitry suitable for communicating with an application server (e.g., server 2404) or other networks or servers. The instructions for conducting the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 2406). In another example of a client/server-based application, control circuitry 2408 runs a web browser that interprets web pages provided by a remote server (e.g., server 2404). For example, the remote server may store the instructions for the application in a storage device.

The remote server may process the stored instructions using circuitry (e.g., control circuitry 2434) and/or generate displays. Computing device 2402 may receive the displays generated by the remote server and may display the content of the displays locally via display 2410. For example, display 2410 may be utilized to present a string of characters. This way, the processing of the instructions is performed remotely (e.g., by server 2404) while the resulting displays, such as the display windows described elsewhere herein, are provided locally on computing device 2404. Computing device 2402 may receive inputs from the user via input/output circuitry 2412 and send those inputs to the remote server for processing and generating the corresponding displays.

Alternatively, computing device 2402 may receive inputs from the user via input/output circuitry 2412 and process and display the received inputs locally, by control circuitry 2408 and display 2410, respectively. For example, input/output circuitry 2412 may correspond to a keyboard and/or a set of and/or one or more speakers/microphones which are used to receive user inputs (e.g., input as displayed in a search bar or a display of FIG. 24 on a computing device). Input/output circuitry 2412 may also correspond to a communication link between display 2410 and control circuitry 2408 such that display 2410 updates in response to inputs received via input/output circuitry 2412 (e.g., simultaneously update what is shown in display 2410 based on inputs received by generating corresponding outputs based on instructions stored in memory via a non-transitory, computer-readable medium).

Server 2404 and computing device 2402 may send and receive content and data such as media content via communication network 2406. For example, server 2404 may be a media content provider, and computing device 2402 may be a smart television configured to download or stream media content, such as a live news broadcast, from server 2404. Control circuitry 2434, 2408 may send and receive commands, requests, and other suitable data through communication network 2406 using communication circuitry 2432, 2426, respectively. Alternatively, control circuitry 2434, 2408 may communicate directly with each other using communication circuitry 2432, 2426, respectively, avoiding communication network 2406.

It is understood that computing device 2402 is not limited to the embodiments and methods shown and described herein. In nonlimiting examples, computing device 2402 may be a television, a Smart TV, a set-top box, an integrated receiver decoder (TRD) for controlling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, computing equipment, or wireless device, and/or combination of the same, capable of suitably displaying and manipulating media content.

Computing device 2402 receives user input 2414 at input/output circuitry 2412. For example, computing device 2402 may receive a user input such as a user swipe or user touch. It is understood that computing device 2402 is not limited to the embodiments and methods shown and described herein.

User input 2414 may be received from a user selection-capturing interface that is separate from device 2402, such as a remote-control device, trackpad, or any other suitable user movement-sensitive, audio-sensitive or capture devices, or as part of device 2402, such as a touchscreen of display 2410. Transmission of user input 2414 to computing device 2402 may be accomplished using a wired connection, such as an audio cable, universal serial bus (USB) cable, ethernet cable and the like attached to a corresponding input port at a local device, or may be accomplished using a wireless connection, such as Bluetooth, Wi-Fi, WiMAX, GSM, UTMS, CDMA, TDMA, 3G, 4G, 4G LTE, 5G, NearLink, ultra-wideband technology, or any other suitable wireless transmission protocol. Input/output circuitry 2412 may include a physical input port such as a 12.5 mm (0.4921 inch) audio jack, RCA audio jack, USB port, ethernet port, or any other suitable connection for receiving audio over a wired connection or may include a wireless receiver configured to receive data via Bluetooth, Wi-Fi, WiMAX, GSM, UTMS, CDMA, TDMA, 3G, 4G, 4G LTE, 5G, NearLink, ultra-wideband technology, or other wireless transmission protocols.

Processing circuitry 2418 may receive user input 2414 from input/output circuitry 2412 using communication path 2416. Processing circuitry 2418 may convert or translate the received user input 2414 that may be in the form of audio data, visual data, gestures, or movement to digital signals. In some embodiments, input/output circuitry 2412 performs the translation to digital signals. In some embodiments, processing circuitry 2418 (or processing circuitry 2436, as the case may be) conducts disclosed processes and methods.

Processing circuitry 2418 may provide requests to storage 2422 by communication path 2420. Storage 2422 may provide requested information to processing circuitry 2418 by communication path 2446. Storage 2422 may transfer a request for information to communication circuitry 2426 which may translate or encode the request for information to a format receivable by communication network 2406 before transferring the request for information by communication path 2428. Communication network 2406 may forward the translated or encoded request for information to communication circuitry 2432, by communication path 2430.

At communication circuitry 2432, the translated or encoded request for information, received through communication path 2430, is translated or decoded for processing circuitry 2436, which will provide a response to the request for information based on information available through control circuitry 2434 or storage 2438, or a combination thereof. The response to the request for information is then provided back to communication network 2406 by communication path 2440 in an encoded or translated format such that communication network 2406 forwards the encoded or translated response back to communication circuitry 2426 by communication path 2442.

At communication circuitry 2426, the encoded or translated response to the request for information may be provided directly back to processing circuitry 2418 by communication path 2454 or may be provided to storage 2422 through communication path 2444, which then provides the information to processing circuitry 2418 by communication path 2446. Processing circuitry 2418 may also provide a request for information directly to communication circuitry 2426 through communication path 2452, where storage 2422 responds to an information request (provided through communication path 2420 or 2444) by communication path 2424 or 2446 that storage 2422 does not contain information pertaining to the request from processing circuitry 2418.

Processing circuitry 2418 may process the response to the request received through communication paths 2446 or 2454 and may provide instructions to display 2410 for a notification to be provided to the users through communication path 2448. Display 2410 may incorporate a timer for providing the notification or may rely on inputs through input/output circuitry 2412 from the user, which are forwarded through processing circuitry 2418 through communication path 2448, to determine how long or in what format to provide the notification. When display 2410 determines the display has been completed, a notification may be provided to processing circuitry 2418 through communication path 2450.

The communication paths provided in FIG. 24 between computing device 2402, server 2404, communication network 2406, and all subcomponents depicted are examples and may be modified to reduce processing time or enhance processing capabilities for each step in the processes disclosed herein by one skilled in the art.

Terminology

The terminology used herein is for the purpose of describing particular embodiments only and is not intended to be limiting of the disclosure.

As used herein, the term extended reality (XR) includes at least one of augmented reality (AR), three-dimensional (3D)

content, four-dimensional (4D) experiences, virtual reality (VR), mixed reality (MR), interactive experiences, control using next-generation user interfaces (next-gen UIs), combinations of the same, or the like.

As used herein, the terms "real time," "simultaneous," "substantially on-demand," and the like are understood to be nearly instantaneous but may include delay due to practical limits of the system. Such delays may be in the order of milliseconds, microseconds or less, depending on the application and nature of the processing. Relatively longer delays (e.g., greater than a millisecond) may result due to communication or processing delays, particularly in remote and cloud computing environments.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although at least some embodiments are described as using a plurality of units or modules to perform a process or processes, it is understood that the process or processes may also be performed by one or a plurality of units or modules. Additionally, it is understood that the term controller/control unit may refer to a hardware device that includes a memory and a processor. The memory may be configured to store the units or the modules, and the processor may be specifically configured to execute said units or modules to perform one or more processes which are described herein.

Unless specifically stated or obvious from context, as used herein, the term "about" is understood as within a range of normal tolerance in the art, for example within 2 standard deviations of the mean. "About" may be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The use of the terms "first", "second", "third", and so on, herein, are provided to identify structures or operations, without describing an order of structures or operations, and, to the extent the structures or operations are used in an embodiment, the structures may be provided or the operations may be executed in a different order from the stated order unless a specific order is definitely specified in the context.

The methods, processes, and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory (e.g., a non-transitory, computer-readable medium accessible by an application via control or processing circuitry from storage) including, but not limited to, volatile and non-volatile computer memory or storage devices such as a hard disk, floppy disk, USB drive, DVD, CD, media cards, register memory, processor caches, random access memory (RAM), UltraRAM, cloud-based storage, and the like.

The interfaces, processes, and analysis described may, in some embodiments, be performed by an application. The application may be loaded directly onto each device of any of the systems described or may be stored in a remote server or any memory and processing circuitry accessible to each device in the system. The generation of interfaces and analysis there-behind may be performed at a receiving device, a sending device, or some device or processor therebetween.

Any use of a phrase such as "in some embodiments" or the like with reference to a feature is not intended to link the feature to another feature described using the same or a similar phrase. Any and all embodiments disclosed herein are combinable or separately practiced as appropriate. Absence of the phrase "in some embodiments" does not infer that the feature is necessary. Inclusion of the phrase "in some embodiments" does not infer that the feature is not applicable to other embodiments or even all embodiments.

The systems and processes discussed herein are intended to be illustrative and not limiting. One skilled in the art would appreciate that the actions of the processes discussed herein may be omitted, modified, combined, duplicated, rearranged, and/or substituted, and any additional actions may be performed without departing from the scope of the invention. More generally, the disclosure herein is meant to provide examples and is not limiting. Only the claims that follow are meant to set bounds as to what the present disclosure includes. Furthermore, it should be noted that the features and limitations described in any some embodiments may be applied to any other embodiment herein, and flowcharts or examples relating to some embodiments may be combined with any other embodiment in a suitable manner, done in different orders, or done in parallel. In addition, the methods, processes, and systems described herein may be performed in real time. It should also be noted that the methods, processes, and/or systems described herein may be applied to, or used in accordance with, other methods, processes, and/or systems.

This description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for inviting remote players and controlling remote player connections via a console device or a cloud service client of a game publisher, the method comprising:

logging a profile associated with a console or game owner in to a console device or cloud service (CD/CS) using credentials;

sending, from a user account and authentication system (UAAS) of a console game provider or cloud service (CGP/CS), a user-authenticated response with a user identification to the CD/CS and a user authentication, user search, or user connection (UA/US/UC) response to a UA/US/UC controller of the CD/CS;

based at least in part on a user selection of an option to invite remote player devices, sending, from the UA/US/UC controller of the CD/CS, a participants list request with the user identification to the UAAS of the CGP/CS;

sending, from the UAAS, a user list with user names and user identifications to the UA/US/UC controller; and based at least in part on receiving user selection of one or more remote player devices from the user list via the CD/CS, sending a user invite request to the one or more selected remote player devices, wherein the user invite request comprises connection endpoints to establish an ultra-low latency peer-to-peer connection between the CD/CS and the one or more selected remote player devices.

2. The method of claim 1, comprising:

based at least in part on user selection of one or more remote player devices to invite from the user list, adding the selected user identifications to an invite list for remote player devices to invite at the CD/CS;

based at least in part on user entry of a name and user selection of a search, sending, from the UA/US/UC controller, a search request with a user name and user identification to the UAAS; and sending, from the UAAS, the user list with user names and an empty response to the UAAS and machine user names and user identifications to the UA/US/UC controller.

3. The method of claim 2, comprising:

based at least in part on identifying the user identification in the UAAS, sending, from the UAAS, the user list with user names and user identifications response to the UAAS and the machine user names and the user identifications to the UA/US/UC controller; and based at least in part on user addition of a searched user to the invite list, adding the selected user identification to the invite list for remote player devices to invite at the CD/CS.

4. The method of claim 3, comprising:

based at least in part on user selection of a send invite selection option, sending, from a remote play controller of the CD/CS, a remote session request with the user identification and remote session identifier to a remote player management controller of the CGP/CS; and sending, from the remote player management controller of the CGP/CS or a remote play controller of the CD/CS, a remote session response with the remote session identifier to the remote play controller of the CD/CS.

5. The method of claim 4, comprising:

sending, from the remote play controller of the CD/CS, to the one or more selected remote player devices an invite with the user identification list, a requesting user name and user identification, RTP streaming connection endpoint, and controller connection UDP 1 connection endpoint, UDP 2 connection endpoint, UDP 3 connection endpoint, UDP 4 connection endpoint, and remote session identifier to the remote player management controller of the CGP/CS.

6. The method of claim 5, comprising:

sending, from the remote player management controller of the CGP/CS, the user invite request with the requesting user name and user identification, RTP streaming connection endpoint, and controller connection UDP 1 connection endpoint, UDP 2 connection endpoint, UDP 3 connection endpoint, UDP 4 connection endpoint, and remote session identifier to each selected remote player device.

7. The method of claim 6, comprising:

sending, from the CD/CS, the user authentication, user search, and UA/US/UC management controller user login with credentials to the UAAS of the CGP/CS.

8. The method of claim 5, wherein the remote player management controller facilitates exchange of the connection endpoints and subsequently refrains from relaying gameplay data, such that an ultra-low latency peer-to-peer connection is formed directly between the CD/CS and the one or more selected remote player devices.

9. The method of claim 8, comprising:

detecting that a network quality associated with a selected remote player device falls below a threshold required for peer-to-peer gameplay; and in response, suspending controller input from the selected remote player device and maintaining delivery of game video to the selected remote player device using an adaptive bitrate streaming connection.

10. The method of claim 9, comprising:

in response to the suspension of controller input from the selected remote player device, controlling gameplay actions associated with the selected remote player device using an artificial intelligence model trained on prior gameplay input of the selected remote player.

11. The method of claim 5, wherein the user invite request comprises a secure, session-specific link that is usable from outside a native game service client, and wherein activation of the secure, session-specific link at a remote player device initiates authentication with the UAAS and subsequent joining of the remote session using the remote session identifier.

12. The method of claim 4, wherein the remote session identifier uniquely associates the user invite request with a single remote gameplay session, and wherein the remote session identifier is invalidated after acceptance of the user invite request by a remote player device.

13. The method of claim 1, wherein the user selection of the option to invite remote players occurs while a game executing on the CD/CS is in a paused state, and wherein the participants list request is sent in response to detection of the paused state at the CD/CS.

14. A system for inviting remote players and controlling remote player connections via a console device or a cloud service client of a game publisher, the system comprising:

a memory and a communication port; and control circuitry communicably coupled to the memory and the communication port and configured to execute the instructions to:

log a profile associated with a console or game owner in to a console device or cloud service (CD/CS) using credentials;

send, from a user account and authentication system (UAAS) of a console game provider or cloud service (CGP/CS), a user-authenticated response with a user identification to the CD/CS and a user authentication, user search, or user connection (UA/US/UC) response to a UA/US/UC controller of the CD/CS;

based at least in part on a user selection of an option to invite remote player devices, send, from the UA/US/UC controller of the CD/CS, a participants list request with the user identification to the UAAS of the CGP/CS;

send, from the UAAS, a user list with user names and user identifications to the UA/US/UC controller; and based at least in part on receiving user selection of one or more remote player devices from the user list via the CD/CS, send a user invite request to the one or more selected remote player devices, wherein the user invite request comprises connection endpoints to establish an ultra-low latency peer-to-peer connection between the CD/CS and the one or more selected remote player devices.

15. The system of claim 14, wherein the control circuitry is configured to execute the instructions to:

based at least in part on user selection of one or more remote player devices to invite from the user list, add the selected user identifications to an invite list for remote player devices to invite at the CD/CS;

based at least in part on user entry of a name and user selection of a search, send, from the UA/US/UC controller, a search request with a user name and user identification to the UAAS; and send, from the UAAS, the user list with user names and an empty response to the UAAS and machine user names and user identifications to the UA/US/UC controller.

16. The system of claim 15, wherein the control circuitry is configured to execute the instructions to:

based at least in part on identifying the user identification in the UAAS, send, from the UAAS, the user list with user names and user identifications response to the UAAS and the machine user names and the user identifications to the UA/US/UC controller; and based at least in part on user addition of a searched user to the invite list, add the selected user identification to the invite list for remote player devices to invite at the CD/CS.

17. The system of claim 16, wherein the control circuitry is configured to execute the instructions to:

based at least in part on user selection of a send invite selection option, send, from a remote play controller of the CD/CS, a remote session request with the user identification and remote session identifier to a remote player management controller of the CGP/CS; and send, from the remote player management controller of the CGP/CS or a remote play controller of the CD/CS, a remote session response with the remote session identifier to the remote play controller of the CD/CS.

18. The system of claim 17, wherein the control circuitry is configured to execute the instructions to:

send, from the remote play controller of the CD/CS, to the one or more selected remote player devices an invite with the user identification list, a requesting user name and user identification, RTP streaming connection endpoint, and controller connection UDP 1 connection endpoint, UDP 2 connection endpoint, UDP 3 connection endpoint, UDP 4 connection endpoint, and remote session identifier to the remote player management controller of the CGP/CS.

19. The system of claim 18, wherein the control circuitry is configured to execute the instructions to:

send, from the remote player management controller of the CGP/CS, the user invite request with the requesting user name and user identification, RTP streaming connection endpoint, and controller connection UDP 1 connection endpoint, UDP 2 connection endpoint, UDP 3 connection endpoint, UDP 4 connection endpoint, and remote session identifier to each selected remote player device.

20. The system of claim 19, wherein the control circuitry is configured to execute the instructions to:

send, from the CD/CS, the user authentication, user search, and UA/US/UC management controller user login with credentials to the UAAS of the CGP/CS.

* * * * *